United States Patent [19]

Bloomberg et al.

[11] Patent Number: 5,402,504
[45] Date of Patent: * Mar. 28, 1995

[54] SEGMENTATION OF TEXT STYLES

[75] Inventors: Dan S. Bloomberg, Palo Alto; M. Margaret Withgott, Los Alto, both of Calif.

[73] Assignee: Xerox Corporation, Rochester, N.Y.

[*] Notice: The portion of the term of this patent subsequent to Jan. 19, 2010 has been disclaimed.

[21] Appl. No.: 750,156

[22] Filed: Aug. 28, 1991

Related U.S. Application Data

[63] Continuation-in-part of Ser. No. 449,263, Dec. 8, 1989, abandoned, and a continuation-in-part of Ser. No. 627,284, Dec. 13, 1990, abandoned.

[51] Int. Cl.$^6$ .......................... G06K 9/34; G06K 9/56; G06K 9/64; G06K 9/44
[52] U.S. Cl. ............................................ 382/9; 382/27; 382/33; 382/55
[58] Field of Search ....................... 382/21, 22, 27, 41, 382/49, 55, 9, 48, 16, 28, 33, 34

[56] References Cited

U.S. PATENT DOCUMENTS

| | | | |
|---|---|---|---|
| 3,611,291 | 10/1971 | Frank | 340/146.3 Z |
| 3,634,822 | 1/1972 | Chow | 340/146.3 S |
| 3,709,525 | 1/1973 | Frank | 283/1 |
| 4,167,728 | 9/1979 | Sternberg | 340/146.3 MA |
| 4,334,241 | 6/1982 | Kashioka et al. | 358/107 |
| 4,395,698 | 7/1983 | Sternberg et al. | 382/27 |
| 4,408,342 | 10/1983 | Grabowski et al. | 382/9 |
| 4,499,499 | 2/1985 | Brickman et al. | 358/263 |
| 4,516,262 | 5/1985 | Sakurai | 382/18 |
| 4,516,266 | 5/1985 | Christopher et al. | 382/48 |
| 4,547,895 | 10/1985 | Mita et al. | 382/8 |
| 4,588,211 | 5/1986 | Greene | 283/70 |
| 4,634,148 | 1/1987 | Greene | 283/70 |

(List continued on next page.)

FOREIGN PATENT DOCUMENTS

| | | | |
|---|---|---|---|
| 0081767 | 6/1983 | European Pat. Off. | H04N 1/40 |
| 0288266 | 10/1988 | European Pat. Off. | G06K 9/00 |

OTHER PUBLICATIONS

Proceedings SPIE Conference Image Algebra and Morphological Image Processing, vol. 1350, 10–12 Jul. 1990, San Diego, USA, pp. 116–128 D. Bloomberg and P. Maragos "Generalized Hit–Miss Operations".
Postl, "Detection of Linear Oblique Structures and Skew Scan in Digitized Documents;" *Int'l. Conf. on Pattern Recog.* (1986).
Haralick et al., "Image Analysis Using Mathematical (List continued on next page.)

*Primary Examiner*—Leo H. Boudreau
*Assistant Examiner*—Michael Cammarata
*Attorney, Agent, or Firm*—Townsend and Townsend Khourie and Crew

[57] ABSTRACT

A method and apparatus for differentiating and extracting handwritten annotations and machine printed text in an image. The method provides for the use of morphological operations, preferably at reduced scale, to eliminate for example, the handwritten annotations from an image. A separation mask is produced that, for example, converts all the image pixels corresponding to machine printed text, and none of the image pixels corresponding to handwritten or handprinted annotations. The separation mask is used in conjunction with the original image to produce separate handwritten annotations and machine printed text images. The invention also provides a method and apparatus for identifying the location of specialized type styles such as bold and italic is disclosed. The method erodes a binary image utilizing structuring elements which provide a relatively large number of hits in regions containing the specialized type styles. The destination image resulting from the erosion is coalesced so as to form masks which may be used to extract portions of the original image containing the specialized type styles.

38 Claims, 37 Drawing Sheets

U.S. PATENT DOCUMENTS

| | | | |
|---|---|---|---|
| 4,644,585 | 2/1987 | Crimmins et al. | 382/48 |
| 4,665,554 | 5/1987 | Sternberg | 382/27 |
| 4,710,965 | 12/1987 | Kobayashi | 382/41 |
| 4,724,309 | 2/1988 | Greene | 235/468 |
| 4,741,046 | 4/1988 | Matsunawa et al. | 382/9 |
| 4,757,551 | 7/1988 | Kobayashi et al. | 382/18 |
| 4,809,348 | 2/1989 | Meyer et al. | 382/49 |
| 4,817,169 | 3/1989 | Peppers et al. | 382/9 |
| 4,821,333 | 4/1989 | Gillies | 382/49 |
| 4,910,787 | 3/1990 | Umeda et al. | 382/25 |
| 4,933,979 | 6/1990 | Suzuki et al. | 382/61 |
| 4,959,868 | 9/1990 | Tanioka | 382/41 |
| 5,048,109 | 9/1991 | Bloomberg et al. | 382/50 |
| 5,065,437 | 11/1991 | Bloomberg | 382/9 |
| 5,140,650 | 8/1992 | Casey et al. | 382/61 |
| 5,202,933 | 4/1993 | Bloomberg | 382/9 |

OTHER PUBLICATIONS

Morphology," *IEEE*, vol. PAMI-9, No. 4, Jul. 1987, pp. 532–550.

Wong et al., "Document Analysis System," *IBM J. Res. Develop.* (1982) 26:647–656.

Suenaga et al., "A Facsimile Based Manuscript Layout & Editing System by Auxiliary Mark Recognition," *IEEE* (1980) 2:856–858.

Suenaga, "A Facsimile Based Text Editor Using Handwritten Mark Recognition," *Proc. of 6th Int'l Joint Conf. on Artificial Intelligence*, Tokyo, Aug. 20–23, 1979, vol. 2, pp. 856–858.

USSN 07/449,624 entitled "Identification and Segmentation of Finely Textured and Solid Regions of Binary Images".

USSN 07/448,193 entitled "Identification, Characterization, and Segmentation of Halftone or Stippled Regions of Binary Images".

USSN 07/447,985 entitled "Detection of Highlighted Regions".

USSN 07/449,626 entitled "Segmentation of Text and Graphics".

USSN 07/449,627 entitled "Image Reduction/Enlargement Technique".

USSN 07/449,203 entitled "Image Registration".

USSN 07/448,774 entitled "Method and Apparatus for Identification of Document Skew".

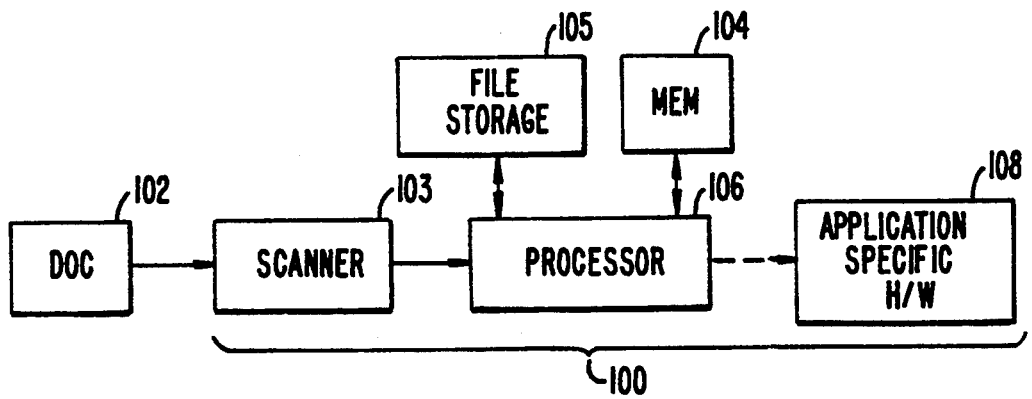
FIG._1A.
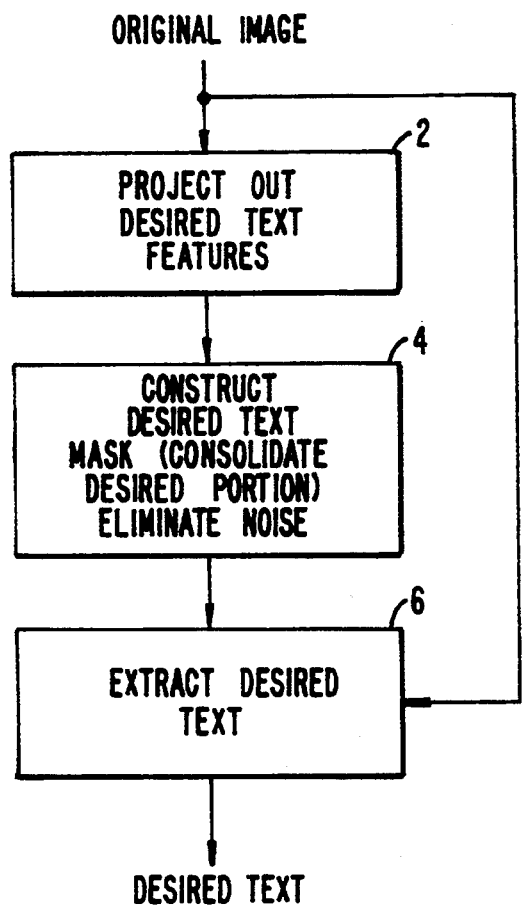
FIG._1B.

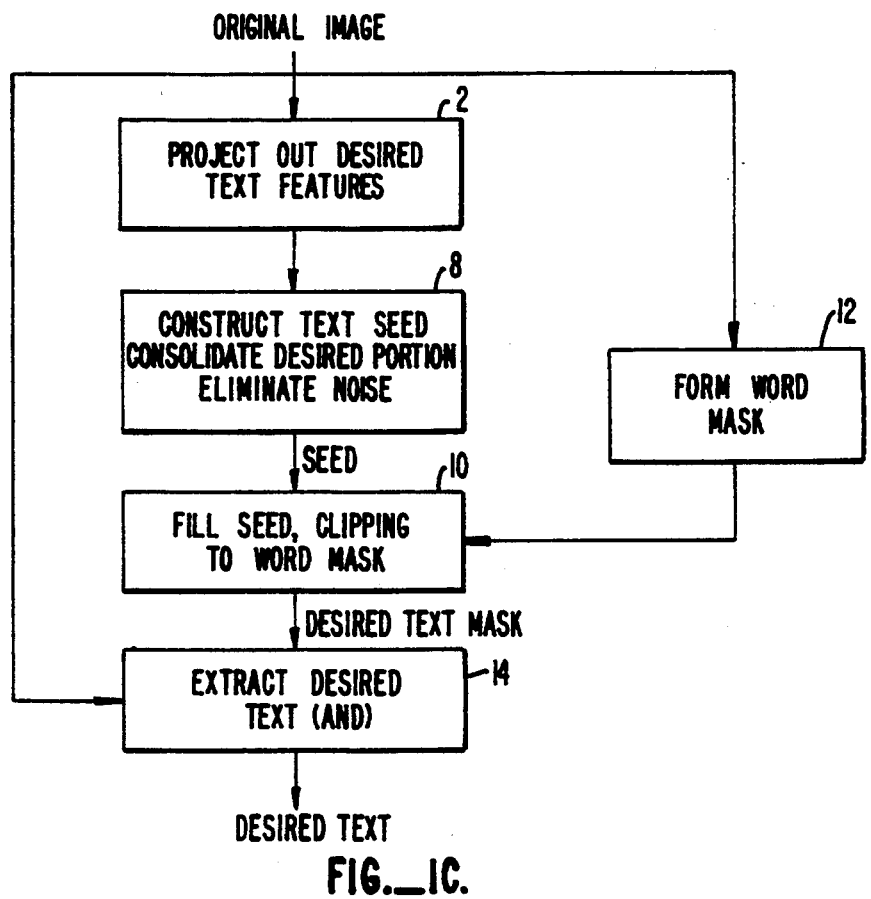
FIG._1C.
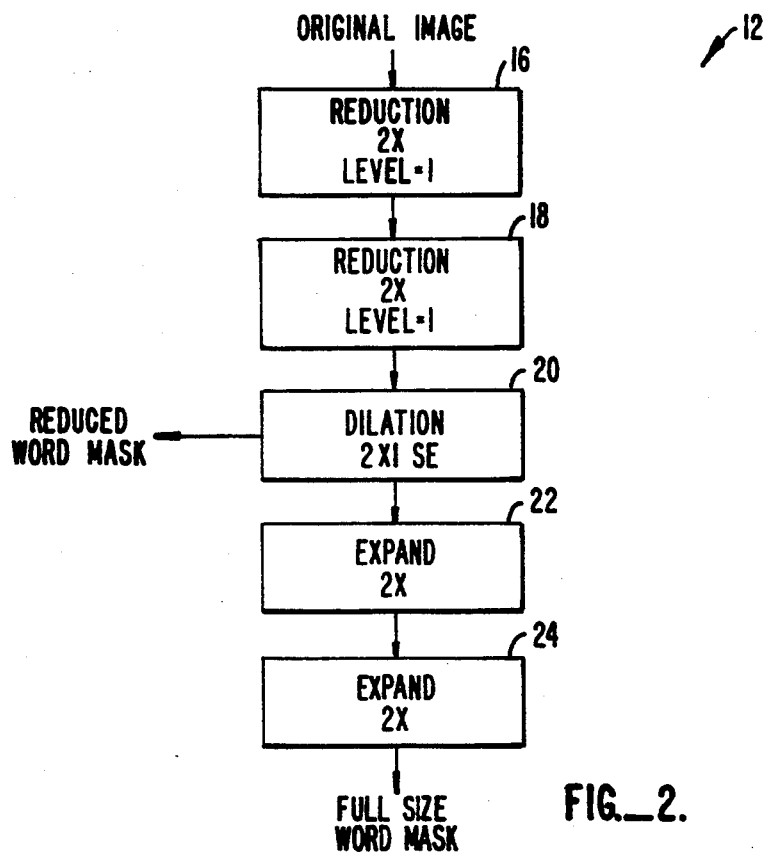
FIG._2.

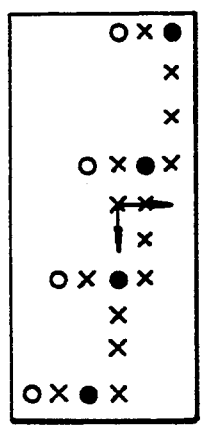
FIG._3A.
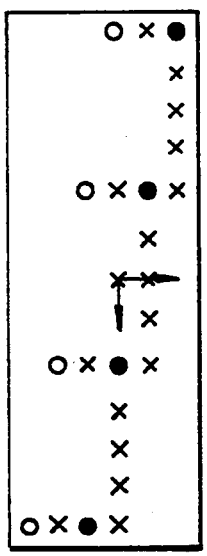
FIG._3B.
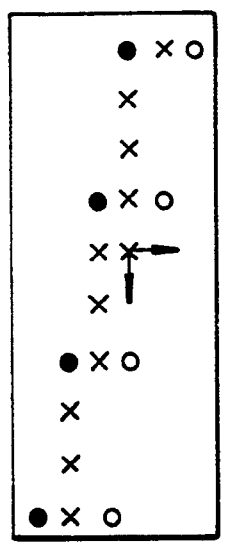
FIG._3C.
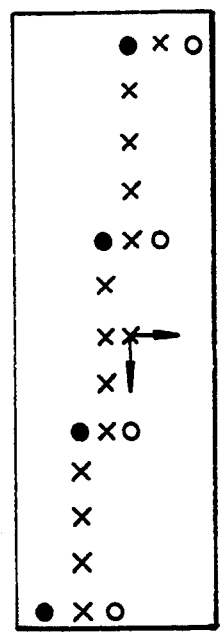
FIG._3D.
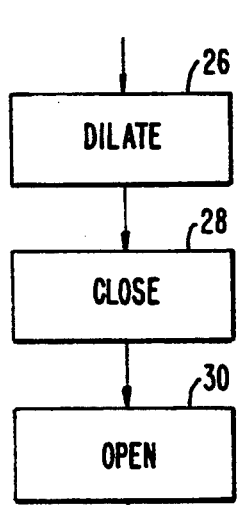
FIG._4.
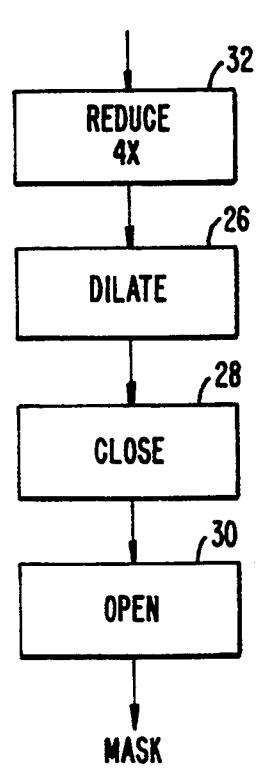
FIG._5.

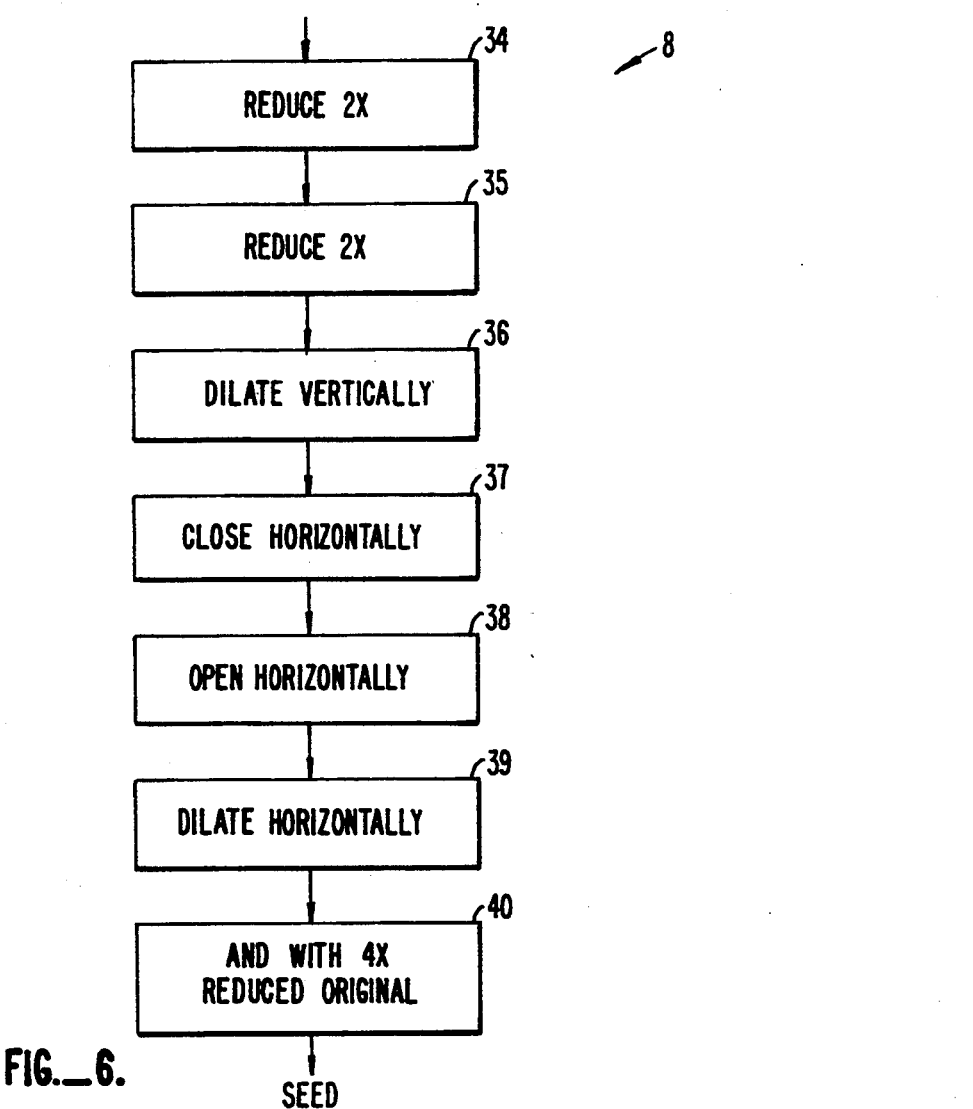
FIG._6.
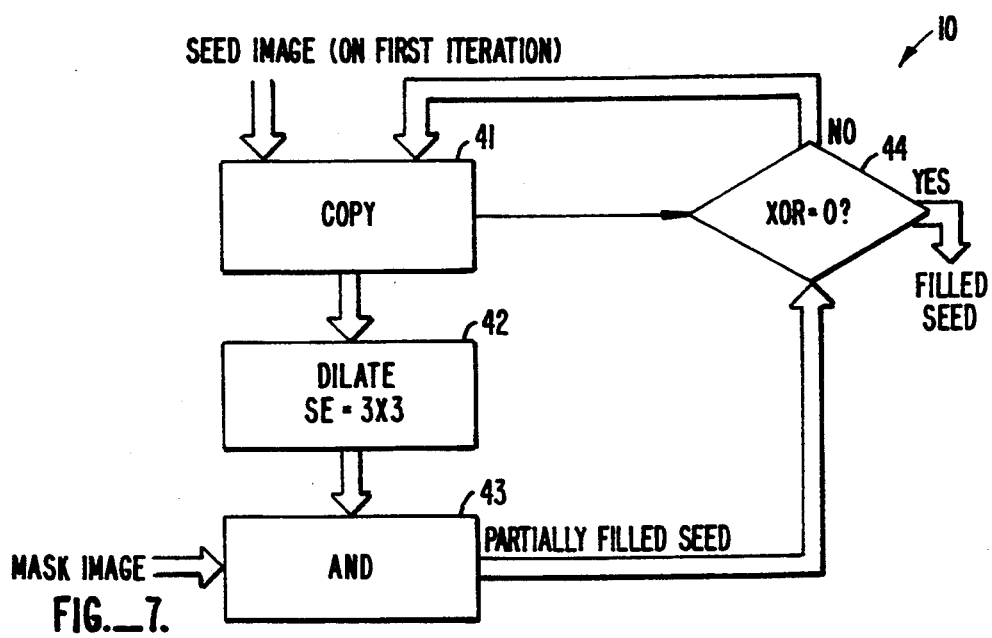
FIG._7.

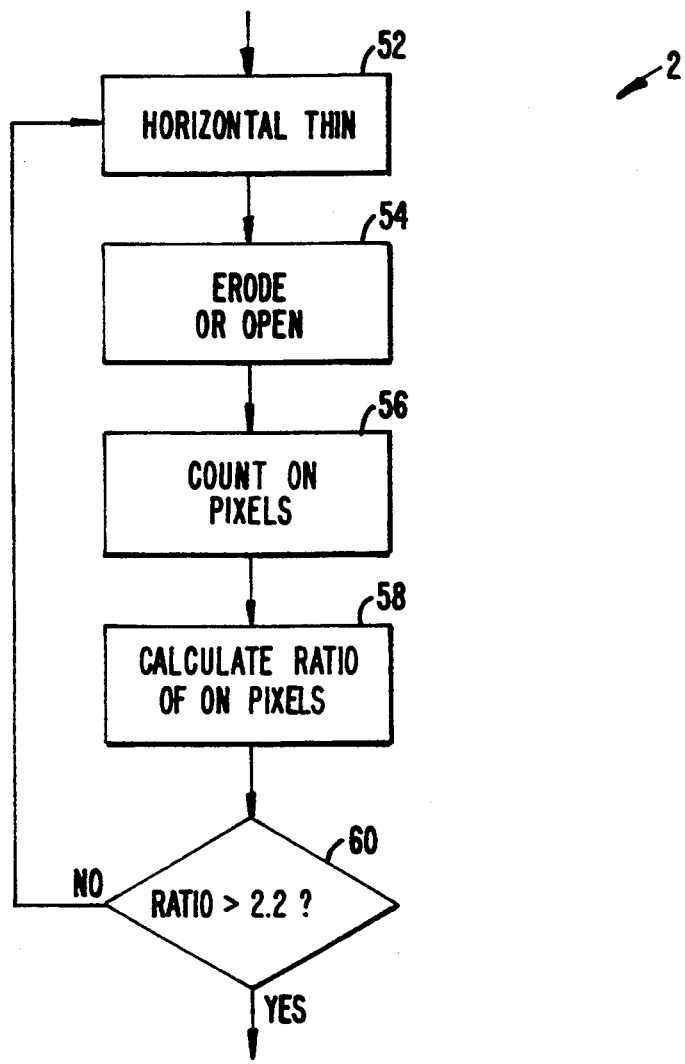
FIG._8A.
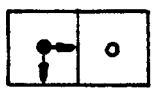
FIG._8B.
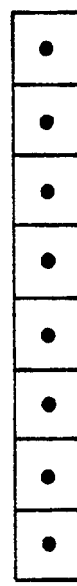
FIG._8C.

remf *place indicator* [Macro]

This removes from the property list stored in *place* the property with an indicator eq to *indicator*. The property indicator and the corresponding value are removed by destructively splicing the property list. remf returns nil if no such property was found, or some non-nil value if a property was found. The form *place* may be any generalized variable acceptable to setf. See remprop.

get-properties *place indicator-list* [Function]

get-properties is like getf, except that the second argument is a list of indicators. get-properties searches the property list stored in *place* for any of the indicators in *indicator-list* until it finds the first property in the property list whose

FIG._9.

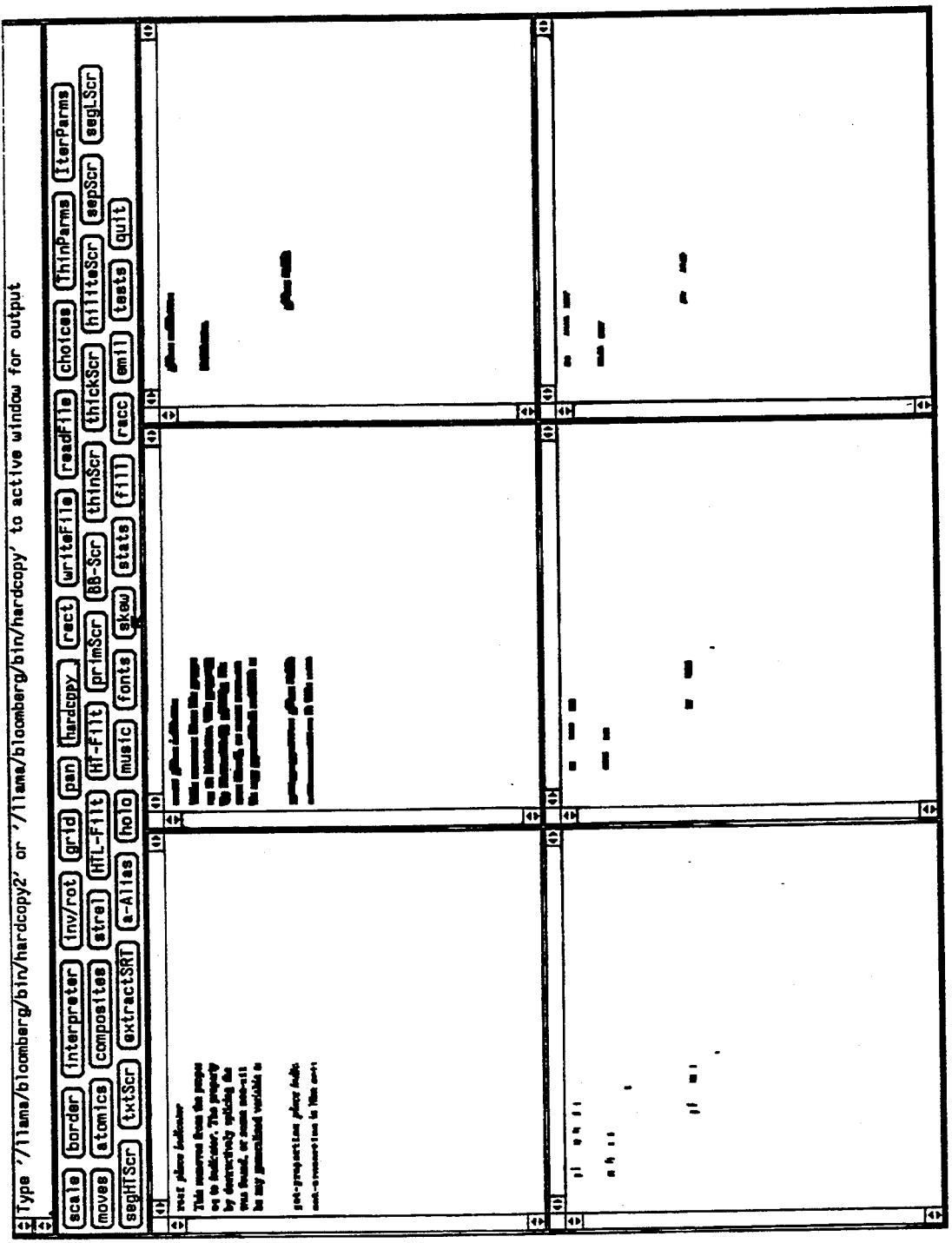
FIG._10.

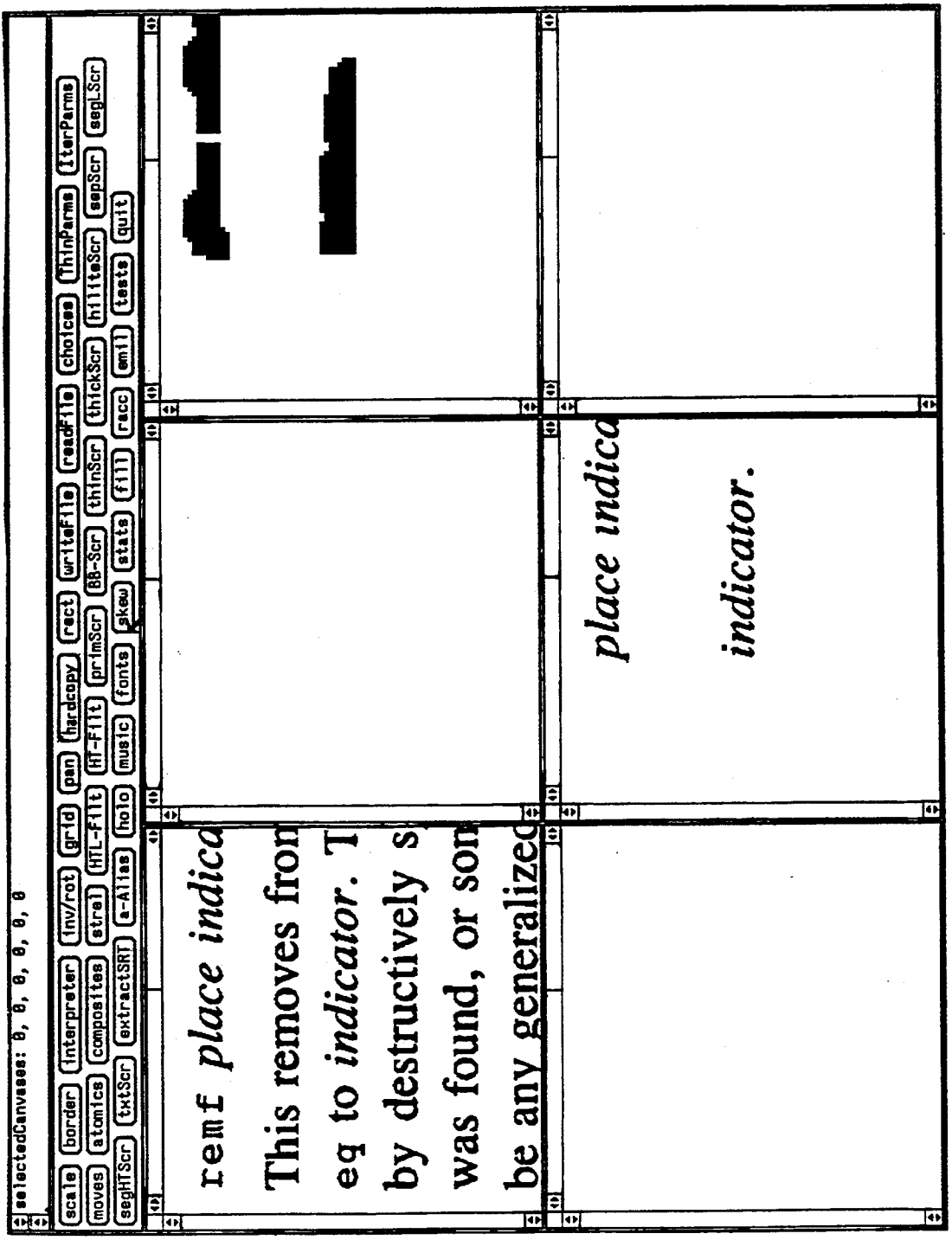
FIG._11.

Consider the CL type *string*. The CL system "knows" how can supply an argument to the type specifier to indicate th string. You can define new types using string with its typ more of not, and or or, using the CL deftype special form The *presentation type string*, on the other hand, allows you list of characters that serve as delimiters during parsing o accept function. More importantly, the string presentation history: when (accept 'string) is invoked, the system off accepted string as the default.

FIG._12.

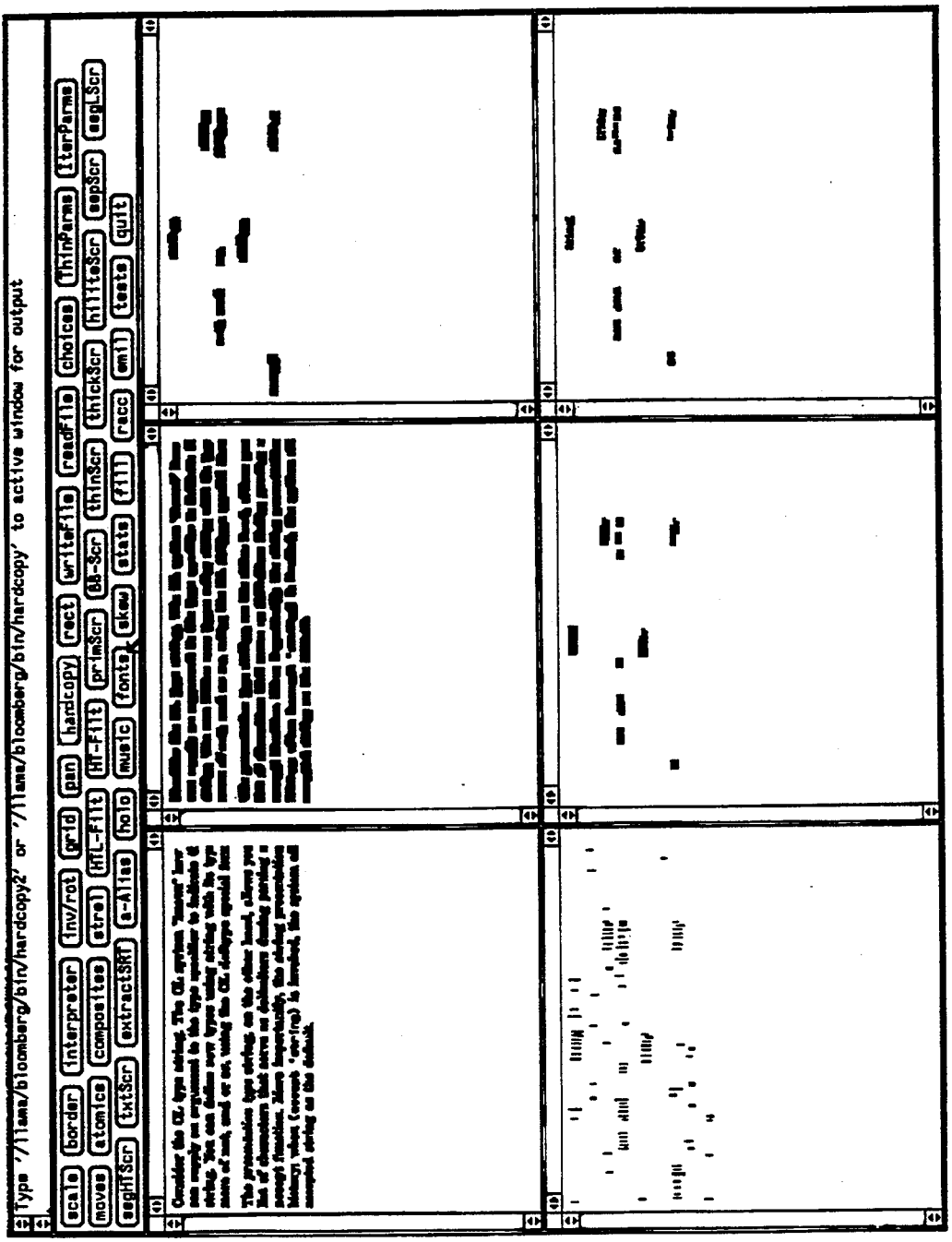
FIG._13.

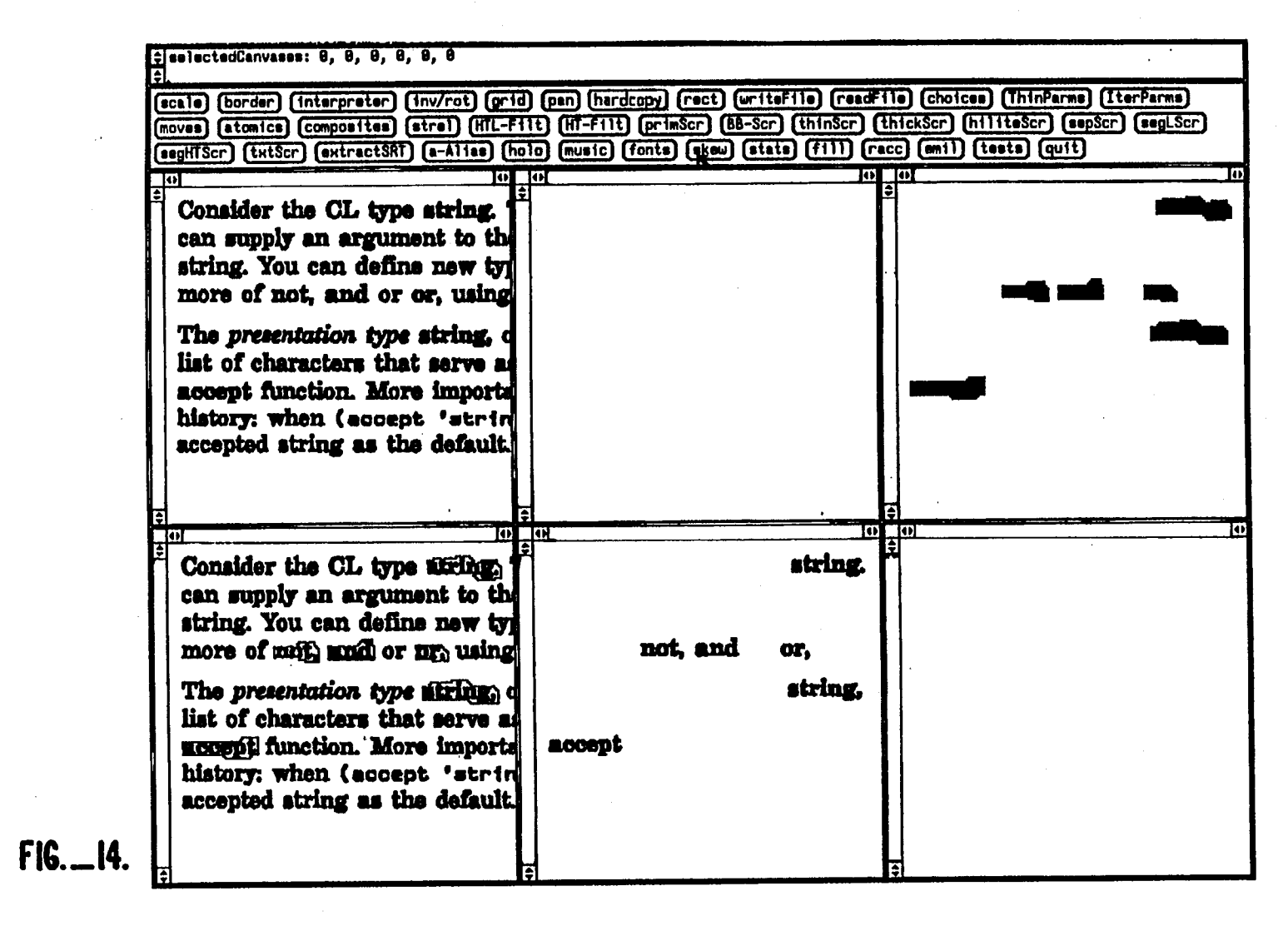

FIG._14.

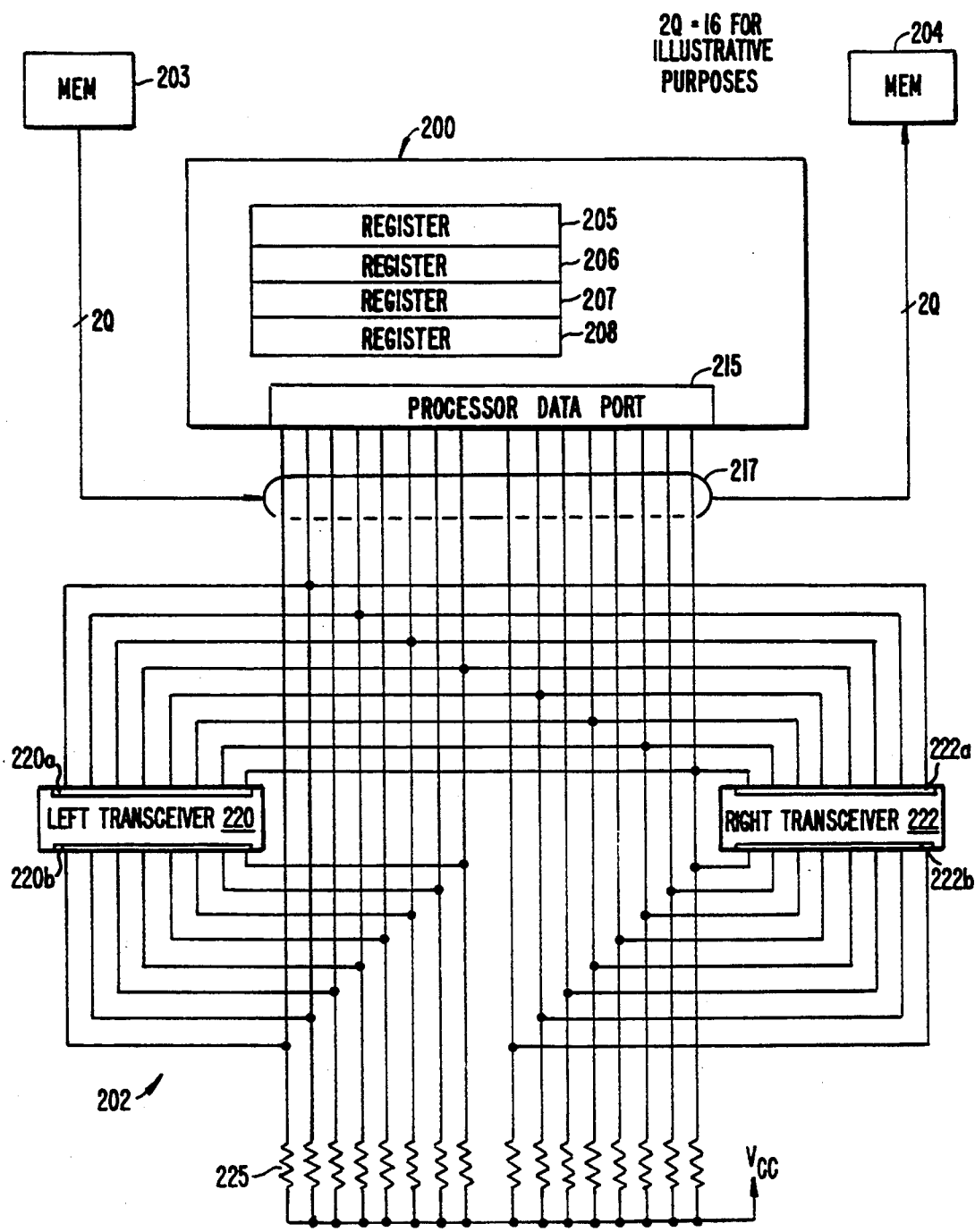
FIG._15.

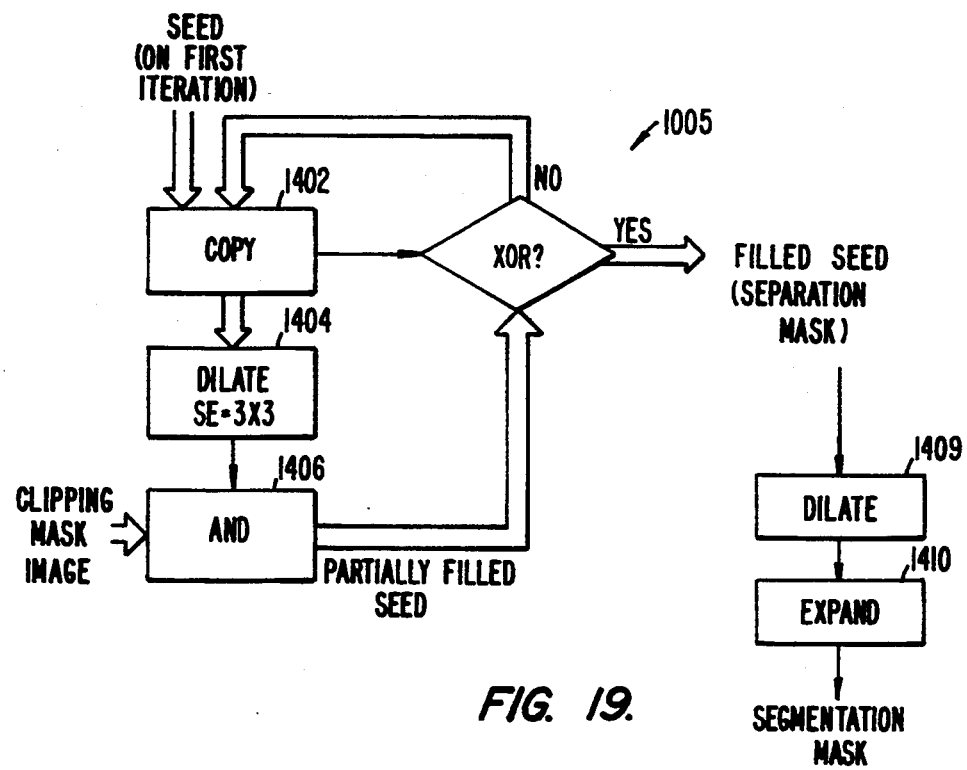
FIG. 19.
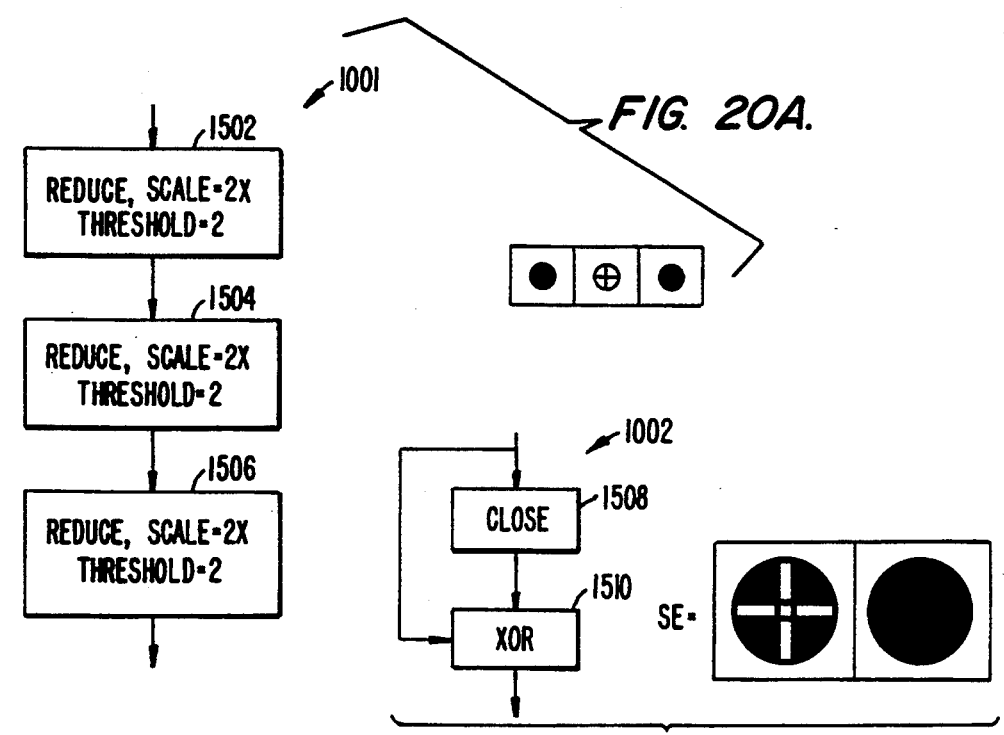
FIG. 20A.
FIG. 20B.

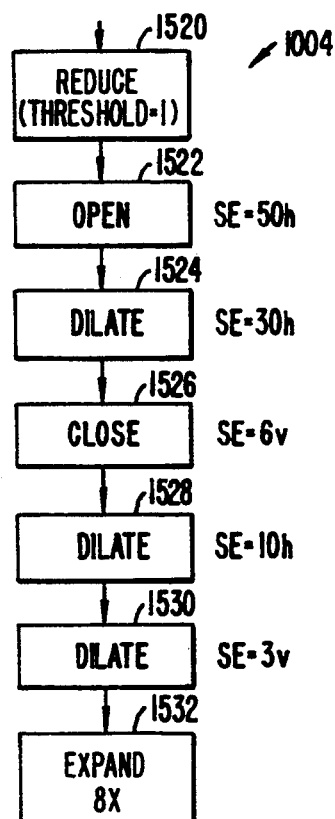
FIG. 20C.
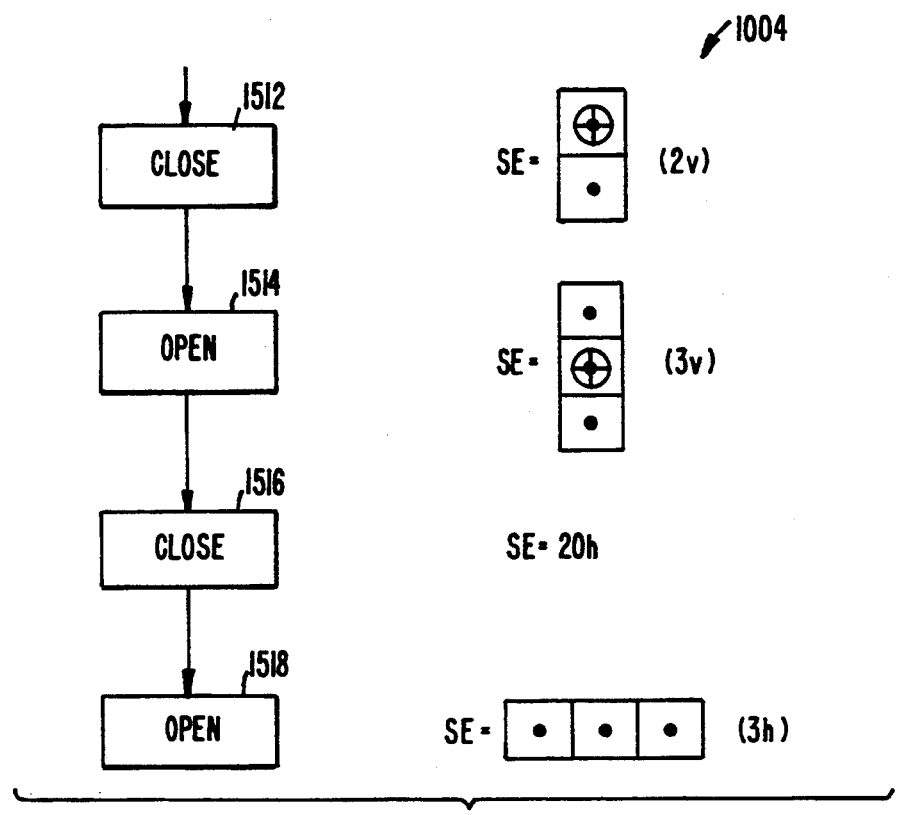
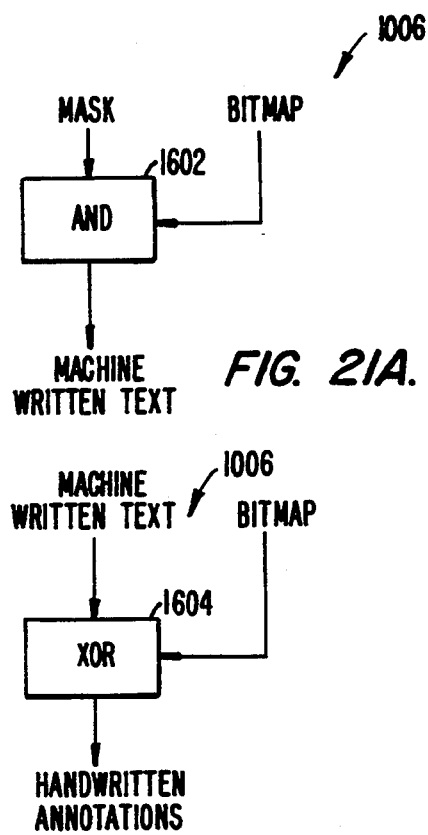
FIG. 20D.
FIG. 21A.
FIG. 21B.

Information on reading digital data

Dan Bloomberg

Sept. 6, 1989

*Do we know of any system that has been used as an image buffer for electronic precollation?*

1 Purpose

Addendum to information relating to IP/890524 (D/89197). This is intended to help clarify some of the procedures for finding the centers of the data marks and for finding the corners. I've included a background section lifted from the upcoming issue of *MORPH BITS* (Volume 5).

2 Background

*Why put digital data on paper? Come on — get serious!*

One clear benefit of digital data on paper is that it augments the raster information in a scanned image, and thus aids an image interpretation system in the extraction of symbolic information.

Encoding digital data on paper has some similarities to encoding data on other media: *What is characteristic about this text?*

- The data is typically stored in a two-dimensional configuration.

- In order to read the data, one must both accurately synchronize the data with a reference "clock" and have sufficient signal to determine the data values.

But there are also many differences:   *MESSY Block CAPITALS*
   *NEAT BLOCK CAPITALS*

- Data on optical media can only be encoded using either (a) the signal value at a specific position or (b) the change in signal value (e.g., presence or absence of a signal transition) at a specific position. But

*neat printing is not necessarily a virtue. For example, if each character is separate, then you can't use long connected components.*

*FIG. 22A.*

Information on reading digital data

Dan Bloomberg

Sept. 6, 1989

1 Purpose

Addendum to information relating to IP/[illegible] (D/[illegible]). This is intended to help clarify some of the procedures for finding the corners of the data marks and for finding the corners. I've included a background section lifted from the upcoming issue of [illegible] (Volume 5)

2 Background

One clear benefit of digital data on paper is that it augments the textual information in a scanned image, and that aids an image interpretation system in the extraction of symbolic information.

Encoding digital data on paper has some similarities to recording data on other media:

- The data is typically stored in a two-dimensional configuration.

- In order to read the data, one must both accurately synchronize the data with a reference "clock" and have sufficient signal to determine the data values.

But there are also many differences:

- Data on optical media can only be encoded using either (a) the signal value at a specific position or (b) the change in signal value (e.g. presence or absence of a signal transition) at a specific position. But

Information on reading digital data

Dan Bloomberg

Sept. 6, 1989

Purpose

Addendum to information relating to IP/890524 (D/89197). This is intended to help clarify some of the procedures for finding the centers of the data marks and for finding the corners. I've included a background section lifted from the upcoming issue of $M_{ORPH}B_{ITS}$ (Volume 5).

One clear benefit of digital data on paper is that it augments the raster information in a scanned image, and thus aids an image interpretation system in the extraction of symbolic information.

Encoding digital data on paper has some similarities to encoding data on other media:

- The data is typically stored in a two-dimensional configuration.

- In order to read the data, one must both accurately synchronize the data with a reference "clock" and have sufficient signal to determine the data values.

But there are also many differences:

- Data on optical media can only be encoded using either (a) the signal value at a specific position or (b) the change in signal value (e.g., presence or absence of a signal transition) at a specific position. But

*FIG. 22I.*

1     Do we know of any system that has been used as an image buffer for electronic precollation?

2   Background  Why put digital data on paper? Come on — get serious!

What is characteristic about this text?

MESSY BLOCK CAPITALS
    NEAT BLOCK CAPITALS neat printing is not necessarily a virtue. For example, if each character is separate, then you can't use long connected components.

*FIG. 22J.*

Information on reading digital data

Dan Bloomberg

Sept. 6, 1989

*Do we know of any system that has been used as an image buffer for electronic precollation?*

1 Purpose

A continuation of information related to [P/89052; D/89197]. This is intended to be included as part of the procedures for locating the centers of the data marks and for finding the corners. I've included a background section lifted from the upcoming issue of MORPHBITS (Volume 5).

2 Background

*Why put digital data on paper? Come on — get serious!*

One clear benefit of digital data on paper is that it augments the raster information in a document for a matching image interpretation system in the extraction of semantic information.

Encoding digital data on paper has some similarities to encoding data on other media:

*What is characteristic about this text?*

- The data is typically stored in a two-dimensional configuration.

- In order to read the data, one must both accurately synchronize the data with a reference "clock" and have sufficient signal to determine the data values.

*MESSY BLOCK CAPITALS*

But there are also many differences:

*NEAT BLOCK CAPITALS*

- Data on optical media can only be encoded using either (a) the signal value at a specific position or (b) the change in signal value (e.g., presence or absence of a signal transition) at a specific position. But

*neat printing is not necessarily a virtue. For example, if each character is separate, then you can't use long connected components.*

FIG. 22K.

Information on reading digital data

Dan Bloomberg

Sept. 6, 1990

1 Purpose

*Do we know of any system that has been used in [illegible] better than electronic [illegible]?*

Addendum to information relating to IP/[illegible] (D/[illegible]). This is intended to help clarify some of the procedures for finding the corners of the data masks and for finding the corners. I've included a background section lifted from the upcoming issue of Xerox Brrz (Volume 5)

2 Background

*why put digital data on paper? Low [illegible]*

One clear benefit of digital data on paper is that it augments the rather [illegible] information in a scanned image, and thus aids an image interpretation system in the extraction of symbolic information.

Encoding digital data on paper has some similarities to reading data on other media: *what is characteristic about this text?*

- The data is typically stored in a two-dimensional configuration.

- In order to read the data, one must both accurately synchronize the data with a reference "clock" and have sufficient signal to determine the data values.

*MANY BACK ARROWS*

But there are also many differences:

*MEAT FLOUR CAPITAL*

- Data on optical media can only be encoded using either (a) the signal value at a specific position or (b) the change in signal value (e.g. presence or absence of a signal transition) at a specific position. On

*neat printing is not necessarily – visible. For example, if each character is separate, then you can't use long connected components*

Information on reading digital dat

Dan Bloomberg

Sept. 6, 1989

1 Purpose

Addendum to information relating to IP/890524 (D/89197). This is intended to help clarify some of the procedures for finding the centers of the data marks and for finding the corners. I've included a background section lifted from the upcoming issue of *MorphBits* (Volume 5).

One clear benefit of digital data on paper is that it augments information in a scanned image, and thus aids an image interpretation system in the extraction of symbolic information.

Encoding digital data on paper has some similarities to encoding data on

- The data is typically stored in a two-dimensional configuration.

- In order to read the data, one must both accurately synchronize the data with a reference "clock" and have sufficient signal to determine the data values.

But there are also many differences: *NEAT BLOCK CAPITAL*
be encoded using either (a) the signal value at a specific position or (b) the change in signal value (e.g. presence or absence of a signal transition) at a specific position. But

FIG. 23G.

2 Background

*Do we know of any system that has 1... used as an image buffer for electronic precollation?*

*why put digital data on paper? Come on — get serious!* the raster other media: *what is characteristic about this text!*

*MESSY BLOCK CAPITALS*

- Data on optical media can only

*neat printing is not necessarily a virtue. For example, if each character is separate, then you can't use long connected components.*

FIG. 23H.

Information on reading digital data

Dan Bloomberg

Sept. 1989

*Do we know of any system that has been used as an image buffer for electronic predates?*

1 Purpose

2 Background

*Why put digital data on paper? Come on — get serious!*

*What is characteristic about this text?*

*MESSY Back CANVAS*

• Data on optical media can only

*neat printing is not necessarily a virtue. For example, if each character is separate, then you can't use long connected components.*

FIG. 23I.

SEGMENTATION OF TEXT STYLES

CROSS REFERENCE TO RELATED APPLICATIONS

This application is a continuation-in-part of U.S. application Ser. Nos. 07/449,263, filed Dec. 8, 1989, and 07/627,284, filed Dec. 13, 1990 (both now abandoned) which are incorporated herein by reference for all purposes. This application is related to application Ser. No. 07/449,626 (which is continued as 08/001,138) and Ser. No. 07/448,193,(now U.S. Pat. No. 5,131,049) all of which are assigned to the assignee of the present invention, and incorporated herein by reference for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates to the field of image processing. In one embodiment the invention provides a method and apparatus for identifying and/or separating type or print styles.

Morphological image processing techniques are well known and have been used in a wide variety of applications. Such techniques have been used in, for example, shape identification. Such morphological techniques use known morphological steps such as "open," "close," "erode," and the like.

Often in document processing it would be desirable to locate and, in some cases, separate text which is discriminated from remaining text by, for example, type styles such as bold or italic type styles. At the present time text in a bold or italic type style is generally identified manually. This process is exceedingly tedious and time consuming.

Also, many documents and their images contain both machine printed text and handwritten annotations. It would be useful to be able to identify regions of a scanned image that correspond to handwritten or handprinted annotations. For example, current OCR systems, as well as foreseeable future OCR systems, are not able to reliably recognize handwritten annotations in an image. When such text is fed to a conventional OCR system, such systems will often produce unusable results. The performance of such systems could be improved if handwritten regions could be identified to avoid processing such regions in the OCR process.

On the other hand, identification and retrieval of handwritten annotations on documents are sometimes important. For example, an image filing system would make use of handwritten notations by saving the annotations (and their coordinates) along with an OCR-ized version of the image. In general, if the handwritten annotations are identified as such, the system can save them as bitmap data, to be fed back to the user in a way that is appropriate to the application.

While meeting with some success, prior methods of separating text have met with a variety of limitations. Some of the prior methods require equipment which is expensive, complex, and/or unreliable, while other techniques require significant amounts of computer memory, computer time, or the like. Some of the methods are less than reliable in detecting and separating handwritten annotations.

From the above it is seen that an improved method and apparatus for identifying special type styles such as bold and italic type styles or for detecting the presence of handwritten annotations and, if present, separating them from machine printed text in a document or image.

SUMMARY OF THE INVENTION

The present invention provides for an improved method and device for identifying and separating type styles. For example, in one embodiment the invention provides a method for locating type styles such as bold and italic type styles. The invention will find a wide variety of applications including use within an optical character recognition (OCR) system. An OCR system would use the invention herein for automatic identification of words which have been emphasized by way of, for example, an italic or bold type style. The invention could be utilized in text processing applications or for improved recognition results. The invention could, alternatively, be use in automatic database indexing of scanned images in which bold and italic styles would be used to directly and automatically generate keyword indices. In still further applications, the invention could be used to produce copies of a black and white document in which portions in bold or italic are reproduced in color. Of course, the above applications are merely illustrative of the utility of the invention herein.

This embodiment of the invention provides for formation of bold/italic masks which are used for separation of bold/italic portions of a document. The operations may be carried out at reduced scale for improved efficiency in some embodiments.

Accordingly, in one embodiment the invention comprises, in a digital processing system, a method of processing a binary text image to identify a location of a first type style, the image containing at least a first region of the first type style and a second region of a second type style, comprising the step of eroding the binary text image with a first structuring element to provide a first destination image, the first structuring element more likely to provide a hit in the first region than in the second region.

In another embodiment the invention provides an optical character recognition system for identifying characters of a first type style in a document, the document containing characters of a first type style and a second type style, comprising a) input means for inputting a binary image of the document; b) means for identifying a region of the first type style programmed to erode the input binary image with an SE to provide a first destination image, the SE more likely to provide a hit in the region of the first type style than in other regions; and c) means for identifying characters in at least some of the regions having more hits in step b). The optical character recognition system may further include means for outputting text in the first text style in the first text style and words in the second text style in the second text style.

In another embodiment the invention provides a copy machine for copying first text styles in a document in a first color and second type styles in the document in a second color comprising input means for inputting a binary image of the document; means for identifying a region of the first type style programmed to erode the input binary image with an SE to provide a first destination image, the SE more likely to provide a hit in the region of the first type style than in other regions; and means for printing characters in the first region in a first color and means for printing characters in other regions in a second color.

In still further embodiments the invention provides an optical character recognition system comprising means for identifying a region containing individual words in a text image comprising digital processing means for dilating the image with a horizontal SE having at least two adjacent ON pixels; and means for identifying characters in the regions containing individual words. The OCR system may further include means for checking spelling of words, said words defined by the identified regions.

An apparatus for indexing a database is also disclosed. The indexing apparatus includes means for inputting a text image, portions of the text identified by a first type style, remaining portions in a second type style; means for identifying text in the first type style comprising means for eroding the text image with a first structuring element, the first structuring element more likely to provide a hit in regions of the first type style than in regions of the second type style; and means for inputting text in the regions of first text style as at least a portion of an index in a database.

This invention also provides a method and apparatus for identifying and, optionally, separating handwritten annotations and machine printed text in an image or document. The method requires relatively limited amounts of computer memory and processing time, while providing reliable results and requiring relatively inexpensive hardware.

In one embodiment the invention comprises, in a digital processing system, a method of identifying handwritten annotations of an input image having handwritten annotations and machine printed text areas comprising morphologically processing a region of the input image having a plurality of handwritten annotations and machine printed characters to produce a destination image, the destination image identifying substantially only the machine printed text or handwritten annotations.

A further understanding of the nature and advantages of the inventions herein may be realized by reference to the remaining portions of the specification and the attached drawings.

BRIEF DESCRIPTION OF THE DRAWINGS

FIG. 1A is an overall block diagram illustrating one embodiment of the hardware used herein and FIGS. 1B and 1C are overall flowcharts illustrating operation of two alternative embodiments of the invention;

FIG. 2 illustrates a process for separation of type styles by forming a word mask;

FIGS. 3A, 3B, 3C and 3D illustrate exemplary SEs used to erode for italic text. Solid filled circles are "hits" (meaning the pixel must be ON), empty circles are "misses" (meaning the pixel must be OFF), and crosses and empty spaces are "don't cares" (meaning the pixel can be either OFF or ON). The center of the SE is labeled with two arrows emanating from it;

FIG. 4 illustrates a first embodiment of a consolidation process;

FIG. 5 illustrates a second embodiment of a consolidation process;

FIG. 6 illustrates a method of forming a type style seed;

FIG. 7 illustrates a fillclip operation;

FIGS. 8A, 8B and 8C illustrate a process for eroding for bold text, along with SEs used therein;

FIG. 9 is an image illustrating "normal" and italic text and used as an example herein;

FIG. 10 is a series of screens illustrating the italic text segmentation process for the image shown in FIG. 9 occurring at a reduction of 4;

FIG. 11 is a series of screens illustrating the italic text segmentation process at a reduction of 2;

FIG. 12 is an image used to illustrate segmentation of bold text;

FIG. 13 illustrates the bold text segmentation process at a reduction of 4;

FIG. 14 illustrates the bold text segmentation process at a reduction of 2;

FIG. 15 illustrates exemplary hardware which may be used to perform a reduction;

FIG. 19 illustrates fillclipping the seed to the fillclip mask;

FIGS. 20A, 20B, 20C and 20D illustrate an alternative embodiment of mask formation;

FIGS. 21A and 21B illustrate formation of machine printed text and handwritten annotation images;

FIGS. 22A, 22B, 22C, 22D, 22E, 22F, 22G, 22H, 22I, 22J, and 22K illustrate an example of operation of the first embodiment of the invention for separating handwritten annotations; and FIGS. 23A, 23B, 23C, 23D, 23E, 23F, 23G, 23H, and 23I illustrate an example of operation of the second embodiment of the invention.

DESCRIPTION OF THE PREFERRED EMBODIMENTS

CONTENTS

Figure 16A:
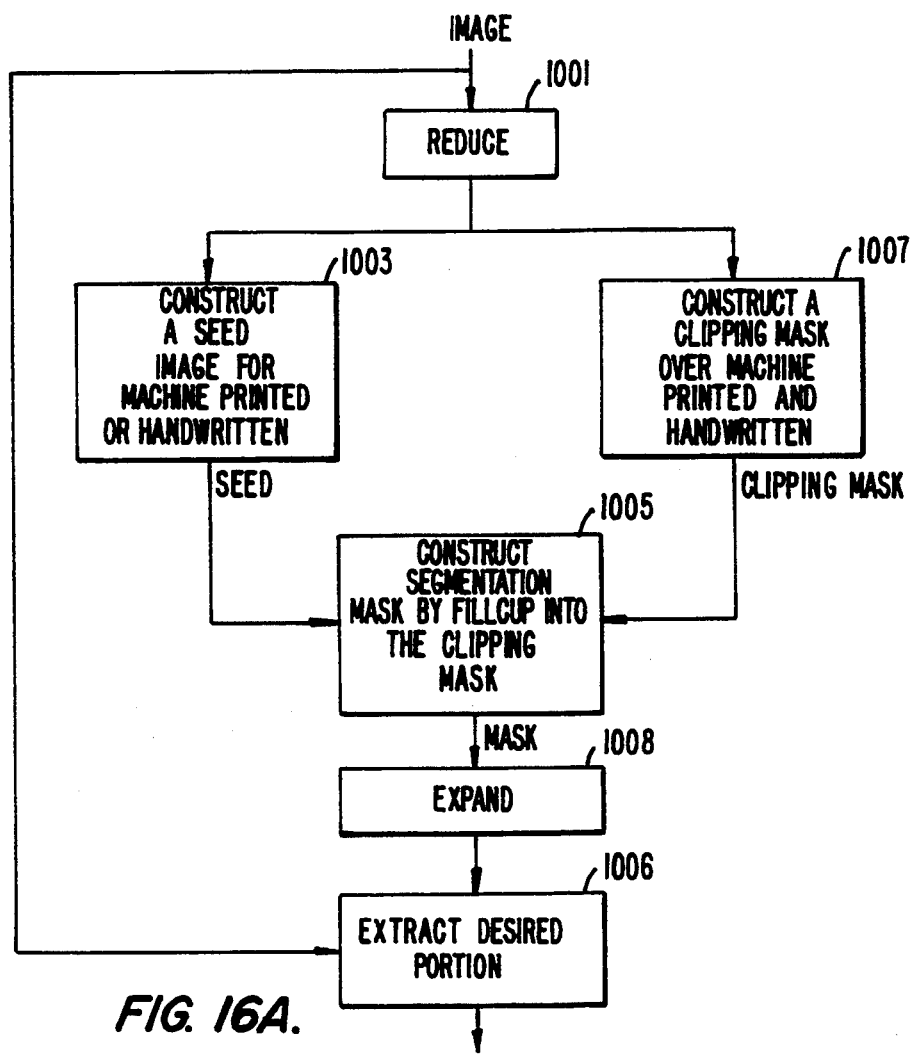
FIGS. 16A and 16B are overall flowcharts illustrating operation of the invention as applied to the extraction of handwriting.

I. GENERAL
  A. Definitions and Terminology
  B. Overall Description

II. IDENTIFICATION OF TYPE STYLES
  A. Details of the Invention
    1. Word Segmentation
    2. Identifying Italic Text
    3. Identifying Bold Text
  B. Discussion of the Software
  C. Graphical Illustration of the Invention
    1. Identification of Italicized Text
    2. Identification of Bold Text
  D. Fast Threshold Reduction (and Expansion) of Images III. SEPARATION OF MACHINE PRINTED TEXT AND HANDWRITING
  A. Details of the Invention
    1. First Exemplary Embodiment
    2. Second Exemplary Embodiment
  B. Discussion of the Software
  C. Examples of the Invention 1. First Exemplary Embodiment
2. Second Exemplary Embodiment
IV. CONCLUSION

I. GENERAL

A. Definitions and Terminology

The present discussion deals with binary images. In this context, the term "image" refers to a representation of a two-dimensional data structure composed of pixels. A binary image is an image where a given pixel is either "ON" or "OFF." Binary images are manipulated according to a number of operations wherein one or more source images are mapped onto a destination image. The results of such operations are generally referred to as images. The image that is the starting point for processing will sometimes be referred to as the original image.

Pixels are normally defined to be ON if they are black and OFF if they are white. The designation of black as ON and white as OFF reflects the fact that most documents of interest have a black foreground and a white background. The techniques of the present invention could be applied to negative images as well. The discussion will be in terms of black on white, but the references to ON or OFF apply equally well to images which have been inverted and, therefore, the roles of these two states are reversed. In some cases the discussion makes reference to a "don't care" pixel which may be either an ON or an OFF pixel. The invention is equally applicable to gray scale images, but the discussion is limited to binary images for purposes of simplicity in presentation. In the context of gray scale images, ON refers to pixels above a threshold and OFF refers to pixels below a threshold.

A "morphological operation" refers to an operation on a pixelmap image (a "source" image), that uses a local rule at each pixel to create another pixelmap image, the "destination" image. This rule depends both on the type of the desired operation to perform as well as on the chosen "structuring element."

A "solid region" of an image refers to a region extending many pixels in one or two dimensions within which substantially all the pixels are ON.

A "textured region" of an image refers to a region that contains a relatively fine-grained pattern of ON and OFF pixels. Examples of textured regions are halftone or stippled regions.

AND, OR, and XOR are logical operations carried out between two images on a pixel-by-pixel basis.

NOT is a logical operation carried out on a single image on a pixel-by-pixel basis.

"Expansion" is a scale operation characterized by a SCALE factor N, wherein each pixel in a source image becomes an NxN square of pixels, all having the same value as the original pixel.

"Reduction" is a scale operation characterized by a SCALE factor N and a threshold LEVEL M. Reduction with SCALE=N entails dividing the source image into N×N squares of pixels, mapping each such square in the source image to a single pixel on the destination image. The value for the pixel in the destination image is determined by the threshold LEVEL M, which is a number between 1 and $N^2$. If the number of ON pixels in the pixel square is greater or equal to M, the destination pixel is ON, otherwise it is OFF.

"Subsampling" is an operation wherein the source image is subdivided into smaller (typically square) elements, and each element in the source image is mapped to a smaller element in the destination image. The pixel values for each destination image element are defined by a selected subset of the pixels in the source image element. Typically, subsampling entails mapping to single pixels, with the destination pixel value being the same as a selected pixel from the source image element. The selection may be predetermined (e.g., upper left pixel) or random.

A "4-connected region" is a set of ON pixels wherein a path can be found between any 2 pixels in the set (1) that lies entirely within the set and (2) whose steps consist of a sequence of 1-pixel steps in any of the four horizontal or vertical directions.

An "8-connected region" is a set of ON pixels wherein a path can be found between any 2 pixels in the set (1) that lies entirely within the set and (2) whose steps consist of a sequence of 1-pixel steps in any of the eight horizontal, vertical, or diagonal directions.

"Handwritten annotations" refers to portions of a document or image which are generated originally by human writing with a pen, pencil, or the like, although this term will also refer to machine reproduced versions of such writing including xerographic copies, printed reproductions, or the like. A resulting image contains substantially only handwritten annotations when portions of machine printed text such as 70%, 80%, 90%, 95%, 97%, 99%, or more of machine printed text has been removed from an original image while leaving a greater portion of handwritten annotations.

"Machine printed text" refers to printed portions of a document or image containing highly regular characters and spacing, frequently generated by, for example, a printer such as a computer printer or printing press, or the like. An image contains substantially only machine printed text when portions of handwritten annotations such as 70%, 80%, 90%, 95%, 97%, 99%, or more of handwritten annotations has been removed from an original image while leaving a greater portion of machine printed text.

"Text" refers to portions of a document or image which comprising letters, numbers, or other language symbols including non-alphabetic linguistic characters such as idiograms and syllabry in the oriental languages.

A "type style" is a characteristic form of printing and is sometimes referred to by those of skill in the art as a type style, type face, or the like.

A "bold" type style is type in which the line width of the features of a given letter are thicker than line widths of the same letter in remaining portions of a document. Of course, a type style may be "bold" in the context of one document and normal in the context of another document. Therefore, bold type styles are measured relative to a specific document or portion thereof.

An "italic" type style is type in which letters are specially identified by replacing normally vertical line segments of letters with line segments which are skewed slightly to the right or left of vertical. "Italic" as it is used herein is intended to refer to slanted type regardless of whether the type is in a Roman or other type style.

A "line-adjacency graph," (LAG) is a data structure representing a binary image which has a tree form with generally three levels in the hierarchy. The three levels are (i) runs of adjacent ON pixels in a scanline, (ii) strokes composed of connected runs, and (iii) the isolated marks (e.g., letters) composed of connected strokes.

A "structuring element" (SE) refers to an image object of typically (but not necessarily) small size and simple shape that probes the source image and extracts various types of information from it via the chosen morphological operation. In the attached figures that show SEs, a solid circle is a "hit," and an open circle is a "miss." The center position is denoted by a cross. Squares that have neither solid nor open circles are "don't cares"; their value in the image (ON or OFF) is not probed. A binary SE is used to probe binary images in a binary morphological operation that operates on binary input images and creates an output binary image. A binary SE can also be used to probe grayscale images, in which case it is viewed as a moving window that is shifted to all places of the source image. The SE is defined by a center location and a number of pixel locations, each normally having a defined value (ON or OFF). The pixels defining the SE do not have to be adjacent each other. The center location need not be at the geometrical center of the pattern; indeed it need not even be inside the pattern. A "solid" SE refers to an SE having a periphery within which all pixels are ON. For example, a solid 2×2 SE is a 2×2 square of ON pixels. A solid SE need not be rectangular. A horizontal SE is generally one row of ON pixels and a vertical SE is generally one column of ON pixels of selected size.

A "hit-miss" SE refers to an SE that specifies at least one ON pixel and at least one OFF pixel.

"Erosion" is a morphological operation wherein a given pixel in the destination image is turned ON if and only if the result of superimposing the SE center on the corresponding pixel location in the source image results in a match between all ON and OFF pixels in the SE and the underlying pixels in the source image. An erosion will give one pixel in the destination image for every match. That is, at each pixel, it outputs 1 if the SE (shifted and centered at that pixel) is totally contained inside the original image foreground, and outputs 0 otherwise.

"Dilation" is a morphological operation wherein a given pixel in the source image being ON causes the SE to be written into the destination image with the SE center at the corresponding location in the destination image. The SEs used for dilation typically have no OFF pixels. The dilation draws the SE as a set of pixels in the destination image for each pixel in the source image. Thus, the output image is the union of all shifted versions of the SE translated at all 1-pixels of the original image.

"Opening" is a morphological operation that is equivalent to an erosion followed by a dilation. The result is to replicate the SE in the destination image for each match in the source image. The erosion replicates the SE in the destination image for each match.

"Closing" is a morphological operation equivalent to a dilation followed by an erosion. A close of an image is also equivalent to the bit inverse of an open on the (bit inverse) background.

"Fill8" refers to an image operation in which 8-connected regions are filled to rectangular bounding boxes.

"Fillclip" is a morphological operation in which seed pixels are filled to a clipping image (also called "clipping mask").

A "mask"-refers to an image, normally derived from an original image, that typically contains regions of ON pixels corresponding to regions of interest in the original image. It will be understood that in the case of a clipping mask, certain regions of ON pixels will not contain seed pixels.

The various operations defined above are sometimes referred to in noun, adjective, and verb forms. For example, references to dilation (noun form) may be in terms of dilating the image or the image being dilated (verb forms) or the image being subjected to a dilation operation (adjective form). No difference in meaning is intended.

B. Overall Description of the Invention

FIG. 1A is a block diagram of an image analysis system 1 within which the present invention may be embodied. The basic operation of system 100 is to extract or eliminate or simply identify the presence or absence of certain characteristic portions of a document 102, in this case handwritten or machine printed text. To this end, the system includes a scanner 103 which digitizes the document on a pixel basis, and provides a resultant data structure. Depending on the application, the scanner may provide a binary image (a single bit per pixel) or a gray scale image (a plurality of bits per pixel). This data structure contains the raw content of the document, to the precision of the resolution of the scanner. This data structure, typically referred to as an image, may be sent to a memory 104 or stored as a file in a file storage unit 105, which may be a disk or other mass storage device.

A processor 106 controls the data flow and performs the image processing. Processor 106 may be a general purpose computer, a special purpose computer optimized for image processing operations, or a combination of a general purpose computer and auxiliary special purpose hardware. If a file storage unit is used, the image is transferred to memory 104 prior to processing. Memory 104 may also be used to store intermediate data structures and possibly a final processed data structure.

The result of the image processing, of which the present invention forms a part, can be a derived image, numerical data (such as coordinates of salient features of the image) or a combination. This information may be communicated to application specific hardware 108, which may be a printer, display, optical character recognition system, graphics recognizer, electroreprographic copier, or the like, or may be written back to the same or a different file storage unit 105.

The invention utilizes specialized reduction procedures and morphological operations to transform regions according to their texture in such a way as to identify and/or remove selected text portions of an image. In preferred embodiments the machine printed regions are identified and, ultimately, coalesced into a separation mask of solid or nearly solid ON pixels. Thus, handwritten portions of an image, for example, can either be removed, while retaining machine printed text or, conversely, machine printed text can be removed, while retaining the handwritten annotations. Of course, in some embodiments it will be desirable to simply identify the presence or absence of machine printed text or handwritten annotations.

In preferred embodiments large solid ON regions of an image (i.e., regions having run lengths of ON pixels over a substantially greater distance than the text or graphics in the image) and finely textured regions (such as half tones or stipples) are first removed from the image. A variety of methods are available for removal of such regions, but in preferred embodiments such regions are removed according to one of the methods disclosed in U.S. application Ser. No. 07/449,624 (now U.S. Pat. No. 5,065,437) and Ser. No. 07/448,193 (now U.S. Pat. No. 5,131,049) which are assigned to the assignee of the present invention and incorporated herein by reference for all purposes. The remaining image contains primarily or exclusively handwritten and/or machine printed text. Of course such removal step is optional, particularly when images to be processed are not expected to contain solid black, stippled, or finely textured regions.

Generally, the method provides for processing of an image including text. The text includes words having a selected type style. For each of a plurality of locations in the image, the method provides for obtaining type style data indicating whether the location is likely to be within one of the words having the type style. The type style data are then used at a plurality of locations to obtain segment data indicating segments of the image that include the words having the type style. The segment data is preferably a data array that includes for each of the plurality of locations, a respective data item, each location's respective data item being the location's respective type style data. The step of obtaining respective type style data may include a substep for each of the plurality of locations, each location's substep including a step of comparing a structuring element with a set of locations that includes the location to produce match data indicating whether the structuring element matches the image at the set of locations, the match data being the location's type style data. The structuring element may be a structuring element which erodes the image. The method is preferably performed at locations which cover substantially all locations of the image.

The invention uses morphological image processing of a region of an image containing multiple characters. In most preferred embodiments, the method is used to process most or all of the pixels in an image (where the image may of course comprise only a portion of the image of an entire document). Therefore, rapid and reliable processing of entire document images (or substantial portions thereof) may be attained.

The present invention utilizes differences in shape and/or texture of machine printed text and handwritten annotations to identify such machine printed text and/or handwritten annotations. By "shape" it is intended to mean herein the outlining shape of characters, words, and/or groups of words in handwritten or machine printed format. By "texture" it is intended to mean the patterns of ON and OFF pixels within regions of the machine printed text or handwritten annotations.

Several techniques are available for segregating such text. For example, the "density" of lines of ON pixels in various orientations may be utilized to initially screen the text for handwritten annotations or machine printed text, handwritten annotations containing substantially greater concentrations of lines at various skewed angles from vertical. Alternatively, the system may utilize the "size" of connected components within the image to provide an initial screening of the text, machine printed text having substantially smaller connected components.

While the above examples give reasonable results, preferred embodiments of the invention utilize textural differences. Particularly, when the system reduces an image containing machine printed text and handwritten annotations to, for example, a resolution of 38 pixels/inch, the two types of writing are texturally quite different. Preferred embodiments of the invention utilize a morphological texture sieving operation to extract and amplify these differences.

FIGS. 1B and 1C are block diagrams illustrating overall operation of two alternative embodiments of the invention. The first alternative embodiment is illustrated in FIG. 1B. In step 2 the original image is eroded with an appropriate structuring element so as to remove most or all of the portions of the image which are not in a desired type style such as bold or italic and project out or consolidate portions of the image which are in a desired type style. Handwritten, italic, or bold text, for example, are identified by selecting regions where a characteristic feature is present in a quantity greater than the background "noise" level. Italic text, for example, is identified by finding long slanted edges; bold text is identified by comparison of the vertical stem thickness with that of the majority of the text. Thus, any amount of italic text can be identified, while bold text is generally found when it constitutes a minority of the text or when training text is available. For practical applications, this limitation is not significant.

In step 4 the output from step 2 is processed using, for example, a dilate operation so as to consolidate the remaining ON pixels so as to form a mask. The mask will consist of areas of ON pixels surrounding regions of the desired type style (such as bold or italic). In step 6, the mask is used to extract only those portions of the original image which contain the desired bold or italic type style. This step may use, for example, an AND operation between the original image and the mask. The output of step 6 is portions of an image which are in bold or italic type styles.

An alternative embodiment of the invention is illustrated in FIG. 1C. In step 2 desired text features are projected out, similar to the embodiment shown in FIG. 1B. In step 8 a text seed is formed and in step 10 the text seed is filled to a word mask formed in step 12 from the original image. The result of the fill operation in step 10 is a desired text mask which is used to extract the desired text in step 14 by, for example, ANDing the mask with the original image.

II. IDENTIFICATION OF TYPE STYLES

A. Details of the Invention

1. Word Segmentation

As shown in step 12 of FIG. 1C, in some embodiments the present invention utilizes a word mask which contains separate solid blocks of pixels, not necessarily rectangular, which generally lies over each individual word in the image. The word mask is used to limit the growth of a bold or italic "seed." The word segmentation operation is based on the fact that the distance between characters within a word is substantially smaller than either the inter-word distance within a line of text, or the distance between words on adjacent lines.

FIG. 2 illustrates the process 12 for making the word mask. The process preferably begins with two successive 2×2 reductions 16 and 18 using a threshold LEVEL=1 (if any pixel in a 2×2 tile is ON, the corresponding pixel in the reduced image is ON). These reductions are followed by a dilation 20 with a horizontal SE; a small 2×1 SE is typically sufficient if reduced scale is used. In general, the horizontal SE must be large enough to close up intra-word spaces, but not join words. While the invention is illustrated by way of a 2×1 horizontal SE, the SE used in step 20 could be a horizontal SE consisting of between about 2 and 5 ON pixels using typical image scans and type sizes.

The output from step 20 is an image in which each word is represented by a solid mask at 4-fold reductions. The mask is now expanded to full size as shown in steps 22 and 24 and used, for example, to limit the growth of a bold or italic "seed" when the growth is conducted at full scale. Alternatively, a reduced word mask from step 20 may be used to limit growth of seeds of italic and bold text when the seed is grown at reduced scale for computational efficiency.

The word masks output from steps 20 and 24 will have a variety of additional applications which will be apparent to those of skill in the art such as mathematical morphology and text-based image processing. Exemplary of such uses are identification of word boundaries for optical character recognition. Proper identification of word boundaries allows characters to be grouped correctly into words, which in turn permits dictionary lookup and correction techniques for incorrectly identified characters using spell checks and correction techniques well known to those of skill in the art.

2. Identifying Italic Text

FIG. 3 illustrates several SEs which may be used in step 2 of FIGS. 1B or 1C to identify italic text. In preferred embodiments for identification of italic text step 2 is an erosion, although it will be apparent to those of skill in the art that an erosion could be replaced with, for example, an erosion by the hit-miss SE followed by a dilation by the hits of the hit-miss SE.

Italic text is identified by locating a feature that is both characteristic of, and nearly exclusively limited to, italic text. A line of ON pixels lying on a line slanted upward at roughly 10 to 15 degrees to the right of vertical has been found to be particularly useful in identifying italic text. SEs matching this feature are utilized to identify regions containing italic text. In a region containing italic text, the SE is much more likely to provide a hit than in a region not containing italic text. Therefore, the destination image produced from step 2 will be loosely connected groups of ON pixels in regions of italic text.

The center of each SE in FIG. 3 is illustrated by arrows. FIGS. 3A and 3C use a smaller SE with a slope of about 18 degrees; FIGS. 3B and 3D use a large SE with a slope of about 14 degrees. ON pixels lying along a line slanted at about 5 to 25 degrees from the vertical may be useful in some embodiments. Note that there is a "don't care" (indicated by an "x") between each "hit" and each "miss." This allows for a pattern match when the image angle is only approximately equal to the pattern angle. There is preferably one don't care between each row of hits and misses.

It is preferred to use edges of slanted strokes, requiring SEs with both hit and miss patterns, rather than a SE comprised entirely of hits. The latter will match copiously any larger region of ON pixels, whereas using hit-miss SEs as shown in FIG. 3 limits the matches to edges of slanted strokes.

It is preferable to use the left edge of text strokes in roman based alphabets because use of the right edge tends to generate matches to normal "y" and "v"s. Thus, the SEs in FIGS. 3A and 3B are most preferred. Since the SE in FIG. 3B is larger than the one in FIG. 3A, fewer pixels will match when FIG. 3B is used than when FIG. 3A is used.

After the erosion of step 2 the image is composed of closely spaced ON pixels in the italic regions and a few isolated ON pixels in the remaining regions. In the embodiment shown in FIG. 1B, the image is now processed to consolidate the true italic regions, and to remove pixels (i.e., noise) from non-italic regions. The consolidation step 4 is illustrated in greater detail in FIG. 4.

The consolidation is based on the fact that there will be many more pixel matches within a region containing italic words than within non-italic words. The result of this consolidation will be a substantially solid mask that covers all (and only) the italic regions. The consolidation preferably begins with a dilation 26. The image is dilated vertically an amount roughly equal to the full height of the text using, for example, a $1 \times 15$ SE. In step 28 the image is closed horizontally by an amount that is large enough to connect vertical lines in adjacent characters, but not enough to connect lines in different words. In step 30 the image is opened horizontally by an amount that is sufficient to remove small vertical lines that were not connected to other lines in the previous step. In this way, pixel "noise" is also largely removed. The destination image from step 30 is a set of masks covering all the italic words.

An alternative consolidation procedure 4 is illustrated in FIG. 5. After the original erosion of step 2 with the pattern matched to slanted edges, the image is reduced as shown in step 32. It has been found that a reduction by a factor of four is a good choice. The 3-step dilation/close/open is then performed on a reduced image, and it is effected quickly on conventional computer hardware.

The formation of a "desired text" seed is used in conjunction with a word mask to identify the desired text, as shown in step 8 of FIG. 1C and illustrated in greater detail in FIG. 6. The goal according to this technique is not to achieve a solid mask covering each italic word. Rather, it is only to generate a seed for the desired text including:

a) some pixels within each italic word; and b) no pixels within each word that is not italic.

Thus, much stricter noise-rejection may be utilized because it is not necessary to have a mask that covers each italic word in its entirety. The result from the process shown in FIG. 6 is referred to herein as italic "seed" pixels.

In step 34 the result from step 2 is optionally reduced using, for example, SCALE=2 and LEVEL=1. The resulting image is then optionally reduced a second time in step 35 to LEVEL=4 again preferably using LEVEL=1. In step 36 the image is then DILATED to expand pixels of the image vertically. This step may use, for example, a 5v SE (i.e., a SE having a single vertical column of 5 ON pixels). In step 37 the result from step 36 is CLOSED horizontally to join regions which are desired to be saved. The CLOSE of step 37 may, in some embodiments, use a 5h SE (i.e., a SE having a single horizontal row of 5 ON pixels).

In step 38 the image is OPENed using, for example, an 8h SE for noise removal. In step 39 the image is optionally DILATED to increase the size of the seed regions. The dilation of step 39 may use, for example, a 5h SE.

The result from step 39 is then optionally ANDed with the original image at step 40 (reduced by $4\times$ if the operations are conducted at reduced scale) to ensure that there are no bridges in the seed between different words.

A further advantage of this method is seen in the use of the fillclip operation, where the desired text seed is grown to completion into the word mask and, therefore, the desired text words are obtained in their entirety. The fillclip operation of step 10 in FIG. 1C is illustrated in greater detail in FIG. 7. The seed image, on the first iteration, is copied in step 41 and then DILATED in step 42 by, for example, a 3×3 SE or other nearly solid SE and ANDed in step 43 with the word mask. Completion is tested in step 44 by way of an XOR and demonstrated when the DILATE/AND sequence does not substantially alter the image. The resulting image consists of all 8-connected regions that have a non-empty intersection with the original seed. If the completion test is not met, the partially filled seed is stored and the process is repeated.

3. Identifying Bold Text

As with italic text, the first step is to identify a feature that is both characteristic of, and nearly exclusively limited to, bold text. It is also desirable to use a feature that is independent of the scale (e.g., style size). Such a feature is, for example, the long vertical stems of the characters, after horizontal thinning has taken place. The process is made independent of font size by stopping the thinning when the vertical stems of the regular characters largely disappear, but the vertical stems of the bold characters are still intact. The image resulting from the thinning includes broken vertical stems of the regular characters but those of the bold characters remain. At this point we have an image composed of closely spaced vertical strokes in the bold regions and a few isolated vertical strokes in the regular or italic regions. The image is then consolidated by solidifying the regions where the vertical strokes are closely spaced (which derive from the bold text) and to removing the isolated vertical strokes ("noise" from regular text regions).

FIG. 8A illustrates the process of identifying bold characters as shown in step 2 in greater detail. As shown in FIG. 8A the following steps are then carried out iteratively:

a) The image is thinned horizontally by one pixel (i.e., each run-length of ON pixels in a scanline is reduced by one pixel) using an erode 52. Preferred SEs for this erode are shown in FIG. 8B. This erosion preferably is a hit-miss erosion in which the image is eroded with the SE, and the result of the erosion is XORed with the input to the erosion. The image may be thinned from either the left or the right depending upon the SE chosen from FIG. 8B.

b) In step 54, the image is eroded with a vertical SE (having a length of about 8 ON pixels), in order to project out the vertical stems. The preferred SE for this erode is shown in FIG. 8C. SEs having from 4 to 12 vertical adjacent ON pixels may be utilized.

c) In step 56, the ON pixels in the eroded image are counted.

d) In step 58 the ratio of pixels in the eroded image to that in the previous iteration is calculated (of course, this step is bypassed on the first pass).

e) A test of the ratio of ON pixels is conducted in step 60. If the ratio calculated in step 58 is less than some threshold (approximately 2.2), the process returns to step 52. If it is greater than the threshold, the loop is exited. Threshold ratios of between about 2.0 and 2.4 will be effective in many embodiments.

It is found empirically that the ratio of ON pixels in the eroded image between successive iterations increases monotonically. It is often in the range 1.8 to 2.0 in the penultimate iteration, and in the range 2.4 to 3.0 when the last iteration occurs and the process should be stopped.

The output from step 60 is consolidated to form a mask using a process similar to that used in detection of italic text except that it may be desirable to use slightly modified SEs. For example, in the CLOSE of step 37 it may be desirable to utilize a 5h SE and the OPEN step 38 it may be desirable to utilize a 8h SE.

As in the separation of regular and italic type styles, an improvement in efficiency can be obtained by constructing the mask at a reduced scale, and a further improvement in both noise rejection and recovery of complete words can be obtained if the technique of filling from "bold seeds" into the word mask is used, as shown in FIG. 6. The criterion for bold text may be made sufficiently strict (by adjusting the sizes of the SEs) such that very few non-bold words will be flagged as bold.

B. Discussion of the Software

Appendix 1, (©), 1991, Xerox Corporation, provides a source code listing in "C" which may be used in implementation of one aspect of the invention. The source code has been successfully demonstrated on a Sun 3/260, although it will be apparent to those of skill in the art that a wide variety of programming languages and hardware implementations could be utilized without departing from the scope of the invention herein.

Segmentation performance on a Sun 3/260 is illustrated in Table 1.

TABLE 1

| Operation | Software Performance |
|---|---|
| | Performance |
| word segmentation | 4 * 10**6 pixels/second (2 sec) |
| italic segmentation | 8 * 10**5 pixels/second (10 sec) |
| bold segmentation | 2 * 10**5 pixels/second (40 sec) |

The times are given for an 8.5×11-inch page, scanned at 300 pixels/inch. The bold time should be reduced by a factor of four if a scanning density of 150/in is used. If image processing proceeds from a lower scanning density than 300/in the sizes of the SEs chosen would be adjusted. The number of image processing reductions used may also be reduced.

C. Graphical Illustration of the Invention

1. Identification of Italicized Text

FIG. 9 shows a text image used herein for an example. The original was of conventional type size and scanned initially at 300/inch. FIG. 10 shows six steps of the process at 4-fold reduction. The windows are numbered 1 to 3 in the top row and 4 to 6 in the bottom row. Window 2 shows the word masks. Window 4 shows the pixels resulting after eroding with the slanted edge pattern in FIG. 3B, reducing by a factor of four, and then DILATING with a small vertical SE. A horizontal CLOSE is used to connect lines that are close, followed by a horizontal OPEN to remove isolated lines (i.e., noise), and the result is seen in Window 5. This is then ANDed with the reduced original in Window 1 to produce the "italic seed" in Window 6. This seed is then filled into the word mask (Window 2) to produce the desired (i.e., italic) word mask in Window 3.

This filling can be accomplished by an iterative sequence of DILATIONS with a 3×3 solid SE, with each dilation followed by an AND with the word mask. After the individual words are filled, the process stops changing; the result is the masks for italic words that are shown in Window 3. ANDing of these masks with the original image removes only the italic words.

FIG. 11 shows part of these results at 2-fold reduction. The original image is in Window 1; the word masks for the italic words are in Window 3; the italic word mask outlines are superimposed on the original in Window 4; and the italic words so identified are in Window 5.

2. Identification of Bold Text

FIG. 12 shows an image containing both bold and italicized text styles. The original type was of conventional size and scanned at 300/inch. FIG. 13 shows six steps of the operation of one embodiment of the invention used to identify bold text at 4-fold reduction. Window 2 shows the word masks. Window 4 shows the stem pixels in the eroded image after the iterative thinning/EROSION/counting has been stopped, and after DILATION with a small vertical SE. The next steps follow closely those of the method for finding "italic seeds." A horizontal CLOSE is used to connect nearby lines, followed by a horizontal OPEN to remove isolated lines (i.e., noise), and the result is seen in Window 5. This is then ANDed with the reduced original in Window 1 to produce the "bold seed" in Window 6. This seed is then filled into the word mask (Window 2). This filling can be accomplished by an iterative sequence of DILATIONS with a 3×3 solid SE, with each dilation followed by an AND with the word mask. After the individual words are filled, the process stops changing; the result is the masks for bold words that are shown in Window 3. ANDing of Window 3 with the original image would extract only the bold type words.

FIG. 14 shows part of these results at 2-fold reduction. The original image is in Window 1; the word masks for the bold words are in Window 3; the bold word mask outlines are superimposed on the original in Window 4; and the bold words so identified are in Window 5. Note that even small bold words are found, and regular style capitals are not mistakenly tagged as "bold."

D. Fast Thresholded Reduction (and Expansion) of Images

One requirement of efficient segmentation is that thresholded reduction must be done quickly. Suppose it is desired to reduce an image by a factor of two in the vertical direction. One way to do this is to use a raster operation (bitblt-bit block transfer) to logically combine the odd and even rows, creating a single row of the reduced image for each pair of rows in the original. The same procedure can then be applied to the columns of the vertically squashed image, giving an image reduced by a factor of two in both directions.

The result, however, depends on the logical operations of the horizontal and vertical raster operations. Obtaining a result with LEVEL=1 or 4 is straightforward. If an OR is used for both raster operation orientations, the result is an ON pixel if any of the four pixels within the corresponding 2×2 square of the original were ON. This is simply a reduction with LEVEL=1. Likewise, if an AND for both raster operation orientations, the result is a reduction with LEVEL=4, where all four pixels must be ON.

A somewhat different approach is used to obtain a reduction with LEVEL=2 or 3. Let the result of doing a horizontal OR followed by a vertical AND be a reduced image R1, and let the result from doing a horizontal AND followed by a vertical OR be a reduced image R2. A reduction with LEVEL=2 is obtained by ORing R1 with R2, and a reduction with LEVEL=3 is obtained by ANDing R1 with R2.

The procedure may not be computationally efficient if implemented as described above. On some computers, such as Sun workstations, raster operations are done in software. The image is stored as a block of sequential data, starting with the first row of the image, moving left-to-right, then the second row, etc. Consequently, the raster operations between rows are fast, because 16 or 32 bits in two words can be combined in one operation. But to perform a raster operation between two columns, the corresponding bits must be found, two bits at a time (one from each column), before the logical operations can be done. It turns out that the time, per pixel, to do the vertical raster operations is at least 25 times greater than the horizontal ones. In fact, when the algorithm is implemented entirely with raster operations, over 90 percent of the time is devoted to the vertical operations.

Fortunately, there is a simple and very fast way to implement the logical operations between columns. Rather than use column raster operations, 16 sequential bits, corresponding to 16 columns in one row can be accessed as a short integer. These 16 bits are used as an index into a $2^{16}$-entry array (i.e., a lookup table) of 8-bit objects. The 8-bit contents of the array give the result of ORing the first bit of the index with the second, the third bit with the fourth and so on to the 15th bit with the 16th. Actually, two arrays are needed, one for ORing the 8 sets of adjacent columns, and one for ANDing the columns. It should be understood that the numerical example is just that, an example. It is also possible to implement this as a $2^8$-entry array of 4-bit objects, or any one of a number of other ways.

The use of lookup tables to implement column logical operations is about as fast, per pixel, as Sun's row raster operations. A 1000×1000 pixel image can be reduced on a Sun 3/260, with either LEVEL=1 or 4, to a 500×500 pixel image in 0.10 second. On a Sun 4/330, the operation takes about 0.04 second.

As discussed above, 2×2 reductions require a first logical operation between rows followed by a second, possibly different, logical operation between columns. Moreover, some threshold levels require two intermediate reduced images which are then combined. The table lookup technique for column operations can become cumbersome if it is desired to have a very wide pixelword. Either the table becomes enormous or one needs special techniques of looking up parts of the wide pixelword in multiple parallel tables. The latter, while clearly superior, does require some way to use portions of the data word as memory addresses, which may not otherwise be necessary.

FIG. 15 is a logic schematic of specialized hardware for performing a logical operation between vertically adjacent 2Q-bit pixelwords and a pairwise bit reduction of the resulting 2Q-bit pixelword (bits 0 through 2Q−1). Although the drawing shows a 16-pixel word, the benefits of this hardware would become manifest for much longer pixelwords where the lookup table technique has become cumbersome. A 512-bit pixelword is contemplated, since a line of image would represent only a few pixelwords.

The reduction of the two pixelwords occurs in two stages, designated 200 and 202. In the first stage, a vertically adjacent pair of pixelwords is read from a first memory 203, and the desired first logical operation is carried out between them. The desired second logical operation is then carried out between the resulting pixelword and a version of the pixelword that is shifted by one bit. This provides a processed pixelword having the bits of interest (valid bits) in every other bit position. In the second stage, the valid bits in the processed pixelword are extracted and compressed, and the result stored in a second memory 204. Memory 203 is preferably organized with a word size corresponding to the pixelword size. Memory 204 may be organized the same way.

The preferred implementation for stage 200 is an array of bit-slice processors, such as the IDT 49C402 processor, available from Integrated Device Technology. This specific processor is a 16-bit wide device, each containing 64 shiftable registers. Thirty-two such devices would be suitable for a 512-bit pixelword. For simplification, only four registers 205, 206, 207, and 208 of one 16-bit device 210 are shown. Among the processor's operations are those that logically combine the contents of first and second registers, and store the result in the first. The processor has a data port 215, which is coupled to a data bus 217.

Second stage 202 includes first and second latched transceivers 220 and 222, each half as wide as the pixelword. Each transceiver has two ports, designated 220a and 220b for transceiver 220 and 222a and 222b for transceiver 222. Each transceiver is half as wide as the pixelword. Ports 220a and 222a are each coupled to the odd bits of data bus 217, which correspond to the bits of interest. Port 220b is coupled to bits 0 through (Q−1) of the data bus, while port 222b is coupled to bits Q through (2Q−1). The bus lines are pulled up by resistors 125 so that undriven lines are pulled high.

Consider the case of a 2×2 reduction with LEVEL=2. The sequence of operations requires that (a) a vertically adjacent pair of pixelwords be ANDed to form a single 2Q-bit pixelword, adjacent pairs of bits be ORed to form a Q-bit pixelword, and the result be stored; (b) the vertically adjacent pair of pixelwords be ORed, adjacent bits of the resultant 2Q-bit pixelword be ANDed, and the resultant Q-bit pixelword be stored; and (c) the two Q-bit pixelwords be ORed.

To effect this, a pair of vertically adjacent pixelwords are read from first memory 203 onto data bus 217 and into registers 205 and 206. Registers 205 and 206 are ANDed and the result stored in registers 207 and 208. The content of register 208 is shifted one bit to the right, registers 207 and 208 are ORed, and the result is stored in register 208. Registers 205 and 206 are ORed, and the result stored in registers 206 and 207. The content of register 207 is right shifted by one bit, registers 206 and 207 are ANDed, and the result stored in register 207.

At this point, register 207 contains the result of ORing the two pixelwords and ANDing pairs of adjacent bits, while register 208 contains the result of ANDing the pixelwords and ORing pairs of adjacent bits. However, registers 207 and 208 contain the valid bits in the odd bit positions 1, 3, . . . (2Q−1). For a reduction with LEVEL=2, registers 207 and 208 are ORed and the result is made available at processor data port 215 which is coupled to data bus 217.

The odd bits of the data bus are latched into transceiver 220 through port 220a, resulting in a Q-bit pixelword with the valid bits in adjacent positions. Although this Q-bit entity could be read back onto the bus and transferred to memory 204, it is preferable to use both latches. Thus, two new pixelwords (horizontally adjacent to the first two) are processed at stage 200 as described above, the result is made available at processor data port 215, and is latched into transceiver 222 through port 222a. The contents of the two transceivers are then read out through ports 220b and 222b onto data bus 217 in order to provide a 2Q-bit pixelword that represents the reduction of four 2Q-bit pixelwords. The result is transferred to second memory 204. This overall sequence continues until all the pixelwords in the pair of rows has been processed. Once the pair of rows has been processed, subsequent pairs are similarly processed.

As mentioned above each bit-slice processor has 64 registers. Accordingly, since 2 memory accesses are more efficient in a block mode, faster operation is likely to result if 8 pairs of pixelwords are read from memory 203 in a block, processed as discussed above, stored in the processor's registers, and written to memory 204 in a block.

Image enlargement is similar, but the steps are executed in the reverse order. First, the processor reads a pixelword and sends the left half through port 220b of transceiver 220. This is read onto the bus through port 220a. Only every other pixel in the resulting word on the bus will initially be valid, so the processor will need to validate all the pixels using a sequence of shifts and logic operations. Since resistors 225 pull up all the bus lines that are not driven, each undriven line, all the even bits in this case, will be 1's. This expanded pixelword, which alternates 1's with valid data, is read into two registers, the content of one register is shifted one place, and the registers are logically ANDed. Everywhere there was a 0 in an odd bit, there will be 00 in an even-/odd pair. None of the other bits will be affected. This pixelword is then written to two vertically adjacent words in the expanded image. This process is repeated for the right half of the pixelword using the transceiver 222. The processor expands the entire row one pixelword at a time and the entire image one row at a time.

III. SEPARATION OF MACHINE PRINTED TEXT AND HANDWRITING

A. Details of the Invention

Figure 16B:
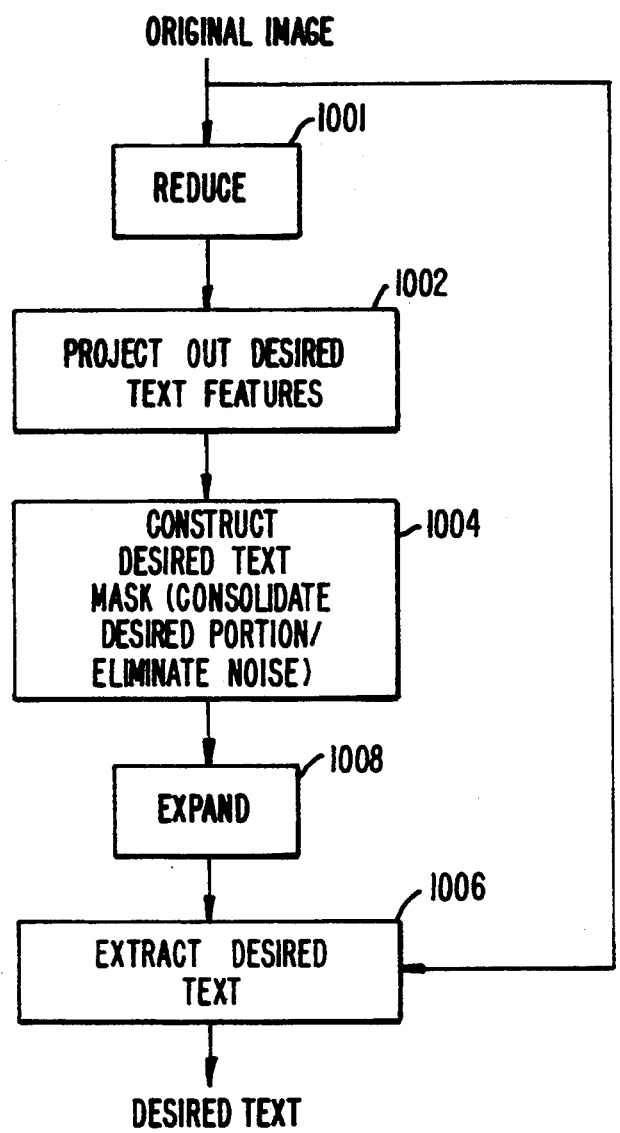

FIGS. 16A and 16B are overall flow diagrams illustrating two particular embodiments of the invention as it is used to identify handwritten annotations in a binary or gray scale image, which has preferably had finely textured regions removed according to the above methods. Referring to FIG. 16A, in preferred embodiments the process begins with one or more optional reduction steps 1001. The invention is illustrated herein primarily by way of reduced scale operations since reduced scale operations operate in an efficient manner and more readily segregate handwritten and machine printed text. Of course, the invention need not be operated at reduced scale but could instead be conducted entirely at full scale. In some embodiments, separate reductions are performed to create a fillclip mask and a text seed so that different thresholds may be utilized.

In step 1003 a reduced noise text seed is formed having a relatively sparse density of pixels substantially only in, for example, the machine printed areas. The text seed, in a preferred embodiment, is formed by morphologically processing the image to identify regions with the characteristic features of handwritten annotations or machine printed text. According to a preferred embodiment, the system identifies regions in which OFF pixels are laterally bounded on two sides by OFF pixels.

In step 1005, the system fillclips the text seed to a fillclip mask formed in step 1007 from the original image. The fillclip mask is an image containing substantially solid regions of ON pixels covering both the handwritten annotations and machine printed text. The result of the fillclip operation in step 1005 is a desired text mask which the system uses to extract the desired machine printed or handwritten annotations in step 1009 by, for example, ANDing a version of the mask which has been expanded (as in step 1008) with the original image or by ANDing the reduced version of the mask with the reduced original image.

FIG. 16B illustrates an alternative embodiment of the invention. The image is reduced, as in the first embodiment, in step 1001 and in step 1002 the original image is processed with an appropriate structuring element to remove a large portion of the pixels in portions of the image which are not in either machine printed or handwritten format, and/or consolidate portions of the image which are in machine printed or handwritten format. Like the first embodiment, the system identifies machine printed text or handwritten annotations by selecting regions where a characteristic feature is present in a quantity greater than the background "noise" level. According to specific embodiments of the invention, the system identifies machine printed text regions with a structuring element which selectively identifies regions in which ON pixels are laterally bounded on two sides by OFF pixels.

In step 1004 the output from step 1002 is processed to consolidate the remaining ON pixels in desired regions and eliminate ON pixels in remaining regions so as to form a mask. The mask will consist primarily of areas of ON pixels in regions of the desired format of machine printed text or handwritten annotations. The mask is then expanded back to the original scale in step 1008 and, in optional step 1006, the mask is used to extract only those portions of the original image which contain the desired machine printed text or handwritten annotations. This step may use, for example, an AND operation between the original image and the mask. The output of step 1006 is portions of an image which are in machine printed or handwritten format.

The invention uses morphological image processing of a region of an image containing multiple characters. In most preferred embodiments, the method is used to process most or all of the pixels in an image (where the image may of course comprise only a portion of the image of an entire document). Therefore, rapid and reliable processing of entire document images (or substantial portions thereof) may be attained.

1. First Exemplary Embodiment

As shown in FIG. 16A, preferred embodiments of the invention form a text seed and a clipping mask system, and then fill the text seed up to the boundaries of the clipping mask.

Figure 17:
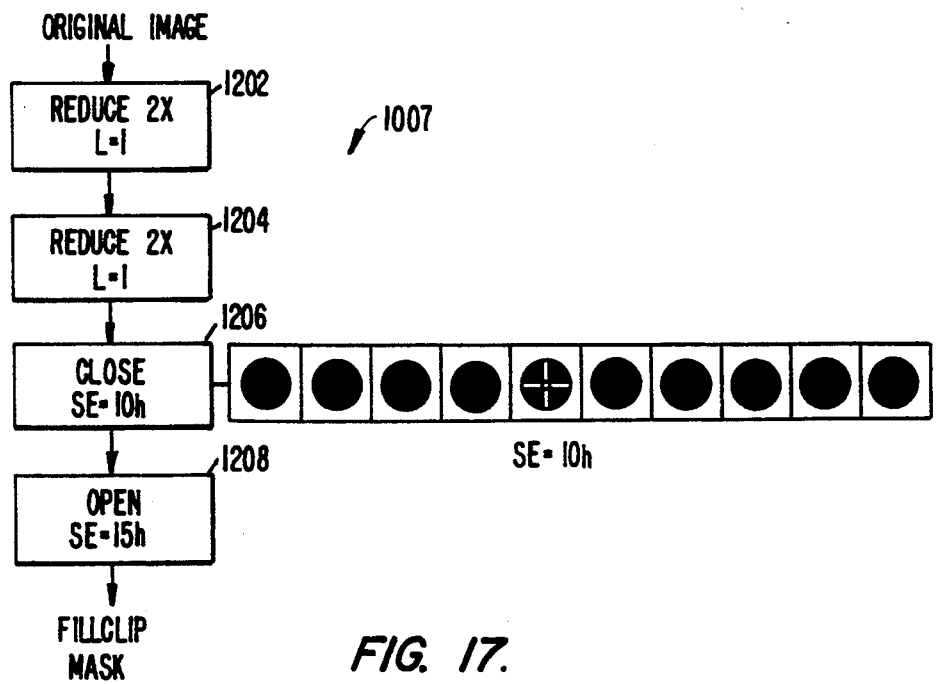
FIG. 17 illustrates a method of forming a fillclip mask.

FIG. 17 illustrates the formation of a fillclip mask, as shown in step 1007. The original image is reduced two times at steps 1202 and 1204, using, for example, threshold LEVEL=1. Therefore, an input image of 150 pixels/inch is now at a scale of about 38 pixels/inch. The system then CLOSEs the image at step 1206 using a large horizontal SE (e.g., 10h) and then OPENs the image at step 1208 using a large horizontal SE (e.g., 15h). The CLOSE joins separate words and the OPEN removes any small vertical "filaments" such that later filling of the seed into the mask does not result in any leakage from the machine printed text regions into handwritten annotation regions.

Figure 18:
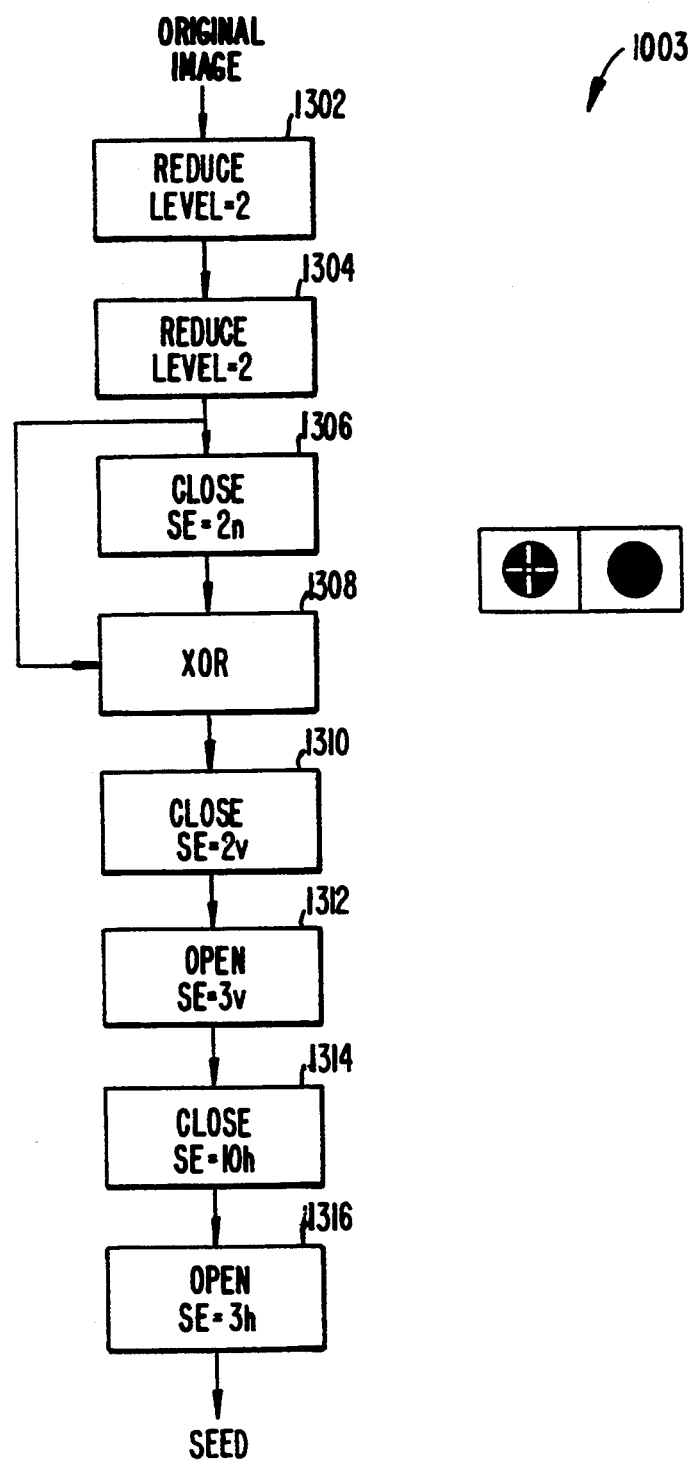
FIG. 18 illustrates formation of a machine printed text seed.

FIG. 18 illustrates the process of constructing a text seed and eliminating noise as shown in step 1003. In step 1302 the original image is optionally reduced using a threshold LEVEL=2. The image is then again optionally reduced at step 1304 using LEVEL=2. Therefore, an input image of 150 pixels/inch is now at about 38 pixels/inch.

At step 1306 the reduced image is then CLOSEd using a 2h SE. At step 1308 the input to and the output from the CLOSE are XOR'd at step 1308, the output being an image with relatively few pixels in handwritten annotation areas and a relatively large number of pixels in machine printed text areas, since the image has been processed to identify only those areas in which there are horizontal gaps with a width of one pixel. It will be recognized that other SEs will be used in particular embodiments, particularly in non-reduced images in which the gaps would be larger than one pixel.

In regions where ON pixels are still contained in handwritten annotation areas, the regions will tend to be only one pixel high (at this particular resolution of 38/inch) and accordingly at step 1310 is CLOSEd with a small vertical SE (e.g., 2v) and then OPENed at step 1312 with a slightly larger vertical SE (e.g., 3v).

The resulting image will generally contain only a few horizontally isolated pixels in handwritten annotation regions at this stage and these are now substantially removed. This is done by performing a horizontal CLOSE/OPEN. For example, at step 1314 the image is now CLOSEd with an SE of, for example, 10h followed by an OPEN 1316 with an SE of, for example, 3h. The resulting image will contain groupings of ON pixels in machine printed text regions with relatively few or no ON pixels in handwritten annotation regions.

FIG. 19 illustrates the fillclip operation 1005 in greater detail. In step 1402 the seed image is stored. The system then DILATEs the image at step 1404 using, for example, a 3×3 SE. The result of step 1404 is then AND'd at step 1406 with the mask image resulting from step 1208. The result of the AND is compared to the copied image at step 1408 using, for example, a XOR and, if the image has not changed from the previous iteration, the filled seed is output as the text mask. If the image is still changing from a previous iteration, the process is repeated copying the last iteration and using the last iteration in the DILATION step 1404. After the image stops changing, the output will be a mask which can be processed to remove the desired text, optionally with an EXPAND step 1410 to return to the original scale. Preferably, the EXPAND is preceded by a DILATE 1409 which ensures that the mask covers desired pixels in the original image.

The operations used herein satisfy two properties that make it easy for us to visualize their geometrical behavior. First, EROSION, DILATION, OPEN, and CLOSE are "increasing" operations, which means that if image 1 is contained in image 2, then any of these morphological operations on image 1 will also be contained in the morphological operation on image 2. Second, CLOSE is extensive and OPEN is antiextensive. This means that the original image is contained in the image transformed by CLOSE and the image transformed by OPEN is contained in the original image. The DILATION and EROSION operations are also extensive and antiextensive, respectively, if the center of the SE is contained within the original image.

The OPEN and CLOSE operations used herein also satisfy additional desirable properties. For example, the result of the operation is independent of the position of the center of the SE. Further, the operation is idempotent, which means that re-applying the OPEN or CLOSE to the resulting image will not change it.

2. Second Exemplary Embodiment

FIGS. 20A to 20D illustrate in greater detail one embodiment of the operations shown in FIG. 16B. In particular, FIG. 20A illustrates a preferred embodiment of the optional reduction step 1001 in greater detail. The particular input image herein is at a resolution of 150 pixels/inch. An image at higher resolution requires proportionately more reduction, whereas an image at lower resolution requires less reduction or, alternatively, the use of appropriately scaled structuring elements. At step 1502 the system performs a first thresholded reduction. According to most preferred embodiments the first thresholded reduction is performed with a scale of 2× and a threshold level of 2. Thereafter, the system preferably performs a second reduction 1504 with a scale of 2× and a threshold of 2 and, in some embodiments, a third reduction 1506, also with a scale of 2× and a threshold level of 2.

FIG. 20B illustrates step 1002 in greater detail in which the desired text portions, in this case the machine printed text, are selectively projected and the undesired portions are substantially eliminated. At step 1508 the system CLOSEs the reduced image using the exemplary SE shown in the right hand portion of the figure. The SE in this particular example is a horizontal SE of length 2 (the center of the SE is shown with the cross hair pixel). When the image is CLOSEd using this SE (like the first embodiment), all OFF pixels that have at least one ON pixel laterally adjacent both to the left and right are turned. ON. Then, a XOR with the original image leaves just those pixels that were turned ON by the CLOSE operation. Thereafter, at step 1510, the output from step 1508 is XOR'd with the input to step 1508 resulting in substantially larger and denser regions of ON pixels in areas of machine printed text than handwritten annotations.

Alternatively, a hit-miss operation on the original image with a hit-miss SE will extract the same set of pixels and can substitute for the two steps 1508 and 1510. The hit-miss operation, using this SE, yields an image with ON pixels only in positions where an OFF pixel is surrounded laterally by ON pixels, as graphically illustrated by the SE itself. Of course, other morphological operations may be used in which the system identifies regions where OFF pixels are bounded on each side by ON pixels. For example, a hit-miss SE, shown in FIG. 20A, with an OFF pixel in the center and laterally adjacent ON pixels would perform the same function.

FIG. 20C illustrates a process of consolidating the desired features and forming the mask as shown in step 1004 in greater detail. These steps take advantage of the fact that the image output from step 1510 will be horizontally sparse and vertically, in most cases, only about 1 pixel high in handwritten regions. Therefore, at step 1512 the output from step 1510 is CLOSEd with the SE shown in the figure, i.e., a vertical SE having a height of 2. Thereafter, at step 1514 the image is OPENed with a vertical SE, preferably with a height greater than that of the preceding CLOSE, such as a 3v SE. The CLOSE of step 1512 takes advantage of the fact that there will tend to be many pixels in the machine printed text part of the image that are vertically aligned, some of which are separated by a single pixel gap. Such pixels are, therefore, joined together before performing the OPEN, which does not remove the joined set.

Thereafter, in step 1516, the system performs an operation which makes long horizontal lines of ON pixels in the machine printed portions of the text. In the particular embodiment shown in FIG. 20C the operation is a CLOSE with a 20h (20 horizontal ON pixels) SE. Thereafter, at step 1518, the few remaining ON pixels in maps of the handwritten portions are removed using an OPEN with a 3h SE.

FIG. 20D illustrates the remaining steps needed for formation of a mask. At step 1520 the system again optionally reduces the image (2×) using a threshold of, for example, 1. Using a 150 pixel/inch input image, the image will now be at a scale of about 19 pixels/inch. Thereafter, at step 1522 the image is OPENed with a large solid horizontal SE (of length 50 in this example), followed by a DILATION at step 1524 with a solid horizontal SE of length 30.

Next, at step 1526 the image is CLOSEd with a vertical SE of height 6. To fill the mask further, a horizontal DILATION with a SE of length 10 is performed at step 1528, followed by a vertical DILATION with a SE of height 3 at step 1530. The system then magnifies the mask 8 times, to the original resolution of 150/inch using an EXPAND at step 1532.

FIG. 21A illustrates one embodiment of step 1006 in which the system extracts the desired text (in this case the machine printed text) from the image. At step 1602 the mask is AND'd with the original bitmap image. The output will be substantially or entirely machine printed text.

FIG. 21B illustrates a technique for extracting handwritten annotations. According to this process the machine printed text image from the output of step 1602 is XOR'd at step 1604 with the original bitmap image. The output of this operation will be substantially or entirely handwritten annotations.

B. Discussion of the Software

Table 1 (© Copyright 1991, Xerox Corporation) provides a program script for implementation of the first embodiment of the invention provided herein, and Table 2 (© Copyright 1991, Xerox Corporation) provides a program script for implementation of the second embodiment of the invention herein. The program scripts are executed sequentially by an interpreter, that invokes procedures written in the "C" language to carry out image transformations. Table 3 illustrates the actions taken in a C computer program based on the script calls. Routines for specific operations used herein such as CLOSE, OPEN, and the like are provided in copending application Ser. No. 07/449,263, previously incorporated herein by reference for all purposes.

The programs have been demonstrated on Sun workstations, although it will be apparent to those of skill in the art that a wide variety of programming languages and hardware configurations could readily be used based on this disclosure without departing from the scope of the invention. Further, while the invention is illustrated herein primarily with regard to implementations in a programmed digital computer, other implementations will be immediately apparent. For example, the invention could be implemented in other digital processing systems such as one formed from discrete hardware components, or a combination of hardware and software components.

TABLE 1

**Program for Separation of Handwritten
Annotation and Machine Printed Text
(First Embodiment)**

```
        *  Extraction at 38/in.
        *  (a) Find horizontal gaps of width 1.
        *  (b) Make a seed within machine printed
           regions.
        *  (c) Make a clipping mask over the entire
           image.
        *  (d) Fill the seed into the clipping mask to
           form a segmentation mask.
        *  (e) Extract the regions of the original
           image using the segmentation mask.
moveToScale(1)
        *  input image at resolution of 150/inch. Reduce to
           38/in
        *  using threshold value of 2.
reduceSelect (1, 0, 0, 0, 0, 0, 0, 2)
reduceSelect (1, 0, 0, 0, 0, 0, 0, 2)
        *  find horizontal gaps of width exactly equal to 1
pause(" find small horizontal gaps")
close(pr1, pr0, strel2h)
xor2(pr1, pr0)
copy(pw0, pr1)
        *  note that for CLSOING with strel2h, the pixel
           density is very low in
        *  the handwritten areas. Also, the components in
           handwritten areas
        *  are typically only one pixel high. Therefore, a
           small vertical
        *  CLOSE/OPEN will remove most of the pixels
           remaining in the handwritten
        *  areas.
pause(" emphasize the textural difference")
close(pr3, pr1, strel2v)
open(pr2, pr3, strel3v)
copy(pw0, pr2)
        *  there are only a very few horizontally-isolated
           pixels remaining
        *  in the handwritten areas. To remove them, while
           retaining
        *  the higher density of pixels in the machine
           printed areas,
        *  do a horizontal CLOSE/OPEN. This solidifies
           machine printed
        *  areas and removes the handwritten areas entirely.
pause (" remove noise; solidify machine printed areas;
get the seed")
close(pr1, pr2, strel10h)
open(pr1, pr1, strel3h)
copy (pw0, pr1)
        *  To make the clipping mask at 38/inch, reduce with
           threshold 1
        *  (to guarantee pixel coverage).
        *  Follow this by a horizontal CLOSE to join
           separate words,
        *  because we cannot expect to have seeds in each
           word.
        *  Finally, do a horizontal OPEN to remove any small
           vertical filaments
        *  that may exist between parts of the mask
           corresponding to machine
        *  and handwritten image. These filaments must be
           removed so that
        *  subsequent filling of the seed into the mask does
           not leak from
        *  parts of the clipping mask that cover machine
           printed regions
        *  into parts of the clipping mask that cover
           handwritten or
        *  handprinted regions.
pause(" make the clipping mask")
moveToScale(1)
reduceselect(1, 0, 0, 0, 0, 0, 0, 1)
reduceSelect(1, 0, 0, 0, 0, 0, 0, 1)
close(pr4, pr0, strel10h)
open(pr4, pr4, strel5h)
copy(pw0, pr4)
        *  Fill the seed into the clipping mask, to produce
           the segmentation
        *  mask. Follow this by a small DILATION to ensure
           that the
```

TABLE 1-continued

**Program for Separation of Handwritten
Annotation and Machine Printed Text
(First Embodiment)**

```
        *  segmentation mask entirely covers the
           corresponding pixels in
        *  the original image.
pause(" fill seed into mask")
fillClip(pr5, pr1, pr4)
dilate(pr3, pr5, strel5)
copy(pw0, pr3)
        *  expand the mask to full size and extract, the
           machine printed and
        *  handwritten parts of the original image.
pause(" expand to full size and extract")
expandSelect(0, 0, 0, 1, 0, 0, 0, 1)
and(pr1, pr0, pr3)
copy(pw0, pr1)
xor(pr2, pr1, pr0)
copy(pw0, pr2)
xor2(pr3, pr0)
copy(pw0, pr3)
        *  reduce 2× to show
pause(" reduce 2× to show")
reduceSelect(1, 1, 1, 1, 0, 0, 0, 2)
copy(pw0, pr1)
copy(pw0, pr2)
copy(pw0, pr3)
(© Copyright 1991, Xerox Corporation)
```

TABLE 2

**Program For Separation of Handwritten
Annotation and Machine Printed Text
(Second Embodiment)**

```
        *  Extraction at 38/inch, looking for horizontal
gaps of width 1.
        *  Then solidify for mask of machine printed part
at 19/inch.
moveToScale(1)
        *  reduction to 38/in
reduceSelect(1,0,0,0,0,0,2)
reduceSelect(1,0,0,0,0,0,2)
        *  find width=1 horizontal gaps
pause("find small horizontal gaps")
close(pr2, pr1, strel2h)
xor2(pr2, pr1)
copy(pw2, pr2)
        *  note that for closing with strel2h, the texture
is very weak in
        *  the handwritten areas. In particular, it is
typically only one
        *  pixel high, so use a vertical close/open
pause("emphasize the textural difference")
close(pr4, pr2, strel2v)
open(pr3, pr4, strel3v)
copy(pw3, pr3)
        *  now do a larger horizontal close/open to
solidify
        *  machine printed areas and remove handwritten
           areas entirely.
pause(" solidify machine printed areas")
close(pr5, pr3, strel20h)
open(pr4, pr5, strel3h)
copy(pw4, pr4)
        *  solidify further: the large dilate is
necessary because of the loss of
        *  pixels near the LH boundary ont the erosion
step of the previous close!
pause(" reduce and further solidify")
reduceSelect(0, 0, 1, 0, 0, 1)
close(pr6, pr4, strel50h)
dilate(pr5, pr6, strel30h)
copy(pw5, pr5)
close(pr6, pr5, strel6v)
copy(pw6, pr6)
dilate(pr2, pr6, strel10h)
dilate(pr3, pr2, strel3v)
copy(pw3, pr3)
        *  expand to full size
pause(" expand to full size")
```

TABLE 2-continued
Program For Separation of Handwritten
Annotation and Machine Printed Text
(Second Embodiment)

```
expandSelect(0, 0, 1, 0, 0, 0, 1)
copy(pw3, pr3)
     * project
pause(" clip original to mask")
and (pr2, pr1, pr3)
copy(pw2, pr2)
     * reduce to show
pause(" reduce 2× to show")
reduceSelect(1, 1, 1, 0, 0, 0, 2)
xor(pr4, pr1, pr3)
copy(pw4, pr4)
subtract(pr5, pr1, pr3)
copy (pw5, pr5)
(© Copyright 1991, Xerox Corporation)
```

TABLE 3
Actions Taken by Interpreted Text Script

| Script Call Name | Associated "C" Procedure |
|---|---|
| dilate, erode | C procedure calls with the same name. |
| reduceSelect, expandselect | C procedure calls with the same name. |
| open, close | openPr, closePr |
| copy | opPrPw(destination, source, COPY) |
| xor2 | opPrPr(destination, source, XOR) |
| xor | logOp(destination, source1, source2, XOR) |
| subtract | logOp(destination, source1, source2, SUBTRACT) |
| and | logOp(destination, source1, source2, INTERSECTION) |
| fillclip | fillclip(destination, seed, clipmask, TO_COMPLETION, 100 |
| moveToScale | moveToSF(scaleFactor) |
| pr | images |
| pw | images |

Note that "destination," "source," "seed," and "clipmask" are all images.

C. Examples of the Invention
1. First Exemplary Embodiment

FIGS. 22A to 22 illustrate operation of the first embodiment of the invention. FIG. 22A is an original image containing machine printed text regions as well as a variety of handwriting. The handwriting is in generally small characters, which might be expected to make the handwritten material appear more similar to the machine characters. The image also contains handwriting in five different styles. At the top, the handwriting is in a "fast" print, which is a mixture of printing and writing. In the second sample from the top, purely script handwriting is included. In the third region of handwriting from the top, the handwriting is printed in a small blank space, near machine printed text. In the fourth region of handwriting from the top letters are printed first with messy block capitals, and then with fairly neat block capitals. In the last sample of handwriting (at the bottom), the handwriting is printed more neatly, with reasonably separate characters.

The resolution of the image used for demonstration was 150 pixels/inch. This can be created by scanning at 150 pixels/inch, or by scanning at 300 pixels/inch and reducing by a factor of 2. The particular image shown in FIG. 7A uses the latter, using thresholded reduction with a threshold of 2.

Figure 22C:
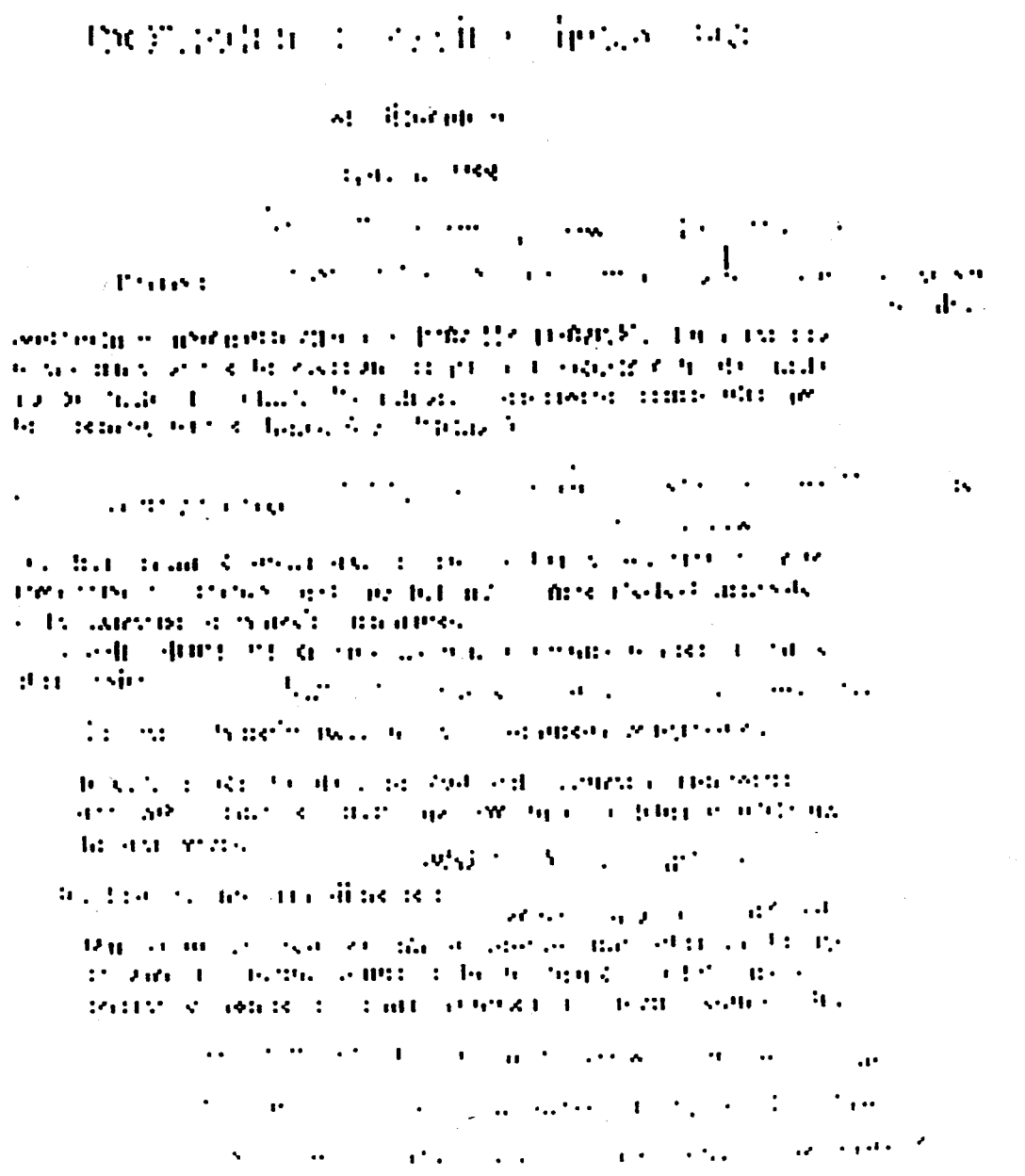

FIG. 22B shows the original image after the reduction steps 1302 and 1304 in seed formation. As shown, the handwritten annotations tend to contain a lower concentration of ON pixels laterally bounded on both sides by OFF pixels. FIG. 22C shows the image after the CLOSE/XOR steps 1306 and 1308. The image now contains a relatively small number of ON pixels in regions of handwritten annotations.

Figure 22D:
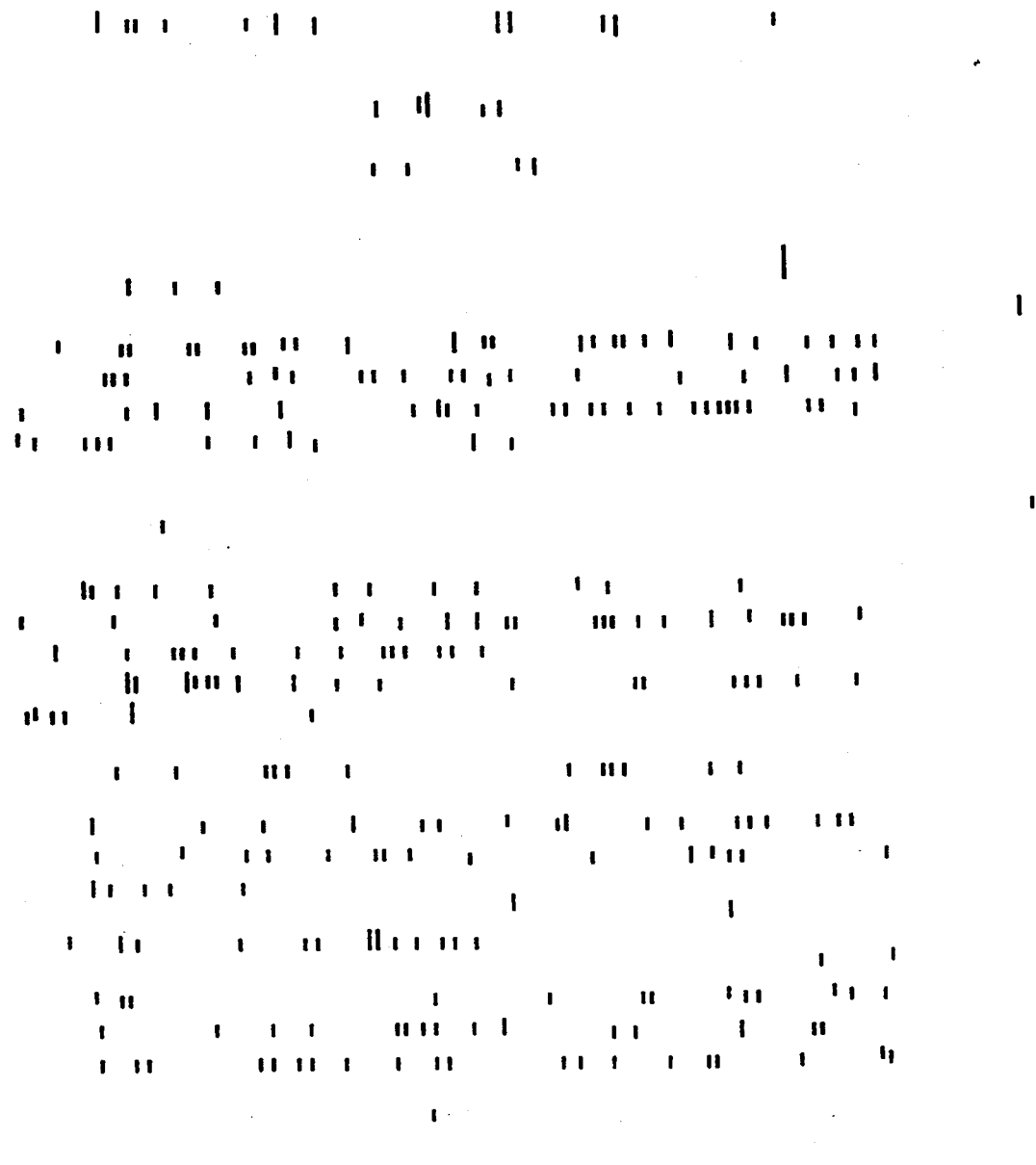

FIG. 22D shows the image after the CLOSE/OPEN steps 1310 and 1312 which are used to remove most of the remaining pixels in the handwritten annotation areas by removing groups of pixels which are not higher than about 1 pixel. The image now contains very few pixels in handwritten annotation areas.

Figure 22E:
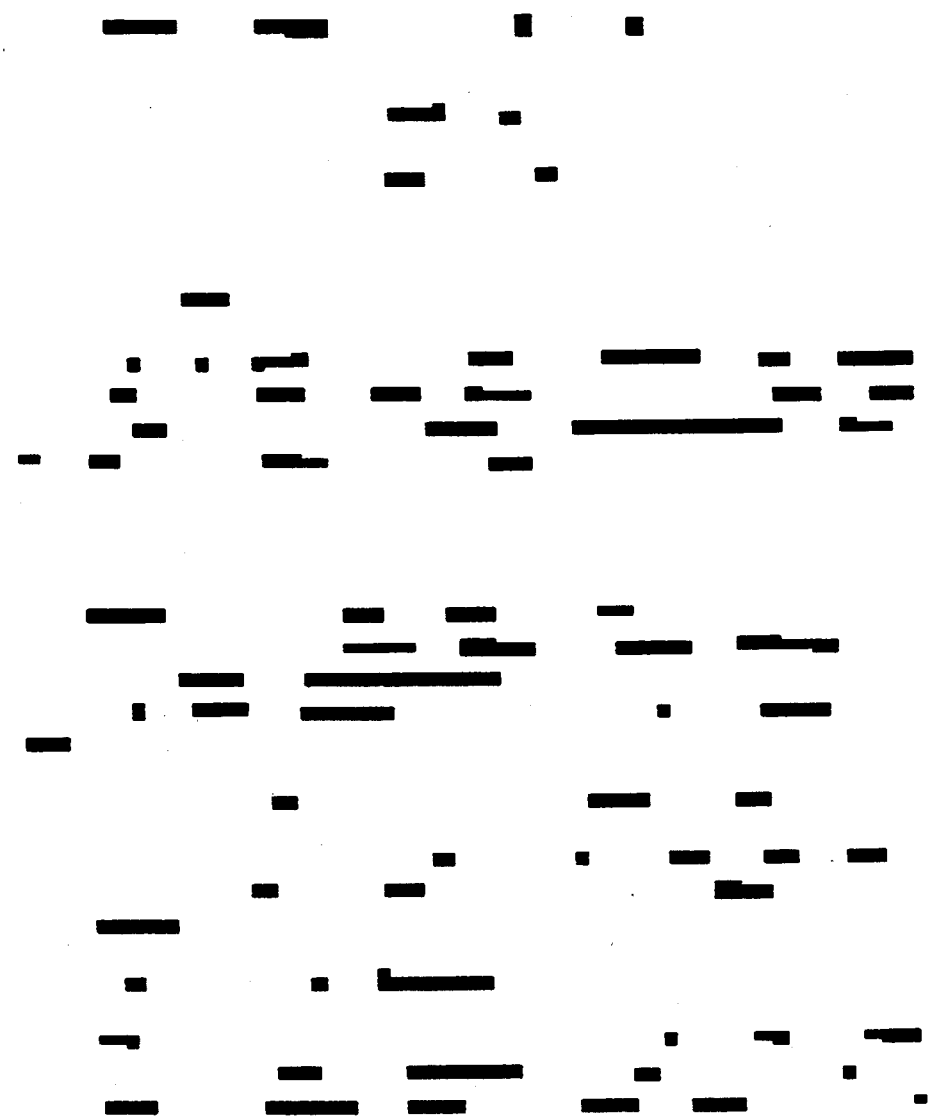

FIG. 22E shows the image after the next set of steps 1312 and 1314. This CLOSE/OPEN tends to remove any remaining pixels in the handwritten annotation regions and solidify groups of ON pixels, resulting in an image which is used as a seed.

Figure 22F:
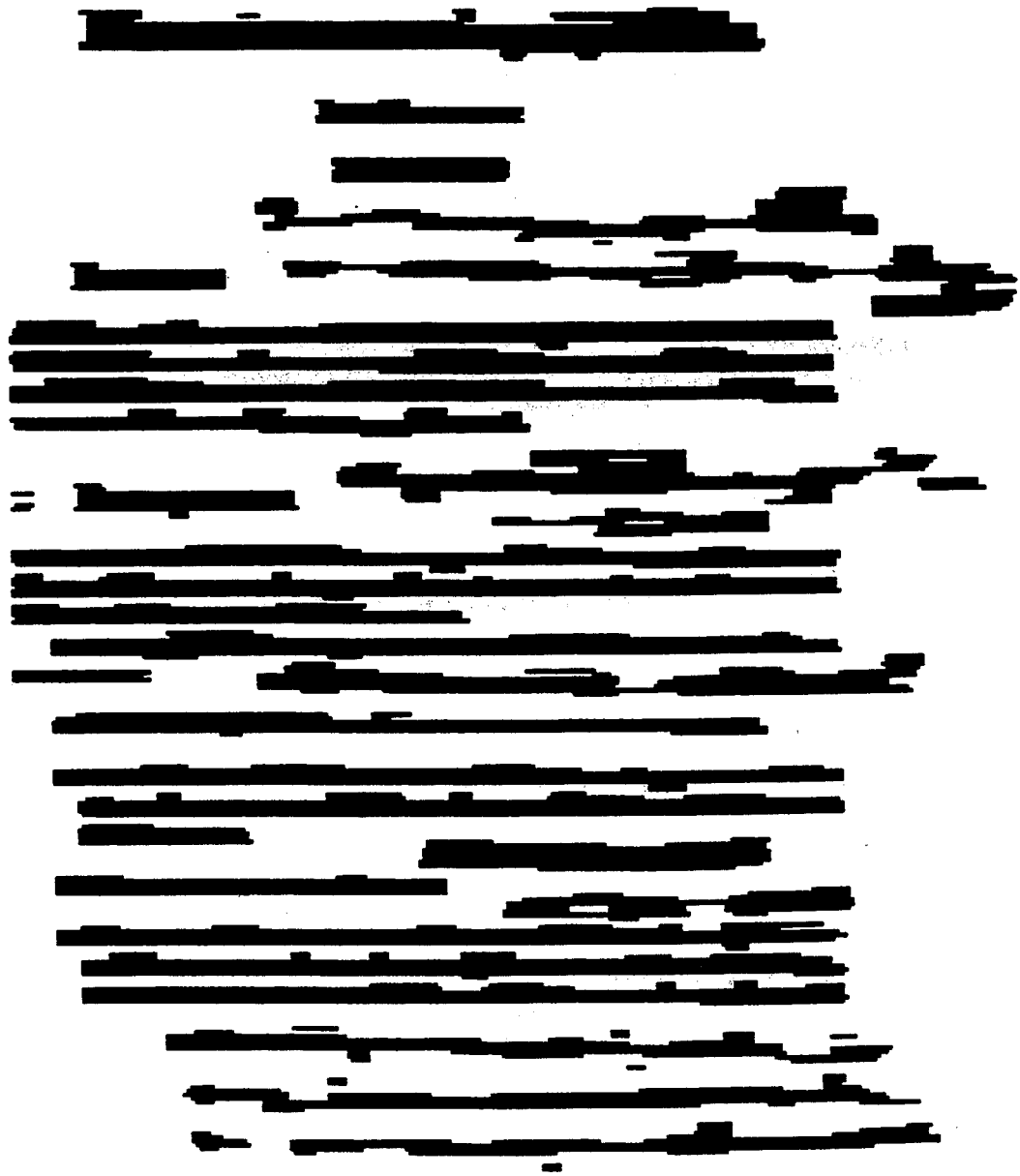

FIG. 22F illustrates the image after formation of the clipping mask with steps 1202 to 1208. As shown the image contains large regions of ON pixels covering both the handwritten annotations and the machine printed text.

Figure 22G:
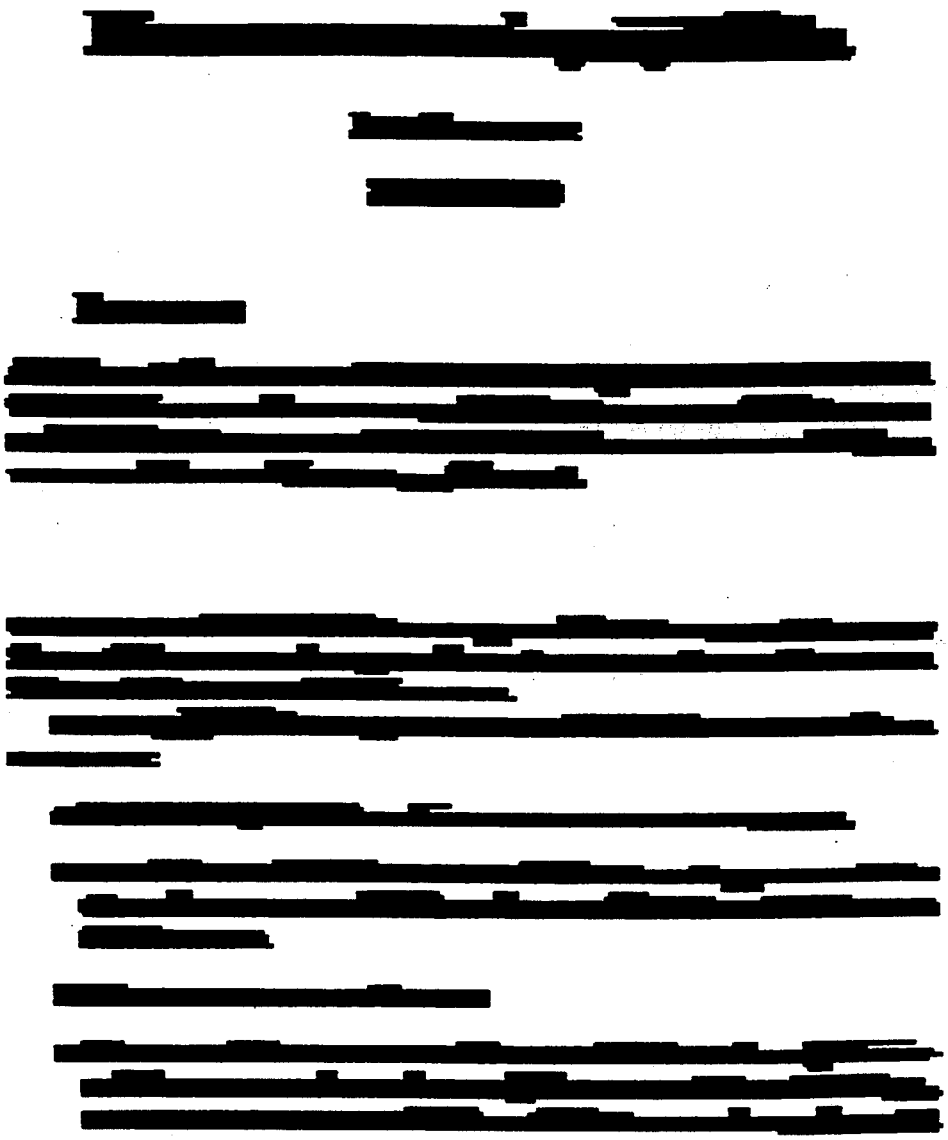
Figure 22H:
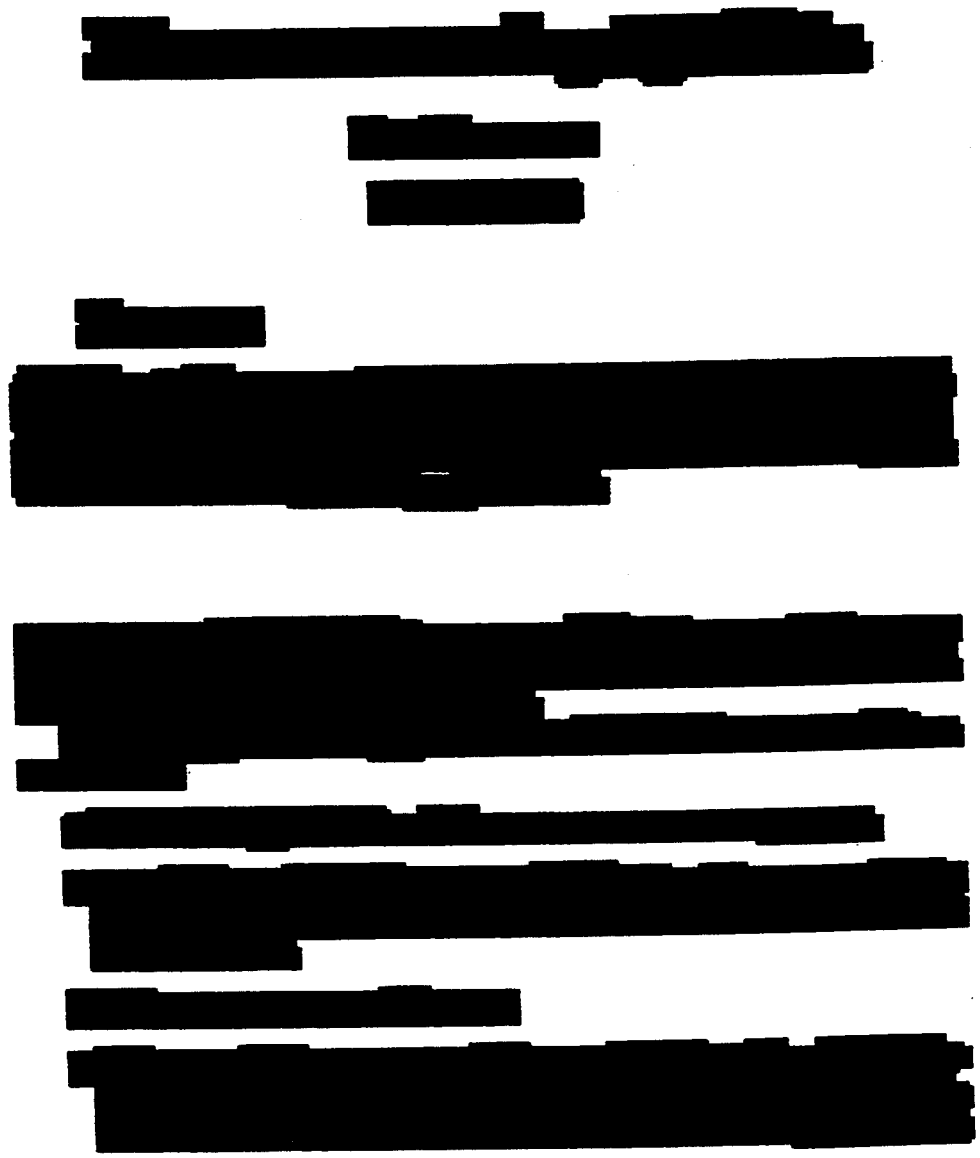

FIG. 22G illustrates the segmentation mask (before the DILATE 1409), which is formed by fillclipping the seed to the fillclip mask. As shown, the segmentation mask includes primarily ON pixels covering the desired machine printed areas. As shown in FIG. 22H, a subsequent DILATE results in substantially complete coverage of these regions.

FIG. 22I illustrates the image after extraction of the machine printed text. As shown, no handwritten annotations remain. FIG. 22J shows the handwritten annotation image. As shown therein, the process was almost completely effective in extracting only handwritten annotations. The "1." and "2. Background" were probably insufficiently dense in seed material (due to their relatively large size) for effective separations. FIG. 22K illustrates the image with the identified machine printed text outlined with the segmentation mask.

2. Second Exemplary Embodiment

FIG. 23A shows the same original image reduced twice as shown in steps 1502 to 1506. For each reduction, a thresholded reduction with a threshold of 2 was utilized. The handwritten and handprinted annotations have a noticeably different texture from the machine printed text at this resolution. This difference is exploited. In particular, the machine printed text has larger density OFF pixels that are surrounded on the left and the right by ON pixels than the handwritten annotations.

Figure 23B:
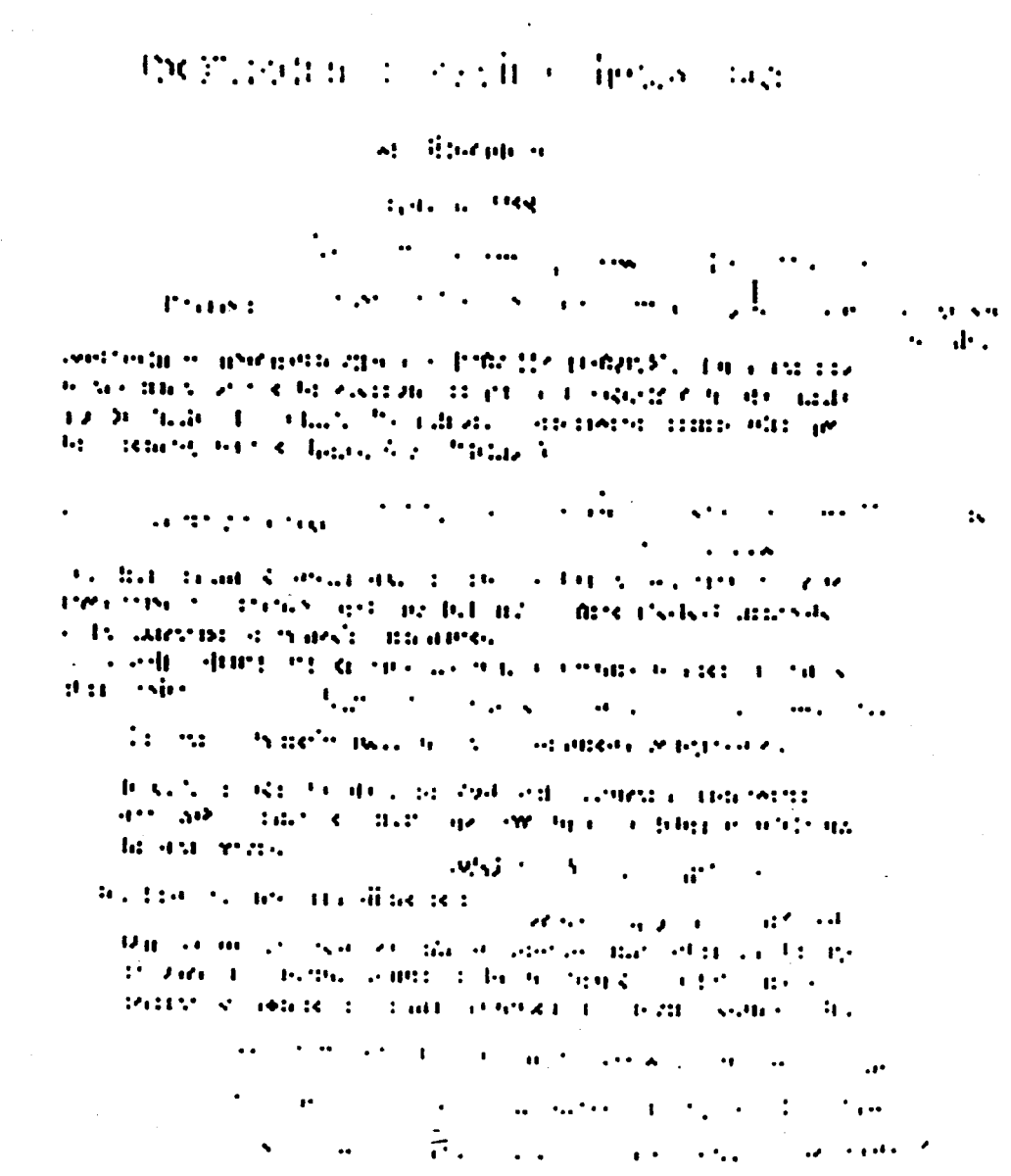

To extract pixels based on this difference, the image is CLOSEd by a horizontal SE of length 2 and then the result is XOR'd with the original reduced image. The resulting image is shown in FIG. 23B. Inspection of FIG. 23B shows that, in fact, the pixels are quite dense in the machine printed part and very sparse in the handwritten part. Note in particular that the pixels in FIG. 23B within the handwritten part are horizontally sparse and vertically are typically only one pixel high.

Figure 23C:
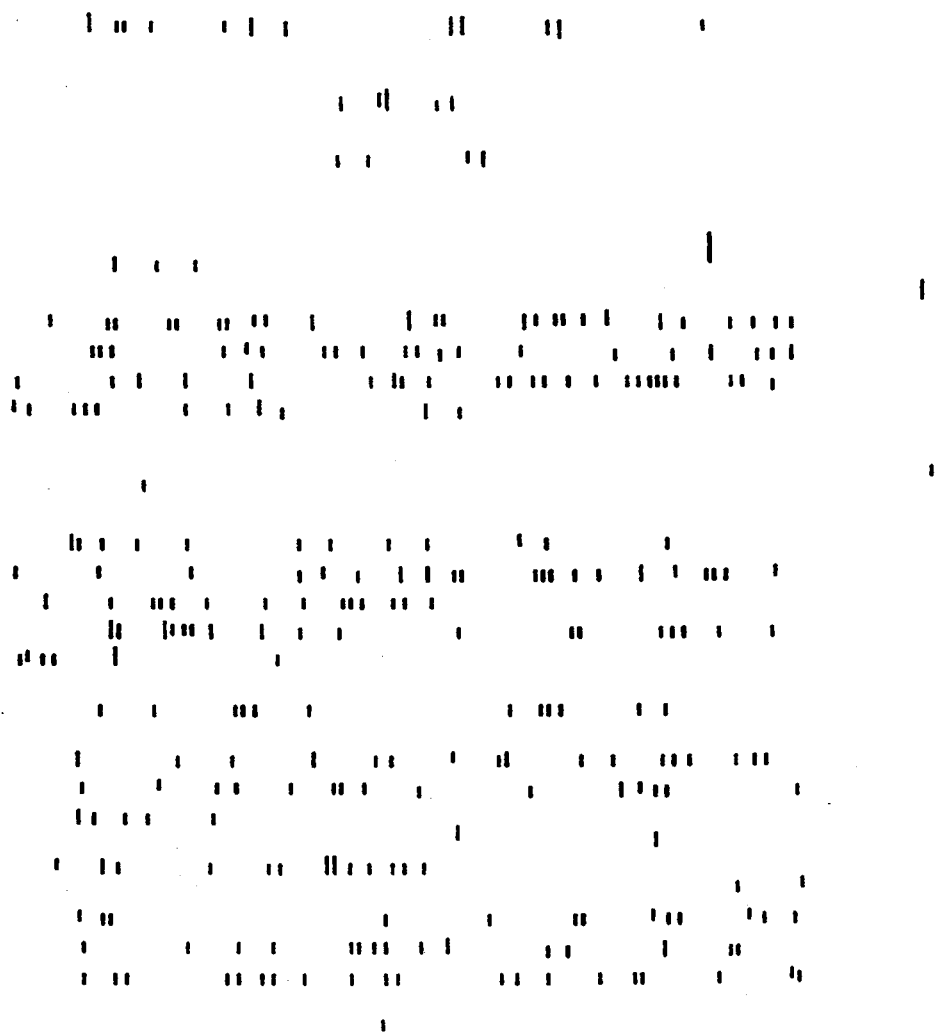

Most of the remaining handwriting pixels are removed to produce the image in FIG. 23C by doing the following two operations:
1. CLOSing with a vertical SE of height 2; and
2. OPENing with a vertical SE of height 3.

The reason the first CLOSE is performed is that there are many pixels in the machine printed part that are vertically aligned but separated by a single pixel gap. It is important to join such pixels together before doing the OPEN.

FIG. 23C looks like punch marks in an IBM card. What is significant about this figure is that there are very few pixels in the handwritten regions. Further, the pixels in the machine printed text regions are sufficiently dense that a covering mask may be constructed.

Figure 23D:
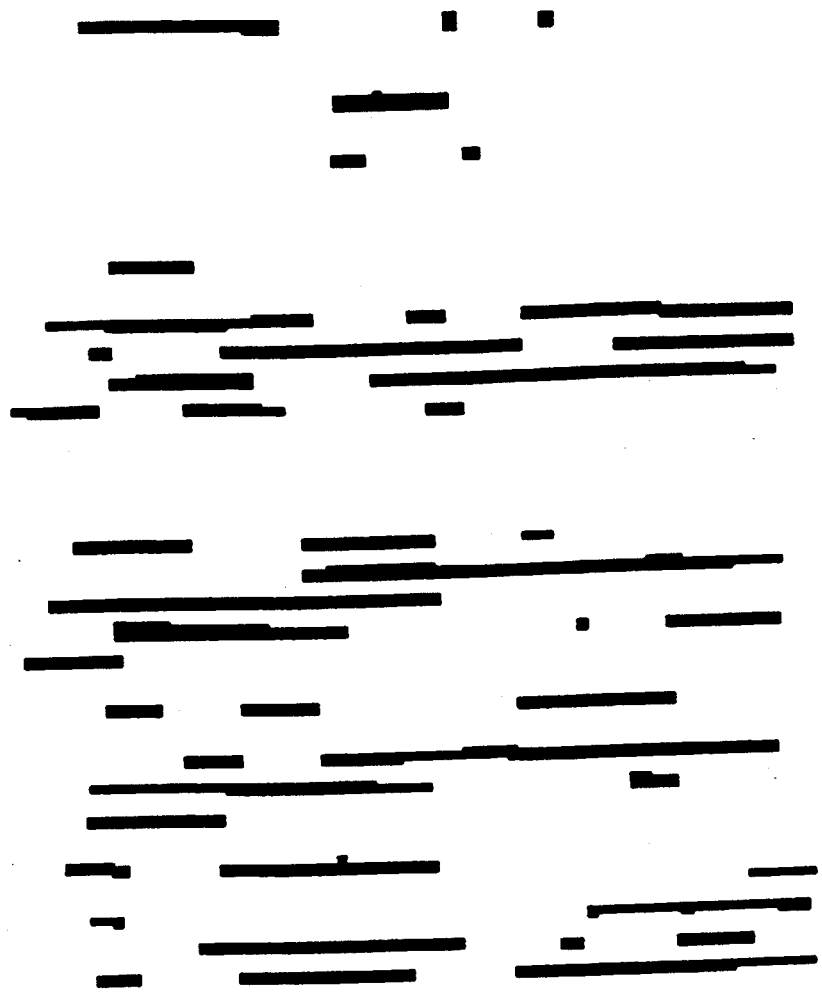

FIG. 23D illustrates the image after the next series of steps. It was produced by doing a large horizontal CLOSE (using a SE of length 20), followed by a small horizontal OPEN (using a SE of length 3). The CLOSE makes the long horizontal lines within the machine printed regions, and the OPEN removes the final few pixels that lie within the handwritten regions.

Figure 23E:
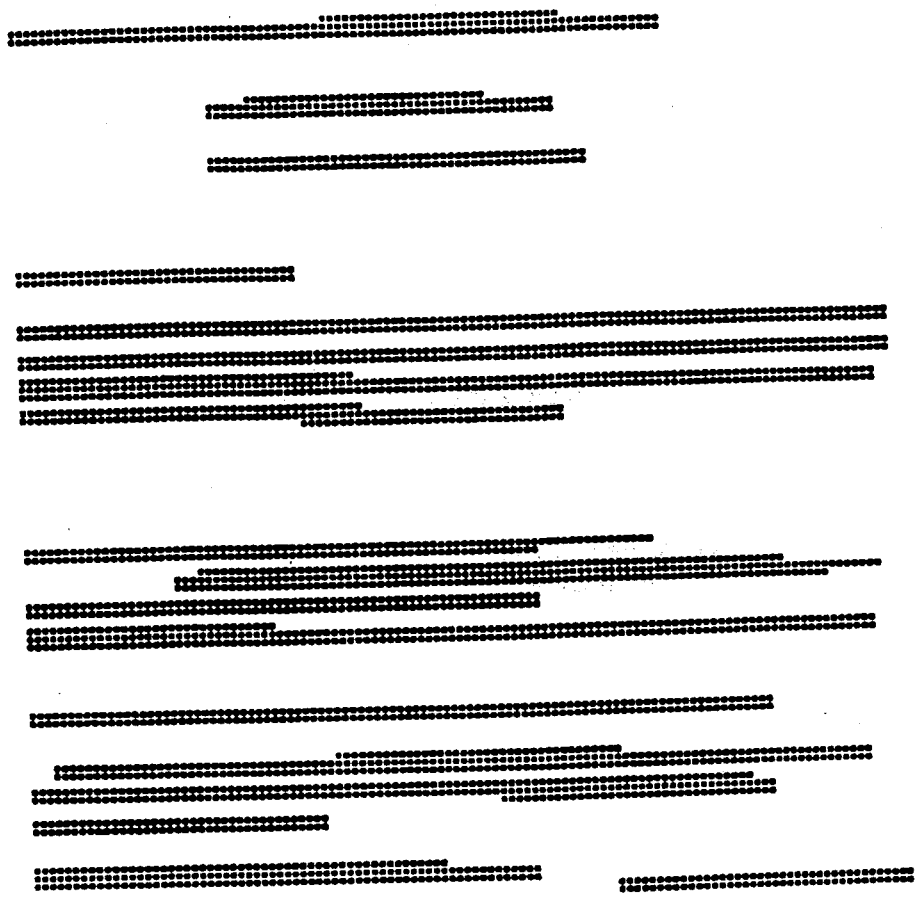

The image is now reduced once more, this time using a threshold of 1, to a resolution of 19 pixels/inch. This is followed by morphological operations with very large SEs. Large SEs are used because it is necessary to produce, starting with the pixels in FIG. 22D, a mask that covers all the machine printed text. This is accomplished by OPENing with a large horizontal SE (of length 50), followed by a DILATION by a horizontal SE of length 30. The result is shown in FIG. 23E, where the pixels are rendered in a "bigpixel" representation at about 19 pixels/inch, and represent a sampling density of 19 pixels/inch on the original.

This image must now be CLOSEd up vertically, which is done by closing with a vertical SE of height 6. To fill the mask further, a horizontal DILATION with a SE of length 10 is done next, followed by a vertical DILATION with a SE of height 3. This results in the mask shown in FIG. 23F. Again, the pixels shown here correspond to a sampling density of 19 pixels/inch in the original, and they are reproduced at roughly the same density, so that the result appears approximately at the size of the original. Note that a few lines of pixels have been cut off at the bottom of FIGS. 23E and 23F.

Figure 23F:
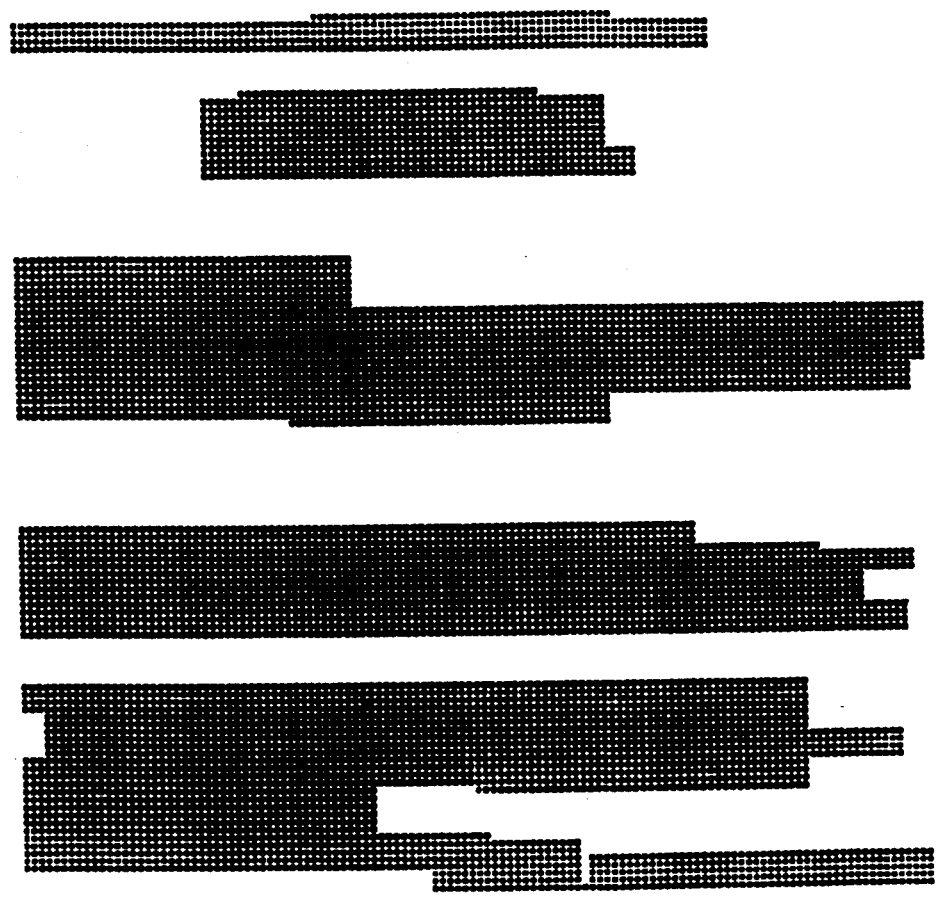

The mask in FIG. 23F is then magnified 8 times, to the original resolution of 150 pixels/inch. FIG. 23G shows the result when this mask is AND'd with the original, extracting most of the machine printed text from the original, along with a little of the handwritten annotations. The handwritten annotations, shown in FIG. 23H, is produced by taking a XOR of FIG. 23G with FIG. 22A. FIG. 23F shows a superposition of the original image with the EXPANDed mask for purposes of further illustration of the efficacy of the invention.

IV. CONCLUSION

It is to be understood that the above description is intended to be illustrative and not restrictive. Many variations of the invention will become apparent to those of skill in the art upon review of this disclosure. For example, while particular morphological operations, SEs, and scales have been illustrated, other sequences, and other sizes and shapes of structuring elements will also give reasonably good results. The above methods are illustrative of the variations which could be implemented by those of skill in the art. The scope of the invention should, therefore, be determined not with reference to the above description, but instead should be determined with reference to the appended claims along with their full scope of equivalents.

APPENDIX 1

SEGMENTATION OF TEXT STYLES

```
/****************************************************************
 * Copyright (c) 1989, Xerox Corporation.  All rights reserved. *
   Copyright protection claimed includes all forms and matters
   of copyrightable material and information now allowed by
   statutory or judicial law or hereafter granted, including
   without limitation, material generated from the software
   programs which are displayed on the screen such as icons,
   screen display looks, etc.
 ****************************************************************/

/*
 *   fontScripts.c--includes subroutines
 *                    fontScrMenuProc()
 *                    fontScr()
 *                    fontBold1()
 *                    fontBold2()
 *                    fontBold3()
 *                    fontItalic1()
 *                    fontItalic2()
 *                    fontItalic3()
 *                    fontWord1()
 */ include <stdio.h>
include <llama.h>
#include <imageReps.h>
#include "alpaca.h"
#include "morph.h"
#include "strelGlobals.h"
```

```c
define BOLD_RATIO          2.4     /* stop flag ratio on successive iters */ static char     message[70];

void
fontScrMenuProc(item, event)
Panel_item      item;
Event           *event;
{
int             selection;
static Menu     fontScrMenu;
void            fontScr();

if (!fontScrMenu)
        fontScrMenu = menu_create(MENU_STRINGS,
                        "bold, parameters 1",
                        "bold, parameters 2",
                        "bold, 4x reduction",
                        "bold, 4x reduction, fill words",
                        "italic erodes",
                        "italic default parameters",
                        "italic, 4x reduction",
                        "italic, 4x reduction, fill words",
                        "word", 0,
                        0);

selection = (int) menu_show(fontScrMenu, mainControlPanel, event, 0);
    fontScr(item, selection, event);
}

/*
 * fontScr():   scripts for segmenting different text fonts
 */
void
fontScr(fontScrItem, selection, event)
Panel_item              fontScrItem;
int                     selection;
Event                   *event;
{ if (!selection)
      return;

if (!pr1)
    {
       printf(" Error in fontScr: no source pixrect\n");
       return;
    } switch (selection)
    {  /* choose script */
    case 1:   /*      Bold font: thin using defaults   */
       fontBold1(strel8v, strel30v, strel30h, BOLD_RATIO);
       break;
    case 2:   /*      Bold font: thin and count; make mask   */
       fontBold1(strel10v, strel30v, strel30h, BOLD_RATIO);
       break;
    case 3:   /*      Bold font: thin and count; reduce x4; make mask   */
       fontBold2(strel8v, strel10v, strel10h, BOLD_RATIO);
       break;
    case 4:   /*      Bold font: thin and count; reduce x4; fill words   */
       fontBold3(strel10v, strel5v, strel5h, BOLD_RATIO);
       break;
    case 5:   /*      Italic font: show erodes for various SEs   */
       erode(pr2, pr1, strelItal1);
       opPrPw(pw2, pr2, COPY);
       erode(pr3, pr1, strelItal2);
       opPrPw(pw3, pr3, COPY);
       erode(pr4, pr1, strelItal3);
       opPrPw(pw4, pr4, COPY);
       erode(pr5, pr1, strelItal4);
       opPrPw(pw5, pr5, COPY);
       opPrPr(pr6, pr2, COPY);
       opPrPr(pr6, pr3, UNION);
       opPrPr(pr6, pr4, UNION);
```

```
         opPrPr(pr6, pr5, UNION);
         opPrPw(pw6, pr6, COPY);
         break;
      case 6:    /*    Italic font: erode; make mask */
         fontItalic1(strelItal1, strel40v, strel40h);
         break;
      case 7:    /*    Italic font: erode; reduce 4x; make mask */
         fontItalic2(strelItal1, strel10v, strel10h);
         break;
      case 8:    /*    Italic font: erode; reduce 4x; fill words */
         fontItalic3(strelItal2, strel5v, strel9h);
         break;
      case 9:    /*    Word segmenation: reduce 4x; make mask */
         fontWord1(strel2h, FALSE, 4);
         break;
      default:
         printf(" Error in fontScr: unknown selection\n");
      }
}

/*
 *  fontBold1():   Vers. 1:
 *                 Thin 1 pixel at a time from the left.
 *                 Erode with strelVert (default 8v) and count the
 *                    remaining pixels.
 *                 When the ratio between successive iterations
 *                    becomes greater than some amount
 *                    (default BOLD_RATIO ~2.4), stop.
 *                 Take the vertically eroded image:
 *                    Eliminate the 1-high noise;
 *                    Dilate with strelTaller (default 30v);
 *                    Close with strelClose (default 30h) to join the
 *                       characters;
 *                    Remove the horizontal and vertical noise;
 *                    Expand the mask horizontally;
 *                    And the mask with the original.
 */
fontBold1(strelVert, strelTaller, strelClose, iterRatio)
STREL         *strelVert, *strelTaller, *strelClose;
double         iterRatio;
{
int            oldNum, newNum, i;

/* thin horizontally */
   opPrPr(pr2, pr1, COPY);
   opPrPw(pw2, pr2, COPY);
   erode(pr4, pr2, strelVert);
   opPrPw(pw4, pr4, COPY);
   oldNum = numberPr(pr4, PIXELS);
   printf(" first number is %d\n", oldNum);
   for (i = 0; i < 10; i++)
   {
      erode(pr3, pr2, strel2hR);
      opPrPw(pw3, pr3, COPY);
      erode(pr4, pr3, strelVert);
      opPrPw(pw4, pr4, COPY);
      newNum = numberPr(pr4, PIXELS);
      printf(" i = %d, newNum = %d\n", i, newNum);
      printf(" greater than 1?:  %f\n", (newNum / (oldNum/iterRatio)));
      if (newNum < (oldNum / iterRatio))
         break;
      oldNum = newNum;
      opPrPr(pr2, pr3, COPY);
      opPrPw(pw2, pr2, COPY);
   }
   openPr(pr5, pr4, strel2v);      /* get rid of one-high noise */
   opPrPw(pw5, pr5, COPY);
   dilate(pr6, pr5, strelTaller);  /* make the marks taller */
   opPrPw(pw6, pr6, COPY);
   closePr(pr5, pr6, strelClose);  /* join the characters */
   opPrPw(pw5, pr5, COPY);
   openPr(pr6, pr5, strel5v);      /* remove noise */
   opPrPw(pw6, pr6, COPY);
```

```
    openPr(pr5, pr6, strel20h);    /* remove noise */
    opPrPw(pw5, pr5, COPY);
    dilate(pr6, pr5, strel20h);    /* expand slightly horizontally */
    opPrPw(pw6, pr6, COPY);   /* show the mask */
    logOp(pr5, pr1, pr6, INTERSECTION);
    opPrPw(pw5, pr5, COPY);
}

/*
 *  fontBold2():   Vers. 2:
 *                      Thin 1 pixel at a time from the left.
 *                      Erode with strelVert (default 8v) and count the
 *                          remaining pixels.
 *                      When the ratio between successive iterations
 *                          becomes greater than some amount
 *                          (default BOLD_RATIO ~2.4), stop.
 *                      Take the vertically eroded image:
 *                          Eliminate the 1-high noise;
 *                          Reduce x4;
 *                          Dilate with strelTaller (default 10v);
 *                          Close with strelClose (default 10h) to join the
 *                              characters;
 *                          Remove the horizontal and vertical noise;
 *                          Expand the mask horizontally;
 *                          Expand x4;
 *                          And the mask with the original.
 */
fontBold2(strelVert, strelTaller, strelClose, iterRatio)
STREL         *strelVert, *strelTaller, *strelClose;
double        iterRatio;
{
int           oldNum, newNum, i;

/* thin horizontally */
    opPrPr(pr2, pr1, COPY);
    opPrPw(pw2, pr2, COPY);
    erode(pr4, pr2, strelVert);
    opPrPw(pw4, pr4, COPY);
    oldNum = numberPr(pr4, PIXELS);
    printf(" first number is %d\n", oldNum);
    for (i = 0; i < 10; i++)
    {
            erode(pr3, pr2, strel2hR);
            opPrPw(pw3, pr3, COPY);
            erode(pr4, pr3, strelVert);
            opPrPw(pw4, pr4, COPY);
            newNum = numberPr(pr4, PIXELS);
            printf(" i = %d, newNum = %d\n", i, newNum);
            printf(" greater than 1?:   %f\n", (newNum / (oldNum/iterRatio)));
            if (newNum < (oldNum / iterRatio))
                    break;
            oldNum = newNum;
            opPrPr(pr2, pr3, COPY);
            opPrPw(pw2, pr2, COPY);
    }
    openPr(pr5, pr4, strel2v);    /* get rid of one-high noise */
    opPrPw(pw5, pr5, COPY);

togSelectedCanvases(5);
    selectiveReduce(1);
    opPrPr(pr3, pr5, COPY);      /* for the hardcopy */
    selectiveReduce(1);
    togSelectedCanvases(5);

opPrPr(pr3, pr5, COPY);      /* for the hardcopy */
    dilate(pr6, pr5, strelTaller);  /* make the marks taller */
    opPrPw(pw6, pr6, COPY);
    opPrPr(pr4, pr6, COPY);      /* for the hardcopy */
    opPrPw(pw4, pr4, COPY);
    closePr(pr5, pr6, strelClose);  /* join the characters */
    opPrPw(pw5, pr5, COPY);
    openPr(pr6, pr5, strel2v);    /* remove noise */
    opPrPw(pw6, pr6, COPY);
    openPr(pr5, pr6, strel8h);    /* remove noise */
```

```
    opPrPw(pw5, pr5, COPY);
    dilate(pr6, pr5, strel5h);   /* expand slightly horizontally */
    opPrPw(pw6, pr6, COPY);   /* show the mask */ togSelectedCanvases(6);
    selectiveExpand(TRUE, 1);
    edge(pr4, pr6, strel3, ON_PIXELS);      /* boundary of mask */
    opPrPr(pr4, pr1, XOR);                  /* original with mask boundary */
    opPrPw(pw4, pr4, COPY);
    logOp(pr5, pr1, pr6, INTERSECTION);     /* extracted bold font */
    opPrPw(pw5, pr5, COPY);
    selectiveExpand(TRUE, 1);
    togSelectedCanvases(6);

logOp(pr5, pr1, pr6, INTERSECTION);
    opPrPw(pw5, pr5, COPY);
}

/*
 *  fontBold3():   Vers. 3:
 *                 Thin 1 pixel at a time from the left.
 *                 Erode with strelVert (default 10v) and count the
 *                     remaining pixels.
 *                 When the ratio between successive iterations
 *                     becomes greater than some amount
 *                     (default BOLD_RATIO ~2.4), stop.
 *                 Take the vertically eroded image:
 *                     Eliminate the 1-high noise;
 *                     Reduce x4;
 *                     Form mask for word-bounding polygons;
 *                     Dilate with strelTaller (default 5v);
 *                     Close with strelClose (default 5h) to join the
 *                         characters;
 *                     Remove the horizontal and vertical noise;
 *                     Expand the mask horizontally;
 *                     Clip the mask to ON pixels in reduced original;
 *                     Fill into word-bounding polygons;
 *                     Expand x4;
 *                     And the mask with the original.
 */
fontBold3(strelVert, strelTaller, strelClose, iterRatio)
STREL        *strelVert, *strelTaller, *strelClose;
double       iterRatio;
{
int          oldNum, newNum, i;

/* thin horizontally */
    opPrPr(pr2, pr1, COPY);
    opPrPw(pw2, pr2, COPY);
    erode(pr4, pr2, strelVert);
    opPrPw(pw4, pr4, COPY);
    oldNum = numberPr(pr4, PIXELS);
    printf(" first number is %d\n", oldNum);
    for (i = 0; i < 10; i++)
    {
            erode(pr3, pr2, strel2hR);
            opPrPw(pw3, pr3, COPY);
            erode(pr4, pr3, strelVert);
            opPrPw(pw4, pr4, COPY);
            newNum = numberPr(pr4, PIXELS);
            printf(" i = %d, newNum = %d\n", i, newNum);
            printf(" greater than 1?:  %f\n", (newNum / (oldNum/iterRatio)));
            if (newNum < (oldNum / iterRatio))
                    break;
            oldNum = newNum;
            opPrPr(pr2, pr3, COPY);
            opPrPw(pw2, pr2, COPY);
    }
    openPr(pr5, pr4, strel2v);   /* get rid of one-high noise */
    opPrPw(pw5, pr5, COPY);

togSelectedCanvases(1);
    togSelectedCanvases(5);
```

```
    selectiveReduce(1);
    opPrPr(pr3, pr5, COPY);      /* for the hardcopy */
    selectiveReduce(1);
    togSelectedCanvases(1);
    togSelectedCanvases(5);

/* mask for word bounding polygons */
    dilate(pr2, pr1, strel2h);
    fill8Pw(pw2, pr2, FIXED_ITERATIONS, 4);
    opPwPr(pr2, pw2, COPY);

/* seed for bold stuff */
    opPrPr(pr3, pr5, COPY);      /* for the hardcopy */
    dilate(pr6, pr5, strelTaller);  /* make the marks taller */
    opPrPw(pw6, pr6, COPY);
    opPrPr(pr4, pr6, COPY);      /* for the hardcopy */
    opPrPw(pw4, pr4, COPY);
    closePr(pr5, pr6, strelClose);  /* join the characters */
    opPrPw(pw5, pr5, COPY);
    openPr(pr6, pr5, strel2v);   /* remove noise */
    opPrPw(pw6, pr6, COPY);
    openPr(pr5, pr6, strel8h);   /* remove noise */
    opPrPw(pw5, pr5, COPY);
    dilate(pr6, pr5, strel5h);   /* expand slightly horizontally */
    opPrPw(pw6, pr6, COPY);      /* show the mask */
    opPrPr(pr6, pr1, INTERSECTION);  /* clip the seed back to the ON pixels */
    opPrPw(pw6, pr6, COPY);      /* show the mask */
    fillClip(pr3, pr6, pr2, TO_COMPLETION, 30);  /* and fill the word mask */
    opPrPw(pw3, pr3, COPY);

togSelectedCanvases(3);

selectiveExpand(TRUE, 1);
    edge(pr4, pr3, strel3, ON_PIXELS);      /* boundary of mask */
    opPrPr(pr4, pr1, XOR);                  /* original with mask boundary */
    opPrPw(pw4, pr4, COPY);
    logOp(pr5, pr1, pr3, INTERSECTION);     /* extracted bold font */
    opPrPw(pw5, pr5, COPY);
    selectiveExpand(TRUE, 1);
    togSelectedCanvases(3);

/* bold separation at full scale */
    logOp(pr5, pr1, pr3, INTERSECTION);
    opPrPw(pw5, pr5, COPY);
}

/*
 *   fontItalic1():  Pattern match to an italic SE.
 *                   Erode with the chosen strelItalic;
 *                   Dilate with strelTaller (default 40v);
 *                   Close with strelClose (default 40h) to join the
 *                        characters;
 *                   Remove the horizontal and vertical noise;
 *                   Expand the mask horizontally;
 *                   And the mask with the original.
 */
fontItalic1(strelItalic, strelTaller, strelClose)
STREL      *strelItalic, *strelTaller, *strelClose;
{
            /* pattern match to italic fonts */
    erode(pr2, pr1, strelItalic);
    opPrPw(pw2, pr2, COPY);      /* show it */
    openPr(pr3, pr2, strel2dp);
    opPrPw(pw3, pr3, COPY);

dilate(pr4, pr3, strelTaller);  /* make the marks taller */
    opPrPw(pw4, pr4, COPY);
    closePr(pr5, pr4, strelClose);  /* join the characters */
    opPrPw(pw5, pr5, COPY);

openPr(pr6, pr5, strel5v);   /* remove noise */
    opPrPw(pw6, pr6, COPY);
    openPr(pr5, pr6, strel20h);  /* remove noise */
```

```
        opPrPw(pw5, pr5, COPY);
        dilate(pr6, pr5, strel20h);   /* expand slightly horizontally */
        opPrPw(pw6, pr6, COPY);   /* show the mask */
        logOp(pr5, pr1, pr6, INTERSECTION);
        opPrPw(pw5, pr5, COPY);
}

/*
 *  fontItalic2():   Pattern match to an italic SE.
 *                   Use reduction to scale 4.
 *                       Erode with the chosen strelItalic
 *                           (default strelItal1);
 *                       Reduce by 4;
 *                       Dilate with strelTaller (default 10v);
 *                       Close with strelClose (default 10h) to join the
 *                           characters;
 *                       Remove the horizontal and vertical noise;
 *                       Expand the mask horizontally;
 *                       Expand by 4;
 *                       And the mask with the original.
 */
fontItalic2(strelItalic, strelTaller, strelClose)
STREL        *strelItalic, *strelTaller, *strelClose;
{

/* pattern match to italic fonts */
    erode(pr2, pr1, strelItalic);
    opPrPw(pw2, pr2, COPY);   /* show it */
    openPr(pr3, pr2, strel2dp);
    opPrPw(pw3, pr3, COPY);

togSelectedCanvases(3);
    selectiveReduce(1);
    selectiveReduce(1);
    togSelectedCanvases(3);

dilate(pr4, pr3, strelTaller);   /* make the marks taller */
    opPrPw(pw4, pr4, COPY);
    closePr(pr5, pr4, strelClose);   /* join the characters */
    opPrPw(pw5, pr5, COPY);

openPr(pr6, pr5, strel2v);   /* remove noise */
    opPrPw(pw6, pr6, COPY);
    openPr(pr5, pr6, strel5h);   /* remove noise */
    opPrPw(pw5, pr5, COPY);
    dilate(pr6, pr5, strel5h);   /* expand slightly horizontally */
    opPrPw(pw6, pr6, COPY);   /* show the mask */ togSelectedCanvases(6);
    selectiveExpand(TRUE, 1);
    edge(pr4, pr6, strel3, ON_PIXELS);       /* boundary of mask */
    opPrPr(pr4, pr1, XOR);                    /* original with mask boundary */
    opPrPw(pw4, pr4, COPY);
    logOp(pr5, pr1, pr6, INTERSECTION);       /* extracted italic font */
    opPrPw(pw5, pr5, COPY);
    selectiveExpand(TRUE, 1);
    togSelectedCanvases(6);

/* italic separation at full scale */
    logOp(pr5, pr1, pr6, INTERSECTION);
    opPrPw(pw5, pr5, COPY);
}

/*
 *  fontItalic3():   Pattern match to an italic SE.
 *                   Use reduction to scale 4.
 *                   Fill selected parts to word boundaries.
 *                       Erode with the chosen strelItalic
 *                           (default strelItal2);
 *                       Reduce by 4;
 *                       Form mask for word-bounding polygons;
 *                       Dilate with strelTaller (default 5v);
```

```
 *                      Close with strelClose (default 9h) to join the
 *                              characters;
 *                      Remove the horizontal and vertical noise;
 *                      Expand the mask horizontally;
 *                      Clip the mask to ON pixels in reduced original;
 *                      Fill into word-bounding polygons;
 *                      Expand by 4;
 *                      And the mask with the original.
 */
fontItalic3(strelItalic, strelTaller, strelClose)
STREL           *strelItalic, *strelTaller, *strelClose;
{

/* pattern match to italic fonts */
    erode(pr2, pr1, strelItalic);
    opPrPw(pw2, pr2, COPY);   /* show it */
    openPr(pr3, pr2, strel2dp);
    opPrPw(pw3, pr3, COPY);

togSelectedCanvases(1);
    togSelectedCanvases(3);
    selectiveReduce(1);
    selectiveReduce(1);
    togSelectedCanvases(1);
    togSelectedCanvases(3);

/*  mask for word bounding polygons */
    dilate(pr2, pr1, strel2h);
    fill8Pw(pw2, pr2, FIXED_ITERATIONS, 4);
    opPwPr(pr2, pw2, COPY);

/*  mask for italic region */
    dilate(pr4, pr3, strelTaller);  /* make the marks taller */
    opPrPw(pw4, pr4, COPY);
    closePr(pr5, pr4, strelClose);   /* join the characters */
    opPrPw(pw5, pr5, COPY);
    openPr(pr6, pr5, strel2v);    /* remove noise */
    opPrPw(pw6, pr6, COPY);
    openPr(pr5, pr6, strel5h);    /* remove noise */
    opPrPw(pw5, pr5, COPY);
    dilate(pr6, pr5, strel5h);    /* expand slightly horizontally */
    opPrPw(pw6, pr6, COPY);
    opPrPr(pr6, pr1, INTERSECTION);    /* clip the seed back to the ON pixels */
    opPrPw(pw6, pr6, COPY);
    fillClip(pr3, pr6, pr2, TO_COMPLETION, 30);
    opPrPw(pw3, pr3, COPY);   /* show the filled mask */ togSelectedCanvases(3);
    selectiveExpand(TRUE, 1);
    edge(pr4, pr3, strel3, ON_PIXELS);        /* boundary of mask */
    opPrPr(pr4, pr1, XOR);                    /* original with mask boundary */
    opPrPw(pw4, pr4, COPY);
    logOp(pr5, pr1, pr3, INTERSECTION);       /* extracted italic font */
    opPrPw(pw5, pr5, COPY);
    selectiveExpand(TRUE, 1);
    togSelectedCanvases(3);

/* italic separation at full scale */
    logOp(pr5, pr1, pr3, INTERSECTION);
    opPrPw(pw5, pr5, COPY);
}
/*
 *   fontWord1:  creates b.b., or partial b.b. for words
 *                  Reduce 4x with level=1;
 *                  Small dilate with strelHor;
 *                  b.b. fill;
 *                  expand.
 */
fontWord1(strelHor, completionFlag, iters)
STREL           *strelHor;
int             completionFlag, iters;
{ openPr(pr2, pr1, strel2);    /* noise removal */
```

```
    opPrPw(pw2, pr2, COPY);
    togSelectedCanvases(2);
    selectiveReduce(1);
    selectiveReduce(1);
    togSelectedCanvases(2);

dilate(pr3, pr2, strelHor);
    if (completionFlag)
        fill8Pw(pw3, pr3, TO_COMPLETION, 100);
      else
        fill8Pw(pw3, pr3, FIXED_ITERATIONS, iters);

togSelectedCanvases(3);
    selectiveExpand(TRUE, 1);
    edge(pr4, pr3, strel3, ON_PIXELS);    /* boundary of mask */
    opPrPr(pr4, pr2, UNION);              /* original with mask boundary */
    opPrPw(pw4, pr4, COPY);
    selectiveExpand(TRUE, 1);
    togSelectedCanvases(3);

edge(pr4, pr3, strel3, ON_PIXELS);    /* boundary of mask */
    opPrPr(pr4, pr2, UNION);              /* original with mask boundary */
    opPrPw(pw4, pr4, COPY);
}

/**********************************************************
 *  Copyright (c) 1988, Xerox Corporation.  All rights reserved.  *
 *  Copyright protection claimed includes all forms and matters   *
 *  of copyrightable material and information now allowed by      *
 *  statutory or judicial law or hereafter granted, including     *
 *  without limitation, material generated from the software      *
 *  programs which are displayed on the screen such as icons,     *
 *  screen display looks, etc.                                    *
 **********************************************************/

/*
 * morph.h:  defined constants and STREL
 */ include <stdio.h>
include <llama.h> define UNION          1       /* [a] OR [b] */
define INTERSECTION   2       /* [a] AND [b] */
#define XOR            3
#define SUBTRACT       4       /* [a] AND (NOT[b]) */
#define COPY           5
define INVERT         6 define HIT            1
define MISS           2 define OP_HU          PIX_SRC | PIX_DST
define OP_HI          PIX_SRC & PIX_DST
#define OP_HC          PIX_SRC
#define OP_MU          PIX_NOT(PIX_SRC) | PIX_DST
#define OP_MI          PIX_NOT(PIX_SRC) & PIX_DST
#define OP_MC          PIX_NOT(PIX_SRC)
define OP_XOR         PIX_SRC ^ PIX_DST define OFF_PIXELS     0
define ON_PIXELS      1 define OFF            0
define ON             1
```

```
#define    PIXELS             0
define    WORDS              1 define    HORIZ              1
define    VERT               2
define    BOTH               3 define    LEFT               0
define    RIGHT              1 define    UP                 0
define    DOWN               1 define    FIRST              1
define    LAST               2 define    FIXED_ITERATIONS   1
define    TO_COMPLETION      2 define    N_STREL            50
define    N_HTL_FILT         50
define    N_HT_FILT          50 define    TO_ABLATION        1
define    TO_ONE_PIXEL       2
#define    FOUR_CONNECT       3
define    EIGHT_CONNECT      4 struct structEl
{
    int         nx, ny;
    int         cx, cy;
    short int   **data;
};
typedef struct structEl STREL;

/****************************************************************
* Copyright (c) 1988, Xerox Corporation.  All rights reserved.  *
* Copyright protection claimed includes all forms and matters   *
* of copyrightable material and information now allowed by      *
* statutory or judicial law or hereafter granted, including     *
* without limitation, material generated from the software      *
* programs which are displayed on the screen such as icons,     *
* screen display looks, etc.                                    *
****************************************************************/

/*
 * alpaca.h--SunWindows include files and globals
 */ include <pixrect/pixrect_hs.h>
include <sunwindow/window_hs.h>
#include <suntool/sunview.h>
#include <suntool/gfxsw.h>
#include <suntool/panel.h>
#include <suntool/canvas.h>
#include <suntool/text.h>
#include <suntool/scrollbar.h>

/******************************************
*          Data Structures                *
******************************************/
```

```
struct Coords
{
    int             n;          /* number of points */
    int             *x, *y;     /* arrays of integers */
};
typedef struct Coords COORDS;

struct Boxes
{
    int             n;          /* number of boxes */
    struct Rectangle **rect;    /* array of pointers to RECTs */ .
};
typedef struct Boxes BOXES;

struct Polys
{
    int             n;          /* number of closed polygons */
    struct Poly     **poly;     /* pointer to array of pointers to POLYs,
                                 * with each POLY representing the
                                 * boundary of a polygon */
};
typedef struct Polys POLYS;

struct Poly
{
    struct Coords   *coords;    /* pointer to COORDS structure giving the data
                                 * pts at "corners" of the polygon boundary */
    int             origScale;  /* original scale factor at which
                                 * polygon boundary "corners" are
                                 * was created */
    int             scale;      /* present scale factor, to which
                                 * polygon boundary "corners" are
                                 * have been transformed */
    struct Rectangle *bbox;     /* minimal bounding box for polygon */
    int             x, y;       /* coordinates of one point within
                                 * (and not on) the polygon boundary */
};
typedef struct Poly POLY;

struct Holo
{
    int             nbits;      /* number of bits */
    int             nerrors;    /* number of errors */
    struct Coords   *coords;    /* data coordinates */
    unsigned char   *bitArray;  /* data array (as read) */
    unsigned char   *errorArray;/* array of read errors */
    unsigned char   *data;      /* packed as a string */
};
typedef struct Holo HOLO;

struct PrTile
{
    Pixrect         ***tile;    /* ptr to array of pixrects */
    int             nx, ny;     /* number of tiles in x and y directions */
    int             w, h;       /* size of each tile */
    int             halftones;  /* true or false */
    int             i, j;       /* index of best tile */
    Pixrect         *best;      /* pixrect of tile with largest
                                   number of transitions */
};
typedef struct PrTile PRTILE;
```

```
struct strelArray
{
    int             n;              /* number of strels */
    char            **name;         /* array of strel names */
    struct structEl **strels;       /* array of pointers to strels */
};
typedef struct strelArray STAR;

/***************************************
 *      Defined Constants              *
 ***************************************/
#define NO_CHANGE       -1
#define NOT_FOUND       -1
define ERROR           -666 define NUM_ENTRIES     50
define NSCALES         6 define DEFAULT         0       /* for atomic pixwin ops */
define SAME            1       /*        "              */
#define DIFFERENT       2       /*        "              */

/***************************************
 *         Global Vars                 *
 ***************************************/
    /* environment globals */
EXTERN char             *Arch;              /* sun3 or sun4 */
EXTERN char             *BaseDirectory;     /* root of alpaca sources */
EXTERN char             *ImageDirectory;    /* default image directory */
EXTERN char             *SourceDirectory;   /* .strel sources, etc. */

/* file names */
EXTERN char     *Hardcopy;
EXTERN char     *HardcopyRot;
EXTERN char     *Hardcopy2;
EXTERN char     *Hardcopy4;
EXTERN char     *HardcopyAlp;
EXTERN char     *HardcopyAlpRot;
EXTERN char     *HardcopyAlp2;
EXTERN char     *HardcopyAlp4;
EXTERN char     *Filename;      /* tail part of filename */

/* sunview globals */
EXTERN Frame    mainFrame;
EXTERN Textsw   mainTextSw;
EXTERN Panel    mainControlPanel;
EXTERN Canvas   canvas1, canvas2, canvas3, canvas4, canvas5, canvas6;

EXTERN Pixwin           *pw1, *pw2, *pw3, *pw4, *pw5, *pw6;
EXTERN Pixwin           *pW[7];
EXTERN struct pixrect   *pR0[6], *pR1[6], *pR2[6], *pR3[6],
                        *pR4[6], *pR5[6], *pR6[6], *pR7[6],
                        *pR8[6], *pR9[6], *pR10[6], *pR11[6],
                        *pR12[6], *pR13[6];
EXTERN struct pixrect   *pr0, *pr1, *pr2, *pr3, *pr4, *pr5, *pr6,
                        *pr7, *pr8, *pr9, *pr10, *pr11, *pr12, *pr13;
EXTERN struct pixrect   *pR[14];

EXTERN struct Coords    *Coords1, *Coords2, *Coords3, *Coords4,
                        *Coords5, *Coords6;
EXTERN struct Boxes     *Boxes1, *Boxes2, *Boxes3, *Boxes4, *Boxes5, *Boxes6;
```

```
EXTERN struct Polys      *Polys1, *Polys2, *Polys3, *Polys5, *Polys5, *Polys6;
EXTERN struct Holo       *Holo1, *Holo2, *Holo3, *Holo4, *Holo5, *Holo6;
EXTERN struct PrTile     *Prtile1, *Prtile2, *Prtile3, *Prtile4,
                         *Prtile5, *Prtile6;
EXTERN struct strelArray *Star1, *Star2, *Star3, *Star4, *Star5,
                         *Star6, *Star7, *Star8, *Star9, *Star10;

EXTERN Scrollbar         sbV1, sbH1, sbV2, sbH2, sbV3, sbH3;
EXTERN Scrollbar         sbV4, sbH4, sbV5, sbH5, sbV6, sbH6;

/* scale globals */
EXTERN int               scaleFactor;
EXTERN struct Image      **scaledImage;
EXTERN int               scaledWidth[NSCALES];
EXTERN int               scaledHeight[NSCALES];
EXTERN struct Image      *sourceImage;
EXTERN struct Image      *auxImage;
EXTERN struct Rectangle  *readRect;

EXTERN Frame             writeFrame;
EXTERN Panel             writePanel;
EXTERN Canvas            writeCanvas;
EXTERN struct Rectangle  *writeRect;
EXTERN struct Image      *writeImage;
EXTERN int               writeFileFormat;

EXTERN Frame             readFrame;
EXTERN Panel             readPanel;
EXTERN Canvas            chosenCanvas;
EXTERN Pixwin            *chosenPixwin;
EXTERN Pixrect           *chosenPixrect;
EXTERN int               selectedCanvases[7];

EXTERN struct structEl   *chosenStrel, *prevChosenStrel;
EXTERN struct structEl   *prev2ChosenStrel, *prev3ChosenStrel;
EXTERN struct structEl   *selectedStrels[7];
EXTERN struct structEl   *chosenFilt, *prevChosenFilt;
EXTERN int               activeChoose;

/* globals for interactive atomics */
EXTERN int               SourceDestPwMode;
EXTERN Pixwin            *SourcePixwin;
EXTERN Pixwin            *DestPixwin;

/* initialized to zero by default */
EXTERN int               totBorderLeftTop;
EXTERN int               totBorderRight;
EXTERN int               totBorderBottom;

/* globals used by morphological operators */
EXTERN int               thresholdLevel;
EXTERN int               numIterations;
EXTERN int               iterMode;
EXTERN int               thinConstraint;
EXTERN int               thinVersion;
EXTERN int               thinDirection;
EXTERN int               thickConstraint;
EXTERN int               thickVersion;
EXTERN int               thickDirection;
EXTERN int               lineLength;
```

```
/****************************************************************
 * Copyright 1988, Xerox Corporation.  All rights reserved.     *
 ****************************************************************/
/*
 * "$Log:       strelGlobals.h,v $
 * Revision 1.0  88/09/15  18:05:18  bloomber
 * Initial revision
 * "
 *
 */

/*
 * strelGlobals.h:  global names for structuring elements
 */ include <stdio.h>
include <llama.h>

EXTERN STREL    **strelArray;
EXTERN STREL    **HTLFiltArray, **HTFiltArray;

/* linear elements */
EXTERN STREL    *strel2h, *strel2hR, *strel3h, *strel4h, *strel5h;
EXTERN STREL    *strel6h, *strel7h, *strel8h, *strel9h;
EXTERN STREL    *strel2v, *strel2vB, *strel3v, *strel4v, *strel5v;
EXTERN STREL    *strel6v, *strel7v, *strel8v, *strel9v;
EXTERN STREL    *strel10h, *strel10v, *strel11h, *strel11v;
EXTERN STREL    *strel13h, *strel13v, *strel15h, *strel15v;
EXTERN STREL    *strel20h, *strel20v, *strel25h, *strel25v;
EXTERN STREL    *strel30h, *strel30v, *strel35h, *strel35v;
EXTERN STREL    *strel40h, *strel40v, *strel45h, *strel45v;
EXTERN STREL    *strel50h, *strel50v;

/* diagonal elements */
EXTERN STREL    *strel3dp, *strel3dn, *strel4dp, *strel4dn;
EXTERN STREL    *strel5dp, *strel5dn, *strel6dp, *strel6dn;
EXTERN STREL    *strel7dp, *strel7dn, *strel9dp, *strel9dn;
EXTERN STREL    *strel11dp, *strel11dn, *strel13dp, *strel13dn;
EXTERN STREL    *strel15dp, *strel15dn;
EXTERN STREL    *strel5hdp, *strel5hdn, *strel5vdp, *strel5vdn;
EXTERN STREL    *strel9hdp, *strel9hdn, *strel9vdp, *strel9vdn;
EXTERN STREL    *strel13hdp, *strel13hdn, *strel13vdp, *strel13vdn;

/* broken linear elements */
EXTERN STREL    *strelF10h, *strelF10v, *strelF15h, *strelF15v;
EXTERN STREL    *strelF20h, *strelF20v, *strelF25h, *strelF25v;
EXTERN STREL    *strelF30h, *strelF30v, *strelF35h, *strelF35v;
EXTERN STREL    *strelF40h, *strelF40v, *strelF45h, *strelF45v;
EXTERN STREL    *strelF50h, *strelF50v;

/* square elements */
EXTERN STREL    *strel1, *strel2, *strel3, *strel4, *strel5;

EXTERN STREL    *strel2dp, *strel2dm;

EXTERN STREL    *strel2ule, *strel2uld, *strel2ure, *strel2urd;
EXTERN STREL    *strel2lle, *strel2lld, *strel2lre, *strel2lrd;

/* use for b.b. corners */
```

```
EXTERN STREL      *strel2tl, *strel2tr, *strel2bl, *strel2br;
EXTERN STREL      *strel7tl, *strel7tr, *strel7bl, *strel7br;
EXTERN STREL      *strel8tl, *strel8tr, *strel8bl, *strel8br;
EXTERN STREL      *strel9tl, *strel9tr, *strel9bl, *strel9br;
EXTERN STREL      *strel11tl, *strel11tr, *strel11bl, *strel11br;

EXTERN STREL      *strel3ve, *strel4ve, *strel2vd;

EXTERN STREL      *strel3h1, *strel3h2, *strel3v1, *strel3v2;
EXTERN STREL      *strel4h1, *strel4h2, *strel4v1, *strel4v2;
EXTERN STREL      *strel5h1, *strel5h2, *strel5v1, *strel5v2;

EXTERN STREL      *strel3ht1, *strel3ht2;

/* use for separating characters */
EXTERN STREL      *strel5gap;

/* use for segmenting italic typefaces */
EXTERN STREL      *strelItal1, *strelItal2, *strelItal3, *strelItal4;
EXTERN STREL      *strelItal5, *strelItal6, *strelItal7, *strelItal8;

/* use for detecting inverted text */
EXTERN STREL      *strel180a, *strel180b, *strel180c, *strel180d;
EXTERN STREL      *strel180e, *strel180f, *strel180g, *strel180h;

/* use for thinning to ablation */
EXTERN STREL      *strel2hl, *strel2hr, *strel2vt, *strel2vb;

/* use for thinning to one pixel */
EXTERN STREL      *strel3hl, *strel3hr, *strel3vt, *strel3vb;

/* use for 4-connect thinning */
EXTERN STREL      *strel3la4, *strel3lb4, *strel3lc4, *strel3ld4;
EXTERN STREL      *strel3le4, *strel3lf4, *strel3lg4, *strel3lh4;
EXTERN STREL      *strel3ra4, *strel3rb4, *strel3rc4, *strel3rd4;
EXTERN STREL      *strel3re4, *strel3rf4, *strel3rg4, *strel3rh4;
EXTERN STREL      *strel3ta4, *strel3tb4, *strel3tc4, *strel3td4;
EXTERN STREL      *strel3te4, *strel3tf4, *strel3tg4, *strel3th4;
EXTERN STREL      *strel3ba4, *strel3bb4, *strel3bc4, *strel3bd4;
EXTERN STREL      *strel3be4, *strel3bf4, *strel3bg4, *strel3bh4;

/* use for 8-connect thinning */
EXTERN STREL      *strel3la8, *strel3lb8, *strel3lc8, *strel3ld8;
EXTERN STREL      *strel3le8, *strel3lf8, *strel3lg8, *strel3lh8;
EXTERN STREL      *strel3ra8, *strel3rb8, *strel3rc8, *strel3rd8;
EXTERN STREL      *strel3re8, *strel3rf8, *strel3rg8, *strel3rh8;
EXTERN STREL      *strel3ta8, *strel3tb8, *strel3tc8, *strel3td8;
EXTERN STREL      *strel3te8, *strel3tf8, *strel3tg8, *strel3th8;
EXTERN STREL      *strel3ba8, *strel3bb8, *strel3bc8, *strel3bd8;
EXTERN STREL      *strel3be8, *strel3bf8, *strel3bg8, *strel3bh8;

/* use for spiral thinning */
EXTERN STREL      *strel3Se, *strel3Sne, *strel3Sn, *strel3Snw;
EXTERN STREL      *strel3Sw, *strel3Ssw, *strel3Ss, *strel3Sse;

/* use for anti-aliasing */
EXTERN STREL      *strelHTR, *strelHTL, *strelHBR, *strelHBL;
EXTERN STREL      *strelVLT, *strelVLB, *strelVRT, *strelVRB;

EXTERN STREL      *strel3slul, *strel3slll, *strel3slur, *strel3sllr;
```

```
EXTERN STREL    *strel3s2ul, *strel3s2ll, *strel3s2ur, *strel3s2lr;

/* use for reading slanted font digital data */
EXTERN STREL    *strel3Sp, *strel3Sn, *strel4Sp, *strel4Sn;
EXTERN STREL    *strel5Sp, *strel5Sn, *strel6Sp, *strel6Sn;
EXTERN STREL    *strel7Sp, *strel7Sn, *strel8Sp, *strel8Sn;

/* use for temporary SEs during program development */
EXTERN STREL    *strelT1, *strelT2, *strelT3, *strelT4, *strelT5;
EXTERN STREL    *strelT6, *strelT7, *strelT8, *strelT9, *strelT10;
EXTERN STREL    *strelT11, *strelT12, *strelT13, *strelT14, *strelT15;
EXTERN STREL    *strelT16, *strelT17, *strelT18, *strelT19, *strelT20;

/*************************
              *Halftone spatial filters *
              *************************/
    /* Horizontal, 0 degrees */
EXTERN STREL    *filtH8p2c0d, *filtH8p3c0d;

/* Solid, 1 cycle, 0 degrees */
EXTERN STREL    *filtS4p1c0d, *filtS4p1c0dI;
EXTERN STREL    *filtS6p1c0d;
EXTERN STREL    *filtS8p1c0d;

/* Solid, 1.5 cycle, 0 degrees */
EXTERN STREL    *filtS8p15c0d;

/* Cruciform, 1 cycle, 8 pix/cycle, 30 degrees */
EXTERN STREL    *filtC8p1c30d;

/* Cruciform, 3 cycle, 8 pix/cycle */
EXTERN STREL    *filtC8p3c0d;

/* Cruciform, 2 cycle, 4 pix/cycle */
EXTERN STREL    *filtC4p2c0d, *filtC4p2c0dI;
EXTERN STREL    *filtC4p2c14d;
EXTERN STREL    *filtC4p2c27d;
EXTERN STREL    *filtC4p2c27dI;
EXTERN STREL    *filtC4p2c45d;

/* Cruciform, 2 cycle, 5 pix/cycle */
EXTERN STREL    *filtC5p2c0d;
EXTERN STREL    *filtC5p2c22d;
EXTERN STREL    *filtC5p2c37d;

/* Cruciform, 2 cycle, 6 pix/cycle */
EXTERN STREL    *filtC6p2c0d;
EXTERN STREL    *filtC6p2c18d;
EXTERN STREL    *filtC6p2c31d;
EXTERN STREL    *filtC6p2c45d;

/* Cruciform, 2 cycle, 7 pix/cycle */
EXTERN STREL    *filtC7p2c0d;
EXTERN STREL    *filtC7p2c27d;
EXTERN STREL    *filtC7p2c34d;
EXTERN STREL    *filtC7p2c45d;

/* Cruciform, 2 cycle, 8 pix/cycle */
EXTERN STREL    *filtC8p2c0d;
EXTERN STREL    *filtC8p2c23d;
```

```
EXTERN STREL    *filtC8p2c30d;
EXTERN STREL    *filtC8p2c45d;

/* Light, 1 cycle, period = 3 */
EXTERN STREL    *filtL3p1c18d;
EXTERN STREL    *filtL3p1c45d;

/* Light, 1 cycle, period = 4 */
EXTERN STREL    *filtL4p1c0d;
EXTERN STREL    *filtL4p1c27d;
EXTERN STREL    *filtL4p1c45d;

/* Light, 1 cycle, period = 5 */
EXTERN STREL    *filtL5p1c0d;
EXTERN STREL    *filtL5p1c11d;

/* Light, 1 cycle, period = 6 */
EXTERN STREL    *filtL6p1c0d;
EXTERN STREL    *filtL6p1c18d;
EXTERN STREL    *filtL6p1c31d;
EXTERN STREL    *filtL6p1c45d;

/* Light, 1 cycle, period = 7 */
EXTERN STREL    *filtL7p1c8d;
EXTERN STREL    *filtL7p1c34d;
EXTERN STREL    *filtL7p1c45d;

/* Light, 1 cycle, period = 8 */
EXTERN STREL    *filtL8p1c0d;
EXTERN STREL    *filtL8p1c14d;
EXTERN STREL    *filtL8p1c23d;
EXTERN STREL    *filtL8p1c45d;

/*******************************
         *Textline spatial filters *
         *******************************/
    /* 4 cycle, white */
EXTERN STREL    *filtV20p4cW, *filtV25p4cW, *filtV30p4cW;
EXTERN STREL    *filtV35p4cW, *filtV40p4cW;
    /* 3 cycle, black&white */
EXTERN STREL    *filtV20p3cBW, *filtV25p3cBW, *filtV30p3cBW;
EXTERN STREL    *filtV35p3cBW, *filtV40p3cBW;
    /* 2 cycle, black&white */
EXTERN STREL    *filtV20p2cBW, *filtV25p2cBW, *filtV30p2cBW;
EXTERN STREL    *filtV35p2cBW, *filtV40p2cBW;
    /* 2 cycle, black&white, center at top */
EXTERN STREL    *filtV20p2ctBW, *filtV25p2ctBW, *filtV30p2ctBW;
EXTERN STREL    *filtV35p2ctBW, *filtV40p2ctBW;
    /* 2 cycle, black&white, center at bottom */
EXTERN STREL    *filtV20p2cbBW, *filtV25p2cbBW, *filtV30p2cbBW;
EXTERN STREL    *filtV35p2cbBW, *filtV40p2cbBW;

/***********************************************************
 * Copyright 1988, Xerox Corporation.  All rights reserved. *
 ***********************************************************/
/*
 * "$Log:      graphA.h,v $
 * Revision 1.0  88/09/15  18:04:24  bloomber
 * Initial revision
 * "
 *
```

```
*/

/*
 * graphA.h
 */

/*******************************************
 *  The following files must be included:  *
 *     #include <stdio.h>                  *
 *     #include <math.h>                   *
 *     #include <suntool/sunview.h>        *
 *     #include <suntool/panel.h>          *
 *     #include <suntool/textsw.h>         *
 *     #include <suntool/canvas.h>         *
 *     #include <suntool/scrollbar.h>      *
 *******************************************/ include <math.h> define    XAXIS              1
define    YAXIS              2
#define    POINTS             1
#define    CURVE              2
#define    HISTOGRAM          3
#define    GRAPH_ARRAY_SIZE   1500

/*******************************
 * globals for graph frame     *
 *******************************/
EXTERN Frame          graphFrame;
EXTERN Panel          graphMessagePanel;
EXTERN Panel          graphControlPanel;
EXTERN Canvas         graphCanvas;
EXTERN Pixwin         *graphPw;
EXTERN struct Data    *graphData;
EXTERN int            graphCanvasWidth, graphCanvasHeight;

EXTERN Frame          graphInputFrame;
EXTERN Panel          graphInputPanel;
EXTERN int            graphAutoScale;

/*******************************
 *     data structures         *
 *******************************/
struct Data
{
    int      x[GRAPH_ARRAY_SIZE], y[GRAPH_ARRAY_SIZE];
    int      n;      /* beginning of unused data */
    int      maxX, minX, maxY, minY;
    float    scaleX, scaleY;
    int      origX, origY;
    int      type;
    char     *title;
};
typedef struct Data DATA;
```

```
/****************************************************************
 * Copyright (c) 1989, Xerox Corporation.  All rights reserved. *
   Copyright protection claimed includes all forms and matters
   of copyrightable material and information now allowed by
   statutory or judicial law or hereafter granted, including
   without limitation, material generated from the software
   programs which are displayed on the screen such as icons,
   screen display looks, etc.
 ****************************************************************/

/*
 * morphOpsAlpl.c--morphological and logical procedures.
 *      basic:
 *                      dilate()    minkowsky add (dilate with hits only)
 *                      dilateB()   generalized dilate using hits and misses
 *                      dilateI()   minkowsky add by spatially inverted strel
 *                      erode()     generalized erode using hits and misses
 *                      erodeH()    erose using hits only
 *                      erodeI()    generalized erode by spatially inverted strel
 *                      openPr()    [pr9] erosion followed by dilation (strel)
 *                      openPrA()
 *                      closePr()   [pr9] dilateB followed by erodeH
 *                      closePrA()
 *                      erodeDilate() [pr9]
 *                      erodeDilateA()
 *                      dilateAdd()
 *                      dilateSepar() [pr9]  dilation by a separable strel
 *                      dilateSeparA()
 *                      erodeSepar() [pr9]   erosion by a separable strel
 *                      erodeSeparA()
 *                      openSepar() [pr9]    open by a separable strel
 *                      openSeparA()
 *                      closeSepar() [pr9]   close by a separable strel
 *                      closeSeparA()
 *                      clearPw()
 *                      clearPr()
 *                      opPrPr() [pr10]  six operations: union, intersect, xor,
 *                                       subtraction, copy, invert
 *                      opPrPrA()
 *                      opPrPw() [pr10]        ...
 *                      opPrPwA()              ...
 *                      opPwPr() [pr10]        ...
 *                      opPwPrA()              ...
 *                      bltOp()   basic rasterops between prs
 *                      logOp()   five operations between 2 pr; result to
 *                                a third pr.
 *      composite:
 *                      edge() [pr7]        boundary pixels
 *                      edgeA()
 *                      line() [pr9]
 *                      lineA()
 *                      lineF() [pr9]       fast version of line
 *                      lineFA()
 *      iterative composites and script-like subroutines:
 *                      fill8() [pr7, pr8]
 *                      fill8A()
 *                      fill4() [pr7, pr8]
 *                      fill4A()
 *                      fillClip() [pr7, pr8]
 *                      corner() [pr7]
```

```
*                cornerA()
*/ include <stdio.h>
include <llama.h>
#include <imageReps.h>
#include "alp.h"
#include "morph.h"
#include "alpStrels.h"

#define   WARNING   1    /* if non-zero, warning messages issued when
                          * temporary pixrects are created.        */

/*
 * dilate():  dilates a pixrect by hits in a structElem.
 *            Result to a pixrect.
 *            The coordinates (cx,cy) give the 'hot point' of the
 *               structElem, with respect to the UL corner.
 *               Alternatively, they give the reference point for the
 *               full image blts.
 *            Note:  this is the usual version of dilation, that is
 *               restricted to hits.  It ignores the misses.
 *            Note:  dilation is the same as Minkowsky addition.
 */
dilate(pixrD, pixrS, strel)
Pixrect      *pixrD, *pixrS;
STREL        *strel;
{
int          i, j, nx, ny, cx, cy, first;
static char  procName[] = "dilate";

if (!isPrDefined(pixrD, procName))
        return;
    if (!isPrDefined(pixrS, procName))
        return;

first = TRUE;
    nx = strel->nx;
    ny = strel->ny;
    cx = strel->cx;
    cy = strel->cy;
    for (j = 0; j < ny; j++)
        for (i = 0; i < nx; i++)
            if (first == TRUE)   /* no blits yet */
            {
                if (strel->data[j][i] == 1)   /* copy image */
                {
                    bltOp(pixrD, pixrS, HIT, i - cx, j - cy, COPY);
                    first = FALSE;
                }
            }
            else if (strel->data[j][i] == 1)
                bltOp(pixrD, pixrS, HIT, i - cx, j - cy, UNION);
}

/*
 * dilateB():  dilates a pixrect by hits/misses in a structElem.
 *             Result to a pixrect.
 *             The coordinates (cx,cy) give the 'hot point' of the
```

```
*                  structElem, with respect to the UL corner.
*                  Alternatively, they give the reference point for the
*                  full image blts.
*             Note: this is an unorthodox version, that dilates by ORing
*                  shifted bit-inverted images for misses!! It is the
*                  dual to the hit/miss generalized erode.
*/
dilateB(pixrD, pixrS, strel)
Pixrect     *pixrD, *pixrS;
STREL       *strel;
{
int         i, j, nx, ny, cx, cy, first;
static char procName[] = "dilateB";

if (!isPrDefined(pixrD, procName))
        return;
    if (!isPrDefined(pixrS, procName))
        return;

first = TRUE;
    nx = strel->nx;
    ny = strel->ny;
    cx = strel->cx;
    cy = strel->cy;
    for (j = 0; j < ny; j++)
        for (i = 0; i < nx; i++)
            if (first == TRUE)   /* no blits yet */
            {
                if (strel->data[j][i] == 1)   /* copy image */
                {
                    bltOp(pixrD, pixrS, HIT, i - cx, j - cy, COPY);
                    first = FALSE;
                }
                else if (strel->data[j][i] == 2)   /* copy inverted image */
                {
                    bltOp(pixrD, pixrS, MISS, i - cx, j - cy, COPY);
                    first = FALSE;
                }
            }
            else if (strel->data[j][i] == 1)
                bltOp(pixrD, pixrS, HIT, i - cx, j - cy, UNION);
            else if (strel->data[j][i] == 2)
                bltOp(pixrD, pixrS, MISS, i - cx, j - cy, UNION);
}

/*
*   dilateI():   dilates a pixrect by a spatially inverted STREL.
*                Result to a pixrect.
*                Note: because dilation is Minkowsky addition,
*                   dilation by an inverted STREL is the same as Minkowsky
*                   addition by an inverted STREL.  The misses in the STREL
*                   are ignored.
*/
dilateI(pixrD, pixrS, strel)
Pixrect     *pixrD, *pixrS;
STREL       *strel;
{
int         i, j, nx, ny, cx, cy, first;
static char procName[] = "dilateI";
```

```
    if (!isPrDefined(pixrS, procName))
        return;
    if (!isPrDefined(pixrD, procName))
        return;

first = TRUE;
    nx = strel->nx;
    ny = strel->ny;
    cx = strel->cx;
    cy = strel->cy;
    for (j = 0; j < ny; j++)
        for (i = 0; i < nx; i++)
            if (first == TRUE)  /* no blits yet */
            {
                if (strel->data[j][i] == 1)  /* copy image */
                {
                    bltOp(pixrD, pixrS, HIT, -i + cx, -j + cy, COPY);
                    first = FALSE;
                }
            }
            else if (strel->data[j][i] == 1)
                bltOp(pixrD, pixrS, HIT, -i + cx, -j + cy, UNION);
}

/*
 *  erode():  erodes a pixrect by a hit/miss STREL.
 *            Result to a pixrect.
 *            The coordinates (cx,cy) give the 'hot point' of the
 *               structElem, with respect to the UL corner.
 *               Alternatively, they give the reference point for the
 *               full image blts.
 *            Note: this is a hit/miss transform for general STRELs.
 */
erode(pixrD, pixrS, strel)
Pixrect      *pixrD, *pixrS;
STREL        *strel;
{
int          i, j, nx, ny, cx, cy, first;
static char  procName[] = "erode";

if (!isPrDefined(pixrS, procName))
        return;
    if (!isPrDefined(pixrD, procName))
        return;

first = TRUE;
    nx = strel->nx;
    ny = strel->ny;
    cx = strel->cx;
    cy = strel->cy;
    for (j = 0; j < ny; j++)
        for (i = 0; i < nx; i++)
            if (first == TRUE)  /* no blits yet */
            {
                if (strel->data[j][i] == 1)  /* copy image */
                {
                    bltOp(pixrD, pixrS, HIT, -i + cx, -j + cy, COPY);
                    first = FALSE;
```

```
                }
                else if (strel->data[j][i] == 2)   /* copy inverted image */
                {
                    bltOp(pixrD, pixrS, MISS, -i + cx, -j + cy, COPY);
                    first = FALSE;
                }
            }
            else if (strel->data[j][i] == 1)
                bltOp(pixrD, pixrS, HIT, -i + cx, -j + cy, INTERSECTION);
            else if (strel->data[j][i] == 2)
                bltOp(pixrD, pixrS, MISS, -i + cx, -j + cy, INTERSECTION);
}

/*
 *  erodeH():  erodes a pixrect by the hits in a STREL.
 *             Result to a pixrect.
 *             The coordinates (cx,cy) give the 'hot point' of the
 *                structElem, with respect to the UL corner.
 *             Alternatively, they give the reference point for the
 *                full image bits.
 */
erodeH(pixrD, pixrS, strel)
Pixrect       *pixrD, *pixrS;
STREL         *strel;
{
int           i, j, nx, ny, cx, cy, first;
static char   procName[] = "erodeH";

if (!isPrDefined(pixrS, procName))
        return;
    if (!isPrDefined(pixrD, procName))
        return;

first = TRUE;
    nx = strel->nx;
    ny = strel->ny;
    cx = strel->cx;
    cy = strel->cy;
    for (j = 0; j < ny; j++)
        for (i = 0; i < nx; i++)
            if (first == TRUE)   /* no blits yet */
            {
                if (strel->data[j][i] == 1)   /* copy image */
                {
                    bltOp(pixrD, pixrS, HIT, -i + cx, -j + cy, COPY);
                    first = FALSE;
                }
            }
            else if (strel->data[j][i] == 1)
                bltOp(pixrD, pixrS, HIT, -i + cx, -j + cy, INTERSECTION);
}

/*
 *  erodeI():  erodes a pixrect by a spatially inverted STREL.
 *             Result to a pixrect.
 *             The coordinates (cx,cy) give the 'hot point' of the
 *                structElem, with respect to the UL corner.
 *             Alternatively, they give the reference point for the
```

```
*              full image blts.
*           Note:  because erosion is Minkowsky subtraction by the
*              inverted STREL, erosion by an inverted STREL is just
*              Minkowsky subtraction.  This operation, however, is
*              the generalized erosion (hit/miss).
*/
erodeI(pixrD, pixrS, strel)
Pixrect      *pixrD, *pixrS;
STREL    ,   *strel;
{
int          i, j, nx, ny, cx, cy, first;
static char  procName[] = "erodeI";

if (!isPrDefined(pixrS, procName))
        return;
    if (!isPrDefined(pixrD, procName))
        return;

first = TRUE;
    nx = strel->nx;
    ny = strel->ny;
    cx = strel->cx;
    cy = strel->cy;
    for (j = 0; j < ny; j++)
        for (i = 0; i < nx; i++)
            if (first == TRUE)   /* no blits yet */
            {
                if (strel->data[j][i] == 1)   /* copy image */
                {
                    bltOp(pixrD, pixrS, HIT, i - cx, j - cy, COPY);
                    first = FALSE;
                }
                else if (strel->data[j][i] == 2)   /* copy inverted image */
                {
                    bltOp(pixrD, pixrS, MISS, i - cx, j - cy, COPY);
                    first = FALSE;
                }
            }
            else if (strel->data[j][i] == 1)
                bltOp(pixrD, pixrS, HIT, i - cx, j - cy, INTERSECTION);
            else if (strel->data[j][i] == 2)
                bltOp(pixrD, pixrS, MISS, i - cx, j - cy, INTERSECTION);
}

/*
*  openPr():  Erosion followed by dilation, using the same structElem.
*             Input from pixrect; output to pixrect
*             Input and output pixrects can be the same.
*             N.B.  "open()" is restricted name! (a system call)
*/
openPr(pixrD, pixrS, strel)
Pixrect      *pixrS, *pixrD;
STREL        *strel;
{
static char  procName[] = "openPr";
Pixrect      *prtemp;

if (!isPrDefined(pixrS, procName))
        return;
```

```
    if (!isPrDefined(pixrD, procName))
        return;

if (!pr9)
    {
#if WARNING
        printf(" Warning in openPr: Creating a temporary pixrect!\n");
#endif WARNING
        prtemp = mem_create(pixrS->pr_size.x, pixrS->pr_size.y, 1);
        erode(prtemp, pixrS, strel);
        dilate(pixrD, prtemp, strel);
        pr_close(prtemp);
    }
    else
    {
        erode(pr9, pixrS, strel);
        dilate(pixrD, pr9, strel);
    }
}

/*
 *  openPrA():  Erosion followed by dilation, using the same structElem.
 *              Input from pixrect; output to pixrect
 *              Input and output pixrects can be the same.
 *              Special version for Alp, requiring spec. of intermediate pr.
 */
openPrA(pixrD, pixrS, pixrI, strel)
Pixrect      *pixrS, *pixrD, *pixrI;
STREL        *strel;
{
static char    procName[] = "openPrA";

if (!isPrDefined(pixrS, procName))
        return;
    if (!isPrDefined(pixrD, procName))
        return;
    if (!isPrDefined(pixrI, procName))
        return;

erode(pixrI, pixrS, strel);
    dilate(pixrD, pixrI, strel);
}

/*
 *  closePr():  Dilation followed by erosion, using the same structElem.
 *              Input from a pixrect; output to a pixrect.
 *              Input and output pixrects can be the same.
 *              N.B.: "close()" is a restricted name! (a system call).
 */
closePr(pixrD, pixrS, strel)
Pixrect      *pixrD, *pixrS;
STREL        *strel;
{
Pixrect        *prtemp;
static char    procName[] = "closePr";

if (!isPrDefined(pixrS, procName))
        return;
```

```
    if (!isPrDefined(pixrD, procName))
        return;

if (!pr9)
    {
#if WARNING
        printf(" Warning in closePr: Creating a temporary pixrect!\n");
#endif WARNING
        prtemp = mem_create(pixrS->pr_size.x, pixrS->pr_size.y, 1);
        dilateB(prtemp, pixrS, strel);
        erodeH(pixrD, prtemp, strel);
        pr_close(prtemp);
    }
    else
    {
        dilateB(pr9, pixrS, strel);
        erodeH(pixrD, pr9, strel);
    }
}

/*
 *  closePrA():  Dilation followed by erosion, using the same STREL.
 *               Input from a pixrect; output to a pixrect.
 *               Input and output pixrects can be the same.
 *               Special version for Alp, requiring spec. of intermediate pr.
 */
closePrA(pixrD, pixrS, pixrI, strel)
Pixrect      *pixrD, *pixrS, *pixrI;
STREL        *strel;
{
static char   procName[] = "closePrA";

if (!isPrDefined(pixrS, procName))
        return;
    if (!isPrDefined(pixrD, procName))
        return;
    if (!isPrDefined(pixrI, procName))
        return;

dilateB(pixrI, pixrS, strel);
    erodeH(pixrD, pixrI, strel);
}

/*
 *  erodeDilate():  Erosion followed by dilation, using in general
 *                  different structuring elements. Result to pixrect.
 *                  Input and output pixrects can be the same.
 */
erodeDilate(pixrD, pixrS, strelE, strelD)
Pixrect      *pixrD, *pixrS;
STREL        *strelE, *strelD;
{
Pixrect       *prtemp;
static char   procName[] = "erodeDilate";

if (!isPrDefined(pixrS, procName))
        return;
    if (!isPrDefined(pixrD, procName))
```

```
                return;

if (!pr9)
        {
#if WARNING
            printf(" Warning in erodeDilate: Creating a temporary pixrect!\n");
#endif WARNING
            prtemp = mem_create(pixrS->pr_size.x, pixrS->pr_size.y, 1);
            erode(prtemp, pixrS, strelE);
            dilate(pixrD, prtemp, strelD);
            pr_close(prtemp);
        }
        else
        {
            erode(pr9, pixrS, strelE);
            dilate(pixrD, pr9, strelD);
        }
}

/*
 *  erodeDilateA():    Erosion followed by dilation, using in general
 *                     different structuring elements. Result to pixrect.
 *                     Input and output pixrects can be the same.
 *              Special version for Alp, requiring spec. of intermediate pr.
 */
erodeDilateA(pixrD, pixrS, pixrI, strelE, strelD)
Pixrect      *pixrD, *pixrS, *pixrI;
STREL        *strelE, *strelD;
{
static char   procName[] = "erodeDilateA";

if (!isPrDefined(pixrS, procName))
            return;
        if (!isPrDefined(pixrD, procName))
            return;
        if (!isPrDefined(pixrI, procName))
            return;

erode(pixrI, pixrS, strelE);
        dilate(pixrD, pixrI, strelD);
}

/*
 *  dilateAdd():  dilates a pixrect by a structElem. Then adds the
 *                result to the destination pixrect. This differs from
 *                the usual dilate(), which simply puts the dilated
 *                result in the destination.
 */
dilateAdd(pixrD, pixrS, strel)
Pixrect      *pixrD, *pixrS;
STREL        *strel;
{
int           i, j, nx, ny, cx, cy;
static char   procName[] = "dilateAdd";

if (!isPrDefined(pixrS, procName))
            return;
        if (!isPrDefined(pixrD, procName))
```

```
        return;

nx = strel->nx;
    ny = strel->ny;
    cx = strel->cx;
    cy = strel->cy;
    for (j = 0; j < ny; j++)
        for (i = 0; i < nx; i++)
            if (strel->data[j][i] == 1)
                bltOp(pixrD, pixrS, HIT, i - cx, j - cy, UNION);
            else if (strel->data[j][i] == 2)
                bltOp(pixrD, pixrS, MISS, i - cx, j - cy, UNION);
}

/*
 *  dilateSepar():   dilates a pr by a separable strel; result to a pr.
 *                   the separable strel is decomposed into the two
 *                      linear strels: strel_1, strel_2
 *                   strel_1 is used before strel_2
 *                   Uses pr9 as temp. storage.
 *                   The source and destination pr can be the same.
 */
dilateSepar(pixrD, pixrS, strel_1, strel_2)
Pixrect      *pixrD, *pixrS;
STREL        *strel_1, *strel_2;
{
static char  procName[] = "dilateSepar";
Pixrect      *prtemp;

if (!isPrDefined(pixrS, procName))
        return;
    if (!isPrDefined(pixrD, procName))
        return;

if (!pr9)
    {
#if WARNING
        printf(" Warning in dilateSepar: Creating a temporary pixrect!\n");
#endif WARNING
        prtemp = mem_create(pixrS->pr_size.x, pixrS->pr_size.y, 1);
        dilate(prtemp, pixrS, strel_1);
        dilate(pixrD, prtemp, strel_2);
        pr_close(prtemp);
    }
    else
    {
        dilate(pr9, pixrS, strel_1);
        dilate(pixrD, pr9, strel_2);
    }

}

/*
 *  dilateSeparA():   dilates a pr by a separable strel; result to a pr.
 *                    the separable strel is decomposed into the two
 *                       linear strels: strel_1, strel_2
 *                    strel_1 is used before strel_2
 *                    The source and destination pr can be the same.
```

```
*                   Special version for Alp, requiring spec. of intermediate pr.
*/
dilateSeparA(pixrD, pixrS, pixrI, strel_1, strel_2)
Pixrect     *pixrD, *pixrS, *pixrI;
STREL       *strel_1, *strel_2;
{
static char   procName[] = "dilateSeparA";

if (!isPrDefined(pixrS, procName))
        return;
    if (!isPrDefined(pixrD, procName))
        return;
    if (!isPrDefined(pixrI, procName))
        return;

dilate(pixrI, pixrS, strel_1);
    dilate(pixrD, pixrI, strel_2);
}

/*
*   erodeSepar(): Erodes a pr by a separable strel; result to a pr.
*                 the separable strel is decomposed into the two
*                     linear strels: strel_1, strel_2
*                   strel_1 is used before strel_2
*                 Uses pr9 as temp. storage.
*                 The source and destination pr can be the same.
*/
erodeSepar(pixrD, pixrS, strel_1, strel_2)
Pixrect     *pixrD, *pixrS;
STREL       *strel_1, *strel_2;
{
static char   procName[] = "erodeSepar";
Pixrect       *prtemp;

if (!isPrDefined(pixrS, procName))
        return;
    if (!isPrDefined(pixrD, procName))
        return;

if (!pr9)
    {
#if WARNING
        printf(" Warning in erodeSepar: Creating a temporary pixrect!\n");
#endif WARNING
        prtemp = mem_create(pixrS->pr_size.x, pixrS->pr_size.y, 1);
        erode(prtemp, pixrS, strel_1);
        erode(pixrD, prtemp, strel_2);
        pr_close(prtemp);
    }
    else
    {
        erode(pr9, pixrS, strel_1);
        erode(pixrD, pr9, strel_2);
    }
}

/*
*   erodeSeparA(): Erodes a pr by a separable strel; result to a pr.
```

```
*                the separable strel is decomposed into the two
*                    linear strels: strel_1, strel_2
*                  strel_1 is used before strel_2
*                The source and destination pr can be the same.
*                Special version for Alp, requiring spec. of intermediate pr.
*/
erodeSeparA(pixrD, pixrS, pixrI, strel_1, strel_2)
Pixrect     *pixrD, *pixrS, *pixrI;
STREL       *strel_1, *strel_2;
{
static char    procName[] = "erodeSeparA";

if (!isPrDefined(pixrS, procName))
        return;
    if (!isPrDefined(pixrD, procName))
        return;
    if (!isPrDefined(pixrI, procName))
        return;

erode(pixrI, pixrS, strel_1);
    erode(pixrD, pixrI, strel_2);
}

/*
*  openSepar():  Open a pr with separable struct elems; result to a pr.
*                Use strel_1 first; then strel_2.
*                The source and destination pr can be the same.
*                Uses pr9 implicitly for temp. storage.
*/
openSepar(pixrD, pixrS, strel_1, strel_2)
Pixrect     *pixrD, *pixrS;
STREL       *strel_1, *strel_2;
{
static char    procName[] = "openSepar";

if (!isPrDefined(pixrS, procName))
        return;
    if (!isPrDefined(pixrD, procName))
        return;

erodeSepar(pixrD, pixrS, strel_1, strel_2);
    dilateSepar(pixrD, pixrD, strel_1, strel_2);
}

/*
*  openSeparA():  Open a pr with separable struct elems; result to a pr.
*                 Use strel_1 first; then strel_2.
*                 The source and destination pr can be the same.
*                 Special version for Alp, requiring spec. of intermediate pr.
*/
openSeparA(pixrD, pixrS, pixrI, strel_1, strel_2)
Pixrect     *pixrD, *pixrS, *pixrI;
STREL       *strel_1, *strel_2;
{
static char    procName[] = "openSeparA";

if (!isPrDefined(pixrS, procName))
        return;
```

```
    if (!isPrDefined(pixrD, procName))
        return;
    if (!isPrDefined(pixrI, procName))
        return;

erodeSeparA(pixrD, pixrS, pixrI, strel_1, strel_2);
    dilateSeparA(pixrD, pixrD, pixrI, strel_1, strel_2);
}

/*
 * closeSepar():  Close a pr with separable struct elems; result to a pr.
 *                Use strel_1 first; then strel_2.
 *                The source and destination pr can be the same.
 *                Uses pr9 implicitly for temp. storage.
 */
closeSepar(pixrD, pixrS, strel_1, strel_2)
Pixrect      *pixrD, *pixrS;
STREL        *strel_1, *strel_2;
{
static char    procName[] = "closeSepar";

if (!isPrDefined(pixrS, procName))
        return;
    if (!isPrDefined(pixrD, procName))
        return;

dilateSepar(pixrD, pixrS, strel_1, strel_2);
    erodeSepar(pixrD, pixrD, strel_1, strel_2);
}

/*
 * closeSeparA():  Close a pr with separable struct elems; result to a pr.
 *                 Use strel_1 first; then strel_2.
 *                 The source and destination pr can be the same.
 *                 Special version for Alp, requiring spec. of intermediate pr.
 */
closeSeparA(pixrD, pixrS, pixrI, strel_1, strel_2)
Pixrect      *pixrD, *pixrS, *pixrI;
STREL        *strel_1, *strel_2;
{
static char    procName[] = "closeSeparA";

if (!isPrDefined(pixrS, procName))
        return;
    if (!isPrDefined(pixrD, procName))
        return;
    if (!isPrDefined(pixrI, procName))
        return;

dilateSeparA(pixrD, pixrS, pixrI, strel_1, strel_2);
    erodeSeparA(pixrD, pixrD, pixrI, strel_1, strel_2);
} clearPw(pixw)
Pixwin       *pixw;
{
```

```
    initRectDisplay();  /* to clear out any rect around */
    pw_writebackground(pixw, 0, 0, scaledWidth[0], scaledHeight[0], PIX_CLR);
} clearPr(pixr)
Pixrect     *pixr;
{
    pr_rop(pixr, 0, 0, pixr->pr_size.x, pixr->pr_size.y,
           PIX_CLR, NULL, 0, 0);
}

/*
 *  opPrPr():   Does one of six operations between a source pixrect and
 *              a destination pixrect, and puts the result in the
 *              destination pixrect.
 *              For set subtraction, the source (second) set is subtracted from
 *              the destination (first) set.
 *              N.B.  uses pr10 for set SUBTRACTion.
 */
opPrPr(pixrD, pixrS, op)
Pixrect     *pixrD, *pixrS;
int         op;
{
int         w, h;
static char procName[] = "opPrPr";

if (!isPrDefined(pixrS, procName))
        return;
    if (!isPrDefined(pixrD, procName))
        return;

w = pixrS->pr_size.x;
    h = pixrS->pr_size.y;
    if (op == UNION)
        pr_rop(pixrD, 0, 0, w, h, OP_HU, pixrS, 0, 0);
    else if (op == INTERSECTION)
        pr_rop(pixrD, 0, 0, w, h, OP_HI, pixrS, 0, 0);
    else if (op == XOR)
        pr_rop(pixrD, 0, 0, w, h, OP_XOR, pixrS, 0, 0);
    else if (op == SUBTRACT)
    {   /* pixrD setminus pixrS */
        if (!pr10)
        {
            printf(" Error in opPrPr: pr10 not defined\n");
            return;
        }
        pr_rop(pr10, 0, 0, w, h, OP_MC, pixrS, 0, 0);
        pr_rop(pixrD, 0, 0, w, h, OP_HI, pr10, 0, 0);
    }
    else if ((op == COPY) && (pixrS != pixrD))
        pr_rop(pixrD, 0, 0, w, h, OP_HC, pixrS, 0, 0);
    else if (op == INVERT)
        pr_rop(pixrD, 0, 0, w, h, OP_MC, pixrS, 0, 0);
    else
        printf(" Warning in opPrPr: No operation performed\n");
}
```

```
/*
 * opPrPrA():   Does one of six operations between a source pixrect and
 *                  a destination pixrect, and puts the result in the
 *                  destination pixrect.
 *              For set subtraction, the source (second) set is subtracted from
 *                  the destination (first) set.
 *              Special version for Alp, requiring specification of
 *                  of intermediate pixrect for set subtraction.
 */
opPrPrA(pixrD, pixrS, pixrI, op)
Pixrect     *pixrD, *pixrS, *pixrI;
int         op;
{
int         w, h;
static char procName[] = "opPrPrA";

if (!isPrDefined(pixrS, procName))
        return;
    if (!isPrDefined(pixrD, procName))
        return;
    if (!isPrDefined(pixrI. procName))
        return;

w = pixrS->pr_size.x;
    h = pixrS->pr_size.y;
    if (op == UNION)
        pr_rop(pixrD, 0, 0, w, h, OP_HU, pixrS, 0, 0);
    else if (op == INTERSECTION)
        pr_rop(pixrD, 0, 0, w, h, OP_HI, pixrS, 0, 0);
    else if (op == XOR)
        pr_rop(pixrD, 0, 0, w, h, OP_XOR, pixrS, 0, 0);
    else if (op == SUBTRACT)
    {   /* pixrD setminus pixrS */
        pr_rop(pixrI, 0, 0, w, h, OP_MC, pixrS, 0, 0);
        pr_rop(pixrD, 0, 0, w, h, OP_HI, pixrI, 0, 0);
    }
    else if ((op == COPY) && (pixrS != pixrD))
        pr_rop(pixrD, 0, 0, w, h, OP_HC, pixrS, 0, 0);
    else if (op == INVERT)
        pr_rop(pixrD, 0, 0, w, h, OP_MC, pixrS, 0, 0);
    else
        printf(" Warning in opPrPrA: no operation performed\n");
}

/*
 * opPrPw():    N.B. uses pr10 for set SUBTRACTion.
 */
opPrPw(pixwD, pixrS, op)
Pixwin      *pixwD;
Pixrect     *pixrS;
int         op;
{
int         w, h;
static char procName[] = "opPrPw";

if (!isPrDefined(pixrS, procName))
        return;

w = pixrS->pr_size.x;
```

```
    h = pixrS->pr_size.y;
    if (isPrTemp(pixrS) == FALSE)
    {   /* only save if not temporary pixrect!! */
        displayedPrNum = getPrNum(pixrS);
        displayedPr = pixrS;
    }
    if (op == UNION)
        pw_rop(pixwD, 0, 0, w, h, OP_HU, pixrS, 0, 0);
    else if (op == INTERSECTION)
        pw_rop(pixwD, 0, 0, w, h, OP_HI, pixrS, 0, 0);
    else if (op == XOR)
        pw_rop(pixwD, 0, 0, w, h, OP_XOR, pixrS, 0, 0);
    else if (op == SUBTRACT)
    {   /* pixwD setminus pixrS */
        if (!pr10)
        {
            printf(" Error in opPrPw: pr10 not defined\n");
            return;
        }
        pr_rop(pr10, 0, 0, w, h, OP_MC, pixrS, 0, 0);
        pw_rop(pixwD, 0, 0, w, h, OP_HI, pr10, 0, 0);
    }
    else if (op == COPY)
        pw_rop(pixwD, 0, 0, w, h, OP_HC, pixrS, 0, 0);
    else if (op == INVERT)
        pw_rop(pixwD, 0, 0, w, h, OP_MC, pixrS, 0, 0);
    else
        printf(" Warning in opPrPw:  no operation performed\n");
}

/*
 *  opPrPwA():   Special version for Alp, requiring specification of
 *               of intermediate pixrect for set subtraction.
 */
opPrPwA(pixwD, pixrS, pixrI, op)
Pixwin       *pixwD;
Pixrect      *pixrS, *pixrI;
int          op;
{
int          w, h;
static char  procName[] = "opPrPwA";

if (!isPrDefined(pixrS, procName))
        return;
    if (!isPrDefined(pixrI, procName))
        return;

w = pixrS->pr_size.x;
    h = pixrS->pr_size.y;
    if (isPrTemp(pixrS) == FALSE)
    {   /* only save if not temporary pixrect!! */
        displayedPrNum = getPrNum(pixrS);
        displayedPr = pixrS;
    }
    if (op == UNION)
        pw_rop(pixwD, 0, 0, w, h, OP_HU, pixrS, 0, 0);
    else if (op == INTERSECTION)
        pw_rop(pixwD, 0, 0, w, h, OP_HI, pixrS, 0, 0);
    else if (op == XOR)
```

```
        pw_rop(pixwD, 0, 0, w, h, OP_XOR, pixrS, 0, 0);
    else if (op == SUBTRACT)
    {   /* pixwD setminus pixrS */
        pr_rop(pixrI, 0, 0, w, h, OP_MC, pixrS, 0, 0);
        pw_rop(pixwD, 0, 0, w, h, OP_HI, pixrI, 0, 0);
    }
    else if (op == COPY)
        pw_rop(pixwD, 0, 0, w, h, OP_HC, pixrS, 0, 0);
    else if (op == INVERT)
        pw_rop(pixwD, 0, 0, w, h, OP_MC, pixrS, 0, 0);
    else
        printf(" Warning in opPrPwA: no operation performed\n");
}

/*
 *  opPwPr():   N.B. uses pr10 for set SUBTRACTion
 */
opPwPr(pixrD, pixwS, op)
Pixrect       *pixrD;
Pixwin        *pixwS;
int           op;
{
int           w, h;
static char   procName[] = "opPwPr";

if (!isPrDefined(pixrD, procName))
        return;

w = pixrD->pr_size.x;
    h = pixrD->pr_size.y;
    if (op == UNION)
        pw_read(pixrD, 0, 0, w, h, OP_HU, pixwS, 0, 0);
    else if (op == INTERSECTION)
        pw_read(pixrD, 0, 0, w, h, OP_HI, pixwS, 0, 0);
    else if (op == XOR)
        pw_read(pixrD, 0, 0, w, h, OP_XOR, pixwS, 0, 0);
    else if (op == SUBTRACT)
    {   /* pixrD setminus pixwS */
        if (!pr10)
        {
            printf(" Error in opPwPr: pr10 not defined\n");
            return;
        }
        pw_read(pr10, 0, 0, w, h, OP_MC, pixwS, 0, 0);
        pr_rop(pixrD, 0, 0, w, h, OP_HI, pr10, 0, 0);
    }
    else if (op == COPY)
        pw_read(pixrD, 0, 0, w, h, OP_HC, pixwS, 0, 0);
    else if (op == INVERT)
        pw_read(pixrD, 0, 0, w, h, OP_MC, pixwS, 0, 0);
    else
        printf(" Error in opPwPr:  unknown op\n");
}

/*
 *  opPwPrA():   Special version for Alp, requiring specification of
 *               of intermediate pixrect for set subtraction.
 */
```

```
opPwPrA(pixrD, pixwS, pixrI, op)
Pixrect      *pixrD, *pixrI;
Pixwin       *pixwS;
int          op;
{
int          w, h;
static char  procName[] = "opPwPr";

if (!isPrDefined(pixrD, procName))
        return;
    if (!isPrDefined(pixrI, procName))
        return;

w = pixrD->pr_size.x;
    h = pixrD->pr_size.y;
    if (op == UNION)
        pw_read(pixrD, 0, 0, w, h, OP_HU, pixwS, 0, 0);
    else if (op == INTERSECTION)
        pw_read(pixrD, 0, 0, w, h, OP_HI, pixwS, 0, 0);
    else if (op == XOR)
        pw_read(pixrD, 0, 0, w, h, OP_XOR, pixwS, 0, 0);
    else if (op == SUBTRACT)
    {   /* pixrD setminus pixwS */
        pw_read(pixrI, 0, 0, w, h, OP_MC, pixwS, 0, 0);
        pr_rop(pixrD, 0, 0, w, h, OP_HI, pixrI, 0, 0);
    }
    else if (op == COPY)
        pw_read(pixrD, 0, 0, w, h, OP_HC, pixwS, 0, 0);
    else if (op == INVERT)
        pw_read(pixrD, 0, 0, w, h, OP_MC, pixwS, 0, 0);
    else
        printf(" Error in opPwPrA: unknown op\n");
}

/*
 * bltOp(): performs appropriate blt between pixrects.
 */
bltOp(pixrD, pixrS, value, i, j, type)
Pixrect      *pixrS, *pixrD;
int          value, i, j, type;
{
int          w, h;
static char  procName[] = "bltOp";

if (!isPrDefined(pixrS, procName))
        return;
    if (!isPrDefined(pixrD, procName))
        return;

w = pixrS->pr_size.x;
    h = pixrS->pr_size.y;
    if (value == HIT)
    {
        if (type == UNION)
            pr_rop(pixrD, i, j, w, h, OP_HU, pixrS, 0, 0);
        else if (type == INTERSECTION)
            pr_rop(pixrD, i, j, w, h, OP_HI, pixrS, 0, 0);
        else if (type == COPY)
            pr_rop(pixrD, i, j, w, h, OP_HC, pixrS, 0, 0);
```

```
            else
            {
                printf(" Error in bltOp: unknown operation type\n");
                return;
            }
        }
        else if (value == MISS)
        {
            if (type == UNION)
                pr_rop(pixrD, i, j, w, h, OP_MU, pixrS, 0, 0);
            else if (type == INTERSECTION)
                pr_rop(pixrD, i, j, w, h, OP_MI, pixrS, 0, 0);
            else if (type == COPY)
                pr_rop(pixrD, i, j, w, h, OP_MC, pixrS, 0, 0);
            else
            {
                printf(" Error in bltOp: unknown operation type\n");
                return;
            }
        }
        else
        {
            printf(" Error in bltOp: unknown operation value\n");
            return;
        }
}

/*
 * logOp():  performs appropriate logical operation between pixrects.
 */
logOp(pixrD, pixrS1, pixrS2, op)
Pixrect         *pixrD, *pixrS1, *pixrS2;
int             op;
{
int             w, h;
static char     procName[] = "logOp";

if (!isPrDefined(pixrS1, procName))
        return;
    if (!isPrDefined(pixrS2, procName))
        return;
    if (!isPrDefined(pixrD, procName))
        return;

w = pixrS1->pr_size.x;
    h = pixrS1->pr_size.y;
    if (op == UNION)
    {  /* 'OR' the bitmaps */
        pr_rop(pixrD, 0, 0, w, h, PIX_SRC, pixrS1, 0, 0);
        pr_rop(pixrD, 0, 0, w, h, OP_HU, pixrS2, 0, 0);
    }
    else if (op == INTERSECTION)
    {  /* 'AND' the bitmaps */
        pr_rop(pixrD, 0, 0, w, h, PIX_SRC, pixrS1, 0, 0);
        pr_rop(pixrD, 0, 0, w, h, OP_HI, pixrS2, 0, 0);
    }
    else if (op == XOR)
    {  /* 'XOR' the bitmaps */
        pr_rop(pixrD, 0, 0, w, h, PIX_SRC, pixrS1, 0, 0);
```

```c
        pr_rop(pixrD, 0, 0, w, h, OP_XOR, pixrS2, 0, 0);
    }
    else
    {
        printf(" Error in logOp: unknown type of operation\n");
        return;
    }
}

/*
 *  edge():    Returns the boundary (edge) pixels.
 *             Type specifies whether the off-pixels or the on-pixels
 *                at the boundary are displayed.
 *             Uses pr7 explicitly.
 */
edge(pixrD, pixrS, strel, type)
Pixrect      *pixrD, *pixrS;
STREL        *strel;
int          type;
{
Pixrect      *prtemp;
static char  procName[] = "edge";

if (!isPrDefined(pixrS, procName))
        return;
    if (!isPrDefined(pixrD, procName))
        return;

/* use 'dilate' to get boundary pixels constituting
         *    the off-pixels at the background;
         * use 'erode' to get boundary pixels within
         *    the on-pixels at the boundary */
    if (!pr7)
    {
#if WARNING
        printf(" Warning in edge: Creating a temporary pixrect!\n");
#endif WARNING
        prtemp = mem_create(pixrS->pr_size.x, pixrS->pr_size.y, 1);
        if (type == OFF_PIXELS)
            dilate(prtemp, pixrS, strel);
        else if (type == ON_PIXELS)
            erode(prtemp, pixrS, strel);
        else
        {
            printf(" Error in edge: unknown type of edge pixels!\n");
            pr_close(prtemp);
            return;
        }
        pr_close(prtemp);
    }
    else
    {
        if (type == OFF_PIXELS)
            dilate(pr7, pixrS, strel);
        else if (type == ON_PIXELS)
            erode(pr7, pixrS, strel);
        else
        {
            printf(" Error in edge: unknown type of edge pixels!\n");
```

```
            return;
        }
    }

/* XOR with source */
    logOp(pixrD, pixrS, pr7, XOR);
}

/*
 *  edgeA():    Returns the boundary (edge) pixels.
 *              Type specifies whether the off-pixels or the on-pixels
 *                 at the boundary are displayed.
 *              Special version for Alp, that requires specification of
 *                 intermediate pixrect.
 */
edgeA(pixrD, pixrS, pixrI, strel, type)
Pixrect      *pixrD, *pixrS, *pixrI;
STREL        *strel;
int          type;
{
static char  procName[] = "edgeA";

if (!isPrDefined(pixrS, procName))
        return;
    if (!isPrDefined(pixrD, procName))
        return;
    if (!isPrDefined(pixrI, procName))
        return;

/* use 'dilate' to get boundary pixels constituting
         *    the off-pixels at the background;
         * use 'erode' to get boundary pixels within
         *    the on-pixels at the boundary */
    if (type == OFF_PIXELS)
        dilate(pixrI, pixrS, strel);
    else if (type == ON_PIXELS)
        erode(pixrI, pixrS, strel);
    else
    {
        printf(" Error in edgeA: unknown type of edge pixels!\n");
        return;
    }

/* XOR with source */
    logOp(pixrD, pixrS, pixrI, XOR);
}

/*
 *  line():  Returns either the horizontal or vertical lines
 *                of given min. length
 *           Robust version, without subsampling of line.
 *           N.B.: openPr uses pr9.
 */
line(pixrD, pixrS, orient, length)
Pixrect      *pixrD, *pixrS;
int          orient, length;
{
STREL        *strel;
```

```
static char    procName[] = "line";

if (!isPrDefined(pixrS, procName))
        return;
    if (!isPrDefined(pixrD, procName))
        return;

if (orient == HORIZ)
    {
        if (length <= 10) strel = strel10h;
        else if (length <= 15) strel = strel15h;
        else if (length <= 20) strel = strel20h;
        else if (length <= 25) strel = strel25h;
        else if (length <= 30) strel = strel30h;
        else if (length <= 35) strel = strel35h;
        else if (length <= 40) strel = strel40h;
        else if (length <= 45) strel = strel45h;
        else if (length <= 50) strel = strel50h;
        else
        {
            printf(" Error in line: length too long!\n");
            return;
        }
    }
    else if (orient == VERT)
    {
        if (length <= 10) strel = strel10v;
        else if (length <= 15) strel = strel15v;
        else if (length <= 20) strel = strel20v;
        else if (length <= 25) strel = strel25v;
        else if (length <= 30) strel = strel30v;
        else if (length <= 35) strel = strel35v;
        else if (length <= 40) strel = strel40v;
        else if (length <= 45) strel = strel45v;
        else if (length <= 50) strel = strel50v;
        else
        {
            printf(" Error in line: length too long!\n");
            return;
        }
    }
    else
    {
        printf(" Error in line: unknown orientation!\n");
        return;
    } openPr(pixrD, pixrS, strel);
}

/*
 * lineA():   Returns either the horizontal or vertical lines
 *                of given min. length
 *            Robust version, without subsampling of line.
 *            Special version for Alp, that requires specification of
 *                intermediate pixrect for openPrA.
 */
lineA(pixrD, pixrS, pixrI, orient, length)
Pixrect        *pixrD, *pixrS, *pixrI;
```

```
int        orient, length;
{
STREL      *strel;
static char procName[] = "lineA";

if (!isPrDefined(pixrS, procName))
        return;
    if (!isPrDefined(pixrD, procName))
        return;
    if (!isPrDefined(pixrI, procName))
        return;

if (orient == HORIZ)
    {
        if (length <= 10) strel = strel10h;
        else if (length <= 15) strel = strel15h;
        else if (length <= 20) strel = strel20h;
        else if (length <= 25) strel = strel25h;
        else if (length <= 30) strel = strel30h;
        else if (length <= 35) strel = strel35h;
        else if (length <= 40) strel = strel40h;
        else if (length <= 45) strel = strel45h;
        else if (length <= 50) strel = strel50h;
        else
        {
            printf(" Error in lineA: length too long!\n");
            return;
        }
    }
    else if (orient == VERT)
    {
        if (length <= 10) strel = strel10v;
        else if (length <= 15) strel = strel15v;
        else if (length <= 20) strel = strel20v;
        else if (length <= 25) strel = strel25v;
        else if (length <= 30) strel = strel30v;
        else if (length <= 35) strel = strel35v;
        else if (length <= 40) strel = strel40v;
        else if (length <= 45) strel = strel45v;
        else if (length <= 50) strel = strel50v;
        else
        {
            printf(" Error in lineA: length too long!\n");
            return;
        }
    }
    else
    {
        printf(" Error in lineA: unknown orientation!\n");
        return;
    } openPrA(pixrD, pixrS, pixrI, strel);
}

/*
 * lineF():   Returns either the horizontal or vertical lines
 *                  of given min. length
 *            Fast version, with subsampling of line.
```

```
*           N.B.:   openPr uses pr9.
*/
lineF(pixrD, pixrS, orient, length)
Pixrect     *pixrD, *pixrS;
int         orient, length;
{
STREL       *strel;
static char procName[] = "lineF";

if (!isPrDefined(pixrS, procName))
        return;
    if (!isPrDefined(pixrD, procName))
        return;

if (orient == HORIZ)
    {
        if (length <= 10) strel = strelF10h;
        else if (length <= 15) strel = strelF15h;
        else if (length <= 20) strel = strelF20h;
        else if (length <= 25) strel = strelF25h;
        else if (length <= 30) strel = strelF30h;
        else if (length <= 35) strel = strelF35h;
        else if (length <= 40) strel = strelF40h;
        else if (length <= 45) strel = strelF45h;
        else if (length <= 50) strel = strelF50h;
        else
        {
            printf(" Error in lineF: length too long!\n");
            return;
        }
    }
    else if (orient == VERT)
    {
        if (length <= 10) strel = strelF10v;
        else if (length <= 15) strel = strelF15v;
        else if (length <= 20) strel = strelF20v;
        else if (length <= 25) strel = strelF25v;
        else if (length <= 30) strel = strelF30v;
        else if (length <= 35) strel = strelF35v;
        else if (length <= 40) strel = strelF40v;
        else if (length <= 45) strel = strelF45v;
        else if (length <= 50) strel = strelF50v;
        else
        {
            printf(" Error in lineF: length too long!\n");
            return;
        }
    }
    else
    {
        printf(" Error in lineF: unknown orientation!\n");
        return;
    } openPr(pixrD, pixrS, strel);
}

/*
 * lineFA():  Returns either the horizontal or vertical lines
```

```
 *                  of given min. length
 *              Fast version, with subsampling of line.
 *              Special version for Alp, that requires specification of
 *                  intermediate pixrect for openPrA.
 */
lineFA(pixrD, pixrS, pixrI, orient, length)
Pixrect         *pixrD, *pixrS, *pixrI;
int             orient, length;
{
STREL           *strel;
static char     procName[] = "lineFA";

if (!isPrDefined(pixrS, procName))
        return;
    if (!isPrDefined(pixrD, procName))
        return;
    if (!isPrDefined(pixrI, procName))
        return;

if (orient == HORIZ)
    {
        if (length <= 10) strel = strelF10h;
        else if (length <= 15) strel = strelF15h;
        else if (length <= 20) strel = strelF20h;
        else if (length <= 25) strel = strelF25h;
        else if (length <= 30) strel = strelF30h;
        else if (length <= 35) strel = strelF35h;
        else if (length <= 40) strel = strelF40h;
        else if (length <= 45) strel = strelF45h;
        else if (length <= 50) strel = strelF50h;
        else
        {
            printf(" Error in lineFA: length too long!\n");
            return;
        }
    }
    else if (orient == VERT)
    {
        if (length <= 10) strel = strelF10v;
        else if (length <= 15) strel = strelF15v;
        else if (length <= 20) strel = strelF20v;
        else if (length <= 25) strel = strelF25v;
        else if (length <= 30) strel = strelF30v;
        else if (length <= 35) strel = strelF35v;
        else if (length <= 40) strel = strelF40v;
        else if (length <= 45) strel = strelF45v;
        else if (length <= 50) strel = strelF50v;
        else
        {
            printf(" Error in lineFA: length too long!\n");
            return;
        }
    }
    else
    {
        printf(" Error in lineFA: unknown orientation!\n");
        return;
    } openPrA(pixrD, pixrS, pixrI, strel);
```

```
}

/*
 *  fill8():    Fast fill with 8-adjacency into a pixrect.
 *     N.B.:   Uses pr7 and pr8, or creates temp pixrects
 *                 if they don't exist.
 *             Uses dilateAdd.
 *             termFlag determines whether the routine terminates
 *                 upon completion.  The parameter iter gives the
 *                 maximum number of iterations permitted.
 */
fill8(pixrD, pixrS, termFlag, iter)
Pixrect        *pixrD, *pixrS;
int             termFlag, iter;
{
int             i;
Pixrect        *prtemp1, *prtemp2;
static char     procName[] = "fill8";

if (!isPrDefined(pixrS, procName))
        return;
    if (!isPrDefined(pixrD, procName))
        return;

if (!pr7 || !pr8)
    {
#if WARNING
        printf(" Warning in fill8: Creating two temporary pixrects.\n");
#endif WARNING
        prtemp1 = mem_create(pixrS->pr_size.x, pixrS->pr_size.y, 1);
        prtemp2 = mem_create(pixrS->pr_size.x, pixrS->pr_size.y, 1);
        opPrPr(pixrD, pixrS, COPY);
        opPrPr(prtemp2, pixrS, COPY);          /* for comparison after
                                                  first iteration    */
        for (i = 0; i < iter; i++)
        {
            erode(prtemp1, pixrD, strel2dp);
            dilateAdd(pixrD, prtemp1, strel2dm);
            erode(prtemp1, pixrD, strel2dm);
            dilateAdd(pixrD, prtemp1, strel2dp);
            if (termFlag == TO_COMPLETION)
            {
                if (equalPrD(pixrD, prtemp2))
                    break;
                opPrPr(prtemp2, pixrD, COPY);  /* for comparison after
                                                  next iteration    */
            }
        }
        pr_close(prtemp1);
        pr_close(prtemp2);
    }
    else
    {
        opPrPr(pixrD, pixrS, COPY);
        opPrPr(pr8, pixrS, COPY);  /* for comparison after first iteration;
                                    * only useful if termFlag == TO_COMPLETION */
        for (i = 0; i < iter; i++)
        {
            erode(pr7, pixrD, strel2dp);
```

```
            dilateAdd(pixrD, pr7, strel2dm);
            erode(pr7, pixrD, strel2dm);
            dilateAdd(pixrD, pr7, strel2dp);
            if (termFlag == TO_COMPLETION)
            {
                if (equalPrD(pixrD, pr8))
                    break;
                opPrPr(pr8, pixrD, COPY);       /* for comparison after
                                                   next iteration */
            }
        }
    }
}

/*
 *  fill8A():    Fast fill with 8-adjacency into a pixrect.
 *               Version that requires specification of 2 pixrects for
 *                  intermediate computation.
 *               Uses dilateAdd.
 *               termFlag determines whether the routine terminates
 *                  upon completion.  The parameter iter gives the
 *                  maximum number of iterations permitted.
 */
fill8A(pixrD, pixrS, pixrI1, pixrI2, termFlag, iter)
Pixrect     *pixrD, *pixrS, *pixrI1, *pixrI2;
int         termFlag, iter;
{
int         i;
static char procName[] = "fill8A";

if (!isPrDefined(pixrS, procName))
        return;
    if (!isPrDefined(pixrD, procName))
        return;
    if (!isPrDefined(pixrI1, procName))
        return;
    if (!isPrDefined(pixrI2, procName))
        return;

opPrPr(pixrD, pixrS, COPY);
    opPrPr(pixrI2, pixrS, COPY);   /* for comparison after first iteration;
                                    * only useful if termFlag == TO_COMPLETION */
    for (i = 0; i < iter; i++)
    {
        erode(pixrI1, pixrD, strel2dp);
        dilateAdd(pixrD, pixrI1, strel2dm);
        erode(pixrI1, pixrD, strel2dm);
        dilateAdd(pixrD, pixrI1, strel2dp);
        if (termFlag == TO_COMPLETION)
        {
            if (equalPrD(pixrD, pixrI2))
                break;
            opPrPr(pixrI2, pixrD, COPY);   /* for comparison after next iteration */
        }
    }
}

/*
```

```
*   fill4():    Fast fill with 4-adjacency into a pixrect.
*      N.B.:   Uses pr7 and pr8.
*              Uses dilateAdd.
*              termFlag determines whether the routine terminates
*                 upon completion.  The parameter iter gives the
*                 maximum number of iterations permitted.
*/
fill4(pixrD, pixrS, termFlag, iter)
Pixrect        *pixrD, *pixrS;
int            termFlag, iter;
{
int            i;
Pixrect        *prtemp1, *prtemp2;
static char    procName[] = "fill4";

if (!isPrDefined(pixrS, procName))
        return;
    if (!isPrDefined(pixrD, procName))
        return;

if (!pr7 || !pr8)
    {
#if WARNING
        printf(" Warning in fill4: Creating two temporary pixrects.\n");
#endif WARNING
        prtemp1 = mem_create(pixrS->pr_size.x, pixrS->pr_size.y, 1);
        prtemp2 = mem_create(pixrS->pr_size.x, pixrS->pr_size.y, 1);
        opPrPr(pixrD, pixrS, COPY);
        opPrPr(prtemp2, pixrS, COPY);        /* for comparison after
                                                first iteration; */
        for (i = 0; i < iter; i++)
        {
            erode(prtemp1, pixrD, strel2ule);
            dilateAdd(pixrD, prtemp1, strel2uld);
            erode(prtemp1, pixrD, strel2ure);
            dilateAdd(pixrD, prtemp1, strel2urd);
            erode(prtemp1, pixrD, strel2lle);
            dilateAdd(pixrD, prtemp1, strel2lld);
            erode(prtemp1, pixrD, strel2lre);
            dilateAdd(pixrD, prtemp1, strel2lrd);
            if (termFlag == TO_COMPLETION)
            {
                if (equalPr(pixrD, prtemp2))
                    break;
                opPrPr(prtemp2, pixrD, COPY);     /* for comparison after
                                                     next iteration */
            }
        }
        pr_close(prtemp1);
        pr_close(prtemp2);
    }
    else
    {
        opPrPr(pixrD, pixrS, COPY);
        opPrPr(pr8, pixrS, COPY);        /* for comparison after
                                            first iteration; */
                                /* only useful if termFlag == TO_COMPLETION */
        for (i = 0; i < iter; i++)
        {
            erode(pr7, pixrD, strel2ule);
```

```
                dilateAdd(pixrD, pr7, strel2uld);
                erode(pr7, pixrD, strel2ure);
                dilateAdd(pixrD, pr7, strel2urd);
                erode(pr7, pixrD, strel2lle);
                dilateAdd(pixrD, pr7, strel2lld);
                erode(pr7, pixrD, strel2lre);
                dilateAdd(pixrD, pr7, strel2lrd);
                if (termFlag == TO_COMPLETION)
                {
                    if (equalPr(pixrD, pr8))
                        break;
                    opPrPr(pr8, pixrD, COPY);        /* for comparison after
                                                        next iteration */
                }
            }
        }
    }
}

/*
 *   fill4A():    Fast fill with 4-adjacency into a pixrect.
 *                Version that requires specification of 2 pixrects for
 *                    intermediate computation.
 *                Uses dilateAdd.
 *                termFlag determines whether the routine terminates
 *                    upon completion.  The parameter iter gives the
 *                    maximum number of iterations permitted.
 */
fill4A(pixrD, pixrS, pixrI1, pixrI2, termFlag, iter)
Pixrect       *pixrD, *pixrS, *pixrI1, *pixrI2;
int            termFlag, iter;
{
int            i;
static char    procName[] = "fill4";

if (!isPrDefined(pixrS, procName))
        return;
    if (!isPrDefined(pixrD, procName))
        return;
    if (!isPrDefined(pixrI1, procName))
        return;
    if (!isPrDefined(pixrI2, procName))
        return;

opPrPr(pixrD, pixrS, COPY);
    opPrPr(pixrI2, pixrS, COPY);   /* for comparison after first iteration;
                                    * only useful if termFlag == TO_COMPLETION */
    for (i = 0; i < iter; i++)
    {
        erode(pixrI1, pixrD, strel2ule);
        dilateAdd(pixrD, pixrI1, strel2uld);
        erode(pixrI1, pixrD, strel2ure);
        dilateAdd(pixrD, pixrI1, strel2urd);
        erode(pixrI1, pixrD, strel2lle);
        dilateAdd(pixrD, pixrI1, strel2lld);
        erode(pixrI1, pixrD, strel2lre);
        dilateAdd(pixrD, pixrI1, strel2lrd);
        if (termFlag == TO_COMPLETION)
        {
            if (equalPr(pixrD, pixrI2))
```

```
                break;
            opPrPr(pixrI2, pixrD, COPY);   /* for comparison after next iteration */
        }
    }
}

/*
 *  fillClip():   Fills pixrD on the pixrS seed, using strel3, and
 *                       clipping to pixrC on each iteration.
 *                    pixrD holds the results after each iteration;
 *                    pr7 and pr8 are used as temporary storage;
 *                       pr8 holds the previous results;
 */
fillClip(pixrD, pixrS, pixrC, termFlag, iter)
Pixrect     *pixrD, *pixrS, *pixrC;
int         termFlag, iter;
{
Pixrect     *mem_create(), *prtemp1, *prtemp2;
int         i;
static char procName[] = "fillClip";

if (!isPrDefined(pixrS, procName))
        return;
    if (!isPrDefined(pixrC, procName))
        return;
    if (!isPrDefined(pixrD, procName))
        return;

if (!pr7 && (termFlag == TO_COMPLETION))  /* need 2 temp pixrects */
    {
#if WARNING
        printf(" Warning in fillClip: Creating two temporary pixrects!\n");
#endif WARNING
        prtemp1 = mem_create(pixrS->pr_size.x, pixrS->pr_size.y, 1);
        prtemp2 = mem_create(pixrS->pr_size.x, pixrS->pr_size.y, 1);
        opPrPr(pixrD, pixrS, COPY);
        opPrPr(prtemp2, pixrS, COPY);    /* for comparison after
                                            first iteration;  */
        for (i = 0; i < iter; i++)
        {
            dilate(prtemp1, pixrD, strel3);  /* dilate */
            logOp(pixrD, prtemp1, pixrC, INTERSECTION);  /* clip */
            if (termFlag == TO_COMPLETION)
            {
                if (equalPr(pixrD, prtemp2))
                    break;
                opPrPr(prtemp2, pixrD, COPY);  /* for comparison after
                                                  next iteration */
            }
        }
        pr_close(prtemp1);
        pr_close(prtemp2);
    }
    else if (!pr7 && (termFlag == FIXED_ITERATIONS))  /* need only 1 temp pr */
    {
#if WARNING
        printf(" Warning in fillClip: Creating a temporary pixrect!\n");
#endif WARNING
        prtemp1 = mem_create(pixrS->pr_size.x, pixrS->pr_size.y, 1);
```

```
        opPrPr(pixrD, pixrS, COPY);
        for (i = 0; i < iter; i++)
        {
            dilate(prtempl, pixrD, strel3);    /* dilate */
            logOp(pixrD, prtempl, pixrC, INTERSECTION);    /* clip */
        }
        pr_close(prtempl);
    }
    else if (pr7 && !pr8 && (termFlag == TO_COMPLETION))
    {    /* need only 1 temp pixrect */
#if WARNING
        printf(" Warning in fillClip: Creating a temporary pixrect!\n");
#endif WARNING
        prtempl = mem_create(pixrS->pr_size.x, pixrS->pr_size.y, 1);
        opPrPr(pixrD, pixrS, COPY);
        opPrPr(prtempl, pixrS, COPY);     /* for comparison after
                                             first iteration; */
        for (i = 0; i < iter; i++)
        {
            dilate(pr7, pixrD, strel3);    /* dilate */
            logOp(pixrD, pr7, pixrC, INTERSECTION);    /* clip */
            if (termFlag == TO_COMPLETION)
            {
                if (equalPr(pixrD, prtempl))
                    break;
                opPrPr(prtempl, pixrD, COPY);    /* for comparison after
                                                    next iteration */
            }
        }
        pr_close(prtempl);
    }
    else     /* don't need any temporary pixrects */
    {
        opPrPr(pixrD, pixrS, COPY);
        opPrPr(pr8, pixrS, COPY);     /* for comparison after
                                         first iteration; */
        for (i = 0; i < iter; i++)
        {
            dilate(pr7, pixrD, strel3);    /* dilate */
            logOp(pixrD, pr7, pixrC, INTERSECTION);    /* clip */
            if (termFlag == TO_COMPLETION)
            {
                if (equalPr(pixrD, pr8))
                    break;
                opPrPr(pr8, pixrD, COPY);    /* for comparison after
                                                next iteration */
            }
        }
    }
}

/*
 *  corner():  extracts designated bounding box corners.
 *             N.B.  Uses pr7; creates a temporary pr if necessary.
 */
corner(pixrD, pixrS, topLeft, topRight, bottomLeft, bottomRight)
Pixrect      *pixrD, *pixrS;
int          topLeft, topRight, bottomLeft, bottomRight;
```

```
{
Pixrect     *prtemp;
static char procName[] = "corner";

if (!isPrDefined(pixrS, procName))
        return;
    if (!isPrDefined(pixrD, procName))
        return;

clearPr(pixrD);

if (!pr7)
    {
#if WARNING
        printf(" Warning in corner: Creating a temporary pixrect!\n");
#endif WARNING
        prtemp = mem_create(pixrS->pr_size.x, pixrS->pr_size.y, 1);
        if (topLeft)
        {
            erode(prtemp, pixrS, strel2tl);
            opPrPr(pixrD, prtemp, UNION);
        }
        if (topRight)
        {
            erode(prtemp, pixrS, strel2tr);
            opPrPr(pixrD, prtemp, UNION);
        }
        if (bottomLeft)
        {
            erode(prtemp, pixrS, strel2bl);
            opPrPr(pixrD, prtemp, UNION);
        }
        if (bottomRight)
        {
            erode(prtemp, pixrS, strel2br);
            opPrPr(pixrD, prtemp, UNION);
        }
        pr_close(prtemp);
    }
    else
    {
        if (topLeft)
        {
            erode(pr7, pixrS, strel2tl);
            opPrPr(pixrD, pr7, UNION);
        }
        if (topRight)
        {
            erode(pr7, pixrS, strel2tr);
            opPrPr(pixrD, pr7, UNION);
        }
        if (bottomLeft)
        {
            erode(pr7, pixrS, strel2bl);
            opPrPr(pixrD, pr7, UNION);
        }
        if (bottomRight)
        {
            erode(pr7, pixrS, strel2br);
            opPrPr(pixrD, pr7, UNION);
```

```c
        }
    }
}

/*
 * cornerA():  extracts designated bounding box corners.
 *      ,     This version requires specification of a pixrect for
 *                  internal computation.
 */
cornerA(pixrD, pixrS, pixrI, topLeft, topRight, bottomLeft, bottomRight)
Pixrect     *pixrD, *pixrS, *pixrI;
int         topLeft, topRight, bottomLeft, bottomRight;
{
static char    procName[] = "corner";

if (!isPrDefined(pixrS, procName))
        return;
    if (!isPrDefined(pixrD, procName))
        return;
    if (!isPrDefined(pixrI, procName))
        return;

clearPr(pixrD);

if (topLeft)
    {
        erode(pixrI, pixrS, strel2tl);
        opPrPr(pixrD, pixrI, UNION);
    }
    if (topRight)
    {
        erode(pixrI, pixrS, strel2tr);
        opPrPr(pixrD, pixrI, UNION);
    }
    if (bottomLeft)
    {
        erode(pixrI, pixrS, strel2bl);
        opPrPr(pixrD, pixrI, UNION);
    }
    if (bottomRight)
    {
        erode(pixrI, pixrS, strel2br);
        opPrPr(pixrD, pixrI, UNION);
    }
}

/*********************************************************************
 * Copyright (c) 1988, Xerox Corporation.  All rights reserved.      *
 * Copyright protection claimed includes all forms and matters       *
 * of copyrightable material and information now allowed by          *
 * statutory or judicial law or hereafter granted, including         *
 * without limitation, material generated from the software          *
 * programs which are displayed on the screen such as icons,         *
 * screen display looks, etc.                                        *
 *********************************************************************/

/*
 * strel1.c--includes subroutines
 *    .           strel1Inits()
 *                     --strel2h, strel2hR, strel2v, strel3h, strel3v,
```

```
 *                      --strel4h, strel4v, strel5h, strel5v,
 *                      --strel6h, strel6v, strel7h, strel7v,
 *                      --strel8h, strel8v, strel9h, strel9v,
 *                      --strel10h, strel10v, strel11h, strel11v;
 *                      --strel13h, strel13v, strel15h, strel15v;
 *                      --strel20h, strel20v, strel25h, strel25v;
 *                      --strel30h, strel30v, strel35h, strel35v;
 *                      --strel40h, strel40v, strel45h, strel45v;
 *                      --strel50h, strel50v;
 *                           ...some diagonal strels...
 *                      --strel3dp, strel3dn, strel4dp, strel4dn;
 *                      --strel5dp, strel5dn, strel6dp, strel6dn;
 *                      --strel7dp, strel7dn, strel9dp, strel9dn;
 *                      --strel11dp, strel11dn, strel13dp, strel13dn;
 *                      --strel15dp, strel15dn;
 *                      --strel5hdp, strel5hdn, strel5vdp, strel5vdn;
 *                      --strel9hdp, strel9hdn, strel9vdp, strel9vdn;
 *                      --strel13hdp, strel13hdn, strel13vdp, strel13vdn;
 *                           ...use for solid block matches...
 *                      --strel1, strel2, strel3, strel4, strel5;
 *                      --strel2dp, strel2dm;
 *                      --strel2tl, strel2tr, strel2bl, strel2br;
 *                      --strel3ve, strel4ve, strel2vd;
 *                      --strel3ht1, strel3ht2;
 *                      --strel3h1, strel3h2, strel3v1, strel3v2;
 *                      --strel4h1, strel4h2, strel4v1, strel4v2;
 *                      --strel5h1, strel5h2, strel5v1, strel5v2;
 *              matrix()
 */ include <stdio.h>
include <llama.h>
#include "morph.h"
#include "strelGlobals.h"

strel1Inits()
{
int             i, j;
short int       **matrix();

/* horizontal strel of length 2: (1c 1) */
    strel2h = (STREL *) calloc (1, sizeof (STREL));
    strel2h->nx = 2;
    strel2h->ny = 1;
    strel2h->cx = strel2h->cy = 0;
    strel2h->data = matrix(strel2h->nx, strel2h->ny);
    strel2h->data[0][0] = 1;
    strel2h->data[0][1] = 1;

/* horizontal strel of length 2: (1 1c) */
    strel2hR = (STREL *) calloc (1, sizeof (STREL));
    strel2hR->nx = 2;
    strel2hR->ny = 1;
    strel2hR->cx = 1;
    strel2hR->cy = 0;
    strel2hR->data = matrix(strel2hR->nx, strel2hR->ny);
    strel2hR->data[0][0] = 1;
    strel2hR->data[0][1] = 1;

/* vertical strel of length 2: v(1c 1) */
    strel2v = (STREL *) calloc (1, sizeof (STREL));
    strel2v->nx = 1;
```

```
strel2v->ny = 2;
strel2v->cx = strel2v->cy = 0;
strel2v->data = matrix(strel2v->nx, strel2v->ny);
strel2v->data[0][0] = 1;
strel2v->data[1][0] = 1;

/* vertical strel of length 2: v(1 lc) */
strel2vB = (STREL *) calloc (1, sizeof (STREL));
strel2vB->nx = 1;
strel2vB->ny = 2;
strel2vB->cx = 0;
strel2vB->cy = 1;
strel2vB->data = matrix(strel2vB->nx, strel2vB->ny);
strel2vB->data[0][0] = 1;
strel2vB->data[1][0] = 1;

/* horizontal strel of length 3: (1 lc 1) */
strel3h = (STREL *) calloc (1, sizeof (STREL));
strel3h->nx = 3;
strel3h->ny = 1;
strel3h->cx = 1;   /* center pixel */
strel3h->cy = 0;
strel3h->data = matrix(strel3h->nx, strel3h->ny);
for (i = 0; i < 3; i++)
    strel3h->data[0][i] = 1;

/* vertical strel of length 3: v(1 lc 1) */
strel3v = (STREL *) calloc (1, sizeof (STREL));
strel3v->nx = 1;
strel3v->ny = 3;
strel3v->cx = 0;
strel3v->cy = 1;
strel3v->data = matrix(strel3v->nx, strel3v->ny);
for (i = 0; i < 3; i++)
    strel3v->data[i][0] = 1;

/* horizontal strel of length 4: (1 lc 1 1) */
strel4h = (STREL *) calloc (1, sizeof (STREL));
strel4h->nx = 4;
strel4h->ny = 1;
strel4h->cx = 1;   /* near center pixel */
strel4h->cy = 0;
strel4h->data = matrix(strel4h->nx, strel4h->ny);
for (i = 0; i < 4; i++)
    strel4h->data[0][i] = 1;

/* vertical strel of length 4: v(1 lc 1 1) */
strel4v = (STREL *) calloc (1, sizeof (STREL));
strel4v->nx = 1;
strel4v->ny = 4;
strel4v->cx = 0;
strel4v->cy = 1;
strel4v->data = matrix(strel4v->nx, strel4v->ny);
for (i = 0; i < 4; i++)
    strel4v->data[i][0] = 1;

/* horizontal strel of length 5: (1 1 lc 1 1) */
strel5h = (STREL *) calloc (1, sizeof (STREL));
strel5h->nx = 5;
strel5h->ny = 1;
strel5h->cx = 2;   /* center pixel */
strel5h->cy = 0;
```

```
strel5h->data = matrix(strel5h->nx, strel5h->ny);
for (i = 0; i < 5; i++)
    strel5h->data[0][i] = 1;

/* vertical strel of length 5: v(1 1 lc 1 1) */
strel5v = (STREL *) calloc (1, sizeof (STREL));
strel5v->nx = 1;
strel5v->ny = 5;
strel5v->cx = 0;
strel5v->cy = 2;
strel5v->data = matrix(strel5v->nx, strel5v->ny);
for (i = 0; i < 5; i++)
    strel5v->data[i][0] = 1;

/* horizontal strel of length 6: (1 1 lc 1 1 1) */
strel6h = (STREL *) calloc (1, sizeof (STREL));
strel6h->nx = 6;
strel6h->ny = 1;
strel6h->cx = 2;  /* near center pixel */
strel6h->cy = 0;
strel6h->data = matrix(strel6h->nx, strel6h->ny);
for (i = 0; i < 6; i++)
    strel6h->data[0][i] = 1;

/* vertical strel of length 6: v(1 1 lc 1 1 1) */
strel6v = (STREL *) calloc (1, sizeof (STREL));
strel6v->nx = 1;
strel6v->ny = 6;
strel6v->cx = 0;
strel6v->cy = 2;
strel6v->data = matrix(strel6v->nx, strel6v->ny);
for (i = 0; i < 6; i++)
    strel6v->data[i][0] = 1;

/* horizontal strel of length 7: (1 1 1 lc 1 1 1) */
strel7h = (STREL *) calloc (1, sizeof (STREL));
strel7h->nx = 7;
strel7h->ny = 1;
strel7h->cx = 3;  /* center pixel */
strel7h->cy = 0;
strel7h->data = matrix(strel7h->nx, strel7h->ny);
for (i = 0; i < 7; i++)
    strel7h->data[0][i] = 1;

/* vertical strel of length 7: v(1 1 1 lc 1 1 1) */
strel7v = (STREL *) calloc (1, sizeof (STREL));
strel7v->nx = 1;
strel7v->ny = 7;
strel7v->cx = 0;
strel7v->cy = 3;
strel7v->data = matrix(strel7v->nx, strel7v->ny);
for (i = 0; i < 7; i++)
    strel7v->data[i][0] = 1;

/* horizontal strel of length 8: (1 1 1 lc 1 1 1 1) */
strel8h = (STREL *) calloc (1, sizeof (STREL));
strel8h->nx = 8;
strel8h->ny = 1;
strel8h->cx = 3;  /* near center pixel */
strel8h->cy = 0;
strel8h->data = matrix(strel8h->nx, strel8h->ny);
```

```
for (i = 0; i < 8; i++)
    strel8h->data[0][i] = 1;

/* vertical strel of length 8: v(1 1 1 1c 1 1 1 1) */
strel8v = (STREL *) calloc (1, sizeof (STREL));
strel8v->nx = 1;
strel8v->ny = 8;
strel8v->cx = 0;
strel8v->cy = 3;
strel8v->data = matrix(strel8v->nx, strel8v->ny);
for (i = 0; i < 8; i++)
    strel8v->data[i][0] = 1;

/* horizontal strel of length 9: (1 1 1 1 1c 1 1 1 1) */
strel9h = (STREL *) calloc (1, sizeof (STREL));
strel9h->nx = 9;
strel9h->ny = 1;
strel9h->cx = 4;   /* center pixel */
strel9h->cy = 0;
strel9h->data = matrix(strel9h->nx, strel9h->ny);
for (i = 0; i < 9; i++)
    strel9h->data[0][i] = 1;

/* vertical strel of length 9: v(1 1 1 1 1c 1 1 1 1) */
strel9v = (STREL *) calloc (1, sizeof (STREL));
strel9v->nx = 1;
strel9v->ny = 9;
strel9v->cx = 0;
strel9v->cy = 4;
strel9v->data = matrix(strel9v->nx, strel9v->ny);
for (i = 0; i < 9; i++)
    strel9v->data[i][0] = 1;

/* horizontal strel of length 10: ((4:1) 1c (5:1)) */
strel10h = (STREL *) calloc (1, sizeof (STREL));
strel10h->nx = 10;
strel10h->ny = 1;
strel10h->cx = 4;   /* near center pixel */
strel10h->cy = 0;
strel10h->data = matrix(strel10h->nx, strel10h->ny);
for (i = 0; i < 10; i++)
    strel10h->data[0][i] = 1;

/* vertical strel of length 10: v((4:1) 1c (5:1)) */
strel10v = (STREL *) calloc (1, sizeof (STREL));
strel10v->nx = 1;
strel10v->ny = 10;
strel10v->cx = 0;
strel10v->cy = 4;   /* near center pixel */
strel10v->data = matrix(strel10v->nx, strel10v->ny);
for (i = 0; i < 10; i++)
    strel10v->data[i][0] = 1;

/* horizontal strel of length 11: h((5:1) 1c (5:1)) */
strel11h = (STREL *) calloc (1, sizeof (STREL));
strel11h->nx = 11;
strel11h->ny = 1;
strel11h->cx = 5;   /* center pixel */
strel11h->cy = 0;
strel11h->data = matrix(strel11h->nx, strel11h->ny);
for (i = 0; i < 11; i++)
    strel11h->data[0][i] = 1;
```

```c
    /* vertical strel of length 11: v((5:1) lc (5:1)) */
strel11v = (STREL *) calloc (1, sizeof (STREL));
strel11v->nx = 1;
strel11v->ny = 11;
strel11v->cx = 0;
strel11v->cy = 5;
strel11v->data = matrix(strel11v->nx, strel11v->ny);
for (i = 0; i < 11; i++)
    strel11v->data[i][0] = 1;

/* horizontal strel of length 13: h((6:1) lc (6:1)) */
strel13h = (STREL *) calloc (1, sizeof (STREL));
strel13h->nx = 13;
strel13h->ny = 1;
strel13h->cx = 6;   /* center pixel */
strel13h->cy = 0;
strel13h->data = matrix(strel13h->nx, strel13h->ny);
for (i = 0; i < 13; i++)
    strel13h->data[0][i] = 1;

/* vertical strel of length 13: v((6:1) lc (6:1)) */
strel13v = (STREL *) calloc (1, sizeof (STREL));
strel13v->nx = 1;
strel13v->ny = 13;
strel13v->cx = 0;
strel13v->cy = 6;
strel13v->data = matrix(strel13v->nx, strel13v->ny);
for (i = 0; i < 13; i++)
    strel13v->data[i][0] = 1;

/* horizontal strel of length 15: ((7:1) lc (7:1)) */
strel15h = (STREL *) calloc (1, sizeof (STREL));
strel15h->nx = 15;
strel15h->ny = 1;
strel15h->cx = 7;   /* center on pixel */
strel15h->cy = 0;
strel15h->data = matrix(strel15h->nx, strel15h->ny);
for (i = 0; i < 15; i++)
    strel15h->data[0][i] = 1;

/* vertical strel of length 15: v((7:1) lc (7:1)) */
strel15v = (STREL *) calloc (1, sizeof (STREL));
strel15v->nx = 1;
strel15v->ny = 15;
strel15v->cx = 0;
strel15v->cy = 7;   /* center on center pixel */
strel15v->data = matrix(strel15v->nx, strel15v->ny);
for (i = 0; i < 15; i++)
    strel15v->data[i][0] = 1;

/* horizontal strel of length 20: ((9:1) lc (10:1)) */
strel20h = (STREL *) calloc (1, sizeof (STREL));
strel20h->nx = 20;
strel20h->ny = 1;
strel20h->cx = 9;   /* near center pixel */
strel20h->cy = 0;
strel20h->data = matrix(strel20h->nx, strel20h->ny);
for (i = 0; i < 20; i++)
    strel20h->data[0][i] = 1;

/* vertical strel of length 20: v((9:1) lc (10:1)) */
```

```
strel20v = (STREL *) calloc (1, sizeof (STREL));
strel20v->nx = 1;
strel20v->ny = 20;
strel20v->cx = 0;
strel20v->cy = 9;   /* near center pixel */
strel20v->data = matrix(strel20v->nx, strel20v->ny);
for (i = 0; i < 20; i++)
    strel20v->data[i][0] = 1;

/* horizontal strel of length 25: ((12:1) lc (12:1)) */
strel25h = (STREL *) calloc (1, sizeof (STREL));
strel25h->nx = 25;
strel25h->ny = 1;
strel25h->cx = 12;  /* center pixel */
strel25h->cy = 0;
strel25h->data = matrix(strel25h->nx, strel25h->ny);
for (i = 0; i < 25; i++)
    strel25h->data[0][i] = 1;

/* vertical strel of length 25: v((12:1) lc (12:1)) */
strel25v = (STREL *) calloc (1, sizeof (STREL));
strel25v->nx = 1;
strel25v->ny = 25;
strel25v->cx = 0;
strel25v->cy = 12;  /* on center pixel */
strel25v->data = matrix(strel25v->nx, strel25v->ny);
for (i = 0; i < 25; i++)
    strel25v->data[i][0] = 1;

/* horizontal strel of length 30: ((14:1) lc (15:1)) */
strel30h = (STREL *) calloc (1, sizeof (STREL));
strel30h->nx = 30;
strel30h->ny = 1;
strel30h->cx = 14;  /* center pixel */
strel30h->cy = 0;
strel30h->data = matrix(strel30h->nx, strel30h->ny);
for (i = 0; i < 30; i++)
    strel30h->data[0][i] = 1;

/* vertical strel of length 30: v((14:1) lc (15:1)) */
strel30v = (STREL *) calloc (1, sizeof (STREL));
strel30v->nx = 1;
strel30v->ny = 30;
strel30v->cx = 0;
strel30v->cy = 14;  /* on center pixel */
strel30v->data = matrix(strel30v->nx, strel30v->ny);
for (i = 0; i < 30; i++)
    strel30v->data[i][0] = 1;

/* horizontal strel of length 35: ((17:1) lc (17:1)) */
strel35h = (STREL *) calloc (1, sizeof (STREL));
strel35h->nx = 35;
strel35h->ny = 1;
strel35h->cx = 17;  /* center pixel */
strel35h->cy = 0;
strel35h->data = matrix(strel35h->nx, strel35h->ny);
for (i = 0; i < 35; i++)
    strel35h->data[0][i] = 1;

/* vertical strel of length 35: v((17:1) lc (17:1)) */
strel35v = (STREL *) calloc (1, sizeof (STREL));
strel35v->nx = 1;
```

```
strel35v->ny = 35;
strel35v->cx = 0;
strel35v->cy = 17;   /* on center pixel */
strel35v->data = matrix(strel35v->nx, strel35v->ny);
for (i = 0; i < 35; i++)
    strel35v->data[i][0] = 1;

/* horizontal strel of length 40: ((19:1) lc (20:1)) */
strel40h = (STREL *) calloc (1, sizeof (STREL));
strel40h->nx = 40;
strel40h->ny = 1;
strel40h->cx = 19;   /* center pixel */
strel40h->cy = 0;
strel40h->data = matrix(strel40h->nx, strel40h->ny);
for (i = 0; i < 40; i++)
    strel40h->data[0][i] = 1;

/* vertical strel of length 40: v((19:1) lc (20:1)) */
strel40v = (STREL *) calloc (1, sizeof (STREL));
strel40v->nx = 1;
strel40v->ny = 40;
strel40v->cx = 0;
strel40v->cy = 19;   /* on center pixel */
strel40v->data = matrix(strel40v->nx, strel40v->ny);
for (i = 0; i < 40; i++)
    strel40v->data[i][0] = 1;

/* horizontal strel of length 45: ((22:1) lc (22:1)) */
strel45h = (STREL *) calloc (1, sizeof (STREL));
strel45h->nx = 45;
strel45h->ny = 1;
strel45h->cx = 22;   /* center pixel */
strel45h->cy = 0;
strel45h->data = matrix(strel45h->nx, strel45h->ny);
for (i = 0; i < 45; i++)
    strel45h->data[0][i] = 1;

/* vertical strel of length 45: v((22:1) lc (22:1)) */
strel45v = (STREL *) calloc (1, sizeof (STREL));
strel45v->nx = 1;
strel45v->ny = 45;
strel45v->cx = 0;
strel45v->cy = 22;   /* on center pixel */
strel45v->data = matrix(strel45v->nx, strel45v->ny);
for (i = 0; i < 45; i++)
    strel45v->data[i][0] = 1;

/* horizontal strel of length 50: ((24:1) lc (25:1)) */
strel50h = (STREL *) calloc (1, sizeof (STREL));
strel50h->nx = 50;
strel50h->ny = 1;
strel50h->cx = 24;   /* center pixel */
strel50h->cy = 0;
strel50h->data = matrix(strel50h->nx, strel50h->ny);
for (i = 0; i < 50; i++)
    strel50h->data[0][i] = 1;

/* vertical strel of length 50: v((24:1) lc (25:1)) */
strel50v = (STREL *) calloc (1, sizeof (STREL));
strel50v->nx = 1;
strel50v->ny = 50;
strel50v->cx = 0;
```

```
strel50v->cy = 24;   /* on center pixel */
strel50v->data = matrix(strel50v->nx, strel50v->ny);
for (i = 0; i < 50; i++)
    strel50v->data[i][0] = 1;

/* diagonal strel, length 3, positive slope. */
strel3dp = (STREL *) calloc (1, sizeof (STREL));
strel3dp->nx = strel3dp->ny = 3;
strel3dp->cx = strel3dp->cy = 1;
strel3dp->data = matrix(strel3dp->nx, strel3dp->ny);
for (i = 0; i < 3; i++)
{
    j = 2 - i;
    strel3dp->data[i][j] = 1;
}

/* diagonal strel, length 3, negative slope. */
strel3dn = (STREL *) calloc (1, sizeof (STREL));
strel3dn->nx = strel3dn->ny = 3;
strel3dn->cx = strel3dn->cy = 1;
strel3dn->data = matrix(strel3dn->nx, strel3dn->ny);
for (i = 0; i < 3; i++)
    strel3dn->data[i][i] = 1;

/* diagonal strel, length 4, positive slope. */
strel4dp = (STREL *) calloc (1, sizeof (STREL));
strel4dp->nx = strel4dp->ny = 4;
strel4dp->cx = strel4dp->cy = 1;
strel4dp->data = matrix(strel4dp->nx, strel4dp->ny);
for (i = 0; i < 4; i++)
{
    j = 3 - i;
    strel4dp->data[i][j] = 1;
}

/* diagonal strel, length 4, negative slope. */
strel4dn = (STREL *) calloc (1, sizeof (STREL));
strel4dn->nx = strel4dn->ny = 4;
strel4dn->cx = strel4dn->cy = 1;
strel4dn->data = matrix(strel4dn->nx, strel4dn->ny);
for (i = 0; i < 4; i++)
    strel4dn->data[i][j] = 1;

/* diagonal strel, length 5, positive slope. */
strel5dp = (STREL *) calloc (1, sizeof (STREL));
strel5dp->nx = strel5dp->ny = 5;
strel5dp->cx = strel5dp->cy = 2;
strel5dp->data = matrix(strel5dp->nx, strel5dp->ny);
for (i = 0; i < 5; i++)
{
    j = 4 - i;
    strel5dp->data[i][j] = 1;
}

/* diagonal strel, length 5, negative slope. */
strel5dn = (STREL *) calloc (1, sizeof (STREL));
strel5dn->nx = strel5dn->ny = 5;
strel5dn->cx = strel5dn->cy = 2;
strel5dn->data = matrix(strel5dn->nx, strel5dn->ny);
for (i = 0; i < 5; i++)
    strel5dn->data[i][i] = 1;
```

```c
    /* diagonal strel, length 6, positive slope. */
strel6dp = (STREL *) calloc (1, sizeof (STREL));
strel6dp->nx = strel6dp->ny = 6;
strel6dp->cx = strel6dp->cy = 2;
strel6dp->data = matrix(strel6dp->nx, strel6dp->ny);
for (i = 0; i < 6; i++)
{
    j = 5 - i;
    strel6dp->data[i][j] = 1;
}

/* diagonal strel, length 6, negative slope. */
strel6dn = (STREL *) calloc (1, sizeof (STREL));
strel6dn->nx = strel6dn->ny = 6;
strel6dn->cx = strel6dn->cy = 2;
strel6dn->data = matrix(strel6dn->nx, strel6dn->ny);
for (i = 0; i < 6; i++)
    strel6dn->data[i][j] = 1;

/* diagonal strel, length 7, positive slope. */
strel7dp = (STREL *) calloc (1, sizeof (STREL));
strel7dp->nx = strel7dp->ny = 7;
strel7dp->cx = strel7dp->cy = 3;
strel7dp->data = matrix(strel7dp->nx, strel7dp->ny);
for (i = 0; i < 7; i++)
{
    j = 6 - i;
    strel7dp->data[i][j] = 1;
}

/* diagonal strel, length 7, negative slope. */
strel7dn = (STREL *) calloc (1, sizeof (STREL));
strel7dn->nx = strel7dn->ny = 7;
strel7dn->cx = strel7dn->cy = 3;
strel7dn->data = matrix(strel7dn->nx, strel7dn->ny);
for (i = 0; i < 7; i++)
    strel7dn->data[i][i] = 1;

/* diagonal strel, length 9, positive slope. */
strel9dp = (STREL *) calloc (1, sizeof (STREL));
strel9dp->nx = strel9dp->ny = 9;
strel9dp->cx = strel9dp->cy = 4;
strel9dp->data = matrix(strel9dp->nx, strel9dp->ny);
for (i = 0; i < 9; i++)
{
    j = 8 - i;
    strel9dp->data[i][j] = 1;
}

/* diagonal strel, length 9, negative slope. */
strel9dn = (STREL *) calloc (1, sizeof (STREL));
strel9dn->nx = strel9dn->ny = 9;
strel9dn->cx = strel9dn->cy = 4;
strel9dn->data = matrix(strel9dn->nx, strel9dn->ny);
for (i = 0; i < 9; i++)
    strel9dn->data[i][i] = 1;

/* diagonal strel, length 11, positive slope. */
strel11dp = (STREL *) calloc (1, sizeof (STREL));
strel11dp->nx = strel11dp->ny = 11;
strel11dp->cx = strel11dp->cy = 5;
```

```
strel11dp->data = matrix(strel11dp->nx, strel11dp->ny);
for (i = 0; i < 11; i++)
{
    j = 10 - i;
    strel11dp->data[i][j] = 1;
}

/* diagonal strel, length 11, negative slope. */
strel11dn = (STREL *) calloc (1, sizeof (STREL));
strel11dn->nx = strel11dn->ny = 11;
strel11dn->cx = strel11dn->cy = 5;
strel11dn->data = matrix(strel11dn->nx, strel11dn->ny);
for (i = 0; i < 11; i++)
    strel11dn->data[i][i] = 1;

/* diagonal strel, length 13, positive slope. */
strel13dp = (STREL *) calloc (1, sizeof (STREL));
strel13dp->nx = strel13dp->ny = 13;
strel13dp->cx = strel13dp->cy = 6;
strel13dp->data = matrix(strel13dp->nx, strel13dp->ny);
for (i = 0; i < 13; i++)
{
    j = 12 - i;
    strel13dp->data[i][j] = 1;
}

/* diagonal strel, length 13, negative slope. */
strel13dn = (STREL *) calloc (1, sizeof (STREL));
strel13dn->nx = strel13dn->ny = 13;
strel13dn->cx = strel13dn->cy = 6;
strel13dn->data = matrix(strel13dn->nx, strel13dn->ny);
for (i = 0; i < 13; i++)
    strel13dn->data[i][i] = 1;

/* diagonal strel, length 15, positive slope. */
strel15dp = (STREL *) calloc (1, sizeof (STREL));
strel15dp->nx = strel15dp->ny = 15;
strel15dp->cx = strel15dp->cy = 7;
strel15dp->data = matrix(strel15dp->nx, strel15dp->ny);
for (i = 0; i < 15; i++)
{
    j = 14 - i;
    strel15dp->data[i][j] = 1;
}

/* diagonal strel, length 15, negative slope. */
strel15dn = (STREL *) calloc (1, sizeof (STREL));
strel15dn->nx = strel15dn->ny = 15;
strel15dn->cx = strel15dn->cy = 7;
strel15dn->data = matrix(strel15dn->nx, strel15dn->ny);
for (i = 0; i < 15; i++)
    strel15dn->data[i][i] = 1;

/* +27 degree diagonal strel, max. dimension 5 */
strel5hdp = (STREL *) calloc (1, sizeof (STREL));
strel5hdp->nx = 5;
strel5hdp->ny = 3;
strel5hdp->cx = 2;
strel5hdp->cy = 1;
strel5hdp->data = matrix(strel5hdp->nx, strel5hdp->ny);
for (j = 0; j < 5; j++)
{
```

```
        i = 2 - j/2;
        strel5hdp->data[i][j] = 1;
}

/* -27 degree diagonal strel, max. dimension 5 */
strel5hdn = (STREL *) calloc (1, sizeof (STREL));
strel5hdn->nx = 5;
strel5hdn->ny = 3;
strel5hdn->cx = 2;
strel5hdn->cy = 1;
strel5hdn->data = matrix(strel5hdn->nx, strel5hdn->ny);
for (j = 0; j < 5; j++)
{
    i = j/2;
    strel5hdn->data[i][j] = 1;
}

/* +63 degree diagonal strel, max. dimension 5 */
strel5vdp = (STREL *) calloc (1, sizeof (STREL));
strel5vdp->nx = 3;
strel5vdp->ny = 5;
strel5vdp->cx = 1;
strel5vdp->cy = 2;
strel5vdp->data = matrix(strel5vdp->nx, strel5vdp->ny);
for (i = 0; i < 5; i++)
{
    j = 2 - (i+1)/2;
    strel5vdp->data[i][j] = 1;
}

/* -63 degree diagonal strel, max. dimension 5 */
strel5vdn = (STREL *) calloc (1, sizeof (STREL));
strel5vdn->nx = 3;
strel5vdn->ny = 5;
strel5vdn->cx = 1;
strel5vdn->cy = 2;
strel5vdn->data = matrix(strel5vdn->nx, strel5vdn->ny);
for (i = 0; i < 5; i++)
{
    j = (i+1)/2;
    strel5vdn->data[i][j] = 1;
}

/* +27 degree diagonal strel, max. dimension 9 */
strel9hdp = (STREL *) calloc (1, sizeof (STREL));
strel9hdp->nx = 9;
strel9hdp->ny = 5;
strel9hdp->cx = 4;
strel9hdp->cy = 2;
strel9hdp->data = matrix(strel9hdp->nx, strel9hdp->ny);
for (j = 0; j < 9; j++)
{
    i = 4 - j/2;
    strel9hdp->data[i][j] = 1;
}

/* -27 degree diagonal strel, max. dimension 9 */
strel9hdn = (STREL *) calloc (1, sizeof (STREL));
strel9hdn->nx = 9;
strel9hdn->ny = 5;
strel9hdn->cx = 4;
```

```
strel9hdn->cy = 2;
strel9hdn->data = matrix(strel9hdn->nx, strel9hdn->ny);
for (j = 0; j < 9; j++)
{
    i = j/2;
    strel9hdn->data[i][j] = 1;
}

/* +63 degree diagonal strel, max. dimension 9 */
strel9vdp = (STREL *) calloc (1, sizeof (STREL));
strel9vdp->nx = 5;
strel9vdp->ny = 9;
strel9vdp->cx = 2;
strel9vdp->cy = 4;
strel9vdp->data = matrix(strel9vdp->nx, strel9vdp->ny);
for (i = 0; i < 9; i++)
{
    j = 4 - (i+1)/2;
    strel9vdp->data[i][j] = 1;
}

/* -63 degree diagonal strel, max. dimension 9 */
strel9vdn = (STREL *) calloc (1, sizeof (STREL));
strel9vdn->nx = 5;
strel9vdn->ny = 9;
strel9vdn->cx = 2;
strel9vdn->cy = 4;
strel9vdn->data = matrix(strel9vdn->nx, strel9vdn->ny);
for (i = 0; i < 9; i++)
{
    j = (i+1)/2;
    strel9vdn->data[i][j] = 1;
}

/* +27 degree diagonal strel, max. dimension 13 */
strel13hdp = (STREL *) calloc (1, sizeof (STREL));
strel13hdp->nx = 13;
strel13hdp->ny = 7;
strel13hdp->cx = 6;
strel13hdp->cy = 3;
strel13hdp->data = matrix(strel13hdp->nx, strel13hdp->ny);
for (j = 0; j < 13; j++)
{
    i = 6 - j/2;
    strel13hdp->data[i][j] = 1;
}

/* -27 degree diagonal strel, max. dimension 13 */
strel13hdn = (STREL *) calloc (1, sizeof (STREL));
strel13hdn->nx = 13;
strel13hdn->ny = 7;
strel13hdn->cx = 6;
strel13hdn->cy = 3;
strel13hdn->data = matrix(strel13hdn->nx, strel13hdn->ny);
for (j = 0; j < 13; j++)
{
    i = j/2;
    strel13hdn->data[i][j] = 1;
}

/* +63 degree diagonal strel, max. dimension 13 */
strel13vdp = (STREL *) calloc (1, sizeof (STREL));
```

```
strel13vdp->nx = 7;
strel13vdp->ny = 13;
strel13vdp->cx = 3;
strel13vdp->cy = 6;
strel13vdp->data = matrix(strel13vdp->nx, strel13vdp->ny);
for (i = 0; i < 13; i++)
{
    j = 6 - (i+1)/2;
    strel13vdp->data[i][j] = 1;
}

/* -63 degree diagonal strel, max. dimension 13 */
strel13vdn = (STREL *) calloc (1, sizeof (STREL));
strel13vdn->nx = 7;
strel13vdn->ny = 13;
strel13vdn->cx = 3;
strel13vdn->cy = 6;
strel13vdn->data = matrix(strel13vdn->nx, strel13vdn->ny);
for (i = 0; i < 13; i++)
{
    j = (i+1)/2;
    strel13vdn->data[i][j] = 1;
}

/* pattern:  1c  */
strel1 = (STREL *) calloc (1, sizeof (STREL));
strel1->nx = strel1->ny = 1;
strel1->cx = strel1->cy = 0;
strel1->data = matrix(strel1->nx, strel1->ny);
strel1->data[0][0] = 1;

/* pattern:  1c  1
                 1   1     */
strel2 = (STREL *) calloc (1, sizeof (STREL));
strel2->nx = strel2->ny = 2;
strel2->cx = strel2->cy = 0;
strel2->data = matrix(strel2->nx, strel2->ny);
strel2->data[0][0] = 1;
strel2->data[0][1] = 1;
strel2->data[1][0] = 1;
strel2->data[1][1] = 1;

/* pattern:  1   1   1
                 1   1c  1
                 1   1   1   */
strel3 = (STREL *) calloc (1, sizeof (STREL));
strel3->nx = strel3->ny = 3;
strel3->cx = strel3->cy = 1;
strel3->data = matrix(strel3->nx, strel3->ny);
for (j = 0; j < 3; j++)
    for (i = 0; i < 3; i++)
        strel3->data[j][i] = 1;

/* pattern:  1   1   1   1
                 1   1c  1   1
                 1   1   1   1
                 1   1   1   1   */
strel4 = (STREL *) calloc (1, sizeof (STREL));
strel4->nx = strel4->ny = 4;
strel4->cx = strel4->cy = 1;
strel4->data = matrix(strel4->nx, strel4->ny);
```

```
for (j = 0; j < 4; j++)
    for (i = 0; i < 4; i++)
        strel4->data[j][i] = 1;

/* pattern:  1  1  1  1  1
                 1  1  1  1  1
                 1  1  1c 1  1
                 1  1  1  1  1
                 1  1  1  1  1    */
strel5 = (STREL *) calloc (1, sizeof (STREL));
strel5->nx = strel5->ny = 5;
strel5->cx = strel5->cy = 2;
strel5->data = matrix(strel5->nx, strel5->ny);
for (j = 0; j < 5; j++)
    for (i = 0; i < 5; i++)
        strel5->data[j][i] = 1;

/* pattern:  0c 1
                 1  0    */
strel2dp = (STREL *) calloc (1, sizeof (STREL));
strel2dp->nx = strel2dp->ny = 2;
strel2dp->cx = strel2dp->cy = 0;
strel2dp->data = matrix(strel2dp->nx, strel2dp->ny);
strel2dp->data[0][1] = 1;
strel2dp->data[1][0] = 1;

/* pattern:  1c 0
                 0  1    */
strel2dm = (STREL *) calloc (1, sizeof (STREL));
strel2dm->nx = strel2dm->ny = 2;
strel2dm->cx = strel2dm->cy = 0;
strel2dm->data = matrix(strel2dm->nx, strel2dm->ny);
strel2dm->data[0][0] = 1;
strel2dm->data[1][1] = 1;

/* pattern:  0c 1
                 1  1    */
strel2ule = (STREL *) calloc (1, sizeof (STREL));
strel2ule->nx = strel2ule->ny = 2;
strel2ule->cx = strel2ule->cy = 0;
strel2ule->data = matrix(strel2ule->nx, strel2ule->ny);
strel2ule->data[0][1] = 1;
strel2ule->data[1][0] = 1;
strel2ule->data[1][1] = 1;

/* pattern:  1c 0
                 0  0    */
strel2uld = (STREL *) calloc (1, sizeof (STREL));
strel2uld->nx = strel2uld->ny = 2;
strel2uld->cx = strel2uld->cy = 0;
strel2uld->data = matrix(strel2uld->nx, strel2uld->ny);
strel2uld->data[0][0] = 1;

/* pattern:  1c 0
                 1  1    */
strel2ure = (STREL *) calloc (1, sizeof (STREL));
strel2ure->nx = strel2ure->ny = 2;
strel2ure->cx = strel2ure->cy = 0;
strel2ure->data = matrix(strel2ure->nx, strel2ure->ny);
strel2ure->data[0][0] = 1;
strel2ure->data[1][0] = 1;
strel2ure->data[1][1] = 1;
```

```
    /* pattern:  0c  1
                 0   0     */
strel2urd = (STREL *) calloc (1, sizeof (STREL));
strel2urd->nx = strel2urd->ny = 2;
strel2urd->cx = strel2urd->cy = 0;
strel2urd->data = matrix(strel2urd->nx, strel2urd->ny);
strel2urd->data[0][1] = 1;

/* pattern:  1c  1
                 0   1     */
strel2lle = (STREL *) calloc (1, sizeof (STREL));
strel2lle->nx = strel2lle->ny = 2;
strel2lle->cx = strel2lle->cy = 0;
strel2lle->data = matrix(strel2lle->nx, strel2lle->ny);
strel2lle->data[0][0] = 1;
strel2lle->data[0][1] = 1;
strel2lle->data[1][1] = 1;

/* pattern:  0c  0
                 1   0     */
strel2lld = (STREL *) calloc (1, sizeof (STREL));
strel2lld->nx = strel2lld->ny = 2;
strel2lld->cx = strel2lld->cy = 0;
strel2lld->data = matrix(strel2lld->nx, strel2lld->ny);
strel2lld->data[1][0] = 1;

/* pattern:  1c  1
                 1   0     */
strel2lre = (STREL *) calloc (1, sizeof (STREL));
strel2lre->nx = strel2lre->ny = 2;
strel2lre->cx = strel2lre->cy = 0;
strel2lre->data = matrix(strel2lre->nx, strel2lre->ny);
strel2lre->data[0][0] = 1;
strel2lre->data[0][1] = 1;
strel2lre->data[1][0] = 1;

/* pattern:  0c  0
                 0   1     */
strel2lrd = (STREL *) calloc (1, sizeof (STREL));
strel2lrd->nx = strel2lrd->ny = 2;
strel2lrd->cx = strel2lrd->cy = 0;
strel2lrd->data = matrix(strel2lrd->nx, strel2lrd->ny);
strel2lrd->data[1][1] = 1;

/* pattern match for top left b.b. corner:  2  2
     *                                          2  1c  */
strel2tl = (STREL *) calloc (1, sizeof (STREL));
strel2tl->nx = 2;
strel2tl->ny = 2;
strel2tl->cx = 1;
strel2tl->cy = 1;
strel2tl->data = matrix(strel2tl->nx, strel2tl->ny);
strel2tl->data[0][0] = 2;
strel2tl->data[0][1] = 2;
strel2tl->data[1][0] = 2;
strel2tl->data[1][1] = 1;

/* pattern match for top right b.b. corner:  2  2
     *                                           1c 2  */
strel2tr = (STREL *) calloc (1, sizeof (STREL));
strel2tr->nx = 2;
strel2tr->ny = 2;
```

```
strel2tr->cx = 0;
strel2tr->cy = 1;
strel2tr->data = matrix(strel2tr->nx, strel2tr->ny);
strel2tr->data[0][0] = 2;
strel2tr->data[0][1] = 2;
strel2tr->data[1][0] = 1;
strel2tr->data[1][1] = 2;

/* pattern match for bottom left b.b. corner:   2 1c
    *                                              2 2    */
strel2bl = (STREL *) calloc (1, sizeof (STREL));
strel2bl->nx = 2;
strel2bl->ny = 2;
strel2bl->cx = 1;
strel2bl->cy = 0;
strel2bl->data = matrix(strel2bl->nx, strel2bl->ny);
strel2bl->data[0][0] = 2;
strel2bl->data[0][1] = 1;
strel2bl->data[1][0] = 2;
strel2bl->data[1][1] = 2;

/* pattern match for bottom right b.b. corner:  1c 2
    *                                              2  2    */
strel2br = (STREL *) calloc (1, sizeof (STREL));
strel2br->nx = 2;
strel2br->ny = 2;
strel2br->cx = 0;
strel2br->cy = 0;
strel2br->data = matrix(strel2br->nx, strel2br->ny);
strel2br->data[0][0] = 1;
strel2br->data[0][1] = 2;
strel2br->data[1][0] = 2;
strel2br->data[1][1] = 2;

/* pattern match for vertical runs of length 1.  v: 2 1c 2   */
strel3ve = (STREL *) calloc (1, sizeof (STREL));
strel3ve->nx = 1;
strel3ve->ny = 3;
strel3ve->cx = 0;
strel3ve->cy = 1;   /* center pixel in column */
strel3ve->data = matrix(strel3ve->nx, strel3ve->ny);
strel3ve->data[0][0] = 2;
strel3ve->data[1][0] = 1;
strel3ve->data[2][0] = 2;

/* pattern match for vertical runs of length 2.  v: 2 1c 1 2   */
strel4ve = (STREL *) calloc (1, sizeof (STREL));
strel4ve->nx = 1;
strel4ve->ny = 4;
strel4ve->cx = 0;
strel4ve->cy = 1;   /* first on pixel down */
strel4ve->data = matrix(strel4ve->nx, strel4ve->ny);
strel4ve->data[0][0] = 2;
strel4ve->data[1][0] = 1;
strel4ve->data[2][0] = 1;
strel4ve->data[3][0] = 2;

/* use with strel4ve to dilate both pixels: */
strel2vd = (STREL *) malloc (sizeof (STREL));
strel2vd->nx = 1;
strel2vd->ny = 2;
strel2vd->cx = 0;  /* dilate  1  -->  1
                                 0        1    */
```

```
strel2vd->cy = 0;
strel2vd->data = matrix(strel2vd->nx, strel2vd->ny);
strel2vd->data[0][0] = 1;
strel2vd->data[1][0] = 1;

/* pattern match for run of length 1:   2c 1 2    */
strel3h1 = (STREL *) calloc (1, sizeof (STREL));
strel3h1->nx = 3;
strel3h1->ny = 1;
strel3h1->cx = 0;   /* center at left pixel */
strel3h1->cy = 0;
strel3h1->data = matrix(strel3h1->nx, strel3h1->ny);
strel3h1->data[0][0] = 2;
strel3h1->data[0][1] = 1;
strel3h1->data[0][2] = 2;

/* pattern match for white run of length 1:   1 2 1c    */
strel3h2 = (STREL *) calloc (1, sizeof (STREL));
strel3h2->nx = 3;
strel3h2->ny = 1;
strel3h2->cx = 2;   /* center at right pixel */
strel3h2->cy = 0;
strel3h2->data = matrix(strel3h2->nx, strel3h2->ny);
strel3h2->data[0][0] = 1;
strel3h2->data[0][1] = 2;
strel3h2->data[0][2] = 1;

/* pattern match for vertical run of length 1:   v:2c 1 2    */
strel3v1 = (STREL *) calloc (1, sizeof (STREL));
strel3v1->nx = 1;
strel3v1->ny = 3;
strel3v1->cx = 0;
strel3v1->cy = 0;   /* center at top pixel */
strel3v1->data = matrix(strel3v1->nx, strel3v1->ny);
strel3v1->data[0][0] = 2;
strel3v1->data[1][0] = 1;
strel3v1->data[2][0] = 2;

/* pattern match for vertical white run of length 1:   v:1 2 1c    */
strel3v2 = (STREL *) calloc (1, sizeof (STREL));
strel3v2->nx = 1;
strel3v2->ny = 3;
strel3v2->cx = 0;
strel3v2->cy = 2;   /* center at bottom pixel */
strel3v2->data = matrix(strel3v2->nx, strel3v2->ny);
strel3v2->data[0][0] = 1;
strel3v2->data[1][0] = 2;
strel3v2->data[2][0] = 1;

/* pattern match for run of length 2:   2c 1 1 2    */
strel4h1 = (STREL *) calloc (1, sizeof (STREL));
strel4h1->nx = 4;
strel4h1->ny = 1;
strel4h1->cx = 0;   /* center at left pixel */
strel4h1->cy = 0;
strel4h1->data = matrix(strel4h1->nx, strel4h1->ny);
strel4h1->data[0][0] = 2;
strel4h1->data[0][1] = 1;
strel4h1->data[0][2] = 1;
strel4h1->data[0][3] = 2;

/* pattern match for white run of length 2:   1 2 2 1c    */
strel4h2 = (STREL *) calloc (1, sizeof (STREL));
strel4h2->nx = 4;
```

```
strel4h2->ny = 1;
strel4h2->cx = 3;   /* center at right pixel */
strel4h2->cy = 0;
strel4h2->data = matrix(strel4h2->nx, strel4h2->ny);
strel4h2->data[0][0] = 1;
strel4h2->data[0][1] = 2;
strel4h2->data[0][2] = 2;
strel4h2->data[0][3] = 1;

/* pattern match for vertical run of length 2:   v:2c 1 1 2   */
strel4v1 = (STREL *) calloc (1, sizeof (STREL));
strel4v1->nx = 1;
strel4v1->ny = 4;
strel4v1->cx = 0;
strel4v1->cy = 0;   /* center at top pixel */
strel4v1->data = matrix(strel4v1->nx, strel4v1->ny);
strel4v1->data[0][0] = 2;
strel4v1->data[1][0] = 1;
strel4v1->data[2][0] = 1;
strel4v1->data[3][0] = 2;

/* pattern match for vertical white run of length 2:  v:1  2  2  1c  */
strel4v2 = (STREL *) calloc (1, sizeof (STREL));
strel4v2->nx = 1;
strel4v2->ny = 4;
strel4v2->cx = 0;
strel4v2->cy = 3;   /* center at bottom pixel */
strel4v2->data = matrix(strel4v2->nx, strel4v2->ny);
strel4v2->data[0][0] = 1;
strel4v2->data[1][0] = 2;
strel4v2->data[2][0] = 2;
strel4v2->data[3][0] = 1;

/* pattern match for run of length 3:    2c 1 1 1 2   */
strel5h1 = (STREL *) calloc (1, sizeof (STREL));
strel5h1->nx = 5;
strel5h1->ny = 1;
strel5h1->cx = 0;   /* center at left pixel */
strel5h1->cy = 0;
strel5h1->data = matrix(strel5h1->nx, strel5h1->ny);
strel5h1->data[0][0] = 2;
strel5h1->data[0][1] = 1;
strel5h1->data[0][2] = 1;
strel5h1->data[0][3] = 1;
strel5h1->data[0][4] = 2;

/* pattern match for white run of length 3:    1  2  2  2  1c   */
strel5h2 = (STREL *) calloc (1, sizeof (STREL));
strel5h2->nx = 5;
strel5h2->ny = 1;
strel5h2->cx = 4;   /* center at right pixel */
strel5h2->cy = 0;
strel5h2->data = matrix(strel5h2->nx, strel5h2->ny);
strel5h2->data[0][0] = 1;
strel5h2->data[0][1] = 2;
strel5h2->data[0][2] = 2;
strel5h2->data[0][3] = 2;
strel5h2->data[0][4] = 1;

/* pattern match for vertical run of length 3:  v:2c 1 1 1 2    */
strel5v1 = (STREL *) calloc (1, sizeof (STREL));
strel5v1->nx = 1;
```

```
strel5v1->ny = 5;
strel5v1->cx = 0;
strel5v1->cy = 0;   /* center at top pixel */
strel5v1->data = matrix(strel5v1->nx, strel5v1->ny);
strel5v1->data[0][0] = 2;
strel5v1->data[1][0] = 1;
strel5v1->data[2][0] = 1;
strel5v1->data[3][0] = 1;
strel5v1->data[4][0] = 2;
    /* pattern match for vertical white run of length 3: v:1  2  2  2  1c  */
strel5v2 = (STREL *) calloc (1, sizeof (STREL));
strel5v2->nx = 1;
strel5v2->ny = 5;
strel5v2->cx = 0;
strel5v2->cy = 4;   /* center at bottom pixel */
strel5v2->data = matrix(strel5v2->nx, strel5v2->ny);
strel5v2->data[0][0] = 1;
strel5v2->data[1][0] = 2;
strel5v2->data[2][0] = 2;
strel5v2->data[3][0] = 2;
strel5v2->data[4][0] = 1;

/* pattern match for single pixel with 4-adj white surround:
            0   2   0
            2   1c  2
            0   2   0       */
strel3ht1 = (STREL *) calloc (1, sizeof (STREL));
strel3ht1->nx = 3;
strel3ht1->ny = 3;
strel3ht1->cx = 1;  /* center pixel in center */
strel3ht1->cy = 1;
strel3ht1->data = matrix(strel3ht1->nx, strel3ht1->ny);
strel3ht1->data[1][1] = 1;
strel3ht1->data[0][1] = 2;
strel3ht1->data[1][0] = 2;
strel3ht1->data[1][2] = 2;
strel3ht1->data[2][1] = 2;

/* pattern match for two pixels with near 4-adj white surround:
            0   2   0
            2   1c  1
            0   2   0       */
strel3ht2 = (STREL *) calloc (1, sizeof (STREL));
strel3ht2->nx = 3;
strel3ht2->ny = 3;
strel3ht2->cx = 1;  /* center pixel in center */
strel3ht2->cy = 1;
strel3ht2->data = matrix(strel3ht2->nx, strel3ht2->ny);
strel3ht2->data[1][1] = 1;
strel3ht2->data[1][2] = 1;
strel3ht2->data[0][1] = 2;
strel3ht2->data[1][0] = 2;
strel3ht2->data[2][1] = 2;

/* horizontal gapped strel of length 5: (1 1 2c 1 1) */
strel5gap = (STREL *) calloc (1, sizeof (STREL));
strel5gap->nx = 5;
strel5gap->ny = 1;
strel5gap->cx = 2;  /* center pixel */
strel5gap->cy = 0;
strel5gap->data = matrix(strel5gap->nx, strel5gap->ny);
for (i = 0; i < 5; i++)
    strel5gap->data[0][i] = 1;
```

```
strel5gap->data[0][2] = 2;
}

/*
 * matrix():  returns a matrix (pointer to array of pointers)
 *            at starting address m that
 *                (1) has allocation for ny rows of nx short ints in each row,
 *                (2) "knows" that each row is of width nx.
 */
short int **
matrix(nx, ny)
int         nx, ny;
{
short int   **m;
int         j;

/* m is a pointer to an array of ny pointers */
    m = (short int **) calloc (ny, sizeof(short int *));
    /* each of which points to an array of nx short ints */
    for (j = 0; j < ny; j++)
        m[j] = (short int *) calloc (nx, sizeof(short int));
    return (m);
}

/****************************************************************
 * Copyright (c) 1988, Xerox Corporation.  All rights reserved.  *
 * Copyright protection claimed includes all forms and matters   *
 * of copyrightable material and information now allowed by      *
 * statutory or judicial law or hereafter granted, including     *
 * without limitation, material generated from the software      *
 * programs which are displayed on the screen such as icons,     *
 * screen display looks, etc.                                    *
 ****************************************************************/

/*
 * strelHT.c--includes subroutines
 *              strelHTInits()
 *
 *      Horizontal Filters:
 *              --filtH8p2c0d, filtH8p3c0d;
 *
 ****************************************************************
 *      Solid Filters:
 *              --filtS4p1c0d, filtS4p1c0dI;   0 degrees...
 *              --filtS6p1c0d, filtS8p1c0d;
 *              --filtS8p15c0d; (1.5 cycles)
 *
 ****************************************************************
 *      Cruciform Filters:
 *              --filtC4p2c0d, filtC4p2c0dI;
 *              --filtC4p2c14d;
 *              --filtC4p2c27d, filtC4p2c27dI;
 *              --filtC4p2c45d;
 *
 *              --filtC5p2c0d;
 *              --filtC5p2c22d;
 *              --filtC5p2c37d;
 *
 *              --filtC6p2c0d;
 *              --filtC6p2c18d;
```

```
*                  --filtC6p2c31d;
*                  --filtC6p2c45d;
*
*                  --filtC7p2c0d;
*                  --filtC7p2c27d;
*                  --filtC7p2c34d;
*                  --filtC7p2c45d;
*
*                  --filtC8p2c0d;
*                  --filtC8p2c23d;
*                  --filtC8p2c30d;
*                  --filtC8p2c45d;
*
*********************************************************
*           Wide Bandpass Filters:
*                  --filtL3p1c18d;
*                  --filtL3p1c45d;
*
*                  --filtL4p1c0d;
*                  --filtL4p1c27d;
*                  --filtL4p1c45d;
*
*                  --filtL5p1c11d;
*
*                  --filtL6p1c0d;
*                  --filtL6p1c18d;
*                  --filtL6p1c31d;
*                  --filtL6p1c45d;
*
*                  --filtL7p1c8d;
*                  --filtL7p1c34d;
*                  --filtL7p1c45d;
*
*                  --filtL8p1c0d;
*                  --filtL8p1c14d;
*                  --filtL8p1c23d;
*                  --filtL8p1c45d;
*             matrix()
*/ include <stdio.h>
include <llama.h>
#include "morph.h"
#include "strelGlobals.h"

strelHTInits()
{
int        i, j;
short int  **matrix();

/***************************************
*    horizontal filters
****************************************/
    /* pattern match for 2 cycles of halftone frequency 8 pix/cycle:
     *       10002000100020001   */
    filtH8p2c0d = (STREL *) calloc (1, sizeof (STREL));
    filtH8p2c0d->nx = 17;
    filtH8p2c0d->ny = 1;
    filtH8p2c0d->cx = 8;   /* center at center pixel */
    filtH8p2c0d->cy = 0;
    filtH8p2c0d->data = matrix(filtH8p2c0d->nx, filtH8p2c0d->ny);
    filtH8p2c0d->data[0][0] = 1;
```

```
filtH8p2c0d->data[0][4] = 2;
filtH8p2c0d->data[0][8] = 1;
filtH8p2c0d->data[0][12] = 2;
filtH8p2c0d->data[0][16] = 1;

/* pattern match for 3 cycles of halftone frequency 8 pix/cycle:
     *     1000200010002000100020001 */
filtH8p3c0d = (STREL *) calloc (1, sizeof (STREL));
filtH8p3c0d->nx = 25;
filtH8p3c0d->ny = 1;
filtH8p3c0d->cx = 12;   /* center at center pixel */
filtH8p3c0d->cy = 0;
filtH8p3c0d->data = matrix(filtH8p3c0d->nx, filtH8p3c0d->ny);
filtH8p3c0d->data[0][0] = 1;
filtH8p3c0d->data[0][4] = 2;
filtH8p3c0d->data[0][8] = 1;
filtH8p3c0d->data[0][12] = 2;
filtH8p3c0d->data[0][16] = 1;
filtH8p3c0d->data[0][20] = 2;
filtH8p3c0d->data[0][24] = 1;

/*****************************************
 *   3 cycles in 2-d
 *****************************************/
    /* pattern match for 3 cycles in 2 dimensions of halftone frequency
     * 8 pix/cycle:
     *    0000000000001000000000000
     *           0000000 (3)
     *    0000000000002000000000000
     *           0000000 (3)
     *    0000000000001000000000000
     *           0000000 (3)
     *    1000200010002000100020001
     *           0000000 (3)
     *    0000000000001000000000000
     *           0000000 (3)
     *    0000000000002000000000000
     *           0000000 (3)
     *    0000000000001000000000000     */
filtC8p3c0d = (STREL *) calloc (1, sizeof (STREL));
filtC8p3c0d->nx = 25;
filtC8p3c0d->ny = 25;
filtC8p3c0d->cx = 12;   /* center at center pixel */
filtC8p3c0d->cy = 12;
filtC8p3c0d->data = matrix(filtC8p3c0d->nx, filtC8p3c0d->ny);
filtC8p3c0d->data[12][0] = 1;
filtC8p3c0d->data[12][4] = 2;
filtC8p3c0d->data[12][8] = 1;
filtC8p3c0d->data[12][12] = 2;
filtC8p3c0d->data[12][16] = 1;
filtC8p3c0d->data[12][20] = 2;
filtC8p3c0d->data[12][24] = 1;
filtC8p3c0d->data[0][12] = 1;
filtC8p3c0d->data[4][12] = 2;
filtC8p3c0d->data[8][12] = 1;
filtC8p3c0d->data[16][12] = 1;
filtC8p3c0d->data[20][12] = 2;
filtC8p3c0d->data[24][12] = 1;

/*****************************************
 *   Solid 1 and 1.5-cycle filters
 *****************************************/
```

```
/* pattern match for 1 cycle, 2-d solid filter, halftone frequency
 *  4 pix/cycle:
 *    10201
 *    00000
 *    20202
 *    00000
 *    10201    */
filtS4plc0d = (STREL *) calloc (1, sizeof (STREL));
filtS4plc0d->nx = 5;
filtS4plc0d->ny = 5;
filtS4plc0d->cx = 2;    /* center at center pixel */
filtS4plc0d->cy = 2;
filtS4plc0d->data = matrix(filtS4plc0d->nx, filtS4plc0d->ny);
filtS4plc0d->data[0][0] = 1;
filtS4plc0d->data[0][2] = 2;
filtS4plc0d->data[0][4] = 1;
filtS4plc0d->data[2][0] = 2;
filtS4plc0d->data[2][2] = 2;
filtS4plc0d->data[2][4] = 2;
filtS4plc0d->data[4][0] = 1;
filtS4plc0d->data[4][2] = 2;
filtS4plc0d->data[4][4] = 1;

/* pattern match for 1 cycle, 2-d solid filter, halftone frequency
 *  4 pix/cycle, inverted phase:
 *    20102
 *    00000
 *    10101
 *    00000
 *    20102    */
filtS4plc0dI = (STREL *) calloc (1, sizeof (STREL));
filtS4plc0dI->nx = 5;
filtS4plc0dI->ny = 5;
filtS4plc0dI->cx = 2;    /* center at center pixel */
filtS4plc0dI->cy = 2;
filtS4plc0dI->data = matrix(filtS4plc0dI->nx, filtS4plc0dI->ny);
filtS4plc0dI->data[0][0] = 2;
filtS4plc0dI->data[0][2] = 1;
filtS4plc0dI->data[0][4] = 2;
filtS4plc0dI->data[2][0] = 1;
filtS4plc0dI->data[2][2] = 1;
filtS4plc0dI->data[2][4] = 1;
filtS4plc0dI->data[4][0] = 2;
filtS4plc0dI->data[4][2] = 1;
filtS4plc0dI->data[4][4] = 2;

/* pattern match for 1 cycle, 2-d solid filter, halftone frequency
 *  6 pix/cycle:
 *    1002001
 *    00000 (2)
 *    2001002
 *    00000 (2)
 *    1002001    */
filtS6plc0d = (STREL *) calloc (1, sizeof (STREL));
filtS6plc0d->nx = 7;
filtS6plc0d->ny = 7;
filtS6plc0d->cx = 3;    /* center at center pixel */
filtS6plc0d->cy = 3;
filtS6plc0d->data = matrix(filtS6plc0d->nx, filtS6plc0d->ny);
filtS6plc0d->data[0][0] = 1;
filtS6plc0d->data[0][3] = 2;
filtS6plc0d->data[0][6] = 1;
filtS6plc0d->data[3][0] = 2;
```

```
filtS6plc0d->data[3][3] = 1;
filtS6plc0d->data[3][6] = 2;
filtS6plc0d->data[6][0] = 1;
filtS6plc0d->data[6][3] = 2;
filtS6plc0d->data[6][6] = 1;

/* pattern match for 1 cycle, 2-d solid filter, halftone frequency
     * 8 pix/cycle:
     *    100020001
     *       00000 (3)
     *    200010002
     *       00000 (3)
     *    100020001   */
filtS8plc0d = (STREL *) calloc (1, sizeof (STREL));
filtS8plc0d->nx = 9;
filtS8plc0d->ny = 9;
filtS8plc0d->cx = 4;   /* center at center pixel */
filtS8plc0d->cy = 4;
filtS8plc0d->data = matrix(filtS8plc0d->nx, filtS8plc0d->ny);
filtS8plc0d->data[0][0] = 1;
filtS8plc0d->data[0][4] = 2;
filtS8plc0d->data[0][8] = 1;
filtS8plc0d->data[4][0] = 2;
filtS8plc0d->data[4][4] = 1;
filtS8plc0d->data[4][8] = 2;
filtS8plc0d->data[8][0] = 1;
filtS8plc0d->data[8][4] = 2;
filtS8plc0d->data[8][8] = 1;

/* pattern match for 1.5 cycles, 2-d solid filter, halftone frequency
     * 8 pix/cycle:
     *    2000100020001
     *        00000 (3)
     *    1000200010002
     *        00000 (3)
     *    2000100020001
     *        00000 (3)
     *    1000200010002   */
filtS8p15c0d = (STREL *) calloc (1, sizeof (STREL));
filtS8p15c0d->nx = 13;
filtS8p15c0d->ny = 13;
filtS8p15c0d->cx = 6;   /* center at center pixel */
filtS8p15c0d->cy = 6;
filtS8p15c0d->data = matrix(filtS8p15c0d->nx, filtS8p15c0d->ny);
filtS8p15c0d->data[0][0] = 0;
filtS8p15c0d->data[0][4] = 1;
filtS8p15c0d->data[0][8] = 2;
filtS8p15c0d->data[0][12] = 0;
filtS8p15c0d->data[4][0] = 1;
filtS8p15c0d->data[4][4] = 2;
filtS8p15c0d->data[4][8] = 1;
filtS8p15c0d->data[4][12] = 2;
filtS8p15c0d->data[8][0] = 2;
filtS8p15c0d->data[8][4] = 1;
filtS8p15c0d->data[8][8] = 2;
filtS8p15c0d->data[8][12] = 1;
filtS8p15c0d->data[12][0] = 0;
filtS8p15c0d->data[12][4] = 2;
filtS8p15c0d->data[12][8] = 1;
filtS8p15c0d->data[12][12] = 0;
```

```
/****************************************
 *     Cruciform 2-cycle filters
 ****************************************/
        /* pattern match for 2 cycles in 2 dimensions of halftone frequency
         * 4 pix/cycle:
         *    000010000
         *    000000000
         *    000020000
         *    000000000
         *    102010201
         *    000000000
         *    000020000
         *    000000000
         *    000010000    */
    filtC4p2c0d = (STREL *) calloc (1, sizeof (STREL));
    filtC4p2c0d->nx = 9;
    filtC4p2c0d->ny = 9;
    filtC4p2c0d->cx = 4;  /* center at center pixel */
    filtC4p2c0d->cy = 4;
    filtC4p2c0d->data = matrix(filtC4p2c0d->nx, filtC4p2c0d->ny);
    filtC4p2c0d->data[4][0] = 1;
    filtC4p2c0d->data[4][2] = 2;
    filtC4p2c0d->data[4][4] = 1;
    filtC4p2c0d->data[4][6] = 2;
    filtC4p2c0d->data[4][8] = 1;
    filtC4p2c0d->data[0][4] = 1;
    filtC4p2c0d->data[2][4] = 2;
    filtC4p2c0d->data[6][4] = 2;
    filtC4p2c0d->data[8][4] = 1;

/* pattern match for 2 cycles in 2 dimensions of halftone frequency
         * 4 pix/cycle; inverted phase:
         *    000020000
         *    000000000
         *    000010000
         *    000000000
         *    201020102
         *    000000000
         *    000010000
         *    000000000
         *    000020000    */
    filtC4p2c0dI = (STREL *) calloc (1, sizeof (STREL));
    filtC4p2c0dI->nx = 9;
    filtC4p2c0dI->ny = 9;
    filtC4p2c0dI->cx = 4;  /* center at center pixel */
    filtC4p2c0dI->cy = 4;
    filtC4p2c0dI->data = matrix(filtC4p2c0dI->nx, filtC4p2c0dI->ny);
    filtC4p2c0dI->data[4][0] = 2;
    filtC4p2c0dI->data[4][2] = 1;
    filtC4p2c0dI->data[4][4] = 2;
    filtC4p2c0dI->data[4][6] = 1;
    filtC4p2c0dI->data[4][8] = 2;
    filtC4p2c0dI->data[0][4] = 2;
    filtC4p2c0dI->data[2][4] = 1;
    filtC4p2c0dI->data[6][4] = 1;
    filtC4p2c0dI->data[8][4] = 2;

/* pattern match for 2 cycles in 2 dimensions of halftone frequency
         * 4 pix/cycle, 14-degree rotation:
         *    000100000
         *    000000000
         *    000200000
```

```
*       000000201
*       000010000
*       102000000
*       000002000
*       000000000
*       000001000   */
filtC4p2c14d = (STREL *) calloc (1, sizeof (STREL));
filtC4p2c14d->nx = 9;
filtC4p2c14d->ny = 9;
filtC4p2c14d->cx = 4;   /* center at center pixel */
filtC4p2c14d->cy = 4;
filtC4p2c14d->data = matrix(filtC4p2c14d->nx, filtC4p2c14d->ny);
filtC4p2c14d->data[0][3] = 1;
filtC4p2c14d->data[2][3] = 2;
filtC4p2c14d->data[3][6] = 2;
filtC4p2c14d->data[3][8] = 1;
filtC4p2c14d->data[4][4] = 1;
filtC4p2c14d->data[5][0] = 1;
filtC4p2c14d->data[5][2] = 2;
filtC4p2c14d->data[6][5] = 2;
filtC4p2c14d->data[8][5] = 1;

/* pattern match for 2 cycles in 2 dimensions of halftone frequency
     * 4 pix/cycle, 27-degree rotation:
     *       001000000
     *       000000000
     *       000200001
     *       000000200
     *       000010000
     *       002000000
     *       100002000
     *       000000000
     *       000000100   */
filtC4p2c27d = (STREL *) calloc (1, sizeof (STREL));
filtC4p2c27d->nx = 9;
filtC4p2c27d->ny = 9;
filtC4p2c27d->cx = 4;   /* center at center pixel */
filtC4p2c27d->cy = 4;
filtC4p2c27d->data = matrix(filtC4p2c27d->nx, filtC4p2c27d->ny);
filtC4p2c27d->data[2][0] = 1;
filtC4p2c27d->data[3][2] = 2;
filtC4p2c27d->data[4][4] = 1;
filtC4p2c27d->data[5][6] = 2;
filtC4p2c27d->data[6][8] = 1;
filtC4p2c27d->data[0][6] = 1;
filtC4p2c27d->data[2][5] = 2;
filtC4p2c27d->data[6][3] = 2;
filtC4p2c27d->data[8][2] = 1;

/* pattern match for 2 cycles in 2 dimensions of halftone frequency
     * 4 pix/cycle, 27-degree rotation, inverted phase:
     *       002000000
     *       000000000
     *       000100002
     *       000000100
     *       000020000
     *       001000000
     *       200001000
     *       000000000
     *       000000200   */
filtC4p2c27dI = (STREL *) calloc (1, sizeof (STREL));
filtC4p2c27dI->nx = 9;
```

```
filtC4p2c27dI->ny = 9;
filtC4p2c27dI->cx = 4;   /* center at center pixel */
filtC4p2c27dI->cy = 4;
filtC4p2c27dI->data = matrix(filtC4p2c27dI->nx, filtC4p2c27dI->ny);
filtC4p2c27dI->data[2][0] = 2;
filtC4p2c27dI->data[3][2] = 1;
filtC4p2c27dI->data[4][4] = 2;
filtC4p2c27dI->data[5][6] = 1;
filtC4p2c27dI->data[6][8] = 2;
filtC4p2c27dI->data[0][6] = 2;
filtC4p2c27dI->data[2][5] = 1;
filtC4p2c27dI->data[6][3] = 1;
filtC4p2c27dI->data[8][2] = 2;

/* pattern match for 2 cycles in 2 dimensions of halftone frequency
     *  4 pix/cycle, 45-degree rotation:
     *     1000001
     *     0020000
     *     0000020
     *     0001000
     *     0200000
     *     0000200
     *     1000001   */
filtC4p2c45d = (STREL *) calloc (1, sizeof (STREL));
filtC4p2c45d->nx = 7;
filtC4p2c45d->ny = 7;
filtC4p2c45d->cx = 3;   /* center at center pixel */
filtC4p2c45d->cy = 3;
filtC4p2c45d->data = matrix(filtC4p2c45d->nx, filtC4p2c45d->ny);
filtC4p2c45d->data[0][0] = 1;
filtC4p2c45d->data[0][6] = 1;
filtC4p2c45d->data[1][2] = 2;
filtC4p2c45d->data[2][5] = 2;
filtC4p2c45d->data[3][3] = 1;
filtC4p2c45d->data[4][1] = 2;
filtC4p2c45d->data[5][4] = 2;
filtC4p2c45d->data[6][0] = 1;
filtC4p2c45d->data[6][6] = 1;

/* pattern match for 2 cycles in 2 dimensions of halftone frequency
     *  5 pix/cycle:
     *     00000100000
     *     00000000000
     *     00000200000
     *     00000000000
     *     00000000000
     *     10200102001
     *     00000000000
     *     00000200000
     *     00000000000
     *     00000000000
     *     00000100000   */
filtC5p2c0d = (STREL *) calloc (1, sizeof (STREL));
filtC5p2c0d->nx = 11;
filtC5p2c0d->ny = 11;
filtC5p2c0d->cx = 5;   /* center at center pixel */
filtC5p2c0d->cy = 5;
filtC5p2c0d->data = matrix(filtC5p2c0d->nx, filtC5p2c0d->ny);
filtC5p2c0d->data[5][0] = 1;
filtC5p2c0d->data[5][2] = 2;
filtC5p2c0d->data[5][5] = 1;
filtC5p2c0d->data[5][7] = 2;
```

```
filtC5p2c0d->data[5][10] = 1;
filtC5p2c0d->data[0][5] = 1;
filtC5p2c0d->data[2][5] = 2;
filtC5p2c0d->data[7][5] = 2;
filtC5p2c0d->data[10][5] = 1;

/* pattern match for 2 cycles in 2 dimensions of halftone frequency
     * 5 pix/cycle, 22-degree rotation:
     *    00010000000
     *    00000000000
     *    00002000000
     *    00000000001
     *    00000000200
     *    00000100000
     *    00200000000
     *    10000000000
     *    00000020000
     *    00000000000
     *    00000001000   */
filtC5p2c22d = (STREL *) calloc (1, sizeof (STREL));
filtC5p2c22d->nx = 11;
filtC5p2c22d->ny = 11;
filtC5p2c22d->cx = 5;   /* center at center pixel */
filtC5p2c22d->cy = 5;
filtC5p2c22d->data = matrix(filtC5p2c22d->nx, filtC5p2c22d->ny);
filtC5p2c22d->data[0][3] = 1;
filtC5p2c22d->data[2][4] = 2;
filtC5p2c22d->data[3][10] = 1;
filtC5p2c22d->data[4][8] = 2;
filtC5p2c22d->data[5][5] = 1;
filtC5p2c22d->data[6][2] = 2;
filtC5p2c22d->data[7][0] = 1;
filtC5p2c22d->data[8][6] = 2;
filtC5p2c22d->data[10][7] = 1;

/* pattern match for 2 cycles in 2 dimensions of halftone frequency
     * 5 pix/cycle, 37-degree rotation:
     *    010000000
     *    000000001
     *    002000200
     *    000000000
     *    000010000
     *    000000000
     *    002000200
     *    100000000
     *    000000010   */
filtC5p2c37d = (STREL *) calloc (1, sizeof (STREL));
filtC5p2c37d->nx = 9;
filtC5p2c37d->ny = 9;
filtC5p2c37d->cx = 4;   /* center at center pixel */
filtC5p2c37d->cy = 4;
filtC5p2c37d->data = matrix(filtC5p2c37d->nx, filtC5p2c37d->ny);
filtC5p2c37d->data[0][1] = 1;
filtC5p2c37d->data[1][8] = 1;
filtC5p2c37d->data[2][2] = 2;
filtC5p2c37d->data[2][6] = 2;
filtC5p2c37d->data[4][4] = 1;
filtC5p2c37d->data[6][2] = 2;
filtC5p2c37d->data[6][6] = 2;
filtC5p2c37d->data[7][0] = 1;
filtC5p2c37d->data[8][7] = 1;
```

```
/* pattern match for 2 cycles in 2 dimensions of halftone frequency
 *  6 pix/cycle:
 *      0000001000000
 *          00000 (2)
 *      0000002000000
 *          00000 (2)
 *      1002001002001
 *          00000 (2)
 *      0000002000000
 *          00000 (2)
 *      0000001000000   */
filtC6p2c0d = (STREL *) calloc (1, sizeof (STREL));
filtC6p2c0d->nx = 13;
filtC6p2c0d->ny = 13;
filtC6p2c0d->cx = 6;   /* center at center pixel */
filtC6p2c0d->cy = 6;
filtC6p2c0d->data = matrix(filtC6p2c0d->nx, filtC6p2c0d->ny);
filtC6p2c0d->data[6][0] = 1;
filtC6p2c0d->data[6][3] = 2;
filtC6p2c0d->data[6][6] = 1;
filtC6p2c0d->data[6][9] = 2;
filtC6p2c0d->data[6][12] = 1;
filtC6p2c0d->data[0][6] = 1;
filtC6p2c0d->data[3][6] = 2;
filtC6p2c0d->data[9][6] = 2;
filtC6p2c0d->data[12][6] = 1;

/* pattern match for 2 cycles in 2 dimensions of halftone frequency
 *  6 pix/cycle, 18-degree rotation:
 *      0000100000000
 *      0000000000000
 *      0000000000000
 *      0000020000000
 *      0000000000001
 *      0000000002000
 *      0000001000000
 *      0002000000000
 *      1000000000000
 *      0000000200000
 *      0000000000000
 *      0000000000000
 *      0000000010000   */
filtC6p2c18d = (STREL *) calloc (1, sizeof (STREL));
filtC6p2c18d->nx = 13;
filtC6p2c18d->ny = 13;
filtC6p2c18d->cx = 6;   /* center at center pixel */
filtC6p2c18d->cy = 6;
filtC6p2c18d->data = matrix(filtC6p2c18d->nx, filtC6p2c18d->ny);
filtC6p2c18d->data[0][4] = 1;
filtC6p2c18d->data[3][5] = 2;
filtC6p2c18d->data[4][12] = 1;
filtC6p2c18d->data[5][9] = 2;
filtC6p2c18d->data[6][6] = 1;
filtC6p2c18d->data[7][3] = 2;
filtC6p2c18d->data[8][0] = 1;
filtC6p2c18d->data[9][7] = 2;
filtC6p2c18d->data[12][8] = 1;

/* pattern match for 2 cycles in 2 dimensions of halftone frequency
 *  6 pix/cycle, 31-degree rotation:
 *      00100000000
 *      00000000000
```

```
*      00002000001
*      00000000000
*      00000000200
*      00000100000
*      00200000000
*      00000000000
*      10000020000
*      00000000000
*      00000000100   */
filtC6p2c31d = (STREL *) calloc (1, sizeof (STREL));
filtC6p2c31d->nx = 11;
filtC6p2c31d->ny = 11;
filtC6p2c31d->cx = 5;   /* center at center pixel */
filtC6p2c31d->cy = 5;
filtC6p2c31d->data = matrix(filtC6p2c31d->nx, filtC6p2c31d->ny);
filtC6p2c31d->data[0][2] = 1;
filtC6p2c31d->data[2][4] = 2;
filtC6p2c31d->data[2][10] = 1;
filtC6p2c31d->data[4][8] = 2;
filtC6p2c31d->data[5][5] = 1;
filtC6p2c31d->data[6][2] = 2;
filtC6p2c31d->data[8][0] = 1;
filtC6p2c31d->data[8][6] = 2;
filtC6p2c31d->data[10][8] = 1;

/* pattern match for 2 cycles in 2 dimensions of halftone frequency
 *   6 pix/cycle, 45-degree rotation:
 *      100000001
 *      000000000
 *      002000200
 *      000000000
 *      000010000
 *      000000000
 *      002000200
 *      000000000
 *      100000001     */
filtC6p2c45d = (STREL *) calloc (1, sizeof (STREL));
filtC6p2c45d->nx = 9;
filtC6p2c45d->ny = 9;
filtC6p2c45d->cx = 4;   /* center at center pixel */
filtC6p2c45d->cy = 4;
filtC6p2c45d->data = matrix(filtC6p2c45d->nx, filtC6p2c45d->ny);
filtC6p2c45d->data[0][0] = 1;
filtC6p2c45d->data[0][8] = 1;
filtC6p2c45d->data[2][2] = 2;
filtC6p2c45d->data[2][6] = 2;
filtC6p2c45d->data[4][4] = 1;
filtC6p2c45d->data[6][2] = 2;
filtC6p2c45d->data[6][6] = 2;
filtC6p2c45d->data[8][0] = 1;
filtC6p2c45d->data[8][8] = 1;

/* pattern match for 2 cycles in 2 dimensions of halftone frequency
 *   7 pix/cycle:
 *      000000010000000
 *          00000 (2)
 *      000000020000000
 *          00000 (3)
 *      100200010020001
 *          00000 (2)
 *      000000020000000
 *          00000 (3)
 *      000000010000000    */
```

```
filtC7p2c0d = (STREL *) calloc (1, sizeof (STREL));
filtC7p2c0d->nx = 15;
filtC7p2c0d->ny = 15;
filtC7p2c0d->cx = 7;   /* center at center pixel */
filtC7p2c0d->cy = 7;
filtC7p2c0d->data = matrix(filtC7p2c0d->nx, filtC7p2c0d->ny);
filtC7p2c0d->data[7][0] = 1;
filtC7p2c0d->data[7][3] = 2;
filtC7p2c0d->data[7][7] = 1;
filtC7p2c0d->data[7][10] = 2;
filtC7p2c0d->data[7][14] = 1;
filtC7p2c0d->data[0][7] = 1;
filtC7p2c0d->data[3][7] = 2;
filtC7p2c0d->data[10][7] = 2;
filtC7p2c0d->data[14][7] = 1;

/* pattern match for 2 cycles in 2 dimensions of halftone frequency
     *  7 pix/cycle at 27-degrees rotation:
     *     0001000000000
     *     0000000000000
     *     0000000000000
     *     0000020000001
     *     0000000000000
     *     0000000002000
     *     0000001000000
     *     0002000000000
     *     0000000000000
     *     1000000200000
     *     0000000000000
     *     0000000000000
     *     0000000001000   */
filtC7p2c27d = (STREL *) calloc (1, sizeof (STREL));
filtC7p2c27d->nx = 13;
filtC7p2c27d->ny = 13;
filtC7p2c27d->cx = 6;   /* center at center pixel */
filtC7p2c27d->cy = 6;
filtC7p2c27d->data = matrix(filtC7p2c27d->nx, filtC7p2c27d->ny);
filtC7p2c27d->data[0][3] = 1;
filtC7p2c27d->data[3][5] = 2;
filtC7p2c27d->data[3][12] = 1;
filtC7p2c27d->data[5][9] = 2;
filtC7p2c27d->data[6][6] = 1;
filtC7p2c27d->data[7][3] = 2;
filtC7p2c27d->data[9][0] = 1;
filtC7p2c27d->data[9][7] = 2;
filtC7p2c27d->data[12][9] = 1;

/* pattern match for 2 cycles in 2 dimensions of halftone frequency
     *  7 pix/cycle at 34-degrees rotation:
     *     0010000000000
     *     0000000000000
     *     0000000000001
     *     0000200000000
     *     0000000002000
     *     0000000000000
     *     0000001000000
     *     0000000000000
     *     0002000000000
     *     0000000020000
     *     1000000000000
```

```
 *      0000000000000
 *      0000000000100  */
filtC7p2c34d = (STREL *) calloc (1, sizeof (STREL));
filtC7p2c34d->nx = 13;
filtC7p2c34d->ny = 13;
filtC7p2c34d->cx = 6;   /* center at center pixel */
filtC7p2c34d->cy = 6;
filtC7p2c34d->data = matrix(filtC7p2c34d->nx, filtC7p2c34d->ny);
filtC7p2c34d->data[0][2] = 1;
filtC7p2c34d->data[2][12] = 1;
filtC7p2c34d->data[3][4] = 2;
filtC7p2c34d->data[4][9] = 2;
filtC7p2c34d->data[6][6] = 1;
filtC7p2c34d->data[8][3] = 2;
filtC7p2c34d->data[9][8] = 2;
filtC7p2c34d->data[10][0] = 1;
filtC7p2c34d->data[12][10] = 1;

/* pattern match for 2 cycles in 2 dimensions of halftone frequency
     *  7 pix/cycle, 45-degree rotation:
     *     10000000001
     *     00000000000
     *     00020000000
     *     00000000200
     *     00000000000
     *     00000100000
     *     00000000000
     *     00200000000
     *     00000002000
     *     00000000000
     *     10000000001   */
filtC7p2c45d = (STREL *) calloc (1, sizeof (STREL));
filtC7p2c45d->nx = 11;
filtC7p2c45d->ny = 11;
filtC7p2c45d->cx = 5;   /* center at center pixel */
filtC7p2c45d->cy = 5;
filtC7p2c45d->data = matrix(filtC7p2c45d->nx, filtC7p2c45d->ny);
filtC7p2c45d->data[0][0] = 1;
filtC7p2c45d->data[0][10] = 1;
filtC7p2c45d->data[2][3] = 2;
filtC7p2c45d->data[3][8] = 2;
filtC7p2c45d->data[5][5] = 1;
filtC7p2c45d->data[7][2] = 2;
filtC7p2c45d->data[8][7] = 2;
filtC7p2c45d->data[10][0] = 1;
filtC7p2c45d->data[10][10] = 1;

/* pattern match for 2 cycles in 2 dimensions of halftone frequency
     *  8 pix/cycle:                  (0-degree, normal cruciform)
     *     00000000100000000
     *           000000 (3)
     *     00000000200000000
     *           000000 (3)
     *     10002000100020001
     *           000000 (3)
     *     00000000200000000
     *           000000 (3)
     *     00000000100000000   */
filtC8p2c0d = (STREL *) calloc (1, sizeof (STREL));
filtC8p2c0d->nx = 17;
```

```
filtC8p2c0d->ny = 17;
filtC8p2c0d->cx = 8;   /* center at center pixel */
filtC8p2c0d->cy = 8;
filtC8p2c0d->data = matrix(filtC8p2c0d->nx, filtC8p2c0d->ny);
filtC8p2c0d->data[8][0] = 1;
filtC8p2c0d->data[8][4] = 2;
filtC8p2c0d->data[8][8] = 1;
filtC8p2c0d->data[8][12] = 2;
filtC8p2c0d->data[8][16] = 1;
filtC8p2c0d->data[0][8] = 1;
filtC8p2c0d->data[4][8] = 2;
filtC8p2c0d->data[12][8] = 2;
filtC8p2c0d->data[16][8] = 1;

/* pattern match for 2 cycles in 2 dimensions of halftone frequency
     * 8 pix/cycle:                    (23-degree, rotated cruciform)
     *   000010000000000
     *   000000000000000
     *   000000000000000
     *   000000000000000
     *   000000200000001
     *   000000000000000
     *   000000000020000
     *   000000010000000
     *   000020000000000
     *   000000000000000
     *   100000002000000
     *   000000000000000
     *   000000000000000
     *   000000000000000
     *   000000000010000   */
filtC8p2c23d = (STREL *) calloc (1, sizeof (STREL));
filtC8p2c23d->nx = 15;
filtC8p2c23d->ny = 15;
filtC8p2c23d->cx = 7;   /* center at center pixel */
filtC8p2c23d->cy = 7;
filtC8p2c23d->data = matrix(filtC8p2c23d->nx, filtC8p2c23d->ny);
filtC8p2c23d->data[0][4] = 1;
filtC8p2c23d->data[4][6] = 2;
filtC8p2c23d->data[4][14] = 1;
filtC8p2c23d->data[6][10] = 2;
filtC8p2c23d->data[7][7] = 1;
filtC8p2c23d->data[8][4] = 2;
filtC8p2c23d->data[10][0] = 1;
filtC8p2c23d->data[10][8] = 2;
filtC8p2c23d->data[14][10] = 1;

/* pattern match for 2 cycles in 2 dimensions of halftone frequency
     * 8 pix/cycle:                    (30-degree, rotated cruciform)
     *   000100000000000
     *   000000000000000
     *   000000000000000
     *   000002000000001
     *   000000000000000
     *   000000000002000
     *   000000000000000
     *   000000010000000
     *   000000000000000
     *   000200000000000
     *   000000000000000
```

```
 *      100000000200000
 *      000000000000000
 *      000000000000000
 *      000000000001000   */
filtC8p2c30d = (STREL *) calloc (1, sizeof (STREL));
filtC8p2c30d->nx = 15;
filtC8p2c30d->ny = 15;
filtC8p2c30d->cx = 7;   /* center at center pixel */
filtC8p2c30d->cy = 7;
filtC8p2c30d->data = matrix(filtC8p2c30d->nx, filtC8p2c30d->ny);
filtC8p2c30d->data[0][3] = 1;
filtC8p2c30d->data[3][5] = 2;
filtC8p2c30d->data[3][14] = 1;
filtC8p2c30d->data[5][11] = 2;
filtC8p2c30d->data[7][7] = 1;
filtC8p2c30d->data[9][3] = 2;
filtC8p2c30d->data[11][0] = 1;
filtC8p2c30d->data[11][9] = 2;
filtC8p2c30d->data[14][11] = 1;

/* pattern match for 2 cycles in 2 dimensions of halftone frequency
     * 8 pix/cycle at 45-degrees rotation:
     *      1000000000001
     *      0000000000000
     *      0000000000000
     *      0002000002000
     *      0000000000000
     *      0000000000000
     *      0000001000000
     *      0000000000000
     *      0000000000000
     *      0002000002000
     *      0000000000000
     *      0000000000000
     *      1000000000001   */
filtC8p2c45d = (STREL *) calloc (1, sizeof (STREL));
filtC8p2c45d->nx = 13;
filtC8p2c45d->ny = 13;
filtC8p2c45d->cx = 6;   /* center at center pixel */
filtC8p2c45d->cy = 6;
filtC8p2c45d->data = matrix(filtC8p2c45d->nx, filtC8p2c45d->ny);
filtC8p2c45d->data[0][0] = 1;
filtC8p2c45d->data[0][12] = 1;
filtC8p2c45d->data[3][3] = 2;
filtC8p2c45d->data[3][9] = 2;
filtC8p2c45d->data[6][6] = 1;
filtC8p2c45d->data[9][3] = 2;
filtC8p2c45d->data[9][9] = 2;
filtC8p2c45d->data[12][0] = 1;
filtC8p2c45d->data[12][12] = 1;

/* pattern match for 1 cycle in 2 dimensions at 8 pix/cycle
     * with 30-degree, rotated cruciform:
     *      002000000
     *             0
     *      000000002
     *             0
     *      000010000
     *             0
     *      200000000
```

```
 *           0
 *     000000200   */
filtC8plc30d = (STREL *) calloc (1, sizeof (STREL));
filtC8plc30d->nx = 9;
filtC8plc30d->ny = 9;
filtC8plc30d->cx = 4;   /* center at center pixel */
filtC8plc30d->cy = 4;
filtC8plc30d->data = matrix(filtC8plc30d->nx, filtC8plc30d->ny);
filtC8plc30d->data[0][2] = 2;
filtC8plc30d->data[4][4] = 1;
filtC8plc30d->data[8][6] = 2;
filtC8plc30d->data[6][0] = 2;
filtC8plc30d->data[2][8] = 2;

/***************************
 *   wide bandpass 2-d filters
 ***************************/
    /* pattern match for 1 cycle, wideBP, halftone frequency 3 pix/cycle,
     *                       rotation 18 degrees.
     *     00010
     *     10000
     *     00200
     *     00001
     *     01000   */
filtL3plc18d = (STREL *) calloc (1, sizeof (STREL));
filtL3plc18d->nx = 5;
filtL3plc18d->ny = 5;
filtL3plc18d->cx = 2;   /* center pixel */
filtL3plc18d->cy = 2;
filtL3plc18d->data = matrix(filtL3plc18d->nx, filtL3plc18d->ny);
filtL3plc18d->data[0][3] = 1;
filtL3plc18d->data[1][0] = 1;
filtL3plc18d->data[2][2] = 2;
filtL3plc18d->data[3][4] = 1;
filtL3plc18d->data[4][1] = 1;

/* pattern match for 1 cycle, wideBP, halftone frequency 3 pix/cycle,
     *                       rotation 45 degrees.
     *     00100
     *     00000
     *     10201
     *     00000
     *     00100   */
filtL3plc45d = (STREL *) calloc (1, sizeof (STREL));
filtL3plc45d->nx = 5;
filtL3plc45d->ny = 5;
filtL3plc45d->cx = 2;   /* center pixel */
filtL3plc45d->cy = 2;
filtL3plc45d->data = matrix(filtL3plc45d->nx, filtL3plc45d->ny);
filtL3plc45d->data[0][2] = 1;
filtL3plc45d->data[2][0] = 1;
filtL3plc45d->data[2][2] = 2;
filtL3plc45d->data[2][4] = 1;
filtL3plc45d->data[4][2] = 1;

/* pattern match for 1 cycle, wideBP, halftone frequency 4 pix/cycle,
     *                       rotation 0 degrees.
     *               Should also work well for 5 pix/cycle.
     *     10001
```

```
 *      00000
 *      00200
 *      00000
 *      10001   */
filtL4plc0d = (STREL *) calloc (1, sizeof (STREL));
filtL4plc0d->nx = 5;
filtL4plc0d->ny = 5;
filtL4plc0d->cx = 2;   /* center pixel */
filtL4plc0d->cy = 2;
filtL4plc0d->data = matrix(filtL4plc0d->nx, filtL4plc0d->ny);
filtL4plc0d->data[0][0] = 1;
filtL4plc0d->data[0][4] = 1;
filtL4plc0d->data[2][2] = 2;
filtL4plc0d->data[4][0] = 1;
filtL4plc0d->data[4][4] = 1;

/* pattern match for 1 cycle, wideBP, halftone frequency 4 pix/cycle,
    *                rotation 27 deg
    *      0000100
    *      0000000
    *      1000000
    *      0002000
    *      0000001
    *      0000000
    *      0010000   */
filtL4plc27d = (STREL *) calloc (1, sizeof (STREL));
filtL4plc27d->nx = 7;
filtL4plc27d->ny = 7;
filtL4plc27d->cx = 3;   /* center pixel */
filtL4plc27d->cy = 3;
filtL4plc27d->data = matrix(filtL4plc27d->nx, filtL4plc27d->ny);
filtL4plc27d->data[0][4] = 1;
filtL4plc27d->data[2][0] = 1;
filtL4plc27d->data[3][3] = 2;
filtL4plc27d->data[4][6] = 1;
filtL4plc27d->data[6][2] = 1;

/* pattern match for 1 cycle, wideBP, halftone frequency 4 pix/cycle,
    *                rotation 45 degrees
    *                Should also work well for 5 pix/cycle.
    *      0001000
    *      0000000
    *      0000000
    *      1002001
    *      0000000
    *      0000000
    *      0001000   */
filtL4plc45d = (STREL *) calloc (1, sizeof (STREL));
filtL4plc45d->nx = 7;
filtL4plc45d->ny = 7;
filtL4plc45d->cx = 3;   /* center pixel */
filtL4plc45d->cy = 3;
filtL4plc45d->data = matrix(filtL4plc45d->nx, filtL4plc45d->ny);
filtL4plc45d->data[0][3] = 1;
filtL4plc45d->data[3][0] = 1;
filtL4plc45d->data[3][3] = 2;
filtL4plc45d->data[3][6] = 1;
filtL4plc45d->data[6][3] = 1;

/* pattern match for 1 cycle, wideBP, halftone frequency 5 pix/cycle,
```

```
 *              rotation 11 deg
 *      0000010
 *      1000000
 *      0000000
 *      0002000
 *      0000000
 *      0000001
 *      0100000  */
filtL5plc11d = (STREL *) calloc (1, sizeof (STREL));
filtL5plc11d->nx = 7;
filtL5plc11d->ny = 7;
filtL5plc11d->cx = 3;   /* center pixel */
filtL5plc11d->cy = 3;
filtL5plc11d->data = matrix(filtL5plc11d->nx, filtL5plc11d->ny);
filtL5plc11d->data[0][5] = 1;
filtL5plc11d->data[1][0] = 1;
filtL5plc11d->data[3][3] = 2;
filtL5plc11d->data[5][6] = 1;
filtL5plc11d->data[6][1] = 1;

/* pattern match for 1 cycle, wideBP, halftone frequency 6 pix/cycle,
     *              rotation 0 degrees
     *              Should also work well for 5 and 7 pix/cycle.
     *      1000001
     *      0000000
     *      0000000
     *      0002000
     *      0000000
     *      0000000
     *      1000001  */
filtL6plc0d = (STREL *) calloc (1, sizeof (STREL));
filtL6plc0d->nx = 7;
filtL6plc0d->ny = 7;
filtL6plc0d->cx = 3;   /* center pixel */
filtL6plc0d->cy = 3;
filtL6plc0d->data = matrix(filtL6plc0d->nx, filtL6plc0d->ny);
filtL6plc0d->data[0][0] = 1;
filtL6plc0d->data[0][6] = 1;
filtL6plc0d->data[3][3] = 2;
filtL6plc0d->data[6][0] = 1;
filtL6plc0d->data[6][6] = 1;

/* pattern match for 1 cycle, wideBP, halftone frequency 6 pix/cycle,
     *              rotation 18 degrees
     *      000000100
     *      000000000
     *      100000000
     *      000000000
     *      000020000
     *      000000000
     *      000000001
     *      000000000
     *      001000000  */
filtL6plc18d = (STREL *) calloc (1, sizeof (STREL));
filtL6plc18d->nx = 9;
filtL6plc18d->ny = 9;
filtL6plc18d->cx = 4;   /* center pixel */
filtL6plc18d->cy = 4;
filtL6plc18d->data = matrix(filtL6plc18d->nx, filtL6plc18d->ny);
filtL6plc18d->data[0][6] = 1;
```

```
filtL6plc18d->data[2][0] = 1;
filtL6plc18d->data[4][4] = 2;
filtL6plc18d->data[6][8] = 1;
filtL6plc18d->data[8][2] = 1;

/* pattern match for 1 cycle, wideBP, halftone frequency 6 pix/cycle,
     *                  rotation 31 degrees
     *      000001000
     *      000000000
     *      000000000
     *      100000000
     *      000020000
     *      000000001
     *      000000000
     *      000000000
     *      000100000    */
filtL6plc31d = (STREL *) calloc (1, sizeof (STREL));
filtL6plc31d->nx = 9;
filtL6plc31d->ny = 9;
filtL6plc31d->cx = 4;   /* center pixel */
filtL6plc31d->cy = 4;
filtL6plc31d->data = matrix(filtL6plc31d->nx, filtL6plc31d->ny);
filtL6plc31d->data[0][5] = 1;
filtL6plc31d->data[3][0] = 1;
filtL6plc31d->data[4][4] = 2;
filtL6plc31d->data[5][8] = 1;
filtL6plc31d->data[8][3] = 1;

/* pattern match for 1 cycle, wideBP, halftone frequency 6 pix/cycle,
     *                  rotation 45 degrees
     *      000010000
     *      000000000
     *      000000000
     *      000000000
     *      100020001
     *      000000000
     *      000000000
     *      000000000
     *      000010000    */
filtL6plc45d = (STREL *) calloc (1, sizeof (STREL));
filtL6plc45d->nx = 9;
filtL6plc45d->ny = 9;
filtL6plc45d->cx = 4;   /* center pixel */
filtL6plc45d->cy = 4;
filtL6plc45d->data = matrix(filtL6plc45d->nx, filtL6plc45d->ny);
filtL6plc45d->data[0][4] = 1;
filtL6plc45d->data[4][0] = 1;
filtL6plc45d->data[4][4] = 2;
filtL6plc45d->data[4][8] = 1;
filtL6plc45d->data[8][4] = 1;

/* pattern match for 1 cycle, wideBP, halftone frequency 7 pix/cycle,
     *                  rotation 8 degrees
     *      000000010
     *      100000000
     *      000000000
     *      000000000
     *      000020000
     *      000000000
     *      000000000
```

```
*       000000001
*       010000000   */
filtL7plc8d = (STREL *) calloc (1, sizeof (STREL));
filtL7plc8d->nx = 9;
filtL7plc8d->ny = 9;
filtL7plc8d->cx = 4;    /* center pixel */
filtL7plc8d->cy = 4;
filtL7plc8d->data = matrix(filtL7plc8d->nx, filtL7plc8d->ny);
filtL7plc8d->data[0][7] = 1;
filtL7plc8d->data[1][0] = 1;
filtL7plc8d->data[4][4] = 2;
filtL7plc8d->data[7][8] = 1;
filtL7plc8d->data[8][1] = 1;

/* pattern match for 1 cycle, wideBP, halftone frequency 7 pix/cycle,
     *                  rotation 34 degrees
     *      00000010000
     *      00000000000
     *      00000000000
     *      00000000000
     *      10000000000
     *      00000200000
     *      00000000001
     *      00000000000
     *      00000000000
     *      00000000000
     *      00001000000    */
filtL7plc34d = (STREL *) calloc (1, sizeof (STREL));
filtL7plc34d->nx = 11;
filtL7plc34d->ny = 11;
filtL7plc34d->cx = 5;    /* center pixel */
filtL7plc34d->cy = 5;
filtL7plc34d->data = matrix(filtL7plc34d->nx, filtL7plc34d->ny);
filtL7plc34d->data[0][6] = 1;
filtL7plc34d->data[4][0] = 1;
filtL7plc34d->data[5][5] = 2;
filtL7plc34d->data[6][10] = 1;
filtL7plc34d->data[10][4] = 1;

/* pattern match for 1 cycle, wideBP, halftone frequency 7 pix/cycle,
     *                  rotation 45 degrees
     *      00000100000
     *          00000 (4)
     *      10000200001
     *          00000 (4)
     *      00000100000    */
filtL7plc45d = (STREL *) calloc (1, sizeof (STREL));
filtL7plc45d->nx = 11;
filtL7plc45d->ny = 11;
filtL7plc45d->cx = 5;    /* center pixel */
filtL7plc45d->cy = 5;
filtL7plc45d->data = matrix(filtL7plc45d->nx, filtL7plc45d->ny);
filtL7plc45d->data[0][5] = 1;
filtL7plc45d->data[5][0] = 1;
filtL7plc45d->data[5][5] = 2;
filtL7plc45d->data[5][10] = 1;
filtL7plc45d->data[10][5] = 1;

/* pattern match for 1 cycle, wideBP, halftone frequency 8 pix/cycle,
     *                  rotation 0 degrees.
```

```
*       100000001
*        00000 (3)
*       000020000
*        00000 (3)
*       100000001   */
filtL8plc0d = (STREL *) calloc (1, sizeof (STREL));
filtL8plc0d->nx = 9;
filtL8plc0d->ny = 9;
filtL8plc0d->cx = 4;   /* center pixel */
filtL8plc0d->cy = 4;
filtL8plc0d->data = matrix(filtL8plc0d->nx, filtL8plc0d->ny);
filtL8plc0d->data[0][0] = 1;
filtL8plc0d->data[0][8] = 1;
filtL8plc0d->data[4][4] = 2;
filtL8plc0d->data[8][0] = 1;
filtL8plc0d->data[8][8] = 1;

/* pattern match for 1 cycle, wideBP, halftone frequency 8 pix/cycle,
     *                       rotation 14 degrees
     *      00000000100
     *      00000000000
     *      10000000000
     *      00000000000
     *      00000000000
     *      00000200000
     *      00000000000
     *      00000000000
     *      00000000001
     *      00000000000
     *      00100000000   */
filtL8plc14d = (STREL *) calloc (1, sizeof (STREL));
filtL8plc14d->nx = 11;
filtL8plc14d->ny = 11;
filtL8plc14d->cx = 5;   /* center pixel */
filtL8plc14d->cy = 5;
filtL8plc14d->data = matrix(filtL8plc14d->nx, filtL8plc14d->ny);
filtL8plc14d->data[0][8] = 1;
filtL8plc14d->data[2][0] = 1;
filtL8plc14d->data[5][5] = 2;
filtL8plc14d->data[8][10] = 1;
filtL8plc14d->data[10][2] = 1;

/* pattern match for 1 cycle, wideBP, halftone frequency 8 pix/cycle,
     *                       rotation 23 degrees.
     *      00000001000
     *      00000000000
     *      00000000000
     *      10000000000
     *      00000000000
     *      00000200000
     *      00000000000
     *      00000000001
     *      00000000000
     *      00000000000
     *      00010000000   */
filtL8plc23d = (STREL *) calloc (1, sizeof (STREL));
filtL8plc23d->nx = 11;
filtL8plc23d->ny = 11;
filtL8plc23d->cx = 5;   /* center pixel */
filtL8plc23d->cy = 5;
```

```
filtL8p1c23d->data = matrix(filtL8p1c23d->nx, filtL8p1c23d->ny);
filtL8p1c23d->data[0][7] = 1;
filtL8p1c23d->data[3][0] = 1;
filtL8p1c23d->data[5][5] = 2;
filtL8p1c23d->data[7][10] = 1;
filtL8p1c23d->data[10][3] = 1;

/* pattern match for 1 cycle, wideBP, halftone frequency 8 pix/cycle,
     *                   rotation 45 degrees.
     *       0000001000000
     *          000000 (5)
     *       1000002000001
     *          000000 (5)
     *       0000001000000   */
filtL8p1c45d = (STREL *) calloc (1, sizeof (STREL));
filtL8p1c45d->nx = 13;
filtL8p1c45d->ny = 13;
filtL8p1c45d->cx = 6;   /* center pixel */
filtL8p1c45d->cy = 6;
filtL8p1c45d->data = matrix(filtL8p1c45d->nx, filtL8p1c45d->ny);
filtL8p1c45d->data[0][6] = 1;
filtL8p1c45d->data[6][0] = 1;
filtL8p1c45d->data[6][6] = 2;
filtL8p1c45d->data[6][12] = 1;
filtL8p1c45d->data[12][6] = 1;

HTLFiltArray = (STREL **) calloc (N_HTL_FILT, sizeof (STREL *));
HTLFiltArray[0]  = filtL3p1c18d;
HTLFiltArray[1]  = filtL3p1c45d;
HTLFiltArray[2]  = filtL4p1c0d;
HTLFiltArray[3]  = filtL4p1c27d;
HTLFiltArray[4]  = filtL4p1c45d;
HTLFiltArray[5]  = filtL5p1c11d;
HTLFiltArray[6]  = filtL6p1c0d;
HTLFiltArray[7]  = filtL6p1c18d;
HTLFiltArray[8]  = filtL6p1c31d;
HTLFiltArray[9]  = filtL6p1c45d;
HTLFiltArray[10] = filtL7p1c8d;
HTLFiltArray[11] = filtL7p1c34d;
HTLFiltArray[12] = filtL7p1c45d;
HTLFiltArray[13] = filtL8p1c0d;
HTLFiltArray[14] = filtL8p1c14d;
HTLFiltArray[15] = filtL8p1c23d;
HTLFiltArray[16] = filtL8p1c45d;

HTFiltArray = (STREL **) calloc (N_HT_FILT, sizeof (STREL *));
HTFiltArray[0]  = filtC4p2c0d;
HTFiltArray[1]  = filtC4p2c0dI;
HTFiltArray[2]  = filtC4p2c14d;
HTFiltArray[3]  = filtC4p2c27d;
HTFiltArray[4]  = filtC4p2c45d;
HTFiltArray[5]  = filtC5p2c0d;
HTFiltArray[6]  = filtC5p2c22d;
HTFiltArray[7]  = filtC5p2c37d;
HTFiltArray[8]  = filtC6p2c0d;
HTFiltArray[9]  = filtC6p2c18d;
HTFiltArray[10] = filtC6p2c31d;
HTFiltArray[11] = filtC6p2c45d;
HTFiltArray[12] = filtC7p2c0d;
HTFiltArray[13] = filtC7p2c27d;
```

```
    HTFiltArray[14] = filtC7p2c45d;
    HTFiltArray[15] = filtC8p2c0d;
    HTFiltArray[16] = filtC8p2c23d;
    HTFiltArray[17] = filtC8p2c45d;
}
/***********************************************
 * Copyright (c) 1988, Xerox Corporation. All rights reserved. *
    Copyright protection claimed includes all forms and matters
    of copyrightable material and information now allowed by
    statutory or judicial law or hereafter granted, including
    without limitation, material generated from the software
    programs which are displayed on the screen such as icons,
    screen display looks, etc.
 ***********************************************/

/*
 * integerOpsAlp.c--includes subroutines
 *              intStatsMenuProc()
 *              intStatsCmd()
 *              graphStats()
 *           --contains procedures that map from the
 *                  image to other domains:
 *              equalPr()   returns 1 if two pr are identical; 2 args.
 *              equalPrA()  returns 1 if two pr are identical; 3 args.
 *              equalPrD()  returns 1 if two pr are identical; 2 args.
 *              zeroPr()    returns 1 if pr is zero
 *              numberPr()  returns number of ON pixels
 *                              or number of non-zero words
 *              makeSumPixelTab()
 *              sumPixels()
 *              onPixelsInRow()
 *              onPixelsInEachRow()
 *              extremeOnPixelInRow()
 */ include <stdio.h>
include <llama.h>
#include <imageReps.h>
#include "alp.h"
#include "morph.h"
#include "alpStrels.h"
#include "graphA.h"

#define  FAST_PIXEL_COUNT       1
define  SLOW_PIXEL_COUNT       0 define  ROW_SUMS               0
define  COLUMN_SUMS            1
#define  ROW_TRANSITIONS        2
define  COLUMN_TRANSITIONS     3 static unsigned short int   *tabSumPixel = NULL;
static unsigned short int   *sumRowPixels = NULL;
static unsigned short int   *sumColumnPixels = NULL;
static unsigned short int   *sumRowTransPixels = NULL;
static unsigned short int   *sumColTransPixels = NULL;
static int                  scanlines, bytesPerLine;
static char                 message[50];

void
intStatsMenuProc(item, event)
```

```
Panel_item     item;
Event          *event;
{
int            selection;
static Menu    intStatsMenu;
void           intStatsCmd();

if (!intStatsMenu)
        intStatsMenu = menu_create(MENU_STRINGS,
                                "Is pr zero?",
                                "Count pixels in pr",
                                "Count non-zero words in pr",
                                "Compute new integer stats",
                                "Show row pixel stats",
                                "Show column pixel stats",
                                "Show row transition stats",
                                "Show column transition stats", 0,
                            0);

selection = (int) menu_show(intStatsMenu, mainControlPanel, event, 0);
    intStatsCmd(item, selection, event);
}

/*
 * intStatsCmd():  computes or shows integer statistics for a pixrect.
 */
void
intStatsCmd(intStatsItem, selection, event)
Panel_item      intStatsItem;
int             selection;
Event           *event;
{
int             i, n;

if (!selection)
        return;

if (!chosenPixrect)
    {
        strcpy(message, "  No chosen pixrect!");
        textsw_insert(mainTextSw, message, strlen(message));
        return;
    } switch (selection)
    {   /* Choose integer operations on pixrects */
    case 1:  /* Is pr = 0 */
        if (zeroPr(chosenPixrect))
        {
            strcpy(message, "\n  Pixrect has no ON pixels\n");;
            textsw_insert(mainTextSw, message, strlen(message));
        }
        else
        {
            strcpy(message, "\n  Pixrect has ON pixels\n");;
            textsw_insert(mainTextSw, message, strlen(message));
        }
        break;
    case 2:  /* Count pixels in pr */
        n = numberPr(chosenPixrect, PIXELS);
        sprintf(message, "\n %d ON pixels in pixrect\n", n);
        textsw_insert(mainTextSw, message, strlen(message));
```

```
            break;
    case 3:  /* Count non-zero words in pr */
        n = numberPr(chosenPixrect, WORDS);
        sprintf(message, "\n %d non-zero words in pixrect\n", n);
        textsw_insert(mainTextSw, message, strlen(message));
        break;
    case 4:  /* Compute integer stats */
        sumPixels(chosenPixrect);
        break;
    case 5:  /* Show row pixel stats */
        graphStats(ROW_SUMS);
        break;
    case 6:  /* Show column pixel byte stats */
        graphStats(COLUMN_SUMS);
        break;
    case 7:  /* Show row pixel transition stats */
        graphStats(ROW_TRANSITIONS);
        break;
    case 8:  /* Show column pixel transition stats */
        graphStats(COLUMN_TRANSITIONS);
        break;
    default:
        printf(" Error in intStatsCmd: unknown selection\n");
    } textsw_insert(mainTextSw, message, strlen(message));
}

/*
 *  graphStats():   plots specified row or column statistics
 *                  assumes that there exist global variables:
 *                      chosenPixrect, chosenPixwin
 *                  if there is no chosenPixwin, then it takes
 *                      statistics from the chosenPixrect.
 */
graphStats(type)
int         type;
{
int         i;
DATA        *data, *graphInit();
static char procName[] = "graphStats";

if (!isPrDefined(chosenPixrect))
        return;

if (type == ROW_SUMS)
    {
        data = graphInit();
        graphPutTitle(data, "Sum of ON pixels in each row");
        if (!sumRowPixels)
            sumPixels(chosenPixrect);
        for (i = 0; i < scanlines; i++)
            graphPutData(data, i, sumRowPixels[i]);
    }
    else if (type == COLUMN_SUMS)
    {
        data = graphInit();
        graphPutTitle(data, "Sum of ON pixels in each byte column");
```

```
            if (!sumColumnPixels)
                sumPixels(chosenPixrect);
            for (i = 0; i < bytesPerLine; i++)
                graphPutData(data, i, sumColumnPixels[i]);
        }
        else if (type == ROW_TRANSITIONS)
        {
            data = graphInit();
            graphPutTitle(data, "Sum of pixel transitions in each row");
            if (!sumRowTransPixels)
                sumPixels(chosenPixrect);
            for (i = 0; i < scanlines; i++)
                graphPutData(data, i, sumRowTransPixels[i]);
        }
        else if (type == COLUMN_TRANSITIONS)
        {
            data = graphInit();
            graphPutTitle(data, "Sum of pixel transitions in each byte column");
            if (!sumColTransPixels)
                sumPixels(chosenPixrect);
            for (i = 0; i < bytesPerLine; i++)
                graphPutData(data, i, sumColTransPixels[i]);
        } graphMake(data);
}

/*
 * equalPr():   returns 1 if the two pixrects are identical; zero otherwise.
 *              creates a temporary pixrect.
 */
int
equalPr(pixr1, pixr2)
Pixrect         *pixr1, *pixr2;
{
int             w, h, eq;
Pixrect         *prT;
static char     procName[] = "equalPr";

if (!isPrDefined(pixr1, procName))
        return;
    if (!isPrDefined(pixr2, procName))
        return;

w = pixr2->pr_size.x;
    h = pixr2->pr_size.y;
    prT = mem_create(w, h, 1);
    if (!prT)
    {
        printf(" Error in equalPr: pixrect not created\n");
        return;
    } opPrPr(prT, pixr2, COPY);
    pr_rop(prT, 0, 0, pixr1->pr_size.x, pixr1->pr_size.y,
            OP_XOR, pixr1, 0, 0);

eq = zeroPr(prT);
    pr_close(prT);
```

```
    return eq;
}

/*
 *  equalPrA():  returns 1 if the two pixrects are identical; zero otherwise.
 *               accepts an auxiliary pixrect as an argument.
 */
int
equalPrA(pixr1, pixr2, pixrI)
Pixrect     *pixr1, *pixr2, *pixrI;
{
static char    procName[] = "equalPrA";

if (!isPrDefined(pixr1, procName))
        return;
    if (!isPrDefined(pixr2, procName))
        return;
    if (!isPrDefined(pixrI, procName))
        return;

opPrPr(pixrI, pixr2, COPY);
    pr_rop(pixrI, 0, 0, pixr1->pr_size.x, pixr1->pr_size.y,
           OP_XOR, pixr1, 0, 0);

return (zeroPr(pixrI));
}

/*
 *  equalPrD():  returns 1 if the two pixrects are identical; zero otherwise.
 *               destructive version: alters the contents of pixr2.
 */
int
equalPrD(pixr1, pixr2)
Pixrect     *pixr1, *pixr2;
{
static char    procName[] = "equalPrD";

if (!isPrDefined(pixr1, procName))
        return;
    if (!isPrDefined(pixr2, procName))
        return;

pr_rop(pixr2, 0, 0, pixr1->pr_size.x, pixr1->pr_size.y,
           OP_XOR, pixr1, 0, 0);

return (zeroPr(pixr2));
}

/*
 *  zeroPr():   returns 1 if the pixrect is zero; returns 0 otherwise.
 */
int
zeroPr(pixr)
Pixrect                 *pixr;
{
int                     i, w, h, dataWords;
unsigned short int      *data;
```

```
static char            procName[] = "zeroPr";

if (!isPrDefined(pixr, procName))
        return;

w = pixr->pr_size.x;
    h = pixr->pr_size.y;
    dataWords = (prBytesPerLine(pixr) >> 1) * h;
    data = (unsigned short int *) mpr_d(pixr)->md_image;
    for (i = 0; i < dataWords; i++)
        if (data[i]) return(0);

return(1);
}

/*
 * numberPr():    returns either the number of ON pixels in the pixrect
 *                or the number of non-zero words, depending on
 *                the value of type.
 */
int
numberPr(pixr, type)
Pixrect                *pixr;
int                    type;
{
int                    i, j, w, h, dataWords, dataBytes, num;
register int           byteOff, index;
register unsigned char *bytePtr;
unsigned short int     *data;
static char            procName[] = "numberPr";

if (!isPrDefined(pixr, procName))
        return;

w = pixr->pr_size.x;
    h = pixr->pr_size.y;
    dataBytes = prBytesPerLine(pixr) * h;
    dataWords = dataBytes >> 1;
    num = 0;
    data = (unsigned short int *) mpr_d(pixr)->md_image;
    bytePtr = (unsigned char *) mpr_d(pixr)->md_image;
    if (type == PIXELS)
#if FAST_PIXEL_COUNT
    {
        if (tabSumPixel == NULL)
            makeSumPixelTab();
        byteOff = 0;
        for (i = 0; i < dataBytes; i++)
        {
            index = *(bytePtr + byteOff);
            byteOff++;
            num += tabSumPixel[(int) index];
        }
    }
#endif FAST_PIXEL_COUNT
#if SLOW_PIXEL_COUNT
    {
        for (i = 0; i < dataWords; i++)
            if (data[i])
```

```
                for (j = 0; j < 16; j++)
                    if (data[i] & wmask[j])
                        num++;
        }
#endif SLOW_PIXEL_COUNT
    else if (type == WORDS)
        for (i = 0; i < dataWords; i++)
            if (data[i])   /* there exists at least one non-zero bit
                            * in the word */
                num++;

return(num);
}

/*
 *  makeSumPixelTab()
 */
makeSumPixelTab()
{
int     p[8];
int     i, t, d, iStart, k;

if (tabSumPixel)  /* already exists; don't do anything */
        return;

/* allocate */
    tabSumPixel = (unsigned short int *) calloc (256, sizeof(short int));

/* initialize power table */
    p[0] = 1;
    for (i = 1; i < 8; i++)
        p[i] = 2 * p[i - 1];

/* make table returning sum of ON pixels in a byte */
    tabSumPixel[0] = (unsigned short int) 0;
    i = 1;
    for (d = 0; d < 8; d++)
    {
        iStart = p[d];
        if (i != iStart)
            printf(" Error: i = %d; iStart = %d\n", i, iStart);
        for (k = 0; k < iStart; k++)
            tabSumPixel[i++] = (unsigned short int) (1 + tabSumPixel[k]);
    }
}

/*
 *  sumPixels():   allocates storage, computes the number of ON pixels
 *                 in each row, the number of ON pixels in each
 *                 byte column, and the number of ON-OFF or OFF-ON
 *                 pixel transitions in each row.
 */
int
sumPixels(pixr)
Pixrect                 *pixr;
{
int                     w, h, i, j, num;
register int            byteOff, index, Bpl;
```

```
register unsigned char    *bytePtr;
Pixrect                   *prT1, *prT2;
static char                procName[] = "sumPixels";

if (!isPrDefined(pixr, procName))
        return;

w = pixr->pr_size.x;
    h = pixr->pr_size.y;
    Bpl = prBytesPerLine(pixr);
    bytePtr = (unsigned char *) mpr_d(pixr)->md_image;

if (tabSumPixel == NULL)
        makeSumPixelTab();

if (sumRowPixels)
        free (sumRowPixels);
    if (sumColumnPixels)
        free (sumColumnPixels);
    if (sumRowTransPixels)
        free (sumRowTransPixels);
    if (sumColTransPixels)
        free (sumColTransPixels);

scanlines = h;
    bytesPerLine = Bpl;
    sumRowPixels = (unsigned short int *) calloc(h,
            sizeof(unsigned short int));
    sumColumnPixels = (unsigned short int *) calloc(Bpl,
            sizeof(unsigned short int));
    sumRowTransPixels = (unsigned short int *) calloc(h,
            sizeof(unsigned short int));
    sumColTransPixels = (unsigned short int *) calloc(Bpl,
            sizeof(unsigned short int));

/* find the number of ON pixels in each row */
    byteOff = 0;
    for (i = 0; i < h; i++)
    {
        num = 0;
        for (j = 0; j < Bpl; j++)
        {
            index = *(bytePtr + byteOff);
            byteOff++;
            num += tabSumPixel[(int) index];
        }
        sumRowPixels[i] = num;
    }

/* find the number of ON pixels in each column byte */
    for (i = 0; i < Bpl; i++)
    {
        num = 0;
        byteOff = i;
        for (j = 0; j < h; j++)
        {
            index = *(bytePtr + byteOff);
            byteOff += Bpl;
            num += tabSumPixel[(int) index];
        }
```

```
            sumColumnPixels[i] = num;
    }

/*  Find the number of pixels transitions in each row.
         *     Note that single pixel runs only get counted once, but this
         *     matters little, because single pixel runs are relatively
         *     rare.  They can be found by using ERODE with SE=strel3h1  */
    prT1 = mem_create(w, h, 1);
    prT2 = mem_create(w, h, 1);
    if (!prT1 || !prT2)
    {
        printf(" Error in sumPixels: pixrect create failure\n");
        return;
    }
    erode(prT1, pixr, strel3h);
    logOp(prT2, pixr, prT1, XOR);
    bytePtr = (unsigned char *) mpr_d(prT2)->md_image;
    byteOff = 0;
    for (i = 0; i < h; i++)
    {
        num = 0;
        for (j = 0; j < Bpl; j++)
        {
            index = *(bytePtr + byteOff);
            byteOff++;
            num += tabSumPixel[(int) index];
        }
        sumRowTransPixels[i] = num;
    }

/*  Find the number of pixels transitions in each byte of columns.
         *     Note that single pixel runs only get counted once, but this
         *     matters little, because single pixel runs are relatively
         *     rare.  They can be found by using ERODE with SE=strel3v1  */
    erode(prT1, pixr, strel3v);
    logOp(prT2, pixr, prT1, XOR);
    bytePtr = (unsigned char *) mpr_d(prT2)->md_image;
    for (i = 0; i < Bpl; i++)
    {
        num = 0;
        byteOff = i;
        for (j = 0; j < h; j++)
        {
            index = *(bytePtr + byteOff);
            byteOff += Bpl;
            num += tabSumPixel[(int) index];
        }
        sumColTransPixels[i] = num;
    }
    pr_close(prT1);
    pr_close(prT2);
}

/*
 *  onPixelsInRow():
 */
onPixelsInRow(pixr, row)
Pixrect                         *pixr;
int                             row;
```

```
{
int                         Bpl, byteOff, num, j;
int                         index;
unsigned char               *bytePtr;
static char                 procName[] = "onPixelsInRow";

if (!isPrDefined(pixr, procName))
        return -1;

if (row >= pixr->pr_size.y)
        return -1;

if (tabSumPixel == NULL)
        makeSumPixelTab();

Bpl = prBytesPerLine(pixr);
    bytePtr = (unsigned char *) mpr_d(pixr)->md_image;
    byteOff = Bpl * row;
    num = 0;
    for (j = 0; j < Bpl; j++)
    {
        index = *(bytePtr + byteOff);
        byteOff++;
        num += tabSumPixel[(int) index];
    }
    return num;
}

/*
 * onPixelsInEachRow(pixr, array)
 */
onPixelsInEachRow(pixr, array)
Pixrect                 *pixr;
unsigned short int      *array;
{
int             h, Bpl, byteOff, num, i, j;
int             index;
unsigned char   *bytePtr;
static char     procName[] = "onPixelsInEachRow";

if (!isPrDefined(pixr, procName))
        return -1;

if (!array)
        return -1;

if (tabSumPixel == NULL)
        makeSumPixelTab();

/* find the number of ON pixels in each row */
    h = pixr->pr_size.y;
    Bpl = prBytesPerLine(pixr);
    bytePtr = (unsigned char *) mpr_d(pixr)->md_image;
    byteOff = 0;
    for (i = 0; i < h; i++)
    {
        num = 0;
        for (j = 0; j < Bpl; j++)
        {
```

```
            index = *(bytePtr + byteOff);
            byteOff++;
            num += tabSumPixel[(int) index];
        }
        array[i] = (unsigned short int) num;
    }
}

/*
*   extremeOnPixelInRow():  Returns the x-coordinate of either
*                               (i) the first ON pixel in the row, or
*                               (ii) the last ON pixel in the row, or
*                               (iii) -1 on error.
*                           "which" is either FIRST or LAST
*/
extremeOnPixelInRow(pixr, row, which)
Pixrect                 *pixr;
int                     row, which;
{
int                 foundFlag;
int                 Bpl, byteOff, j, jStart, i;
unsigned char       *bytePtr, byte;
static char         procName[] = "extremeOnPixelInRow";

if (!isPrDefined(pixr, procName))
        return -1;

if (row >= pixr->pr_size.y)
        return -1;

foundFlag = FALSE;

/* find the first or last byte with ON pixel(s) */
    Bpl = prBytesPerLine(pixr);
    bytePtr = (unsigned char *) mpr_d(pixr)->md_image;
    if (which == FIRST)    /* first byte */
    {
        byteOff = Bpl * row;
        for (j = 0; j < Bpl; j++)
        {
            byte = *(bytePtr + byteOff);
            if (byte)
            {
                foundFlag = TRUE;
                break;
            }
            byteOff++;
        }
    }
    else   /* last byte */
    {
        byteOff = Bpl * (row + 1) - 1;
        for (j = Bpl - 1; j >= 0; j--)
        {
            byte = *(bytePtr + byteOff);
            if (byte)
            {
                foundFlag = TRUE;
                break;
```

```
            }
            byteOff--;
        }
    } if (!foundFlag)
        return (-1);

jStart = 8 * j;    /* bit position of start of byte with first ON pixel */
    if (which == FIRST)   /* search for first ON bit: left to right */
        for (i = 0; i < 8; i++)
        {
            if (byte & mask8[i])
                return (jStart + i);
        }
    else    /* search for first ON bit: right to left */
        for (i = 7; i >= 0; i--)
            if (byte & mask8[i])
                return (jStart + i);

printf(" Error in extremeOnPixelInRow: shouldn't have reached here\n");
    return -1;
}

/****************************************************************
 * Copyright (c) 1988, Xerox Corporation.  All rights reserved.  *
 * Copyright protection claimed includes all forms and matters   *
 * of copyrightable material and information now allowed by      *
 * statutory or judicial law or hereafter granted, including     *
 * without limitation, material generated from the software      *
 * programs which are displayed on the screen such as icons,     *
 * screen display looks, etc.                                    *
 ****************************************************************/

/*
 * scale.c: contains subroutines for
 *              (1) thresholded reduction:
 *                   --reduceImToIm()
 *                   --reducePrToIm()
 *                   --reducePr()
 *                   --reducePr2()
 *                   --redOpF()
 *                   --redFastColumns()
 *                   --makeLookupTables()
 *                   --redOp()
 *              (2) fast and slow expansion
 *                   --expandPr2()
 *                   --expOpF()
 *                   --expFastColumns()
 *                   --expandPr2S()
 *              (3) set globals
 *                   --setThresholdLevel()
 *
 *       Note:  redOp() uses only rasterOps
 *              redOpF() uses rasterOps for rows and table lookup for columns.
 */ include <stdio.h>
include <llama.h>
#include <imageReps.h>
#include <imageGlobals.h>
#include "alp.h"
#include "morph.h"
```

```
#define  OR        1
#define  AND       2
#define  OR_OR     1
#define  OR_AND    2
#define  AND_OR    3
define  AND_AND   4 static unsigned char       *tabOr, *tabAnd;
static unsigned short int  *tabExp2;
```

/*****************************************************
 *       Reduction procedures
 *****************************************************/
/*
 *  reduceImToIm():  Returns reduced image from a source image.
 *                   level = {1, 2, 3, 4} == {.25, .5, .75, 1.0} black
 *                   returns NULL on error.
 *                   This hasn't been tested, but because it differs from
 *                   reducePrToIm by only a line, it should be OK.
 */
```
IMAGE *
reduceImToIm(imIn, level)
IMAGE      *imIn;
int         level;
{
Pixrect    *pixrS, *pixrD, *imageToPrN(), *reducePr();
IMAGE      *imOut, *pixrectToImageN();

pixrS = imageToPrN(imIn);
    pixrD = reducePr(pixrS, level);
    if (!pixrD)
    {
        printf(" Error in reduceImToIm:  returned Pr is NULL\n");
        return (NULL);
    } imOut = pixrectToImageN(pixrD);
    pr_close (pixrS);
    pr_close (pixrD);

return (imOut);
}
```

/*
 *  reducePrToIm():  Returns reduced image from Pixrect.
 *                   level = {1, 2, 3, 4} == {.25, .5, .75, 1.0} black
 *                   returns NULL on error.
 */
```
IMAGE *
reducePrToIm(pixrS, level)
Pixrect    *pixrS;
int         level;
{
Pixrect    *pixrD, *reducePr();
IMAGE      *im, *pixrectToImageN();

pixrD = reducePr(pixrS, level);
    if (!pixrD)
    {
```

```
            printf(" Error in reducePrToIm:  returned Pr is NULL\n");
            return (NULL);
    } im = pixrectToImageN(pixrD);
    pr_close (pixrD);

return (im);
}

/*
 *  reducePr():   Returns reduced pixrect such that each pixel is ON
 *                    if at least 'level' of the four corresponding
 *                    source pixels is ON.
 *                Makes lookup tables if not already done.
 *                Uses redOpF (with table look-up) for speed.
 */
Pixrect *
reducePr(pixrS, level)
Pixrect         *pixrS;
int             level;
{
Pixrect         *pixrD, *pixrDAux;
int             wS, hS, wD, hD;
int             error1, error2;
static char     procName[] = "reducePr";

if (!isPrDefined(pixrS, procName))
        return (NULL);

wS = pixrS->pr_size.x;
    hS = pixrS->pr_size.y;
    pixrDAux = NULL;
    pixrD = mem_create(wS/2, hS/2, 1);   /* a half-height, half-width pr */
    if (!isPrDefined(pixrD, procName))
        return (NULL);

if (!tabAnd || !tabOr)
        makeLookupTables();

error1 = error2 = 0;
    wD = wS/2;
    hD = hS/2;

if (level == 1)
        error1 = redOpF(pixrD, pixrS, OR_OR);
    else if (level == 2)
    {
        error1 = redOpF(pixrD, pixrS, OR_AND);
        pixrDAux = mem_create(wS/2, hS/2, 1);   /* a half-ht, half-width pr */
        error2 = redOpF(pixrDAux, pixrS, AND_OR);
        pr_rop(pixrD, 0, 0, wD, hD, OP_HU, pixrDAux, 0, 0);
    }
    else if (level == 3)
    {
        error1 = redOpF(pixrD, pixrS, OR_AND);
        pixrDAux = mem_create(wS/2, hS/2, 1);   /* a half-ht, half-width pr */
        error2 = redOpF(pixrDAux, pixrS, AND_OR);
        pr_rop(pixrD, 0, 0, wD, hD, OP_HI, pixrDAux, 0, 0);
    }
    else if (level == 4)
        error1 = redOpF(pixrD, pixrS, AND_AND);
```

```
        if (pixrDAux)
            pr_close(pixrDAux);

if (error1 || error2)
            return (NULL);
        else
            return (pixrD);
}

/*
 *  reducePr2():   Takes an input pixrect and a reduced output pixrect,
 *                 and returns in the reduced pixrect an image
 *                 such that each pixel is ON
 *                 if at least 'level' of the four corresponding
 *                 pixels in the input pixrect is ON.
 *                 Makes lookup tables if not already done.
 *                 Uses redOpF (with table look-up) for speed.
 */
reducePr2(pixrD, pixrS, level)
Pixrect         *pixrD, *pixrS;
int             level;
{
Pixrect         *pixrDAux;
int             wS, hS, wD, hD;
int             error1, error2;
static char     procName[] = "reducePr2";

if (!isPrDefined(pixrS, procName))
        return 1;
    if (!isPrDefined(pixrD, procName))
        return 1;

wS = pixrS->pr_size.x;
    hS = pixrS->pr_size.y;
    wD = pixrD->pr_size.x;
    hD = pixrD->pr_size.y;
    if (wS != 2*wD || hS != 2*hD)
    {
        printf("Error in reducePr2: pixrect sizes incorrect\n");
        return 1;
    } if (!tabAnd || !tabOr)
        makeLookupTables();

pixrDAux = NULL;
    error1 = error2 = 0;

if (level == 1)
        error1 = redOpF(pixrD, pixrS, OR_OR);
    else if (level == 2)
    {
        error1 = redOpF(pixrD, pixrS, OR_AND);
        pixrDAux = mem_create(wS/2, hS/2, 1);   /* a half-ht, half-width pr */
        error2 = redOpF(pixrDAux, pixrS, AND_OR);
        pr_rop(pixrD, 0, 0, wD, hD, OP_HU, pixrDAux, 0, 0);
    }
    else if (level == 3)
    {
        error1 = redOpF(pixrD, pixrS, OR_AND);
        pixrDAux = mem_create(wS/2, hS/2, 1);   /* a half-ht, half-width pr */
```

```
        error2 = redOpF(pixrDAux, pixrS, AND_OR);
        pr_rop(pixrD, 0, 0, wD, hD, OP_HI, pixrDAux, 0, 0);
    }
    else if (level == 4)
        error1 = redOpF(pixrD, pixrS, AND_AND);

if (pixrDAux)
        pr_close(pixrDAux);

if (error1 || error2)
        return 1;
    else
        return 0;
}

/*
 * redOpF: Fills the reduced destination pixrect with data of
 *           the type specified by op.
 *         Fast version with table lookup.
 *         Two steps:  first combines adjacent rows of the source
 *              pixrect and writes into the intermediate pixrect;
 *              then uses table to convert each set of 16 adjacent bits
 *              of the intermediate pixrect into eight bits of the
 *              destination pixrect.
 *         Returns 0 if OK; 1 on error.
 */
redOpF(pixrD, pixrS, op)
Pixrect        *pixrD, *pixrS;
int            op;
{
int            wS, hS, wD, hD, j;
Pixrect        *pixrI;
static char    procName[] = "redOpF";

if (!isPrDefined(pixrS, procName))
        return 1;
    if (!isPrDefined(pixrD, procName))
        return 1;

wS = pixrS->pr_size.x;
    hS = pixrS->pr_size.y;
    wD = pixrD->pr_size.x;
    hD = pixrD->pr_size.y;
    if (wS != 2*wD || hS != 2*hD)
    {
        printf("Error in redOpF: pixrect sizes incorrect\n");
        return 1;
    } pixrI = mem_create(wS, hS/2, 1);  /* a half-height, full-width pr */
    if (!pixrI)
    {
        printf(" Error in redOpF: pixrI not created\n");
        return 1;
    } if (op == OR_OR)
    {
        for (j = 0; j < hD; j++)
        {
            pr_rop(pixrI, 0, j, wS, 1, OP_HC, pixrS, 0, 2*j);
```

```
                pr_rop(pixrI, 0, j, wS, 1, OP_HU, pixrS, 0, 2*j + 1);
        } if (redFastColumns(pixrD, pixrI, OR))
            return 1;
    }
    else if (op == OR_AND)
    {
        for (j = 0; j < hD; j++)
        {
            pr_rop(pixrI, 0, j, wS, 1, OP_HC, pixrS, 0, 2*j);
            pr_rop(pixrI, 0, j, wS, 1, OP_HU, pixrS, 0, 2*j + 1);
        } if (redFastColumns(pixrD, pixrI, AND))
            return 1;
    }
    else if (op == AND_OR)
    {
        for (j = 0; j < hD; j++)
        {
            pr_rop(pixrI, 0, j, wS, 1, OP_HC, pixrS, 0, 2*j);
            pr_rop(pixrI, 0, j, wS, 1, OP_HI, pixrS, 0, 2*j + 1);
        } if (redFastColumns(pixrD, pixrI, OR))
            return 1;
    }
    else if (op == AND_AND)
    {
        for (j = 0; j < hD; j++)
        {
            pr_rop(pixrI, 0, j, wS, 1, OP_HC, pixrS, 0, 2*j);
            pr_rop(pixrI, 0, j, wS, 1, OP_HI, pixrS, 0, 2*j + 1);
        } if (redFastColumns(pixrD, pixrI, AND))
            return 1;
    }
    else
    {
        printf(" Error in redOpF: unknown operators\n");
        return 1;
    } pr_close (pixrI);
    return 0;
}

/*
 *    redFastColumns():   uses lookup tables to reduce the number of
 *                        columns by a factor of 2 in going from the
 *                        source pixrect to the destination pixrect.
 *                        checks that relative sizes of source and destination
 *                            pixrects are correct.
 *                        depending on the line padding, the pixrect data
 *                            is either stored in short ints or in 32-bit ints.
 *                        returns 0 (or 1 on error).
 */
redFastColumns(pixrD, pixrS, op)
Pixrect              *pixrD, *pixrS;
```

```c
                        int                 op;
{
    int                 wS, hS, wD, hD, j, prSWpl, prDBpl;
    register            i, sWord, dByte;
    unsigned short int  *pS, index;
    unsigned char       *pD, *tab;
    static char         procName[] = "redFastColumns";

if (!isPrDefined(pixrS, procName))
        return 1;
    if (!isPrDefined(pixrD, procName))
        return 1;

wS = pixrS->pr_size.x;
    hS = pixrS->pr_size.y;
    wD = pixrD->pr_size.x;
    hD = pixrD->pr_size.y;
    prSWpl = prBytesPerLine(pixrS) >> 1;
    prDBpl = prBytesPerLine(pixrD);      /* Note that prDBpl >= prSWpl */
    if ((wD != ((wS + 1) >> 1)) || (hD != hS))
    {
        printf("Error in redFastColumns: pixrect sizes incorrect\n");
        return 1;
    }
    pS = (unsigned short int *) mpr_d(pixrS)->md_image;
    pD = (unsigned char *) mpr_d(pixrD)->md_image;

if (op == OR)
        tab = tabOr;
      else if (op == AND)
        tab = tabAnd;
      else
        printf(" Error in redFastColumns: unknown operation\n");

dByte = 0;
    for (j = 0; j < hS; j++)
    {
        sWord = j * prSWpl;
        for (i = 0; i < prSWpl; i++)
        {
                /* obtain 16 bits from the source */
            index = *(pS + sWord);
            sWord++;
                /* get the corresponding 8 bits from the table,
                 * and put it in the destination byte */
            *(pD + dByte) = tab[index];
            dByte++;
        }
            /* Note that i for the row just completed has been incremented,
             *   and it now gives the number of bytes written to pixrD.
             * Write null bytes to pad pixrD */
        for (; i < prDBpl; i++)
        {
            *(pD + dByte) = '\0';
            dByte++;
        }
    } return 0;
}
```

```
/*
 * makeLookupTables():  Allocates and fills OR and AND tables
 *                          for column reduction.
 *                      Allocates and fills expansion table.
 */
makeLookupTables()
{
int     p[15], base[8];
int     i, d, r, k, iStart, tInc;

/* allocate */
    tabOr = (unsigned char *) calloc (256*256, 1);
    tabAnd = (unsigned char *) calloc (256*256, 1);
    tabExp2 = (unsigned short int *) calloc (256, sizeof(short int));

p[0] = 1;
    for (i = 1; i <= 14; i++)
        p[i] = 2 * p[i - 1];

/*  OR table */
    tabOr[0] = (unsigned char) 0;
    i = 1;
    for (d = 1; d <= 8; d++)
    {
        iStart = p[2 * d - 2];
        tInc = p[d - 1];
        if (i != iStart)
            printf(" Error: i = %d; iStart = %d\n", i, iStart);
        for (r = 1; r <= 3; r++)
            for (k = 0; k < iStart; k++)
                tabOr[i++] = (unsigned char) ((int)tabOr[k] + tInc);
    }

/*  AND table */
    tabAnd[0] = (unsigned char) 0;
    i = 1;
    for (d = 1; d <= 8; d++)
    {
        iStart = p[2 * d - 2];
        if (i != iStart)
            printf(" Error: i = %d; iStart = %d\n", i, iStart);
        for (r = 1; r <= 3; r++)
        {
            if (r < 3)
                tInc = 0;
            else
                tInc = p[d - 1];
            for (k = 0; k < iStart; k++)
                tabAnd[i++] = (unsigned char) ((int)tabAnd[k] + tInc);
        }
    }

/*  for (d = 0; d < 15; d++)
    {
        for (i = p[d]; i < p[d] + 6; i++)
            printf(" tabOr[%d] = %d; tabAnd[%d] = %d\n",
                    i, tabOr[i], i, tabAnd[i]);
        for (i = p[d]; i > p[d] - 6; i--)
            printf(" tabOr[%d] = %d; tabAnd[%d] = %d\n",
                    i, tabOr[i], i, tabAnd[i]);
    } */
```

```
        base[0] = 3;
        for (i = 1; i < 8; i++)
            base[i] = p[2 * i] * base[0];

/* Expansion table */
        tabExp2[0] = 0;
        i = 1;
        for (d = 0; d < 8; d++)
        {
            iStart = p[d];
            if (i != iStart)
                printf(" Error: i = %d; iStart = %d\n", i, iStart);
            for (k = 0; k < iStart; k++)
                tabExp2[i++] = (unsigned short int) base[d] + tabExp2[k];
        }

/*      for (i = 0; i < p[8]; i += 2)
            printf(" tabExp2[%d] = %d; tabExp2[%d] = %d\n",
                i, tabExp2[i], i+1, tabExp2[i+1]);  */
}

/*
 *  redOp():  Fills the reduced destination pixrect with data of
 *              the type specified by op.
 *            Two steps:  first combines adjacent rows of the source
 *              pixrect and writes into the intermediate pixrect;
 *              then combines adjacent columns of the intermediate pixrect
 *              and writes into the destination pixrect.
 *            This is about 7 times slower than redOpF.
 *            Returns 0 if OK; 1 on error.
 *            To use this subroutine, substitute the redOp() call
 *              for redOpF(), in reducePr() and/or reducePr2().
 */
redOp(pixrD, pixrS, op)
Pixrect         *pixrD, *pixrS;
int             op;
{
int             wS, hS, wD, hD, i, j;
Pixrect         *pixrI;
static char     procName[] = "redOp";

if (!isPrDefined(pixrS, procName))
        return 1;
    if (!isPrDefined(pixrD, procName))
        return 1;

wS = pixrS->pr_size.x;
    hS = pixrS->pr_size.y;
    wD = pixrD->pr_size.x;
    hD = pixrD->pr_size.y;
    if (wS != 2*wD || hS != 2*hD)
    {
        printf("Error in redOp: pixrect sizes incorrect\n");
        return 1;
    } pixrI = mem_create(wS, hS/2, 1);  /* a half-height, full-width pr */
    if (!pixrI)
    {
        printf(" Error in redOp: pixrI not created\n");
        return 1;
    }
```

```
if (op == OR_OR)
{
    for (j = 0; j < hD; j++)
    {
        pr_rop(pixrI, 0, j, wS, 1, OP_HC, pixrS, 0, 2*j);
        pr_rop(pixrI, 0, j, wS, 1, OP_HU, pixrS, 0, 2*j + 1);
    } for (i = 0; i < wD; i++)
    {
        pr_rop(pixrD, i, 0, 1, hD, OP_HC, pixrI, 2*i, 0);
        pr_rop(pixrD, i, 0, 1, hD, OP_HU, pixrI, 2*i + 1, 0);
    }
}
else if (op == OR_AND)
{
    for (j = 0; j < hD; j++)
    {
        pr_rop(pixrI, 0, j, wS, 1, OP_HC, pixrS, 0, 2*j);
        pr_rop(pixrI, 0, j, wS, 1, OP_HU, pixrS, 0, 2*j + 1);
    } for (i = 0; i < wD; i++)
    {
        pr_rop(pixrD, i, 0, 1, hD, OP_HC, pixrI, 2*i, 0);
        pr_rop(pixrD, i, 0, 1, hD, OP_HI, pixrI, 2*i + 1, 0);
    }
}
else if (op == AND_OR)
{
    for (j = 0; j < hD; j++)
    {
        pr_rop(pixrI, 0, j, wS, 1, OP_HC, pixrS, 0, 2*j);
        pr_rop(pixrI, 0, j, wS, 1, OP_HI, pixrS, 0, 2*j + 1);
    } for (i = 0; i < wD; i++)
    {
        pr_rop(pixrD, i, 0, 1, hD, OP_HC, pixrI, 2*i, 0);
        pr_rop(pixrD, i, 0, 1, hD, OP_HU, pixrI, 2*i + 1, 0);
    }
}
else if (op == AND_AND)
{
    for (j = 0; j < hD; j++)
    {
        pr_rop(pixrI, 0, j, wS, 1, OP_HC, pixrS, 0, 2*j);
        pr_rop(pixrI, 0, j, wS, 1, OP_HI, pixrS, 0, 2*j + 1);
    } for (i = 0; i < wD; i++)
    {
        pr_rop(pixrD, i, 0, 1, hD, OP_HC, pixrI, 2*i, 0);
        pr_rop(pixrD, i, 0, 1, hD, OP_HI, pixrI, 2*i + 1, 0);
    }
}
else
{
    printf(" Error in redOp: unknown operators\n");
    return 1;
```

```
        } pr_close (pixrI);
    return 0;
}

/****************************************************************
 *      Expansion procedures
 ****************************************************************/
/*
 * expandPr2():  Takes a source pixrect and an expanded destination pixrect;
 *               each pixel in the source pixrect is mapped to four
 *               identical pixels in the destination.
 *               Makes lookup tables if not already done.
 *               Uses expOpF (with table look-up) for speed.
 */
expandPr2(pixrD, pixrS)
Pixrect         *pixrD, *pixrS;
{
int             wS, hS, wD, hD;
static char     procName[] = "expandPr2";

if (!isPrDefined(pixrS, procName))
        return 1;
    if (!isPrDefined(pixrD, procName))
        return 1;

wS = pixrS->pr_size.x;
    hS = pixrS->pr_size.y;
    wD = pixrD->pr_size.x;
    hD = pixrD->pr_size.y;
    if (wD != 2 * wS || hD != 2 * hS)
    {
        printf("Error in expandPr2: pixrect sizes incorrect\n");
        return 1;
    } if (!tabExp2)
        makeLookupTables();

if (expOpF(pixrD, pixrS))
        return 1;
      else
        return 0;
}

/*
 * expOpF: Fills the expanded destination pixrect with
 *         data from the source.
 *         Fast version with table lookup.
 *         Two steps: first combines adjacent rows of the source
 *              pixrect and writes into the intermediate pixrect;
 *              then uses table to convert each columns
 *              of the intermediate pixrect into two columns of
 *              the destination pixrect.
 *         Returns 0 if OK; 1 on error.
 */
expOpF(pixrD, pixrS)
```

```
Pixrect         *pixrD, *pixrS;
{
int             wS, hS, wD, hD, j;
Pixrect         *pixrI;
static char     procName[] = "expOpF";

if (!isPrDefined(pixrS, procName))
        return 1;
    if (!isPrDefined(pixrD, procName))
        return 1;

wS = pixrS->pr_size.x;
    hS = pixrS->pr_size.y;
    wD = pixrD->pr_size.x;
    hD = pixrD->pr_size.y;
    if (wD != 2*wS || hD != 2*hS)
    {
        printf("Error in expOpF: pixrect sizes incorrect\n");
        return 1;
    } pixrI = mem_create(wS, 2 * hS, 1);
    if (!pixrI)
    {
        printf(" Error in expOpF: pixrI not created\n");
        return 1;
    } for (j = 0; j < hS; j++)
    {
        pr_rop(pixrI, 0, 2*j, wS, 1, OP_HC, pixrS, 0, j);
        pr_rop(pixrI, 0, 2*j + 1, wS, 1, OP_HC, pixrS, 0, j);
    } if (expFastColumns(pixrD, pixrI))
        return 1;

pr_close (pixrI);
    return 0;
}

/*
 *  expFastColumns():   uses lookup tables to expand the number of
 *                        columns by a factor of 2 in going from the
 *                        source pixrect to the destination pixrect.
 *                      checks that relative sizes of source and destination
 *                         pixrects are correct.
 *                      depending on the line padding, the pixrect data
 *                         is either stored in short ints or in 32-bit ints.
 *                      Returns 0 (or 1 on error).
 */
expFastColumns(pixrD, pixrS)
Pixrect                 *pixrD, *pixrS;
{
int                     wS, hS, wD, hD, j, prSBpl, prDWpl;
register                i, sByte, dWord;
unsigned char           *pS, index;
unsigned short int      *pD;
static char             procName[] = "expFastColumns";
```

```
    if (!isPrDefined(pixrS, procName))
        return 1;
    if (!isPrDefined(pixrD, procName))
        return 1;

wS = pixrS->pr_size.x;
    hS = pixrS->pr_size.y;
    wD = pixrD->pr_size.x;
    hD = pixrD->pr_size.y;
    prSBpl = prBytesPerLine(pixrS);
    prDWpl = prBytesPerLine(pixrD) >> 1;   /* Note that prSBpl >= prDWpl */
    if (wD != 2 * wS || hS != hD)
    {
        printf("Error in expFastColumns: pixrect sizes incorrect\n");
        return 1;
    }
    pS = (unsigned char *) mpr_d(pixrS)->md_image;
    pD = (unsigned short int *) mpr_d(pixrD)->md_image;

dWord = 0;
    for (j = 0; j < hS; j++)
    {
        sByte = j * prSBpl;
        for (i = 0; i < prDWpl; i++)  /* because prDWpl <= prSBpl */
        {
            /* obtain 8 bits from the source */
            index = *(pS + sByte);
            sByte++;
                /* get the corresponding 16 bits from the table,
                 * and put it in the destination byte */
            *(pD + dWord) = tabExp2[(int) index];
            dWord++;
        }
    } return 0;
}

/*
 * expandPr2S():  Takes an input pixrect and an expanded output pixrect,
 *                and returns in the expanded pixrect an image
 *                such that for each ON pixel in the input pixrect,
 *                all corresponding pixels in the output pixrect are ON.
 *                The integer mag is the requested magnification.
 *                    It is checked against the sizes of source and destination
 *                    pixrects, and if the relative sizes don't equal mag,
 *                    the routine returns with an error.
 *                Returns 1 on error; 0 if OK.
 *                This is the "slow" version, that does everything by
 *                    bit checking and substitution.
 */
expandPr2S(pixrD, pixrS, mag)
Pixrect        *pixrD, *pixrS;
int            mag;
{
IMAGE          *imS, *imD, *pixrectToImageN(), *expandImage();
int            wS, hS, wD, hD;
int            error;
```

```
static char    procName[] = "expandPr2S";

if (!isPrDefined(pixrS, procName))
        return 1;
    if (!isPrDefined(pixrD, procName))
        return 1;

wS = pixrS->pr_size.x;
    hS = pixrS->pr_size.y;
    wD = pixrD->pr_size.x;
    hD = pixrD->pr_size.y;
    if (wD != (mag * wS) || hD != (mag * hS))
    {
        printf("Error in expandPr2S: pixrect sizes incorrect\n");
        return 1;
    } imS = pixrectToImageN(pixrS);  /* imS has new data */
    imD = expandImage(imS, mag);   /* imD is newly made image structure */
    if (!imD)
        return 1;
    error = imageIntoPr(pixrD, imD); /* data from imD copied to pixrD */
    free (imS->data);
    free (imS);
    free (imD->data);
    free (imD);
    if (error)
       return 1;
     else
        return 0;
}

/**************************************************
 *      Set globals
 **************************************************/
/*
 *  setThresholdLevel()
 */
setThresholdLevel(level)
int     level;
{ if (level > 0 && level <= 4)
        thresholdLevel = level;
    else
        printf(" Error in setThresholdLevel: unknown level\n");
}

/**************************************************
 * Copyright (c) 1988, Xerox Corporation.  All rights reserved. *
 * Copyright protection claimed includes all forms and matters  *
 * of copyrightable material and information now allowed by     *
 * statutory or judicial law or hereafter granted, including    *
 * without limitation, material generated from the software     *
 * programs which are displayed on the screen such as icons,    *
 * screen display looks, etc.                                   *
 **************************************************/

/*
 * Taken from the version of graph.c in Vicuna.
 *      Substitute: >> #include "alpaca.h"
```

```
*                       >> #include "graph.h"
*          for:         << #include "raveDisplay.h"
*/

/*
* graphA: This module contains the procedures to create a pop up
*          frame or subframe that plots graphical data.
*      The following functions are defined:
*          graphMake()
*          graphMenu()
*          graphPaint()
*          graphInvert()
*          graphHardcopyMenu()
*             graphHardcopyCmd()
*             graphDumpDisplay()
*          graphWriteFile()
*          graphQuit()
*          graphScaleProc()
*             graphInputMenu()
*             graphInputSelect()
*             graphInputQuit()
*             graphInputInit()
*          graphSelectType()
*          graphClearCanvas()
*          graphInit()
*          graphPutTitle()
*          graphPutData()
*          graphPutType()
*          graphPlotData()
*          graphGetMinMax()
*          graphSetScale()
*          graphAxes()
*          graphPoints()
*          graphCurve()
*          graphHistogram()
*          graphCanCoord()
*          graphCanClip()
*          graphDrawPoint()
*          graphCheck()
*          graphTestExample()
*      The following functions are defined in writeFileA.c:
*          panelMessage()
*          clearString()
*      Usage: entry is through graphMake(data).
*          data is a pointer to data struct DATA.
*          This makes the graph frame if it is not existent.
*          The frame is made either as a subframe (of mainFrame) or as
*          a mainFrame. In the latter case, window_main_loop is called,
*          and control is returned to the calling program by destroying
*          the window.
*/ include <stdio.h>
include <sys/file.h>
#include <llama.h>
#include <imageReps.h>
#include "alpaca.h"
#include "graphA.h"

#define   GRAPH_FRAME_WIDTH      380
#define   GRAPH_FRAME_HEIGHT     450
#define   MARGIN                 20
```

```
#define    DEBUG                      0
#define    DISPLAY_TIME               10   /* if > 0, automatically removes
                                            * display after this number of secs */ define    DUMP_FILE                  "/usr/tmp/dumpfile"
define    Sign(x)                    (((x) < 0) ? -1 : 1)

static char      clearMessage[] = "                                                      ";
static char      paintMessage[] = " Painting not yet implemented.";
static char      dumpFrameMessage[] = " Frame is being printed. ";
static char      dumpGraphMessage[] = " Graph is being printed. ";
static char      message[100], filename[80];
static char      varMessage[60];
static char      inputStart[] = " Enter value and click selection ";
static int       tooMuchData = 0;
Panel_item       graphMessage;
Panel_item       graphScaling;
Panel_item       graphScaleChoice;
Panel_item       graphSelectPanel;
Panel_item       graphInputMessage;
Panel_item       graphInputText;

void             graphQuit();

graphMake(data)
DATA      *data;
{
    if (!graphFrame)
       graphMenu();
    window_set(graphFrame, WIN_SHOW, TRUE, 0);
    graphAutoScale = 1;    /* default is for automatic scaling */
    panel_set_value(graphScaleChoice, 0);
    panel_set_value(graphSelectPanel, 0);
    graphData = data;
    graphPlotData(graphData);
    if (DISPLAY_TIME > 0)
       doWithDelay(graphQuit, DISPLAY_TIME, 0);
    if (!mainFrame)
       window_main_loop(graphFrame);
} graphMenu()
{
/*
 * graphMenu --- displays a pop up frame or sub-frame with message panel,
 *               control panel, and canvas that allows plotting of data.
 */
/*  Panel      graphMessagePanel;
 *  Panel      graphControlPanel;
 *  Canvas     graphCanvas;   */
void      graphPaint();
void      graphInvert();
void      graphHardcopyMenu();
void      graphWriteFile();
void      graphScaleProc();
void      graphSelectType();

if (mainFrame)
    {   /* make a subframe */
        graphFrame = window_create(mainFrame, FRAME,
               FRAME_LABEL,       "Graph",
               WIN_WIDTH,         GRAPH_FRAME_WIDTH,
```

```
                  WIN_HEIGHT,      GRAPH_FRAME_HEIGHT,
                  WIN_X,           0,
                  WIN_Y,           360.
                  0);
   }
     else
   {   /* make a main frame */
       graphFrame = window_create(NULL, FRAME,
              FRAME_LABEL,     "Graph",
              WIN_WIDTH,       GRAPH_FRAME_WIDTH,
              WIN_HEIGHT,      GRAPH_FRAME_HEIGHT,
              WIN_X,           300,
              WIN_Y,           360,
              0);
   } graphMessagePanel = window_create(graphFrame, PANEL,
         PANEL_HEIGHT,    ATTR_ROW(2),
         0);
graphMessage = panel_create_item(graphMessagePanel, PANEL_MESSAGE,
         PANEL_LABEL_BOLD,    TRUE,
         PANEL_LABEL_STRING,  "                              ",
         PANEL_ITEM_X,        0,
         PANEL_SHOW_ITEM,     FALSE,
         0);
graphScaling = panel_create_item(graphMessagePanel, PANEL_MESSAGE,
         PANEL_LABEL_BOLD,    TRUE,
         PANEL_LABEL_STRING,  "                              ",
         PANEL_ITEM_X,        0,
         PANEL_ITEM_Y,        ATTR_ROW(1),
         PANEL_SHOW_ITEM,     FALSE,
         0);
window_fit_height(graphMessagePanel);

graphControlPanel = window_create(graphFrame, PANEL,
         WIN_BELOW,       graphMessagePanel,
         0);
panel_create_item(graphControlPanel, PANEL_BUTTON,
         PANEL_LABEL_IMAGE,
                 panel_button_image(graphControlPanel,"paint",4,0),
         PANEL_LABEL_BOLD,    TRUE,
         PANEL_NOTIFY_PROC,   graphPaint,
         0);
panel_create_item(graphControlPanel, PANEL_BUTTON,
         PANEL_LABEL_IMAGE,
                 panel_button_image(graphControlPanel,"invert",6,0),
         PANEL_LABEL_BOLD,    TRUE,
         PANEL_NOTIFY_PROC,   graphInvert,
         0);
panel_create_item(graphControlPanel, PANEL_BUTTON,
         PANEL_LABEL_IMAGE,
                 panel_button_image(graphControlPanel,"hardcopy",8,0),
         PANEL_LABEL_BOLD,    TRUE,
         PANEL_NOTIFY_PROC,   graphHardcopyMenu,
         0);
panel_create_item(graphControlPanel, PANEL_BUTTON,
         PANEL_LABEL_IMAGE,
                 panel_button_image(graphControlPanel,"writeFile",9,0),
         PANEL_LABEL_BOLD,    TRUE,
         PANEL_NOTIFY_PROC,   graphWriteFile,
         0);
panel_create_item(graphControlPanel, PANEL_BUTTON,
```

```
                PANEL_LABEL_IMAGE,
                    panel_button_image(graphControlPanel,"quit",4,0),
                PANEL_LABEL_BOLD,       TRUE,
                PANEL_NOTIFY_PROC,      graphQuit,
                0);
        graphScaleChoice = panel_create_item(graphControlPanel, PANEL_CYCLE,
                PANEL_ITEM_X,           ATTR_COL(0),
                PANEL_ITEM_Y,           ATTR_ROW(1),
                PANEL_LABEL_BOLD,       TRUE,
                PANEL_LABEL_STRING,     "Auto Scaling Enabled: ",
                PANEL_CHOICE_STRINGS,   "YES", "NO", 0,
                PANEL_VALUE,            0,
                PANEL_NOTIFY_PROC,      graphScaleProc,
                0);
        graphSelectPanel = panel_create_item(graphControlPanel, PANEL_CHOICE,
                PANEL_ITEM_X,           ATTR_COL(0),
                PANEL_ITEM_Y,           ATTR_ROW(2)+1,
                PANEL_LABEL_STRING,     "Type:",
                PANEL_LABEL_BOLD,       TRUE,
                PANEL_CHOICE_STRINGS,   "Histo","Curve","Points",0,
                PANEL_NOTIFY_PROC,      graphSelectType,
                0);
        window_fit_height(graphControlPanel);

graphCanvasWidth = 365;
        graphCanvasHeight = 320;
        graphCanvas = window_create(graphFrame, CANVAS,
                WIN_BELOW,              graphControlPanel,
                CANVAS_AUTO_SHRINK,     FALSE,
                CANVAS_WIDTH,           graphCanvasWidth,
                CANVAS_HEIGHT,          graphCanvasHeight,
                WIN_CONSUME_PICK_EVENTS,WIN_NO_EVENTS,WIN_MOUSE_BUTTONS,LOC_DRAG,0,
                0);
        graphPw = canvas_pixwin(graphCanvas);
} void
graphPaint(item,event)
Panel_item      item;
Event           *event;
{
        panelMessage(graphMessage,paintMessage);
} void
graphInvert()
{
        pw_writebackground(graphPw,0,0,graphCanvasWidth,graphCanvasHeight,
                PIX_NOT(PIX_DST));
} void
graphHardcopyMenu(item,event)
Panel_item      item;
Event           *event;
{
int             selection;
static Menu     hardcopyMenu;
void            graphHardcopyCmd();

if (!hardcopyMenu)
```

```
                hardcopyMenu = menu_create(MENU_STRINGS,
                                           "Hardcopy frame",
                                           "Hardcopy graph", 0,
                                  0);

selection = (int) menu_show(hardcopyMenu, graphControlPanel, event, 0);
    graphHardcopyCmd(item, selection, event);
}

/*
 *  graphHardcopyCmd()
 */
void
graphHardcopyCmd(hardcopyItem, selection, event)
Panel_item      hardcopyItem;
int             selection;
Event           *event;
{
int             width, height;

if (!selection)
        return;

switch (selection)
    {
    case 1:   /* automatic hardcopy of graph frame */
        graphDumpDisplay();
        panelMessage(graphMessage,dumpFrameMessage);
        width = (int) window_get(graphFrame, WIN_WIDTH);
        height = (int) window_get(graphFrame, WIN_HEIGHT);
        autoSizeDump(width, height);
        break;
    case 2:   /* automatic hardcopy of graph canvas */
        dumpCanvas(graphCanvas, NULL);
        panelMessage(graphMessage,dumpGraphMessage);
        autoSizeDump(graphCanvasWidth, graphCanvasHeight);
        break;
    default:
        printf(" Error in graphHardcopyCmd: unknown selection %d\n", selection);
    }
} graphDumpDisplay()
{
struct pixrect  *framepr, *mem_create(), *screen;
int             fd, x, y, width, height, mainX, mainY;
FILE            *fp;

fd = open(DUMP_FILE, O_CREAT, 0666);  /* create a new file if possible */
    close(fd);
    fd = open(DUMP_FILE, O_TRUNC, 0666);  /* truncate to zero length */
    close(fd);
    fd = open(DUMP_FILE, O_RDWR, 0666);
    fp = fdopen(fd,"w+");
    if(fp == NULL)
    {
        sprintf(message,"%s could not be opened",filename);
        warning(message);
        return;
    }
```

```
    x = (int) window_get(graphFrame,WIN_X);
    y = (int) window_get(graphFrame,WIN_Y);
    if (mainFrame)
    {
        mainX = (int) window_get(mainFrame,WIN_X);
        mainY = (int) window_get(mainFrame,WIN_Y);
        x += mainX;
        y += mainY;
    }
    width = (int) window_get(graphFrame, WIN_WIDTH);
    height = (int) window_get(graphFrame, WIN_HEIGHT);
    screen = pr_open("/dev/fb");
    if (screen == NULL) syserr("can't find framebuffer");
    framepr = mem_create(width, height, 1);
    pr_rop(framepr, 0, 0, width, height, PIX_SRC, screen, x, y);
    pr_dump(framepr, fp, NULL, RT_STANDARD, 1);

fclose(fp);
} void
graphWriteFile()
{
Panel_item       item;
Event            *event;

writeFileMain(item, event, graphCanvas, NULL);
} void
graphQuit()
{
    if (mainFrame)
    {
        panelMessage(graphMessage,clearMessage);
        graphClearCanvas();
        window_set(graphFrame, WIN_SHOW, FALSE, 0);
    }
    else
        window_destroy(graphFrame);

free (graphData);
    graphData = NULL;   /* the free knows only about "data", not "graphData";
                         * hence, graphInit() will try to free graphData
                         * if it is not NULL, resulting in a seg. fault!  */
} void
graphScaleProc()
{
    if (!panel_get_value(graphScaleChoice))
    {   /* automatic scaling */
        graphAutoScale = 1;
        panelMessage(graphScaling, clearMessage);
    }
    else
    {   /* otherwise, do manual scaling */
        graphAutoScale = 0;
        if (!graphInputFrame)
            graphInputMenu();
        else
```

```
            window_set(graphInputFrame, WIN_SHOW, TRUE, 0);
         sprintf(varMessage,"X: %d to %d; Y: %d to %d\n", graphData->minX,
            graphData->maxX, graphData->minY, graphData->maxY);
         panelMessage(graphInputMessage,varMessage);
         panelMessage(graphScaling,varMessage);
      }
} graphInputMenu()
{
/* Frame           graphInputFrame;
*  Panel           graphInputPanel;   */
void             graphInputSelect();
void             graphInputQuit();
void             graphInputInit();

graphInputFrame = window_create(graphFrame, FRAME,
      WIN_X,               GRAPH_FRAME_WIDTH,
      WIN_Y,               100,
      WIN_WIDTH,           GRAPH_FRAME_WIDTH,
      WIN_HEIGHT,          75,
      0);
   graphInputPanel = window_create(graphInputFrame, PANEL, 0);
   graphInputMessage = panel_create_item(graphInputPanel, PANEL_MESSAGE,
      PANEL_ITEM_X,        0,
      PANEL_ITEM_Y,        ATTR_ROW(0),
      PANEL_LABEL_BOLD,    TRUE,
      PANEL_LABEL_STRING,  "                        ",
      PANEL_SHOW_ITEM,     FALSE,
      0);
   panel_create_item(graphInputPanel, PANEL_CHOICE,
      PANEL_ITEM_X,        0,
      PANEL_ITEM_Y,        ATTR_ROW(1),
      PANEL_LABEL_BOLD,    TRUE,
      PANEL_CHOICE_STRINGS, "MinX", "MaxX", "MinY", "MaxY", 0,
      PANEL_NOTIFY_PROC,   graphInputSelect,
      0);
   panel_create_item(graphInputPanel, PANEL_BUTTON,
      PANEL_LABEL_IMAGE,
         panel_button_image(graphInputPanel,"Quit",5,0),
      PANEL_LABEL_BOLD,    TRUE,
      PANEL_NOTIFY_PROC,   graphInputQuit,
      0);
   graphInputText = panel_create_item(graphInputPanel, PANEL_TEXT,
      PANEL_ITEM_X,        0,
      PANEL_ITEM_Y,        ATTR_ROW(2),
      PANEL_LABEL_BOLD,    TRUE,
      PANEL_VALUE_DISPLAY_LENGTH,   20,
      PANEL_LABEL_STRING,  "             ",
      PANEL_NOTIFY_PROC,   graphInputInit,
      0);
   window_fit_height(graphInputPanel);
   window_set(graphInputFrame, WIN_SHOW, TRUE, 0);
   panelMessage(graphInputMessage,inputStart);
   graphInputInit();
} void
graphInputSelect(selectItem, choice, event)
Panel_item       selectItem;
int              choice;
Event            *event;
```

```c
{
    graphInputInit();
    switch(choice)
    {
    case 0:       /* replace MinX */
        graphData->minX = atoi(panel_get_value(graphInputText));
        break;
    case 1:       /* replace MaxX */
        graphData->maxX = atoi(panel_get_value(graphInputText));
        break;
    case 2:       /* replace MinY */
        graphData->minY = atoi(panel_get_value(graphInputText));
        break;
    case 3:       /* replace MaxY */
        graphData->maxY = atoi(panel_get_value(graphInputText));
        break;
    default:
        printf("Error in graphInputSelect: unknown choice");
    }
    sprintf(varMessage,"X: %d to %d; Y: %d to %d\n", graphData->minX,
        graphData->maxX, graphData->minY, graphData->maxY);
    panelMessage(graphInputMessage,varMessage);
    panelMessage(graphScaling,varMessage);
    panel_set_value(graphInputText,"");
} void
graphInputQuit()
{
    window_set(graphInputFrame, WIN_SHOW, FALSE, 0);
}
void
graphInputInit()
{
    panel_set(graphInputText, PANEL_LABEL_STRING, " Value:",
        PANEL_SHOW_ITEM,    TRUE,
        0);
} void
graphSelectType(selectedPanel, type, event)
Panel_item      selectedPanel;
int             type;
Event           *event;
{ graphClearCanvas();
    switch (type)
    {
    case 0:    /* display histogram */
        graphData->type = HISTOGRAM;
        break;
    case 1:    /* display curve */
        graphData->type = CURVE;
        break;
    case 2:    /* display points */
        graphData->type = POINTS;
        break;
    default:
        printf("Error in graphSelectType: unknown plot type\n");
    }
    graphPlotData(graphData);
```

```
} graphClearCanvas()
{
    pw_writebackground(graphPw,0,0,graphCanvasWidth,graphCanvasHeight,PIX_CLR);
}

/*****************************
 *    Graphical routines     *
 *****************************/

DATA *
graphInit()
{
DATA         *data;
int          i;
/* char      *titleString;  */ if (graphData)  /* clean up previous stuff */
    {
        free (graphData);
        graphData = NULL;
    } data = (DATA *)calloc(1, sizeof(DATA));
    if (!data)
        syserr(" Malloc failure for data in graphInit in graph.c");
    data->n = 0;
    data->minX = data->maxX = data->minY = data->maxY = 0;
    data->scaleX = data->scaleY = 0.0;
    data->origX = data->origY = 0;
    data->type = HISTOGRAM;
    data->title = "";
    for (i = 0; i < GRAPH_ARRAY_SIZE; i++)
        data->x[i] = data->y[i] = 0;
    return(data);
} graphPutTitle(data, title)
DATA       *data;
char   ,   *title;
{
    data->title = (char *)malloc(strlen(title) + 1);
    if (!data->title)
    {
        printf("Malloc error in graphPutTitle");
        return;
    }
    strcpy(data->title. title);
} graphPutData(data,x,y)
DATA       *data;
int        x,y;
{
int        nextN;

nextN = data->n;
    if (nextN > (GRAPH_ARRAY_SIZE - 3))
    {
        if (!tooMuchData)  /* only print the message the first time */
        {
```

```
        printf("Error in graphPutData: too many data points\n");
        tooMuchData = 1;
    }
    return;
}
data->x[nextN] = x;
data->y[nextN] = y;
data->n++;
} graphPutType(data,type)
DATA        *data;
int         type;
{ data->type = type;
} graphPlotData(data)
DATA        *data;
{
int         errFlag, graphMinMax(), graphSetScale(), graphAxes();

if (!data)
    {
        printf("Error in graphPlotData: no data\n");
        return;
    }

/* do preliminaries */
    errFlag = graphGetMinMax(data);
    if (errFlag)
    {
        printf(" Error in graphPlotData from graphGetMinMax\n");
        return;
    }
    errFlag = graphSetScale(data);
    if (errFlag)
    {
        printf(" Error in graphPlotData from graphSetScale\n");
        return;
    } graphClearCanvas();
    panelMessage(graphMessage,clearMessage);
    strcpy(varMessage,data->title);
    panelMessage(graphMessage,varMessage);

sprintf(varMessage,"X: %d to %d; Y: %d to %d\n",
            data->minX, data->maxX. data->minY, data->maxY);
    panelMessage(graphScaling,varMessage);

/* plot axes */
    errFlag = graphAxes(data);
    if (errFlag)
    {
        printf("  Error in graphPlotData from graphAxes\n");
        return;
    }

/* plot data */
    switch (data->type)
```

```c
    {
    case POINTS:
        graphPoints(data);
        break;
    case CURVE:
        graphCurve(data);
        break;
    case HISTOGRAM:
        graphHistogram(data);
        break;
    default:
        printf(" Error in graphPlotData: plot type unknown\n");
        break;
    }
} int
graphGetMinMax(data)
DATA        *data;
{
int         i;

if (!data)
    {
        printf("Error in graphGetMinMax:  no data\n");
        return(1);
    } if (!data->n)
    {
        printf("Error in graphGetMinMax: no datapoints\n");
        return(1);
    } if (!graphAutoScale)   /* if manual, do not reset min and max */
        return(0);

data->minX = data->minY = 1000000000;
    data->maxX = data->maxY = -1000000000;
    for (i = 0; i < data->n; i++)
    {
        data->minX = Min(data->x[i], data->minX);
        data->maxX = Max(data->x[i], data->maxX);
        data->minY = Min(data->y[i], data->minY);
        data->maxY = Max(data->y[i], data->maxY);
    }
#if DEBUG
    printf("MinX = %d; MaxX = %d; MinY = %d; MaxY = %d\n",
        data->minX, data->maxX, data->minY, data->maxY);
#endif DEBUG
    return(0);
} int
graphSetScale(data)
DATA        *data;
{
int         maxX, minX, maxY, minY, rangeX, rangeY;
int         signMaxX, signMinX, signMaxY, signMinY;
float       scaleX, scaleY;
```

```
    if (!data)
    {
        printf("Error in graphSetScale:  no data\n");
        return(1);
    } minX = data->minX;
    maxX = data->maxX;
    minY = data->minY;
    maxY = data->maxY;
    signMinX = Sign(minX);
    signMaxX = Sign(maxX);
    signMinY = Sign(minY);
    signMaxY = Sign(maxY);
    if (graphAutoScale)
    {   /* always include 0 in range */
        if (signMinX * signMaxX >= 0)
        {   /* they're either both positive or both negative */
            if (signMaxX > 0)
            {   /* plot from zero to max */
                rangeX = maxX;
                data->origX = 0;
            }
            else
            {   /* plot from min to zero */
                rangeX = -minX;
                data->origX = minX;
            }
        }
        else
        {   /* plot from min to max */
            rangeX = maxX - minX;
            data->origX = minX;
        } if (signMinY * signMaxY >= 0)
        {   /* they're either both positive or both negative */
            if (signMaxY > 0)
            {   /* plot from zero to max */
                rangeY = maxY;
                data->origY = 0;
            }
            else
            {   /* plot from min to zero */
                rangeY = -minY;
                data->origY = minY;
            }
        }
        else
        {   /* plot from min to max */
            rangeY = maxY - minY;
            data->origY = minY;
        }
    }
    else
    {   /* take the range as given */
        rangeX = maxX - minX;
        data->origX = minX;
        rangeY = maxY - minY;
        data->origY = minY;
    }
#if DEBUG
```

```c
        printf("rangeX = %d; rangeY = %d\n", rangeX, rangeY);
        printf("origX = %d; origY = %d\n", data->origX, data->origY);
endif DEBUG if (!rangeX || !rangeY)
    {
        printf("Error in graphSetScale: some range = 0\n");
        return(1);
    }

/* allows expansion of canvas by resizing window */
    graphCanvasWidth = (int) window_get(graphCanvas, WIN_WIDTH);
    graphCanvasHeight = (int) window_get(graphCanvas, WIN_HEIGHT);

scaleX = (graphCanvasWidth - 2 * MARGIN) / ((float) rangeX);
    scaleY = (graphCanvasHeight - 2 * MARGIN) / ((float) rangeY);
    data->scaleX = scaleX;
    data->scaleY = scaleY;
#if DEBUG
        printf(" scaleX = %-.3f; scaleY = %-.3f\n",scaleX,scaleY);
#endif DEBUG
    return(0);
} int
graphAxes(data)
DATA           *data;
{
int             errFlag, graphSetScale(), op, left, top, right, bottom;
int      •      i, graphCanCoord(), axisX, axisY, centerX, centerY, canX, canY;
int             extentX, extentY, exponX, exponY, factorX, factorY, ticX, ticY;
float           scaleX, scaleY;
struct rect     r;

if (!data)
    {
        printf("Error in graphAxes:  no data\n");
        return(1);
    } scaleX = data->scaleX;
    scaleY = data->scaleY;
    if (!scaleX || !scaleY)
    {
        errFlag = graphSetScale(data);
        if (errFlag)
        {
            printf(" Error in graphAxes from graphSetScale\n");
            return(1);
        }
        scaleX = data->scaleX;
        scaleY = data->scaleY;
    } op = PIX_SET;
    centerX = graphCanvasWidth >> 1;
    centerY = graphCanvasHeight >> 1;
    extentX = Max(Abs(data->maxX), Abs(data->minX));
    extentY = Max(Abs(data->maxY), Abs(data->minY));
    exponX = (int) log10 ((double) extentX);
    exponY = (int) log10 ((double) extentY);
```

```
        factorX = (int) pow(10.,(double) exponX);
        factorY = (int) pow(10.,(double) exponY);
#if DEBUG
        printf("extentX = %d,extentY = %d,exponX = %d,exponY = %d\n",
            extentX, extentY, exponX, exponY);
        printf("factorX = %d,factorY = %d\n",factorX,factorY);
#endif DEBUG
        left = MARGIN;
        right = graphCanvasWidth - MARGIN;
        top = MARGIN;
        bottom = graphCanvasHeight - MARGIN;
        axisX = graphCanCoord(0, data->origY, scaleY, YAXIS);
        axisY = graphCanCoord(0, data->origX, scaleX, XAXIS);
        pw_get_region_rect(graphPw,&r);
        pw_lock(graphPw,&r);
        if (graphAutoScale || graphCanClip(centerX, axisY))  /* x-axis within canvas */
            pw_vector(graphPw, left, axisX, right, axisX, op, 1);
        if (graphAutoScale || graphCanClip(axisY, centerY))  /* y-axis within canvas */
            pw_vector(graphPw, axisY, top, axisY, bottom, op, 1);
        for (i = -10; i<=10; i++)
        {   /* draw clipped tics */
            ticX = i * factorX;
            ticY = i * factorY;
            canX = graphCanCoord(ticX, data->origX, scaleX, XAXIS);
            canY = graphCanCoord(ticY, data->origY, scaleY, YAXIS);
            if (graphCanClip(canX, axisX))
                graphDrawPoint(canX, axisX, 4, op);
            if (graphCanClip(axisY, canY))
                graphDrawPoint(axisY, canY, 4, op);
        }
        pw_unlock(graphPw);
        return(0);
} graphPoints(data)
DATA            *data;
{
int             errFlag, graphCheck(), graphCanCoord();
int             i, op, canX, canY;
float           scaleX, scaleY;
struct rect     r;

errFlag = graphCheck(data);
        if (errFlag)
        {
            printf(" Error in graphCurve from graphCheck\n");
            return;
        } scaleX = data->scaleX;
        scaleY = data->scaleY;
        op = PIX_SET;
        pw_get_region_rect(graphPw,&r);
        pw_lock(graphPw,&r);
        for (i = 0; i < data->n; i++)
        {
            canX = graphCanCoord(data->x[i], data->origX, scaleX, XAXIS);
            canY = graphCanCoord(data->y[i], data->origY, scaleY, YAXIS);
            if (graphAutoScale || graphCanClip(canX, canY))
                graphDrawPoint(canX, canY, 2, op);
        }
```

```
    pw_unlock(graphPw);
} graphCurve(data)
DATA          *data;
{
int           errFlag, graphCheck(), graphCanCoord();
int           i, op, oldX, oldY, newX, newY;
float         scaleX, scaleY;
struct rect   r;

errFlag = graphCheck(data);
    if (errFlag)
    {
        printf("  Error in graphCurve from graphCheck\n");
        return;
    }
    scaleX = data->scaleX;
    scaleY = data->scaleY;
    op = PIX_SET;
    oldX = graphCanCoord(data->x[0], data->origX, scaleX, XAXIS);
    oldY = graphCanCoord(data->y[0], data->origY, scaleY, YAXIS);
    pw_get_region_rect(graphPw,&r);
    pw_lock(graphPw,&r);
    for (i = 1; i < data->n; i++)
    {
        newX = graphCanCoord(data->x[i], data->origX, scaleX, XAXIS);
        newY = graphCanCoord(data->y[i], data->origY, scaleY, YAXIS);
        if (graphAutoScale ||
                (graphCanClip(oldX, oldY) && graphCanClip(newX, newY)))
            pw_vector(graphPw, oldX, oldY, newX, newY, op, 1);
        oldX = newX;
        oldY = newY;
    }
    pw_unlock(graphPw);
} graphHistogram(data)
DATA          *data;
{
int           errFlag, graphCheck(), graphCanCoord();
int           i, op, canX, canY, onAxisY;
float         scaleX, scaleY;
struct rect   r;

errFlag = graphCheck(data);
    if (errFlag)
    {
        printf("  Error in graphCurve from graphCheck\n");
        return;
    } scaleX = data->scaleX;
    scaleY = data->scaleY;
    op = PIX_SET;
    onAxisY = graphCanCoord(0, data->origY, scaleY, YAXIS);
    pw_get_region_rect(graphPw,&r);
    pw_lock(graphPw,&r);
    for (i = 0; i < data->n; i++)
    {
        canX = graphCanCoord(data->x[i], data->origX, scaleX, XAXIS);
        canY = graphCanCoord(data->y[i], data->origY, scaleY, YAXIS);
```

```
            if (graphAutoScale ||
                (graphCanClip(canX, canY) && graphCanClip(canX, onAxisY)))
                pw_vector(graphPw, canX, canY, canX, onAxisY, op, 1);
    }
    pw_unlock(graphPw);
}

/*
 * graphCanCoord():   returns the canvas pixel coordinate value,
 *                    relative to the upper-left corner (minus the
 *                    MARGIN) of the canvas.
 *                    when the "val" is at the "orig", the canvas
 *                    coordinate returned is the lower-left corner
 *                    (minus the MARGIN) of the canvas!
 */
int
graphCanCoord(val, orig, scale, axis)
double      scale;
int         val, orig, axis;
{
int         canCoord;

switch(axis)
    {
    case XAXIS:
        canCoord = MARGIN + scale * (val - orig);
        return(canCoord);
        break;
    case YAXIS:
        canCoord = (graphCanvasHeight - MARGIN) - scale * (val - orig);
        return(canCoord);
        break;
    default:
        printf("Error in graphCanCoord: unknown axis type\n");
    }
} int
graphCanClip(canX, canY)
int             canX, canY;
{   /* returns 1 if within margined canvas */
    if (canX >= MARGIN && canX <= (graphCanvasWidth - MARGIN)
        && canY >= MARGIN && canY <= (graphCanvasHeight - MARGIN))
        return(1);
    else
        return(0);
} graphDrawPoint(canX, canY, size, op)
int             canX, canY, size, op;
{
int             left, right, top, bottom;

/* this is for a plus sign */
    left = canX - size;
    right = canX + size;
    top = canY - size;
    bottom = canY + size;
    pw_vector(graphPw, left, canY, right, canY, op, 1);
    pw_vector(graphPw, canX, top, canX, bottom, op, 1);
```

```c
} int
graphCheck(data)
DATA         *data;
{
int          errFlag, graphSetScale();
float        scaleX, scaleY;

if (!data)
    {
        printf(" Error in graphCheck: no data\n");
        return(1);
    } scaleX = data->scaleX;
    scaleY = data->scaleY;
    if (!scaleX || !scaleY)
    {
        errFlag = graphSetScale(data);
        if (errFlag)
        {
            printf(" Error in graphCheck from graphSetScale: no range\n");
            return(1);
        }
    } if (!data->n)
    {
        printf(" Error in graphCheck:  no data points\n");
        return(1);
    } return(0);   /* OK */
} graphTestExample()
{
DATA         *testData, *graphInit();
int          i, x, y;

/* initialize graph */
    testData = graphInit();

/* input data into fields */
    graphPutTitle(testData,"Example Data");
    for (i = -50; i <= 50; i++)
    {
        x = 2 * i;
        y = x * Abs(x);
        graphPutData(testData,x,y);
    }
    graphPutType(testData,HISTOGRAM);
    graphMake(testData);
}
```

```
/****************************************************************
 * Copyright (c) 1989, Xerox Corporation.  All rights reserved. *
   Copyright protection claimed includes all forms and matters
   of copyrightable material and information now allowed by
   statutory or judicial law or hereafter granted, including
   without limitation, material generated from the software
   programs which are displayed on the screen such as icons,
   screen display looks, etc.
 ****************************************************************/

/*
 *  coordsA.c:  includes subroutines
 *                --createCoords():   creates struct and associated arrays
 *                --destroyCoords():  frees arrays and returns NULL ptr
 *                --xformCoords():    translation and scaling
 *                --storeCoords():    stores ON pixels in a pixrect
 *                --printCoords():    prints coord pairs
 *                --displayCoords():  writes coord to a pixrect
 *                --displayArray():   writes coordinated array to a pixrect
 *                --writeCoords():    writes formatted to file
 *                --readCoords():     reads formatted from a file
 *                --coordsToBoxes():
 */ include <stdio.h>
include <llama.h>
#include <imageReps.h>
#include "alpaca.h"
#include "morph.h"
#include "strelGlobals.h"

static char             message[50];

/*
 * createCoords():  takes the number of coordinate pairs, and returns
 *                  a COORDS data structure.
 */
COORDS *
createCoords(numPts)
int         numPts;
{
COORDS      *coords;
int         *x, *y;

coords = (COORDS *) calloc(1, sizeof(COORDS));
    x = (int *) calloc(numPts, sizeof(int));
    y = (int *) calloc(numPts, sizeof(int));
    if (!coords || !x || !y)
    {
        printf(" Error in createCoords(): malloc failure!\n");
        return NULL;
    }
    coords->x = x;
    coords->y = y;
    coords->n = numPts;

return (coords);
}
```

```
/*
 * destroyCoords(): frees the storage and returns a NULL pointer
 */
COORDS *
destroyCoords(coords)
COORDS     *coords;
{
    if (!coords)
    {
        printf(" Error in destroyCoords: COORDS structure not defined\n");
        return NULL;
    } free(coords->x);
    free(coords->y);
    free(coords);
    return NULL;
}

/*
 * xformCoords()
 */
COORDS *
xformCoords(coords, shiftX, shiftY, scale)
COORDS      *coords;
int          shiftX, shiftY, scale;
{
int          i, numPts;
COORDS       *coordsOut, *createCoords();

if (!coords)
    {
        printf(" Error in xformCoords: no COORDS structure\n");
        return NULL;
    } numPts = coords->n;
    coordsOut = createCoords(numPts);
    if (!coordsOut)
    {
        printf(" Error in xformCoords: coordsOut not created\n");
        return NULL;
    }

/* shift the origin and then scale */
    for (i = 0; i < numPts; i++)
    {
        coordsOut->x[i] = scale * (coords->x[i] + shiftX);
        coordsOut->y[i] = scale * (coords->y[i] + shiftY);
    } return (coordsOut);
}

/*
 * storeCoords(): takes a pixrect, creates a COORDS data structure,
 *                places the coordinates of the ON pixels in the
```

```
 *                    data structure, and returns the COORDS struct.
 */
COORDS *
storeCoords(pixr)
Pixrect         *pixr;
{
COORDS          *coords, *createCoords();
int             numPts, h, Bpl, arrayIndex, i, j, k, x1, x2;
unsigned char   *bytePtr, byte;
static char     procName[] = "storeCoords";

if (!isPrDefined(pixr, procName))
        return NULL;

numPts = numberPr(pixr, PIXELS);

coords = createCoords(numPts);
    if (!coords)
        return NULL;

Bpl = prBytesPerLine(pixr);
    h = pixr->pr_size.y;
    bytePtr = (unsigned char *) mpr_d(pixr)->md_image;
    arrayIndex = 0;
    for (i = 0; i < h; i++)
        for (j = 0; j < Bpl; j++)
        {
            byte = *bytePtr;
            if (byte)  /* extract the coordinates of the ON pixels */
            {
                x1 = 8 * j;
                x2 = x1 + 8;
                for (k = x1; k < x2; k++)
                    if (pr_get(pixr, k, i) == 1)
                    {
                        coords->x[arrayIndex] = k;
                        coords->y[arrayIndex] = i;
                        arrayIndex++;
                    }
            }
            bytePtr++;
        } if (arrayIndex != numPts)
        printf(" Error in storeCoords(): %d ON pixels, %d coord pairs!!\n",
                numPts, arrayIndex);

return (coords);
}

/*
 * printCoords()
 */
printCoords(coords)
COORDS      *coords;
{
int         numPts, i;

if (!coords)
```

```
    {
        printf(" Error in printCoords(): no COORD data structure\n");
        return;
    } numPts = coords->n;
    printf("     ");
    for (i = 0; i < numPts; i++)
    {
        printf("(%d,%d) ", coords->x[i], coords->y[i]);
        if (((i+1) % 6) == 0)
            printf("\n     ");
    }
    printf("\n");
}

/*
 * displayCoords():  writes pixels from input COORDS structure onto pixrect.
 */
displayCoords(pixr, coords)
Pixrect         *pixr;
COORDS          *coords;
{
int             i, numPts;
static char     procName[] = "displayCoords";

if (!isPrDefined(pixr, procName))
        return;

if (!coords)
    {
        printf(" Error in displayCoords(): COORDS structure not defined\n");
        return;
    } numPts = coords->n;
    clearPr(pixr);
    for (i = 0; i < numPts; i++)
        pr_put(pixr, coords->x[i], coords->y[i], 1);
}

/*
 * displayArray():  displays in a pixrect a binary array, at the locations
 *                  specified by a COORDS structure.  Useful for debugging.
 *          Note: number of points in COORDS should equal array size,
 *                  but this cannot be checked.
 */
displayArray(pixr, coords, array)
Pixrect         *pixr;
COORDS          *coords;
unsigned char   *array;
{
int             i, numPts;
static char     procName[] = "displayArray";

if (!isPrDefined(pixr, procName))
        return;
```

```
    if (!coords || !array)
    {
        printf(" Error in displayArray(): input data structure not defined\n");
        return;
    } numPts = coords->n;
    clearPr(pixr);
    for (i = 0; i < numPts; i++)
        pr_put(pixr, coords->x[i], coords->y[i], array[i]);
}

/*
 * writeCoords():  formatted write of a COORDS structure to named file
 */
writeCoords(filename, coords)
char        *filename;
COORDS      *coords;
{
int         n, i;
FILE        *fp;

if (!coords)
    {
        printf(" Error in writeCoords: no COORDS data structure\n");
        return 1;
    } fp = fopen(filename, "w");
    if (!fp)
    {
        printf(" Error in writeCoords: failure to open %s\n", filename);
        return 1;
    } n = coords->n;
    fprintf(fp, " Number of points: %d\n", n);
    fprintf(fp, " Coords:\n   ");
    for (i = 0; i < n; i++)
    {
        fprintf(fp, "(%d,%d) ", coords->x[i], coords->y[i]);
        if (i % 5 == 4) fprintf(fp, "\n   ");
    }
    fprintf(fp, "\n");

fclose(fp);
}

/*
 * readCoords():  formatted read of a COORDS structure from named file;
 *                returns the structure.
 */
COORDS *
readCoords(filename)
char        *filename;
{
int         n, i, xcoord, ycoord;
FILE        *fp;
```

```
COORDS       *coords, *createCoords();

fp = fopen(filename, "r");
    if (!fp)
    {
        printf(" Error in readCoords: failure to open %s\n", filename);
        return NULL;
    } fscanf(fp, " Number of points: %d\n", &n);
    coords = createCoords(n);
    fscanf(fp, " Coords:\n     ");
    for (i = 0; i < n; i++)
    {
        fscanf(fp, "(%d,%d) ", &coords->x[i], &coords->y[i]);
        if (i % 5 == 4) fscanf(fp, "\n     ");
    } fclose(fp);

return (coords);
}

/*
 *  coordsToBoxes()
 */
BOXES *
coordsToBoxes(coords)
COORDS      *coords;
{
int         *x1, *x2, *y1, *y2;
int         numPts, numRects, i, j, index, x, y, found;
BOXES       *boxes, *createBoxes();

if (!coords)
    {
        printf(" Error in coordsToBoxes: COORDS struct undefined\n");
        return NULL;
    } numPts = coords->n;
    if (numPts % 4)    /* not evenly divisible by 4 */
    {
        printf(" Error in coordsToBoxes: npts = %d not div. by 4\n", numPts);
        return NULL;
    } numRects = numPts / 4;
    boxes = createBoxes(numRects);
    if (!boxes)
        return NULL;

/* make arrays of integers for UL and LR corners of rects */
    x1 = (int *) calloc(numRects, sizeof(int));
    x2 = (int *) calloc(numRects, sizeof(int));
    y1 = (int *) calloc(numRects, sizeof(int));
    y2 = (int *) calloc(numRects, sizeof(int));
    if (!x1 || !y1 || !x2 || !y2)
    {
```

```
        printf(" Error in coordsToBoxes: calloc failure for coord. array\n");
        return NULL;
    } index = 0;
    for (i = 0; i < numPts; i++)
    {   /* go through each set of 2 coord pairs */
        x = coords->x[i];
        y = coords->y[i];
        found = FALSE;
        for (j = 0; j < index; j++)   /* search rects already started */
            if ((x == x1[j]) && !y2[j])   /* associated with rect j */
            {
                found = TRUE;
                y2[j] = y;
                if (coords->x[i] != x1[j])
                {
                    printf(" Warning in coordsToBoxes, in rect %d:\n", j);
                    printf("   x-coords of points 1 and 3: (%d) and (%d)\n",
                        x1[j], coords->x[i]);
                }
                i++;   /* go to the last point in the rect; check that it's
                          OK */
                if (coords->x[i] != x2[j])
                {
                    printf(" Warning in coordsToBoxes, in rect %d:\n", j);
                    printf("   x-coords of points 2 and 4: (%d) and (%d)\n",
                        x2[j], coords->x[i]);
                }
                if (coords->y[i] != y2[j])
                {
                    printf(" Warning in coordsToBoxes, in rect %d:\n", j);
                    printf("   y-coords of points 3 and 4: (%d) and (%d)\n",
                        y2[j], coords->y[i]);
                }
                break;   /* don't look at any more rectangles */
            }
        if (!found)   /* start a new rect */
        {
            if (index == numRects)   /* check for overflow: this can happen
                                      * if x coords of 1st and 3rd pts differ */
            {
                printf(" Error in coordsToBoxes: too many rects\n");
                return NULL;
            }
            x1[index] = x;
            y1[index] = y;
            i++;   /* get the next point */
            x2[index] = coords->x[i];
            if (coords->y[i] != y)
            {
                printf(" Warning in coordsToBoxes, in rect %d:\n", index);
                printf("   y-coords of points 1 and 2: (%d) and (%d)\n",
                    y, coords->y[i]);
            }
            index++;   /* increment to point to the first empty rect
                        * in the set of 4 arrays */
        }
    }
}
```

```
        /* transfer data from arrays to BOXES struct */
    for (i = 0; i < numRects; i++)
    {
        boxes->rect[i]->x = x1[i];
        boxes->rect[i]->y = y1[i];
        boxes->rect[i]->w = x2[i] - x1[i] + 1;
        boxes->rect[i]->h = y2[i] - y1[i] + 1;
    }

/* finish up */
    free(x1);
    free(y1);
    free(x2);
    free(y2);
    return (boxes);
}

/****************************************************************
 * Copyright (c) 1989, Xerox Corporation.  All rights reserved.  *
   Copyright protection claimed includes all forms and matters
   of copyrightable material and information now allowed by
   statutory or judicial law or hereafter granted, including
   without limitation, material generated from the software
   programs which are displayed on the screen such as icons,
   screen display looks, etc.
 ****************************************************************/

/*
 * boxesA.c:   includes subroutines
 *              --createBoxes():   creates struct, pointers, and RECT arrays
 *              --xformBoxes():    translation and scaling
 *              --printBoxes():    prints formatted boxes
 *              --displayBoxes():  writes outline of each RECT to a pixrect
 *              --writeBoxes():    writes formatted to a file
 *              --readBoxes():     reads formatted from a file
 *              --boxesToCoords(): makes coords struct of UL corners
 */ include <stdio.h>
include <llama.h>
#include <imageReps.h>
#include "alpaca.h"
#include "morph.h"
#include "strelGlobals.h"

static char             message[50];

/*
 * createBoxes():  takes the number of Rects, and returns a BOXES data
 *                 structure, that has all the rects pre-allocated.
 */
BOXES *
createBoxes(numRects)
int           numRects;
{
int           i;
BOXES         *boxes;

/* make the boxes structure */
    boxes = (BOXES *) calloc(1, sizeof(BOXES));
```

```
    if (!boxes)
    {
        printf(" Error in createBoxes: calloc failure for boxes\n");
        return NULL;
    }
    boxes->n = numRects;

/* make the array of pointers to rects, and then make the
           array of rects */
    boxes->rect = (RECT **) calloc(numRects, sizeof(RECT *));
    for (i = 0; i < numRects; i++)
    {
        boxes->rect[i] = (RECT *) calloc(1, sizeof(RECT));
        if (!boxes->rect[i])
        {
            printf(" Error in createBoxes: calloc failure for rect\n");
            return NULL;
        }
    } return (boxes);
}

/*
 * xformBoxes()
 */
BOXES *
xformBoxes(boxes, shiftX, shiftY, scale)
BOXES           *boxes;
int              shiftX, shiftY, scale;
{
int             i, numRects;
BOXES           *boxesOut, *createBoxes();

if (!boxes)
    {
        printf(" Error in xformBoxes: no BOXES structure\n");
        return NULL;
    } numRects = boxes->n;
    boxesOut = createBoxes(numRects);
    if (!boxesOut)
    {
        printf(" Error in xformBoxes: boxesOut not created\n");
        return NULL;
    }

/* shift the origin and then scale */
    for (i = 0; i < numRects; i++)
    {
        boxesOut->rect[i]->x = Max(0, boxes->rect[i]->x + shiftX);
        boxesOut->rect[i]->y = Max(0, boxes->rect[i]->y + shiftY);
        boxesOut->rect[i]->x *= scale;
        boxesOut->rect[i]->y *= scale;
        boxesOut->rect[i]->w = boxes->rect[i]->w * scale;
        boxesOut->rect[i]->h = boxes->rect[i]->h * scale;
    } return (boxesOut);
}
```

```
/*
 * printBoxes()
 */
printBoxes(boxes)
BOXES       *boxes;
{
int         numRects, i;

if (!boxes)
    {
        printf(" Error in printBoxes(): no BOXES data structure\n");
        return;
    } numRects = boxes->n;
    printf(" Number of rectangles = %d\n", numRects);
    for (i = 0; i < numRects; i++)
        printf("     (%d,%d,%d,%d)\n", boxes->rect[i]->x, boxes->rect[i]->y,
                boxes->rect[i]->w, boxes->rect[i]->h);
}

/*
 * displayBoxes():  writes rectangle outline for each RECT onto a pixrect.
 */
displayBoxes(pixr, boxes)
Pixrect     *pixr;
BOXES       *boxes;
{
int         i, numRects, x1, y1, x2, y2;
static char procName[] = "displayBoxes";

if (!isPrDefined(pixr, procName))
        return;

if (!boxes)
    {
        printf(" Error in displayBoxes(): BOXES structure not defined\n");
        return;
    } numRects = boxes->n;
    clearPr(pixr);
    for (i = 0; i < numRects; i++)
    {
        x1 = boxes->rect[i]->x;
        y1 = boxes->rect[i]->y;
        x2 = x1 + boxes->rect[i]->w - 1;
        y2 = y1 + boxes->rect[i]->h - 1;
        pr_vector(pixr, x1, y1, x2, y1, PIX_SET, 1);
        pr_vector(pixr, x2, y1, x2, y2, PIX_SET, 1);
        pr_vector(pixr, x2, y2, x1, y2, PIX_SET, 1);
        pr_vector(pixr, x1, y2, x1, y1, PIX_SET, 1);
    }
}

/*
 * writeBoxes():  formatted write of a BOXES structure to named file
 */
writeBoxes(filename, boxes)
char        *filename;
```

```
BOXES         *boxes;
{
int           n, i, x, y, w, h;
FILE          *fp;

if (!boxes)
    {
        printf(" Error in writeBoxes: no BOXES data structure\n");
        return 1;
    }
    fp = fopen(filename, "w");
    if (!fp)
    {
        printf(" Error in writeBoxes: failure to open %s\n", filename);
        return 1;
    } n = boxes->n;
    fprintf(fp, " Number of boxes: %d\n", n);
    for (i = 0; i < n; i++)
    {
        fprintf(fp, "    Box %d:\n", i + 1);
        x = boxes->rect[i]->x;
        y = boxes->rect[i]->y;
        w = boxes->rect[i]->w;
        h = boxes->rect[i]->h;
        fprintf(fp, "       (%d,%d,%d,%d)\n", x, y, w, h);
    } fclose(fp);
}

/*
 * readBoxes():   formatted read of a BOXES structure from named file;
 *                returns the structure.
 */
BOXES *
readBoxes(filename)
char          *filename;
{
int           n, i, x, y, w, h, tmp;
FILE          *fp;
BOXES         *boxes, *createBoxes();

fp = fopen(filename, "r");
    if (!fp)
    {
        printf(" Error in readBoxes: failure to open %s\n", filename);
        return NULL;
    } fscanf(fp, " Number of boxes: %d\n", &n);
    boxes = createBoxes(n);
    for (i = 0; i < n; i++)
    {
        fscanf(fp, "    Box %d:\n", &tmp);
        fscanf(fp, "       (%d,%d,%d,%d)\n", &x, &y, &w, &h);
        boxes->rect[i]->x = x;
        boxes->rect[i]->y = y;
        boxes->rect[i]->w = w;
        boxes->rect[i]->h = h;
```

```
    } fclose(fp);

return (boxes);
}
/*
*   boxesToCoords():    returns the UL corners of each rect, in
*                       a COORDS data structure.
*/
COORDS *
boxesToCoords(boxes)
BOXES       *boxes;
{
int         i, n;
COORDS      *coords, *createCoords();

if (!boxes)
    {
        printf(" Error in boxesToCoords: no BOXES data structure\n");
        return NULL;
    } n = boxes->n;
    coords = createCoords(n);
    for (i = 0; i < n; i++)
    {
        coords->x[i] = boxes->rect[i]->x;
        coords->y[i] = boxes->rect[i]->y;
    } return coords;
}

/***********************************************************
*   Copyright (c) 1989, Xerox Corporation. All rights reserved. *
    Copyright protection claimed includes all forms and matters
    of copyrightable material and information now allowed by
    statutory or judicial law or hereafter granted, including
    without limitation, material generated from the software
    programs which are displayed on the screen such as icons,
    screen display looks, etc.
***********************************************************/

/*
*   tile.c--includes subroutines
*                   createTile()
*                   displayTile()
*                   destroyTile()
*
*                   rectOfPixrect()
*/ include <stdio.h>
include <llama.h>
#include <imageReps.h>
#include "alpaca.h"
#include "morph.h"

static char     message[80];
```

```
/*
 *  createTile()
 */
PRTILE *
createTile(pixr, nx, ny)
Pixrect       *pixr;
int           nx, ny;
{
int           i, j, w, h, x, y;
PRTILE        *prtile;
Pixrect       ***tile;
static char   procName[] = "createTile";

if (!isPrDefined(pixr, procName))
        return NULL;

tile = (Pixrect ***) calloc(ny, sizeof(Pixrect **));
    if (!tile)
    {
        printf(" Error in createTile: calloc failure for row ptrs\n");
        return NULL;
    } for (i = 0; i < nx; i++)
    {
        tile[i] = (Pixrect **) calloc(nx, sizeof(Pixrect *));
        if (!tile[i])
        {
            printf(" Error in createTile: calloc failure for ptrs in row\n");
            return NULL;
        }
    } w = pixr->pr_size.x / nx;    /* width of each tile */
    h = pixr->pr_size.y / ny;    /* height of each tile */
    for (i = 0; i < ny; i++)
    {
        y = i * h;
        for (j = 0; j < nx; j++)
        {
            x = j * w;
            tile[i][j] = mem_create(w, h, 1);
            if (!tile[i][j])
            {
                printf(" Error in createTile: mem_create failure for tile\n");
                return NULL;
            }
            pr_rop(tile[i][j], 0, 0, w, h, PIX_SRC, pixr, x, y);
        }
    } prtile = (PRTILE *) calloc(1, sizeof(PRTILE));
    prtile->nx = nx;
    prtile->ny = ny;
    prtile->w = w;
    prtile->h = h;
    prtile->tile = tile;

return (prtile);
}
```

```
/*
 * displayTile()
 */
displayTile(pixr, prtile)
Pixrect         *pixr;
PRTILE          *prtile;
{
int             nx, ny, w, h, x, y, i, j;
static char     procName[] = "displayTile";

if (!isPrDefined(pixr, procName))
        return 1;

if (!prtile)
    {
        printf(" Error in displayTile: PRTILE structure not defined\n");
        return 1;
    } nx = prtile->nx;
    ny = prtile->ny;
    w = prtile->w;
    h = prtile->h;

if ((nx * w > pixr->pr_size.x) || (ny * h > pixr->pr_size.y))
    {
        printf(" Error in displayTile: destination pr too small for tiles\n");
        return 1;
    } clearPr(pixr);

for (i = 0; i < ny; i++)
    {
        y = i * h;
        for (j = 0; j < nx; j++)
        {
            x = j * w;
            pr_rop(pixr, x, y, w, h, PIX_SRC, prtile->tile[i][j], 0, 0);
            opPrPw(pw6, pixr, COPY);
        }
    } return 0;
}

/*
 * destroyTile()
 */
PRTILE *
destroyTile(prtile)
PRTILE          *prtile;
{
int             nx, ny, i, j;
Pixrect         ***tile;

if (!prtile)
    {
        printf(" Error in destroyTile:  PRTILE structure not defined\n");
        return NULL;
    }
```

```
    nx = prtile->nx;
    ny = prtile->ny;
    tile = prtile->tile;
    for (i = 0; i < ny; i++)
    {
        for (j = 0; j < nx; j++)
            pr_close(tile[i][j]);
        free(tile[i]);
        tile[i] = NULL;
    }
    free(tile);
    free(prtile);

return NULL;
}

/*
 * rectOfPixrect():   returns the rect part of a pixrect, if valid; else NULL.
 */
Pixrect *
rectOfPixrect(pixr, rect)
Pixrect        *pixr;
RECT           *rect;
{
int             w, h;
Pixrect        *pixrOut;
static char     procName[] = "rectOfPixrect";

if (!isPrDefined(pixr, procName))
        return NULL;

if (!rect)
    {
        printf(" Error in rectOfPixrect: rect not defined\n");
        return NULL;
    } w = pixr->pr_size.x;
    h = pixr->pr_size.y;
    if ((rect->x + rect->w > w) || (rect->y + rect->h) > h)
    {
        printf(" Error in rectOfPixrect: rect not valid size\n");
        return NULL;
    } pixrOut = mem_create(rect->w, rect->h, 1);
    if (!pixrOut)
    {
        printf(" Error in rectOfPixrect: pixrOut not created\n");
        return NULL;
    } pr_rop(pixrOut, 0, 0, rect->w, rect->h, PIX_SRC, pixr, rect->x, rect->y);
    return pixrOut;
}
```

What is claimed is:

1. In a digital processing system, a method of processing a binary text image containing at least a first region containing at least a first word having a first type style and a second region containing at least a second word having a second type style to identify locations of said first words having said first type style, comprising the steps of:

a) eroding said binary text image with a first structuring element to provide a first destination image having a plurality of remaining pixels, said first structuring element more likely to provide a hit in said first region than in said second region; and b) morphologically processing said remaining pixels of said first destination image to create a mask image substantially masking said locations of said first words.

2. The method as recited in claim 1 wherein said first type style is an italic type style.

3. In a digital processing system, a method of processing a binary text image to identify and distinguish a location of a first type style wherein said first type style is an italic type style, comprising the step of eroding said binary text image with a first structuring element, wherein said first structuring element comprises a plurality of ON pixels along a first line, said first line at an angle of greater than about 5 degrees from vertical and less than about 25 degrees from the vertical, said structuring element further comprising a plurality of OFF pixels adjacent said first line, to provide a first destination image, said first structuring element more likely to provide a hit in said first region than in said second region, remaining pixels used to identify said location of said first type style, and distinguish said location of said first type style from said second region of said second type style.

4. The method as recited in claim 3 wherein said first line is at an angle of between about 14 and 18 degrees from vertical.

5. The method as recited in claim 3 wherein said structuring element further comprises a plurality of don't care pixels between said plurality of ON pixels and said plurality of OFF pixels.

6. The method as recited in claim 3 wherein said structuring element matches a left edge of italic characters in said image.

7. The method as recited in claim 1 wherein said first type style is a bold type style.

8. In a digital processing system, a method of processing a binary text image to identify and distinguish a location of a first type style, wherein said first type style is a bold type style, and wherein said image contains at least a first region of said first type style and a second region of a second type style, comprising the step of eroding said binary text image with a fist structuring element, wherein said step of eroding comprises the steps of: a) thinning the image horizontally; b) eroding vertically using a SE having at least two adjacent vertical ON pixels; c) determining a ratio of a number of ON pixels in said image in a previous iteration to a number of ON pixels in a present iteration; d) testing said ratio by comparison to a threshold; and e) if said ratio is not above said threshold, returning to step a); to provide a first destination image, said first structuring element more likely to provide a hit in said first region than in said second region, remaining pixels used to identify said location of said first type style, and distinguish said location of said first type style from said second region of said second type style.

9. The method as recited in claim 8 wherein said threshold is between about 2 and 2.4.

10. The method as recited in claim 8 wherein said threshold is about 2.2.

11. The method as recited in claims 1, 2, or 7 further comprising the step of using said created mask image to create a second destination image containing substantially only said first words having said first type style.

12. The method as recited in claim 11 wherein the step of forming said second destination image further comprises the steps of:

a) consolidating said first destination image so as to form said mask image; and b) using said mask image to extract regions of said first type style in said binary text image.

13. The method as recited in claim 11 wherein the step of forming said second destination image further comprises the steps of:

a) dilating said first destination image to produce a third destination image;

b) closing said third destination image to produce a fourth destination image;

c) opening said fourth destination image and using the opened image to produce said mask image; and d) using said mask image to extract regions of said first type style in said binary text image.

14. The method as recited in claim 12 or 13 wherein the step of extracting regions of said first type style in said binary text image is a step of ANDing said mask and said text image.

15. In a digital processing system, a method of processing a binary text image to identify and distinguish a location of a first type style, said image containing at least a first region of said first type style and a second region of a second type style, said method comprising the steps of:

a) eroding said binary text image with a first structuring element to provide a first destination image, said first structuring element more likely to provide a hit in said first region than in said second region, remaining pixels used to identify said location of said first type style, and distinguish said location of said first type style from said second region of said second type style;

b) using said first destination image to form a second destination image containing substantially only said first type style from said text image, comprising the steps of:

i) dilating said first destination image to produce a third destination image;

ii) closing said third destination image to produce a fourth destination image;

iii) opening said fourth destination image to produce a mask; and iv) using said mask to locate said first type style in said text image to produce said second destination image;

wherein the step of dilating is preceded by the step of reducing said first destination image.

16. The method as recited in claim 11 wherein the step of forming said second destination image further comprises the steps of:

a) forming a seed image from said first destination image, said seed image comprising ON pixels only within regions of said first type style;

b) growing said seed image into said mask image; and c) ANDing said mask image with said binary text image to provide said second destination image.

17. In a digital processing system, a method of processing a binary text image to identify and distinguish a location of a first type style, said image containing at least a first region of said first type style and a second region of a second type style, comprising the step of eroding said binary text image with a first structuring element to provide a first destination image, using said first destination image to form a second destination image containing substantially only said first type style from said text image wherein the step of forming a second destination image further comprises the steps of, i) forming a seed image from said first destination image wherein said step of forming a seed image further comprises the steps of, a) dilating said first destination image vertically, b) closing said image horizontally, c) opening said image horizontally; d) dilating said image horizontally; and e) ANDing an image from step d) with said binary text image to form said seed image; said seed image comprising ON pixels only within regions of said first type style, ii) growing said seed image into a mask image to provide a third destination image, and iii) ANDing said third destination image with said binary text image to provide said second destination image said first structuring element more likely to provide a hit in said first region than in said second region; remaining pixels used to identify said location of said first type style, and distinguish said location of said first type style from said second region of said second type style.

18. In a digital processing system, a method of processing a binary text image to identify and distinguish a location of a first type style, said image containing at least a first region of said first type style and a second region of a second type style, comprising the step of eroding said binary text image with a first structuring element to provide a first destination image, using said first destination image to form a second destination image containing substantially only said first type style from said text image wherein the step of forming a second destination image further comprises the steps of, i) forming a seed image from said first destination image; said seed image comprising ON pixels only within regions of said first type style, ii) growing said seed image into a mask image to provide a third destination image, wherein said step of growing said seed image into a mask image further comprises the steps of: a) saving said seed image as a saved image; b) dilating said seed image; c) ANDing an image from step b) with said mask image to produce a partially filled seed image; d) comparing said partially filled seed image with said saved image; e) if said seed image has not changed from a previous iteration, outputting said partially filled seed image as said third destination image; and f) if said seed image differs from a previous iteration, saving said partially filled seed as a saved image and returning to step b); and iii) ANDing said third destination image with said binary text image to provide said second destination image said first structuring element more likely to provide a hit in said first region than in said second region; remaining pixels used to identify said location of said first type style, and distinguish said location of said first type style from said second region of said second type style.

19. A method of forming a word mask from a binary image comprising the step of dilating said image with a horizontal structural element, said horizontal structural element comprising at least two adjacent ON pixels preceded by the step of reducing said binary image at least once.

20. A method of forming a word mask from a binary image comprising the step of dilating said image with a horizontal structural element, said horizontal structural element comprising at least two adjacent ON pixels preceded by two reductions by a factor of 2 with threshold LEVEL=1.

21. The method as recited in claims 19 or 20 wherein said structural element is a 2×1 structural element.

22. An optical character recognition system for identifying characters of a first type style in a document, said document containing characters of a first type style and a second type style, comprising:
a) input means for inputting a binary text image of said document;
b) means for identifying a region of said first type style programmed to erode said input binary text image with an structural element to provide a first destination image having a plurality of remaining pixels, said structural element more likely to provide a hit in said region of said first type style than in other regions, and said region identifying means programmed to create a mask image from said plurality of remaining pixels of said first destination image, said mask image substantially covering characters of said first type style; and
c) means for identifying characters substantially covered by said mask image.

23. An optical character recognition system as recited in claim 22 further comprising means for outputting text in said first text style in said first text style and words in said second text style in said second text style.

24. The optical character recognition system set forth in claim 22 further comprising:
a) means for identifying individual words comprising said identified characters substantially covered by said mask image.

25. The optical character recognition system set forth in claim 24 further comprising means for checking spelling of said identified words.

26. In a digital processing means, a method of identifying handwritten annotation areas of an input image having handwritten annotation areas and machine printed text areas, said method comprising the steps of:
a) morphologically processing a region of said input image having a plurality of handwritten and machine printed characters to produce an image having a plurality of remaining pixels concentrated in either said machine printed text areas or said handwritten annotation areas;
b) morphologically processing said plurality of remaining pixels to produce a mask image substantially masking either said machine printed text areas or said handwritten annotation areas; and
c) using said mask image to produce a destination image, said destination image identifying substantially only said machine printed text or said handwritten annotations areas.

27. The method as recited in claim 26 wherein said step of processing further comprises the step of identifying regions of machine printed text or handwritten annotations with a SE which selectively identifies said machine printed text or handwritten annotations to produce a first intermediate image.

28. The method as recited in claim 26 wherein said mask image is formed by the steps of:
a) extracting seed pixels in substantially only said handwritten annotation or machine printed text areas; and
b) filling said seed pixels by a fillclip operation to a clipping mask, said clipping mask comprising substantially solid regions of ON pixels over said handwritten annotation areas and said machine printed text areas.

29. The method as recited in claim 28 further comprising the step of forming a first output handwritten annotation image or a machine printed text image by ANDing said mask image with said input image.

30. The method as recited in claim 29 further comprising the step of XORing said first output image with said input image to form a second output image.

31. A digital computer programmed to perform the methods of claims 1, 2, 3, 4, 5, 6, 7, 8, 9, 26, 27, 28, 29 or 30.

32. An optical character reader programmed to remove handwritten annotations by the method of claims 1, 2, 3, 4, 5, 6, 7, 8, 9, 26, 27, 28, 29 or 30 prior to performing character recognition operations.

33. The method as recited in claim 17 wherein said first type style is an italic type style.

34. The method as recited in claim 17 wherein said first type style is a bold type style.

35. The method as recited in claim 18 wherein said first type style is an italic type style.

36. The method as recited in claim 18 wherein said first type style is a bold type style.

37. The method as recited in claim 1 wherein the step of creating said mask image from said plurality of remaining pixels comprises the steps of:

a) dilating said first destination image to produce a second destination image containing a plurality of closely spaced lines in said first region and a plurality of isolated lines in said second region;

b) closing said second destination image to connect individual ones of said plurality of closely spaced lines and produce a third destination image; and c) opening said third destination image to remove said plurality of isolated lines from said second region resulting in said mask image substantially masking said locations of said first words.

38. The method as recited in claim 1 wherein the step of creating said mask image from said plurality of remaining pixels comprises the steps of:

a) forming a text seed from said remaining pixels, said text seed having ON pixels only within regions of said first type style;

b) forming a word mask from said binary text image, said word mask substantially masking words having said first type style and words having said second type style; and c) using said word mask to grow said text seed and create said mask image substantially masking said locations of said first words.

* * * * *